(12) United States Patent
Green

(10) Patent No.: US 6,354,244 B1
(45) Date of Patent: Mar. 12, 2002

(54) MODULAR GARDEN ACCESSORY SYSTEM

(76) Inventor: Larry Green, 16529 NE. 36th Ct., Redmond, WA (US) 98052

(*) Notice: Subject to any disclaimer, the term of this patent is extended or adjusted under 35 U.S.C. 154(b) by 0 days.

(21) Appl. No.: 09/397,482

(22) Filed: Sep. 16, 1999

Related U.S. Application Data

(63) Continuation-in-part of application No. 08/951,611, filed on Oct. 16, 1997
(60) Provisional application No. 60/029,071, filed on Oct. 23, 1996.

(51) Int. Cl.⁷ .......................... A01K 31/00; A01K 39/00
(52) U.S. Cl. .................................................. 119/429
(58) Field of Search ............................... 119/52.2, 52.3, 119/57.8, 57.9, 428, 429, 430, 431, 432, 433, 434, 435; 52/40, 169.13, 301, 726.3, 736.2

(56) References Cited

U.S. PATENT DOCUMENTS

| | | | |
|---|---|---|---|
| 278,389 A | 5/1883 | Bigelow | 52/165 |
| 1,024,761 A | 4/1912 | Anderson | 52/301 |
| 1,025,886 A | 5/1912 | Schoening | 248/235 |
| 1,138,826 A | 5/1915 | Younis | 403/375 X |
| 1,185,345 A * | 5/1916 | Reiber | |
| 1,988,260 A | 1/1935 | Berghoff | 248/317 X |
| 2,046,152 A | 6/1936 | Dean | 52/301 |
| 2,277,332 A | 3/1942 | Lamb | 211/196 |
| 2,524,502 A * | 10/1950 | Wilkinson | |
| 2,579,240 A | 12/1951 | Masoner | 248/317 |
| 2,898,069 A | 8/1959 | Kramer | 248/314 X |
| 3,053,226 A * | 9/1962 | Dunn | |
| 3,094,100 A | 6/1963 | Wise | 119/57.8 X |
| 3,228,577 A | 1/1966 | Croft | 248/317 X |
| D234,521 S | 3/1975 | Fry | |
| D234,522 S | 3/1975 | Fry | |
| D234,703 S | 4/1975 | Fry | |
| 3,939,985 A | 2/1976 | Hochman | 248/224.7 X |
| 4,156,332 A | 5/1979 | Thompson | 52/165 |
| 4,326,352 A | 4/1982 | Barth | 248/156 X |
| 4,625,937 A | 12/1986 | Haase | 248/156 X |
| 4,649,865 A * | 3/1987 | Riggi | |
| 4,765,277 A | 8/1988 | Bailey et al. | 119/57.9 |
| 4,767,088 A | 8/1988 | Fielder et al. | 119/57.9 X |
| 4,934,319 A * | 6/1990 | Waltemeyer | 119/52.2 |
| 5,195,460 A | 3/1993 | Loken | 119/52.3 X |
| 5,354,223 A * | 10/1994 | Wawzonek | 119/52.1 |
| 5,517,928 A | 5/1996 | Erdman | 403/375 X |

FOREIGN PATENT DOCUMENTS

DE 1028648 4/1958 ............. 248/317

OTHER PUBLICATIONS

Bishop, Rustic and Redwood Birdhouses Feeders and Food Catalog, 1963–1964.
Iron Design bird feeder products, pp. 5–9.
The RainForest Feeder by Creative Native Designs.
Droll Yankees Inc. bird feeder designs.
Country Home Wild Bird Care Products.
Wing Song Bird Feeder System with Sound Monitor.

* cited by examiner

Primary Examiner—Thomas Price
(74) Attorney, Agent, or Firm—Michael R. Schacht; Hughes & Schacht, PLLC

(57) ABSTRACT

A modular garden accessory system. This system comprises a post assembly, one or more branch assemblies, and one or more garden accessories that may be connected to or suspended from the post assembly or the branch assemblies. The system is comprised of a relatively small number of standard parts that may be connected in a number of configurations to obtain a relatively large number of accessories. The system is designed for easy assembly with a minimum number of fasteners. Many of the accessories are constructed about a plastic base member that defines an upper surface appropriate for use as a feeder and a lower surface that allows the accessory to be attached to a post assembly or branch assembly in one of a number of configurations.

24 Claims, 118 Drawing Sheets

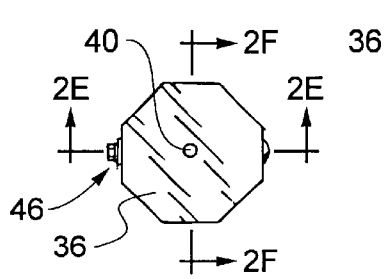
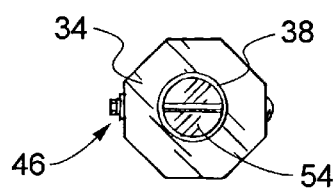
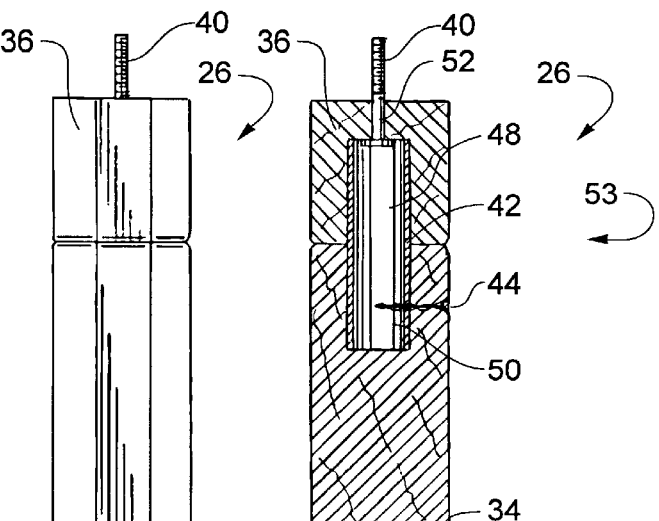
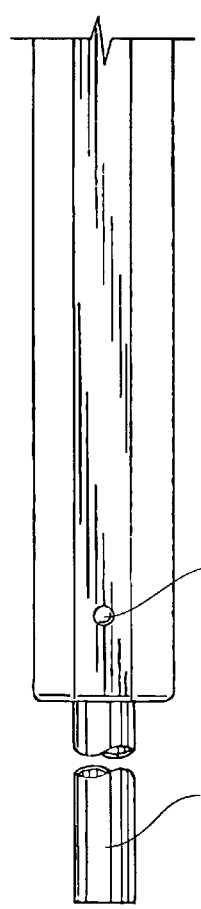
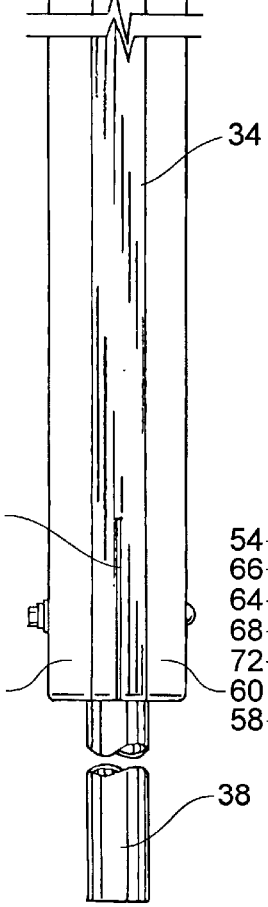
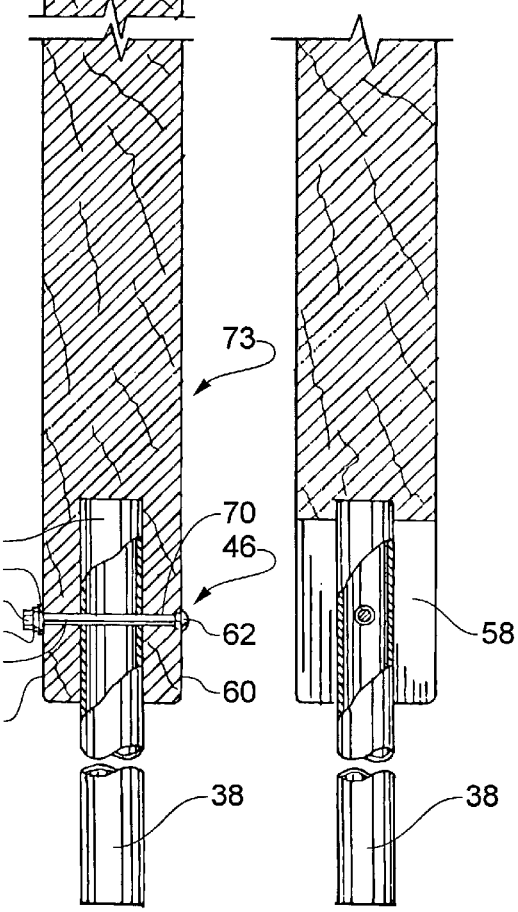
FIG.2D
FIG.2C
FIG.2B   FIG.2A   FIG.2E   FIG.2F

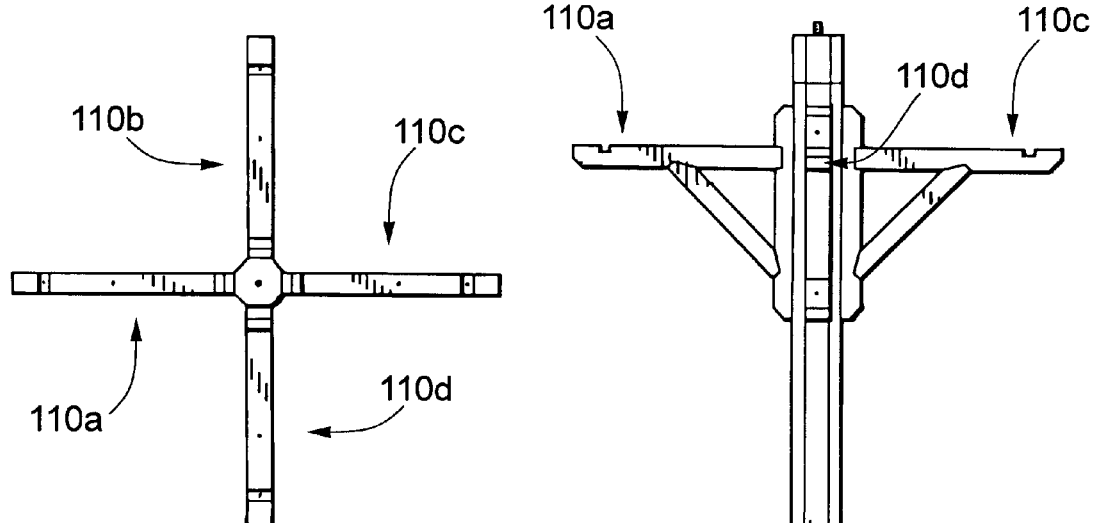
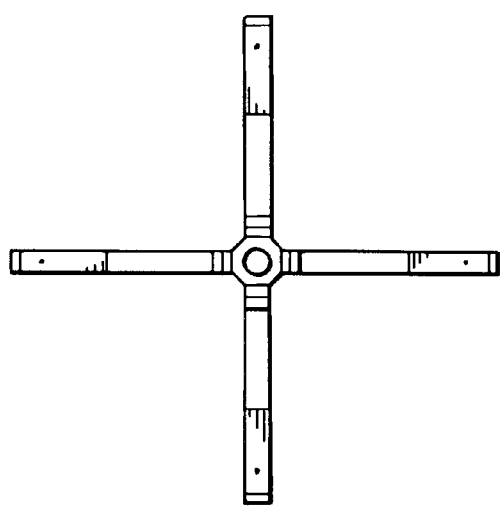
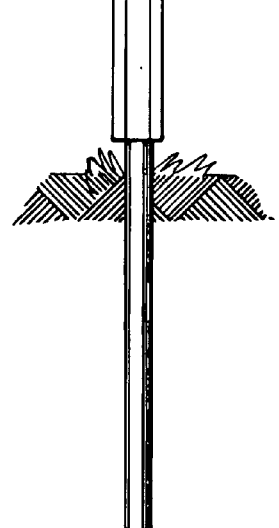
FIG.9B
FIG.9C  FIG.9A

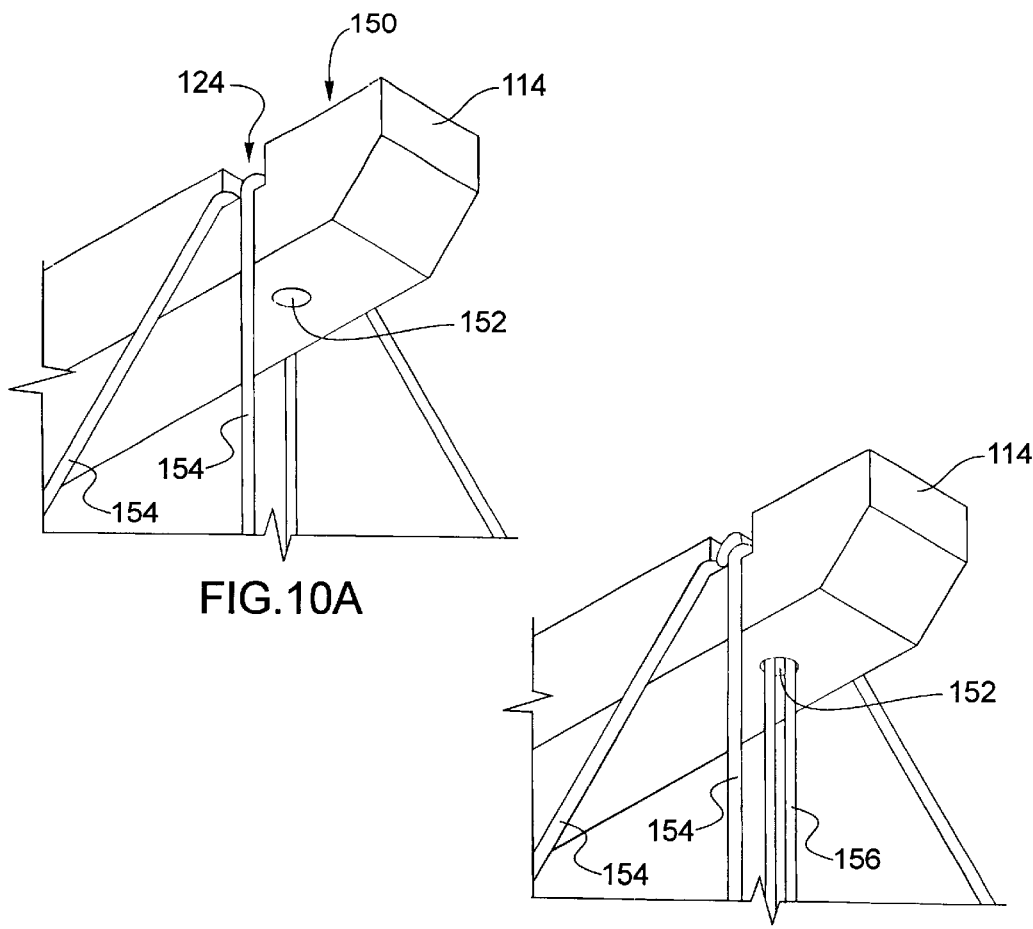
FIG.10A
FIG.10B
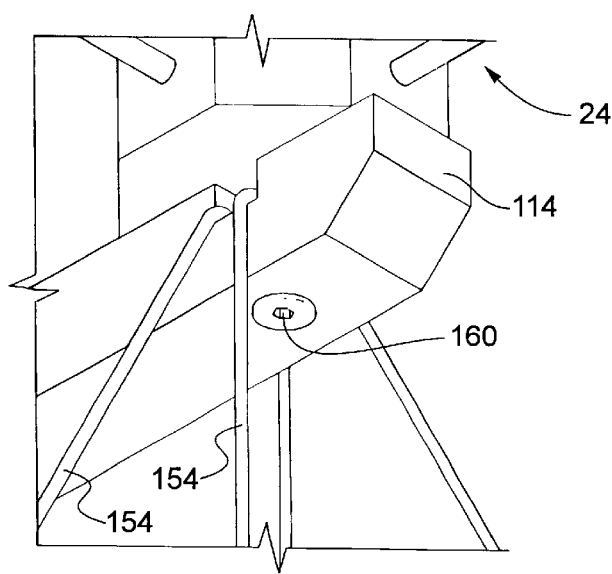
FIG.10C

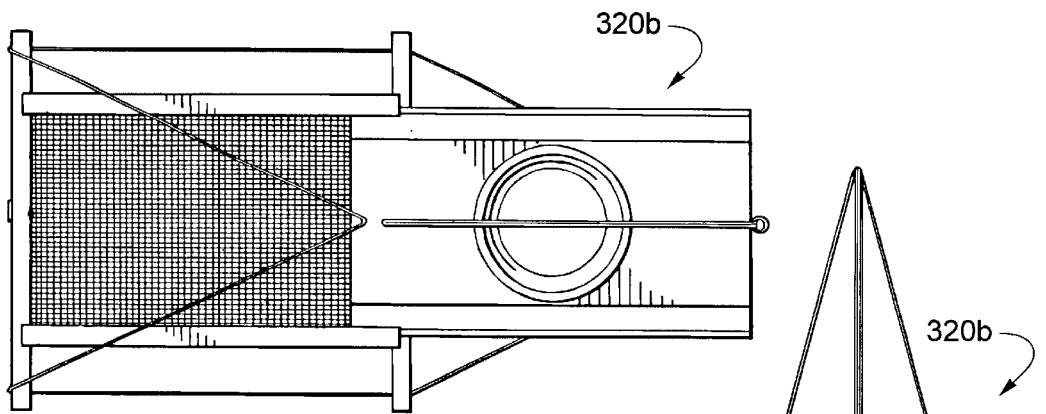
FIG.15F
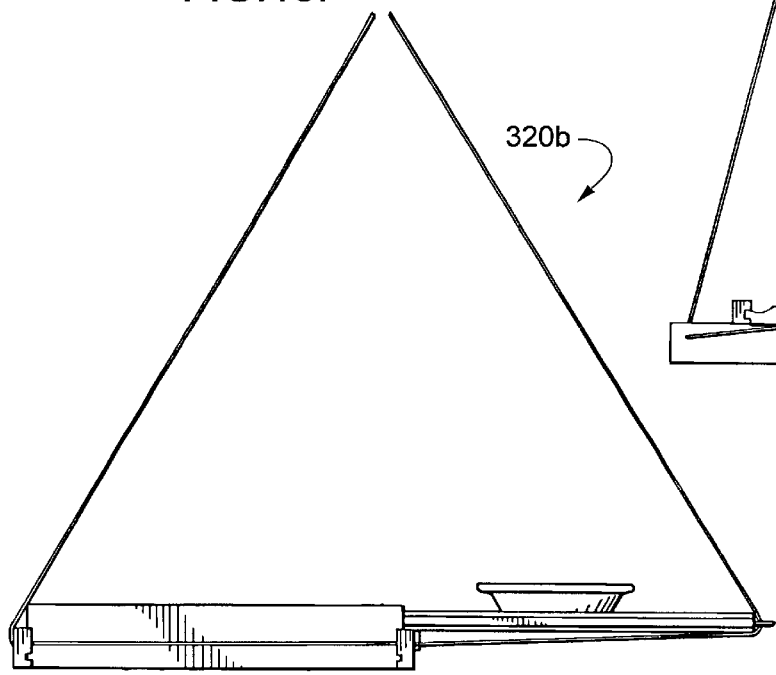
FIG.15G
FIG.15H
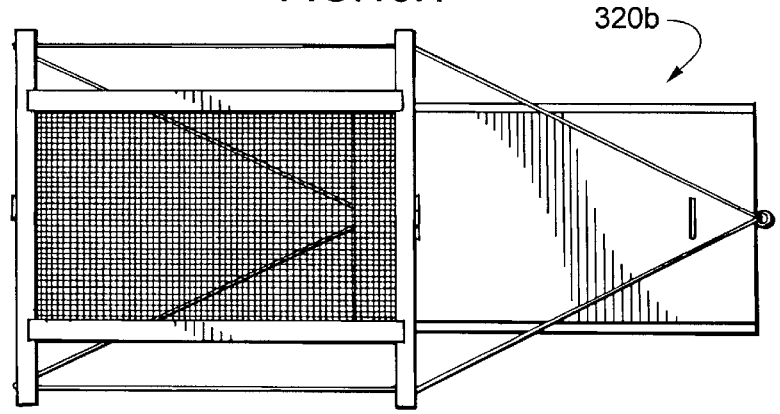
FIG.15I

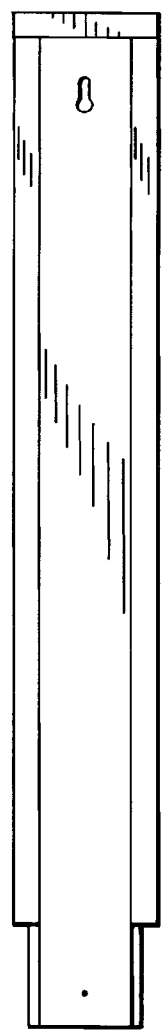
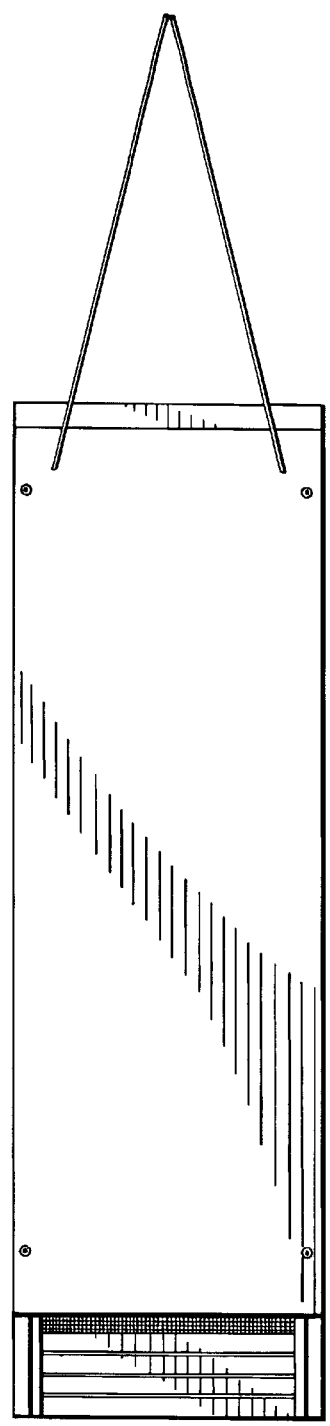
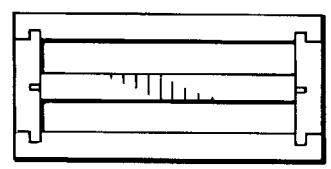
FIG.22B        FIG.22C
FIG.22D

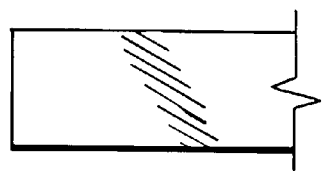
FIG.33B
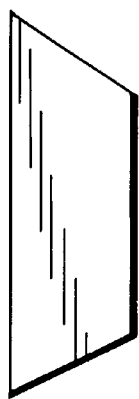
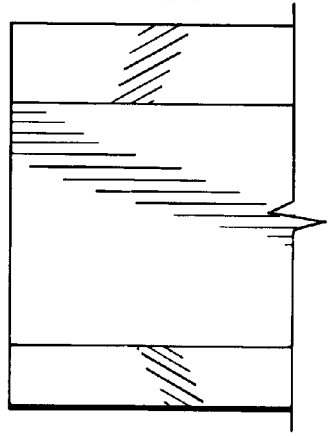
FIG.33A  FIG.33C
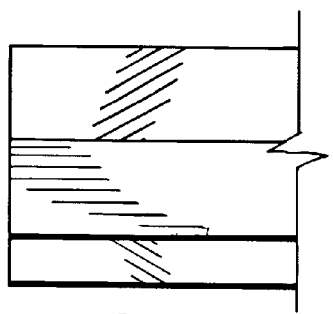
FIG.34B
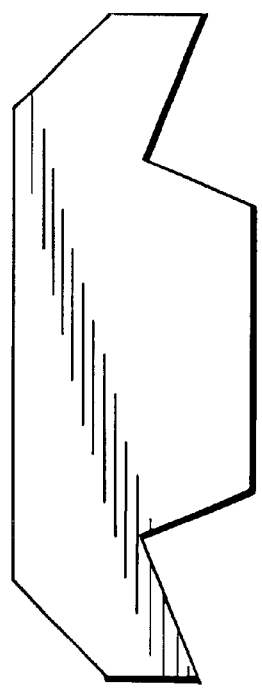 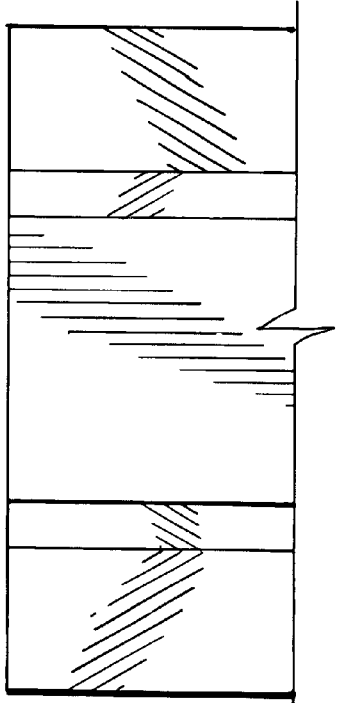
FIG.34A  FIG.34C

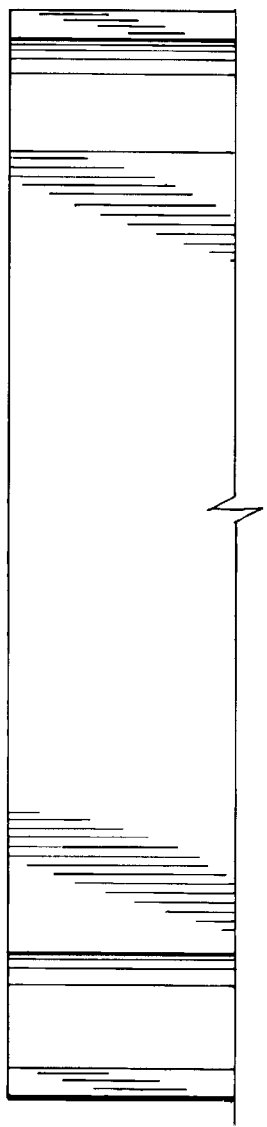
FIG.36B
FIG.36A   FIG.36C
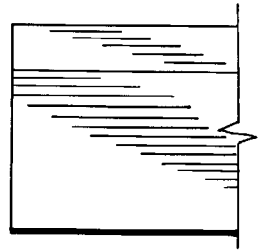
FIG.37B
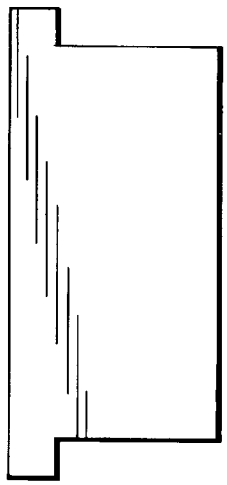
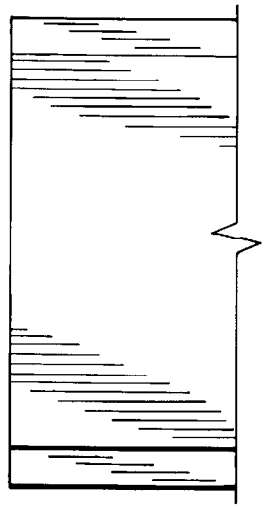
FIG.37A   FIG.37C
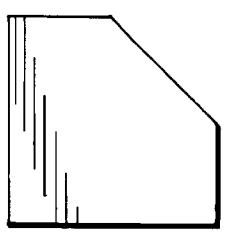
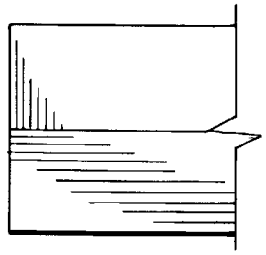
FIG.38A   FIG.38B
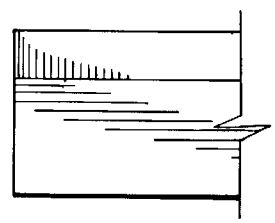
FIG.39A   FIG.39B

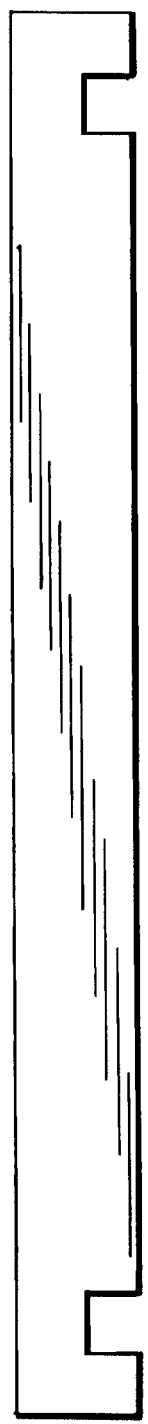
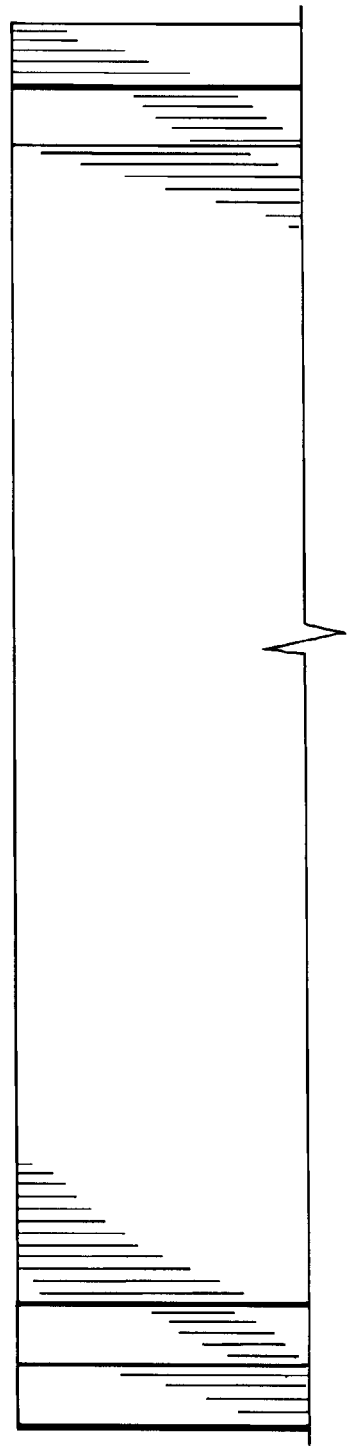
FIG.40B
FIG.40A   FIG.40C

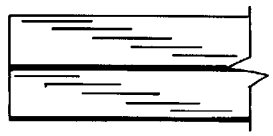
FIG.41B
FIG.43B
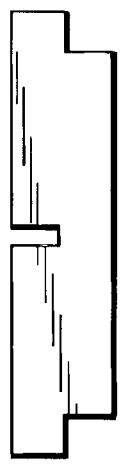 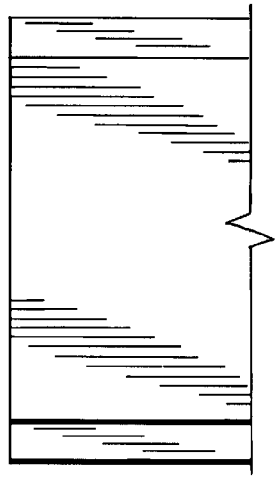  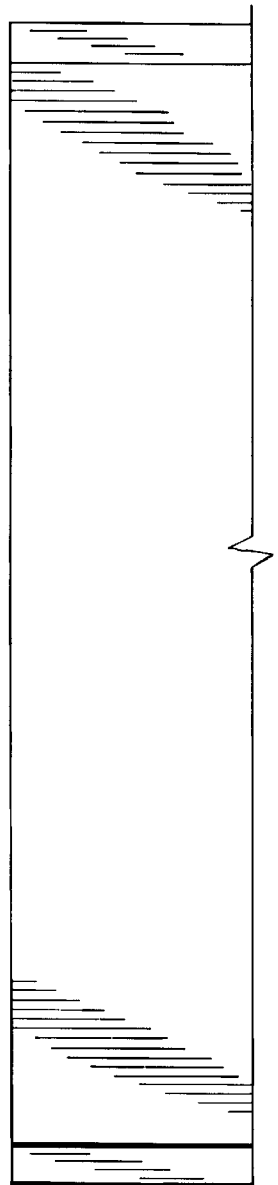
FIG.41A   FIG.41C
FIG.42B
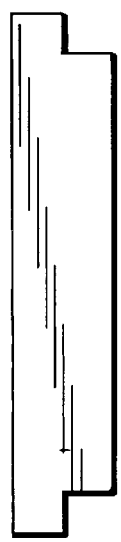 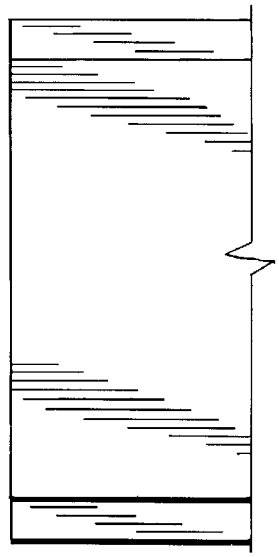
FIG.43A   FIG.43C
FIG.42A   FIG.42C

FIG.44B
FIG.47B
 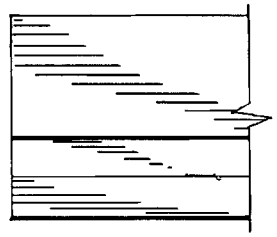
FIG.44A  FIG.44C
 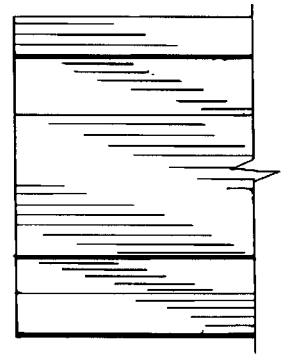
FIG.47A  FIG.48
FIG.45B
 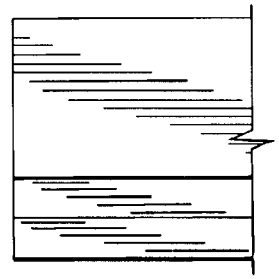
FIG.45A  FIG.45C
FIG.49B
FIG.46B
 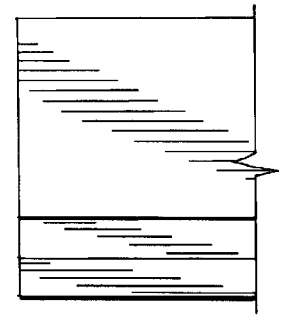
FIG.46A  FIG.46C
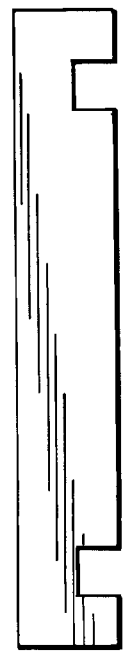 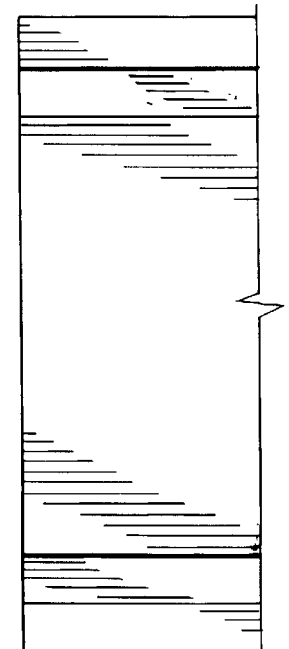
FIG.49A  FIG.49C

MODULAR GARDEN ACCESSORY SYSTEM

RELATED APPLICATIONS

This application is a continuation-in-part of U.S. Ser. No. 08/951,611 filed on Oct. 16, 1997, which claimed priority of U.S. Provisional Patent Application No. 60/029,071, which was filed on Oct. 23, 1996.

TECHNICAL FIELD

The present invention relates to outdoor accessories such as planters, bird feeders, and the like and, more particularly, a modular system for displaying accessories such as bird houses, planters, and the like.

BACKGROUND OF THE INVENTION

Homeowners have long used what will be referred to herein as "garden accessories" in outdoor areas such as gardens, patios, decks, and balconies. As used herein, the term "garden accessories" encompasses planters, birdfeeders, birdhouses, bird perches, and other objects that may be hung or fixed in outdoor locations.

Garden accessories are exposed to the elements and thus must be rugged, but are used primarily for aesthetic reasons and thus must present a pleasant appearance.

Traditionally, garden accessories were viewed as discrete objects. A person setting out to design a birdfeeder, for example, would not consider how the birdfeeder under design would fit, both functionally and aesthetically, with other garden accessories. The overall design was considered the domain of the homeowner. Accordingly, currently available garden accessories are not sold as part of broader system.

OBJECTS OF THE INVENTION

From the foregoing, it should be apparent that one primary goal of the present invention is to obtain a modular garden accessory system.

Another more specific object of the present invention is to obtain a modular garden accessory system having a favorable mix of the following characteristics:

- allows the homeowner substantial flexibility in the design of a landscape;
- does not require the homeowner to engineer connections between various garden accessories;
- provides garden accessories and components for combining garden accessories that are rugged, functional, and aesthetically pleasing;
- allows a large system to be manufactured using a relatively small number of standardized parts; and
- can be easily assembled by non-skilled people.

SUMMARY OF THE INVENTION

The present invention is a modular garden accessory system in which the various components of the system have been engineered for consistent appearance and function yet provide the landscape designer with significant flexibility.

In one form, the system of the present invention comprises a support system from which garden accessories may be hung or on which garden accessories may be mounted. The support system comprises a post assembly and possibly one or more branch assemblies. The branch assemblies comprise a support member that horizontally extends from the post assembly; various garden accessories may be hung from or mounted on the support member. Optionally, garden accessories may be mounted directly to the post assembly.

The garden accessories that are hung from the support assembly can come in almost an infinite number of configurations. But in one preferred form, the garden accessories may be built around a standard base member.

The base member of the present invention has an upper surface that functions as a feeding surface for birds, a lower surface that is configured to allow the garden accessory to be mounted on a support member or post assembly, and structural components that serve to rigidify the entire garden accessory.

The base member may be made of injection-molded plastic. In this form, it is highly resistant to decay and can present a flat surface without fear that trapped water will not rot as with wood.

To prevent trapped water from spoiling food on this feeding surface, perforations are formed in the feeding surface to allow water to drain away. And the feeding surface has walls that separate the surface into a number of feed bins to facilitate feeding.

When assembled with other components into a finished accessory, the base portion will be almost entirely out of sight. The remaining components of the accessory may be made of wood or other aesthetically pleasing, but perhaps less durable, material.

BRIEF DESCRIPTION OF THE DRAWINGS

FIG. 2A is a front elevational view of a support system employed by the garden accessory system shown in FIG. 1 with FIG. 2A being a top plan view, FIG. 2C, being a bottom plan view, FIG. 2B being a side elevational view, FIG. 2E being a cut-away view taken along lines 2e—2e in FIG. 2D, and FIG. 2F being a partial cut-away view taken along lines 2f—2f in FIG. 2D;

FIG. 9A is a front elevational view of a support system constructed accordance with the present invention, with the side and rear elevational views being identical, where FIG. 9B is a top plan view and FIG. 9C is a bottom plan view thereof;

FIGS. 10A–10M depict a number of different ways in which the ranch assemblies described above can be used to suspend or otherwise support accessories such as those depicted in FIG. 1;

FIGS. 22A–22I depict a bat enclosure of the present invention, with FIG. 22A being a perspective view thereof, FIG. 22B being a side elevational view thereof, the opposite side view being identical, FIG. 22C being a front elevational view, the rear elevational view being the same, and FIG. 22D being a bottom plan view thereof;

FIGS. 33–49 depict a number of molding profiles used as basic components in the modular system depicted in FIG. 1;

FIG. 50 depicts an anchor base that may be used to attach a post assembly to a mounting surface such as a deck or the like;

DETAILED DESCRIPTION

Figure 1A:
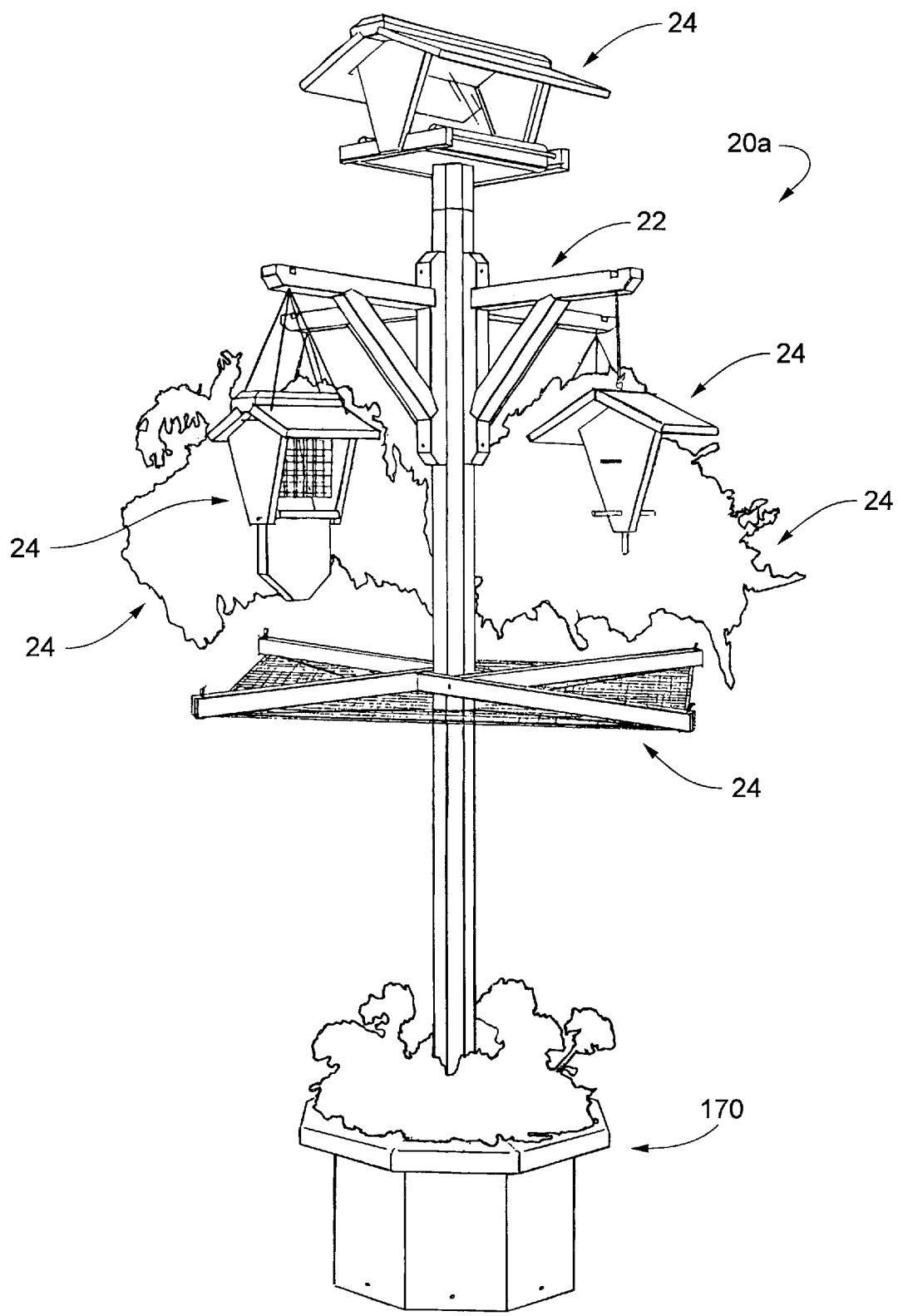
FIGS. 1A–1J depict a number of combinations of garden accessories that can be obtained with the modular garden accessory system of the present invention.
Figure 1B:
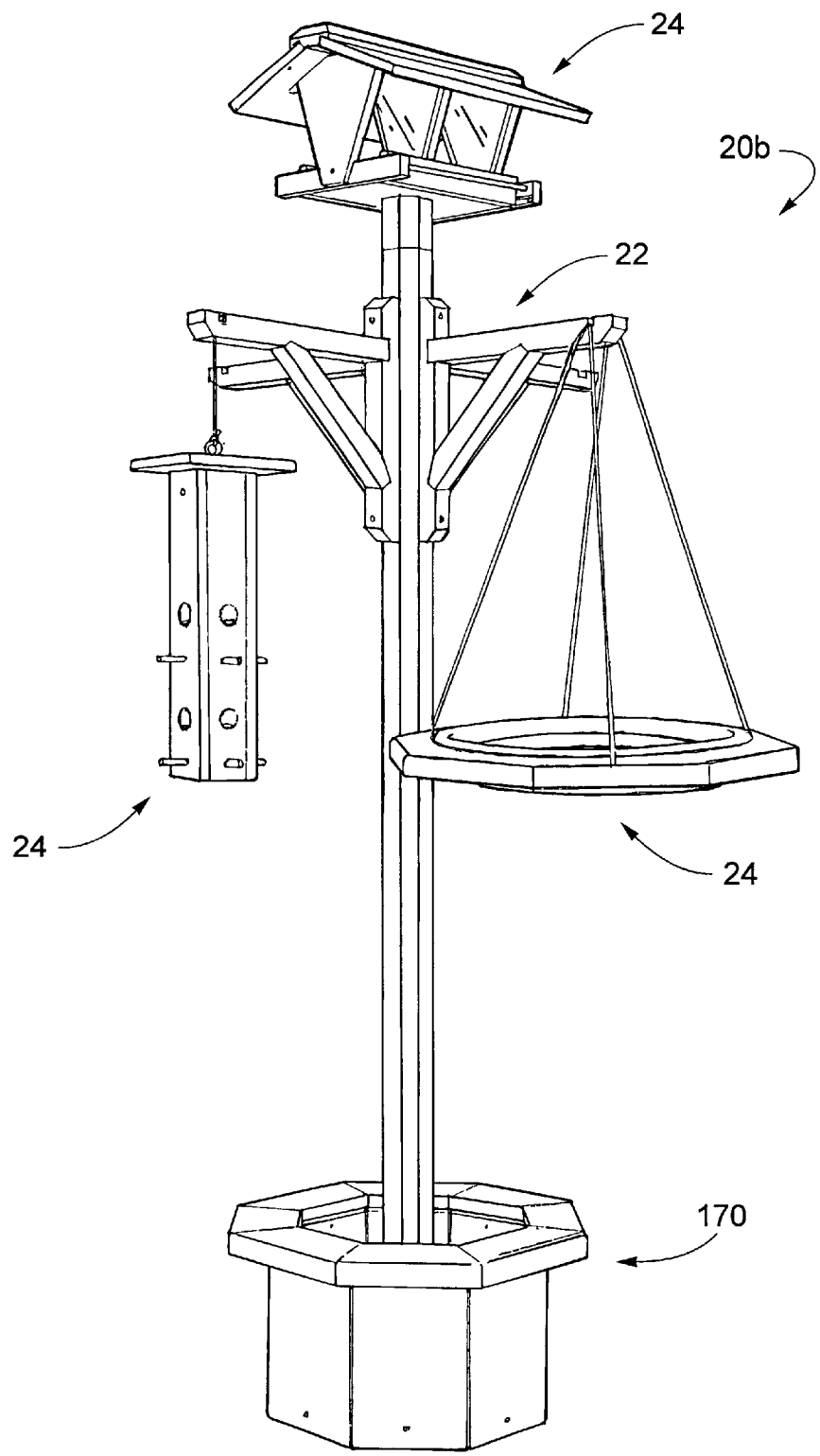

Referring now to the drawing, depicted therein at 20a–20j in FIGS. 1A–1J is a modular garden accessory system constructed in accordance with, and embodying, the principles of the present invention. The garden accessory system 20 comprises a support system 22 and one or more accessories 24. FIGS. 1A–1J illustrate just a few of the combinations that can result from the modular garden accessory system 20 of the present invention.

The system 20 is intended to be aesthetically pleasing, easy to ship, store, and assemble, and very flexible, providing the owner with the ability to create with ease numerous combinations such as those depicted in FIGS. 1A–1J. The support system 22 provides a rigid structural platform to which or from which the accessories 24 may be attached or hung. The accessories 24 each have a specific function as will be explained in further detail below. In any case, these accessories 24 must be easily assembled out of a limited number of standard parts.

The following discussion will be organized as follows. Initially, the support system 22 will be described with reference to FIGS. 2–12. Following that, the accessories 24 will be described with reference to FIGS. 13–31. Finally, the limited set of standard parts used to create the support system 22 and accessories 24 will be described with reference to FIGS. 32–49.

SUPPORT SYSTEM

Figure 1C:
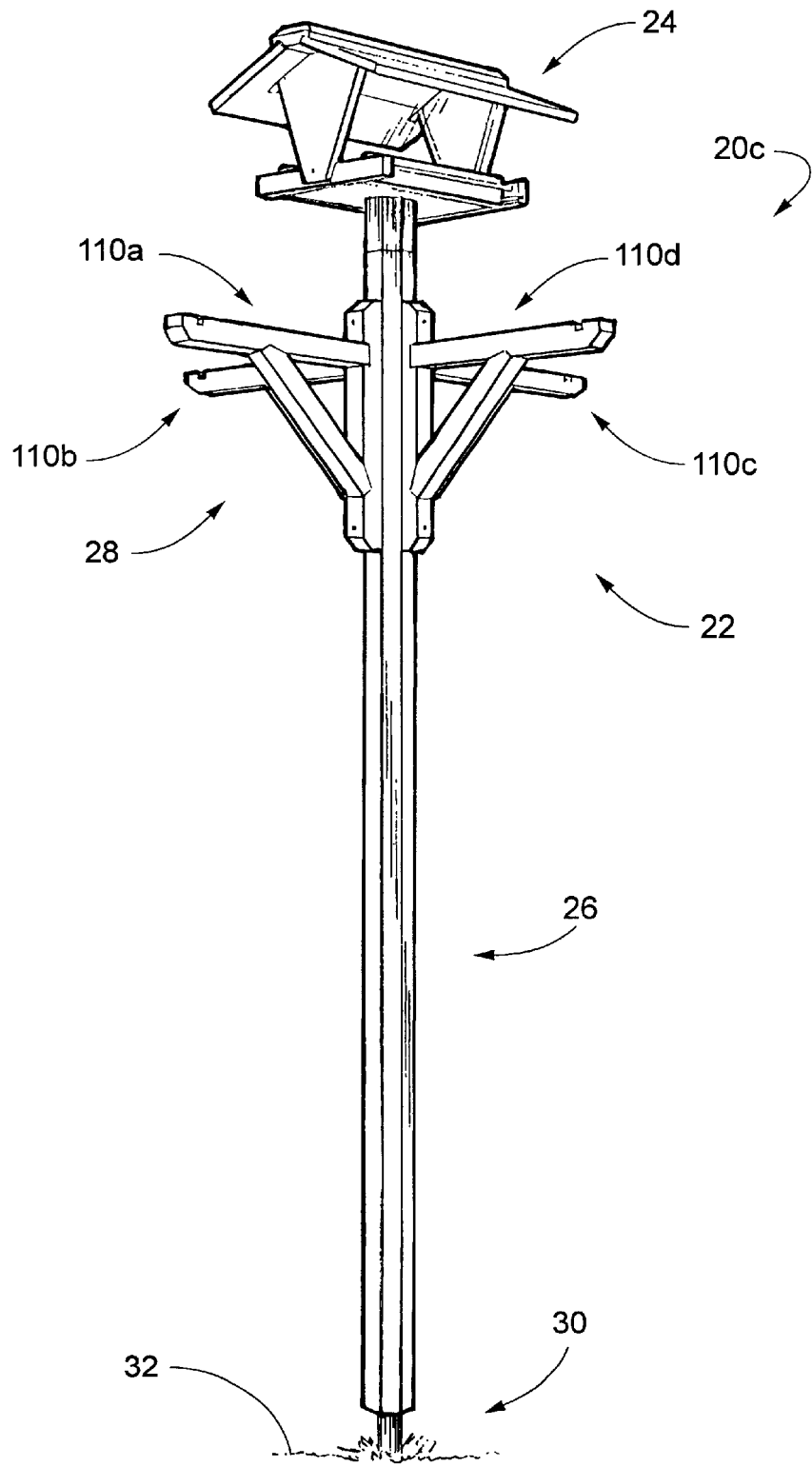

Referring for a moment back to FIG. 1C, it can be seen that the support system 22 comprises a post portion 26, a branch portion 28, and an anchor portion 30. The branch portion 26 comprises a member or assembly of members that spaces the branch portion 22 from a surface 32 on which the system 20 is mounted. The branch portion 28 facilitates the attachment of accessories to the post portion 26. The anchor portion 30 provides the mechanical attachment of the post portion 26 to the surface 32 that results in the entire system 20 remaining in an upright position, even when a number of accessories 24 are attached thereto or hung therefrom.

Referring now to FIG. 6, depicted therein are a number of exemplary post portions 26a–26g and anchor portions 30a–30c. The post portions 26a–26g and anchor portions 30a–30c are combined as necessary for a given environment including the type of surface 32 on which the system 20 is to be placed, length of the post portion 26, and other factors such as aesthetics. Generally speaking, with the shorter post portions 26a–26c, any type of anchor portion 30a–30c may be used, depending on the specific circumstances. However, with longer post portions such as the portions 26d–26g only the longer anchor portions 30c may be used and still securely maintain the system 20 in an upright configuration.

FIG. 6 also illustrates that the post portion 26 will typically be in an assembly of individual post members including at least one post section 34a–34e and one post cap 36.

Figures 6A, 6B, 6C, 6D, 6E, 6F, 6G, 6H, 6I, 6J:
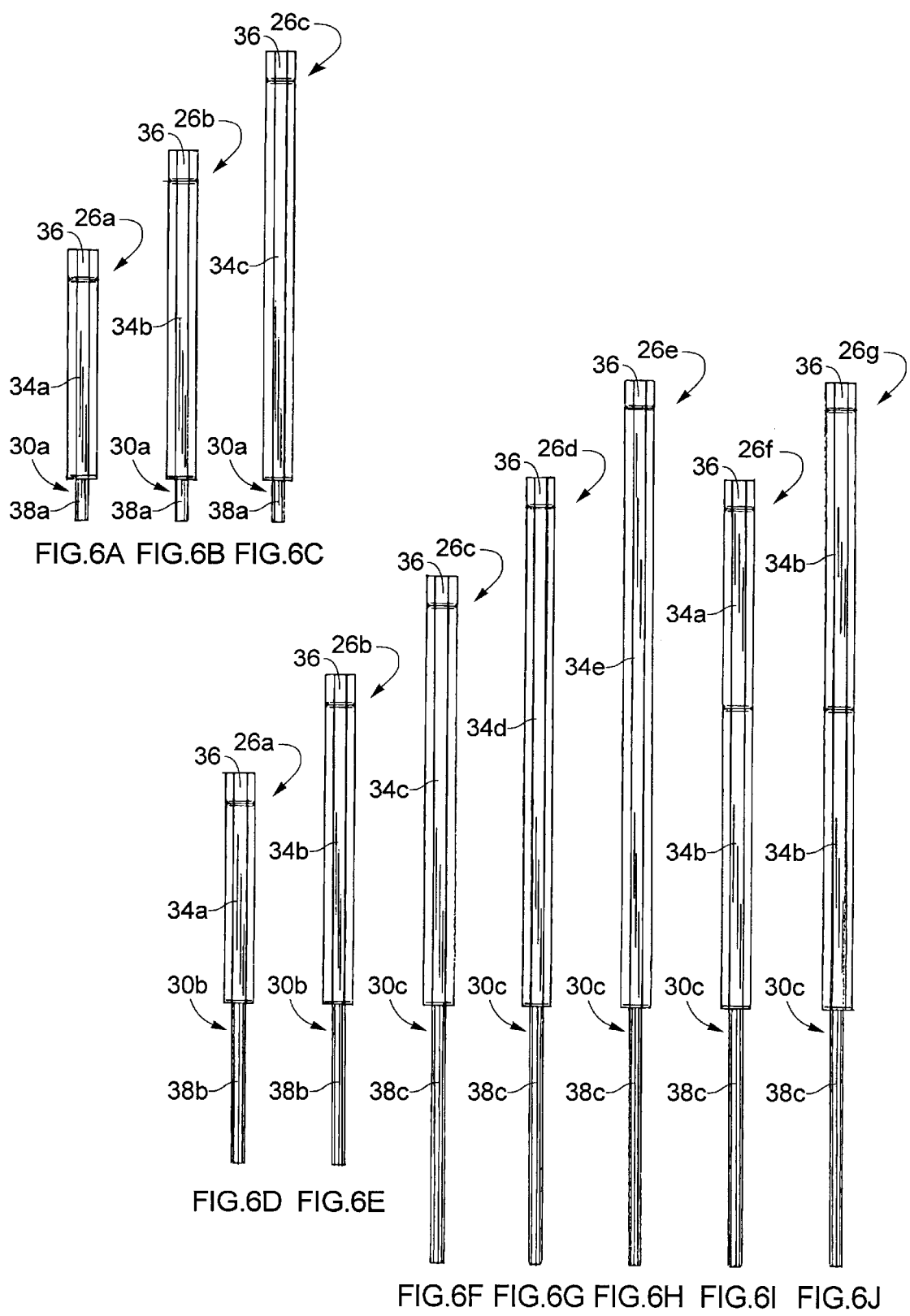
FIGS. 6A–6J depict a number of post portions of the support assemblies depicted in FIGS. 2–4.

The post sections 34 of the exemplary system 20 are made in five standard sizes. As shown in FIG. 6A–6H, a post portion 26 may comprise an assembly employing only one of these sections 34a–34e. FIG. 6I and FIG. 6J show that at least two of these post sections 34 may be combined; to maintain the system 20 in a stable, upright position, only the exemplary post sections 34a and 34b should be combined.

The exemplary anchor portions 30a–30c comprise metal anchor tubes 30a–30c. These anchor tubes 30 are sized and dimensioned to engage its associated post portion 26 and the surface 32 in a manner that maintains the entire system 20 in an upright position. These tubes are also made of corrosion resistant material, as they will often be inserted into the ground and thus exposed to moisture for prolonged periods.

Figure 7C:
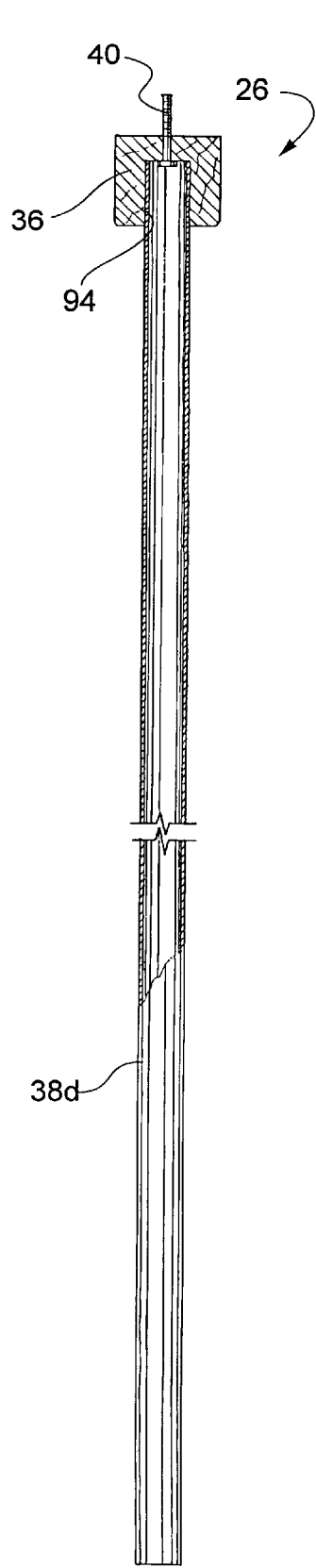
FIG. 7A depicts a bottom perspective view of yet another type of support system of the present invention, with FIG. 7B being an exploded assembly view and FIG. 7C being a front elevational partial cut-away view thereof.
Figure 7B:
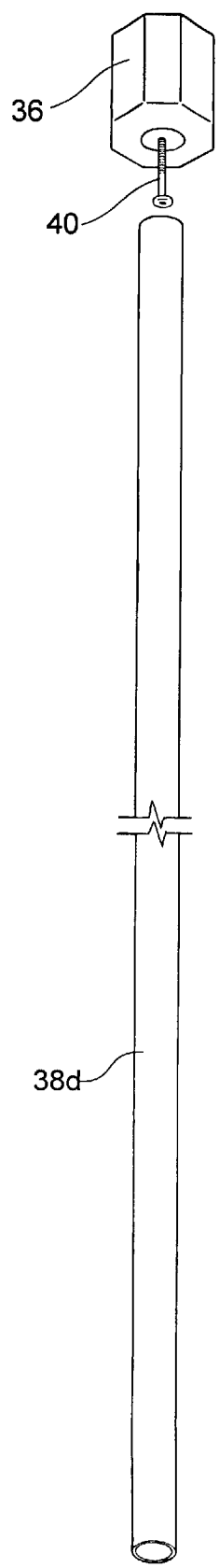
Figure 7A:
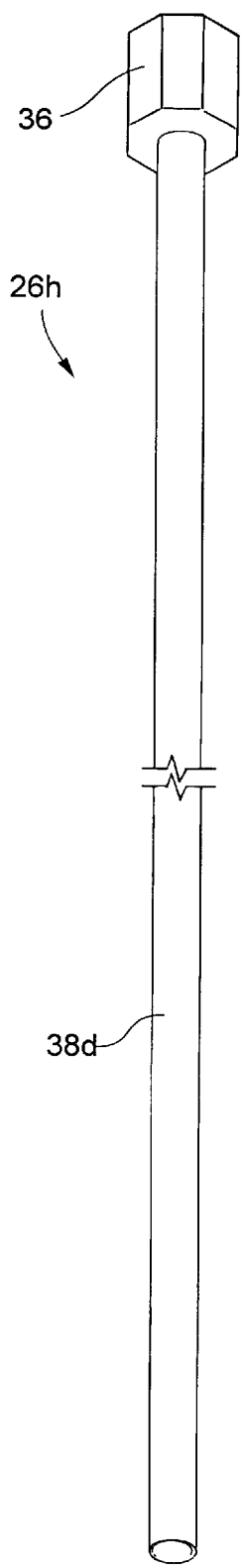

Referring for a moment to FIG. 7A, depicted therein is yet another post portion 26h. This post portion 26h comprises simply an elongate anchor post 38d and a post cap 36. Systems 20g–20i depicted in FIGS. 1G–1I employ post portions 26 such as that depicted at 26h in FIG. 7A.

An inspection of FIGS. 6A–6J indicates that some method must be provided for connecting the anchor posts 38 to the post sections 34, the post sections 34 to each other, and the post sections 34 to the post caps 36. Examples of connecting systems appropriate for this purpose are depicted in FIGS. 2–5.

Referring now to FIG. 2, depicted therein is an exemplary post portion 26. This exemplary post portion 26 comprises a single post section 34, an anchor tube 38, and a post cap 36. Additionally, the post section 26 comprises a cap bolt 40, cap tube 42, fastener 44, and bolt assembly 46.

As best shown in FIG. 2E, the cap 36 has a bore 48 formed in a lower portion thereof. The post section 34 has a similar bore 50 formed in an upper portion thereof. The bores 48 and 50 are sized and dimensioned to snugly receive the cap tube 42. More specifically, the cap tube 42 engages the surfaces of the cap 36 and post section 34 defining the bores 48 and 50 to form a friction fit that inhibits relative movement between the post section 34 and the cap 36. Additionally, the fastener 44 is screwed into the post section 34 and cap tube 42 to prevent relative movement between the tube 42 and post section 34. The cap tube 42 and bores 48 and 50 thus form a friction fit attachment system 53 for connecting the post cap 36 onto the post section 34.

The cap bolt 40 is inserted through a small bore 52 formed in an upper portion of the post cap 36 to allow accessories to be attached to the upper end of the post portion 26.

FIG. 2E also illustrates that an anchor bore 54 is formed in a lower portion of the post section 34. This anchor bore 54 is similar to the bores 48 and 50 described above, except that it is elongate to provide a more secure attachment between the post section 34 and the anchor tube 38.

Additionally, as shown in FIG. 2A and FIG. 2F, a slit 56 is formed in the post section 34 along its longitudinal axis and through a substantial portion of the length of the anchor bore 54. The purpose of this slit 56 is to allow the bolt assembly 46 to act on first and second lower end portions 58 and 60 of the post section 34 to enhance the frictional engagement between the post section 34 and the anchor tube 38.

More specifically, the bolt assembly 46 comprises a bolt 62, nut 64, washer 66, and lock washer 68. The bolt 62 is inserted into anchor bolt bores 70 and 72 formed in the lower portions 58 and 60, through the anchor bore 54, and thus through the anchor tube 38.

By axially rotating the nut 64 relative to the bolt 62, a clamping force is exerted on the portions 58 and 60 of the post section 34 that causes a slight decrease in the diameter of the anchor bore 54. The bolt assembly 46, bore 54, and slit 56 thus form a clamping attachment means 73 for securely and rigidly attaching the post section 34 to the anchor tube 38.

Figure 3B:
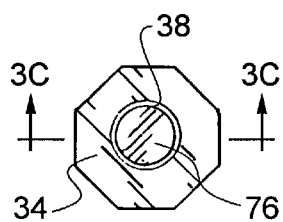
FIG. 3A is a partial front elevational view of a yet another support system, with FIG. 3B being a bottom elevational view and FIG. 3C being a partial cut-away view taken along lines 3c—3c in FIG. 3B.
Figure 3A:
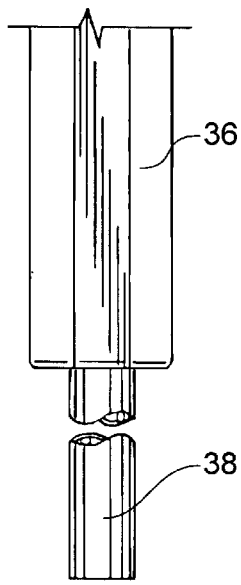
Figure 3C:
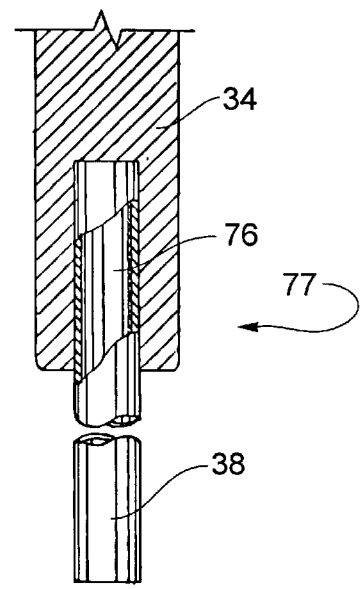

Shown in FIGS. 3A–3C is a second means for attaching a post section 34 to an anchor tube 38. As perhaps best shown in FIG. 3C, an anchor bore 76 is formed in the lower end of the post section 34. This anchor bore 76 is sized and dimensioned to snugly receive the anchor tube 38 in a manner that creates a friction fit which inhibits relative movement between the post section 34 and the anchor tube 38. The bore 76 thus forms a simple friction fit attachment system 77 similar to that described with reference to FIG. 2E to attach the post cap 36 on to the post section 34. The system 77 depicted in FIGS. 3A–3C is used most effectively when the length of the post section 26 is relatively short.

Figure 4C:
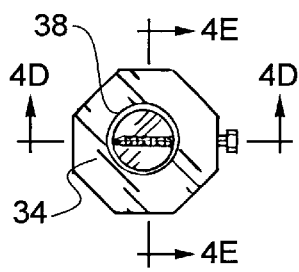
FIG. 4A is a partial front elevational view of yet another support system of the present invention, with FIG. 4B being a side elevational view, FIG. 4C being a bottom plan view, FIG. 4D being a partial cut-away view taken along lines 4d—4d in FIG. 4C, and FIG. 4E being a partial cutaway view taken along lines 4e—4e in FIG. 4C.
Figure 4B:
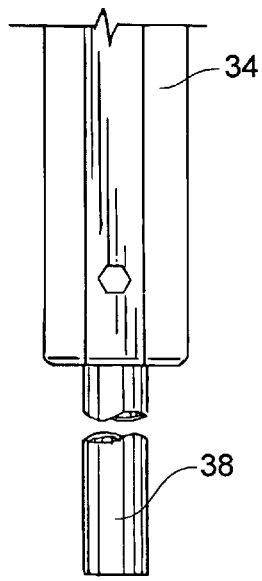
Figure 4A:
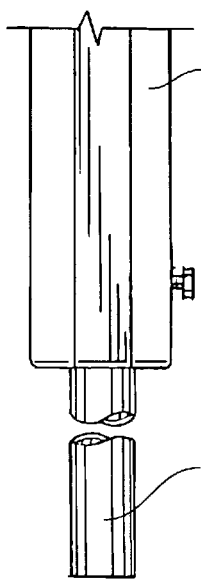
Figure 4D:
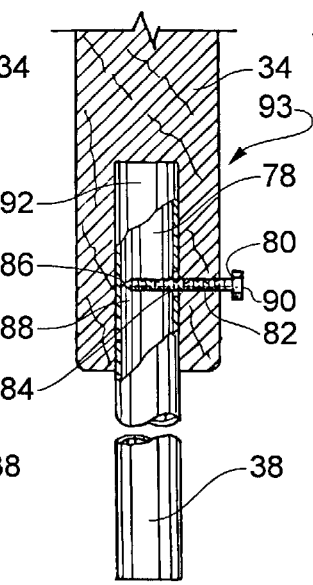
Figure 4E:
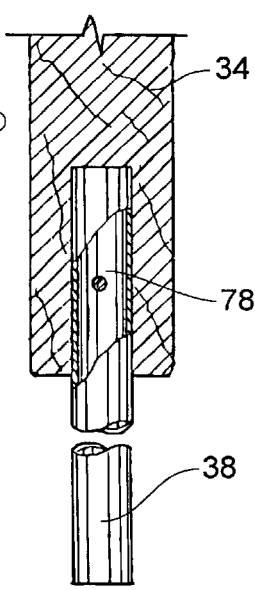

Referring now to FIGS. 4A–4C, depicted therein is yet another system for attaching a post section 34 to an anchor tube 38. As best shown in FIGS. 4D–4E, an anchor bore 78 is formed in a lower end of the post section 34. This anchor bore 78 is coaxial with the longitudinal axis of the post section 34 and is sized and dimensioned to snugly receive the anchor post 38. A friction fit is thus formed between the surface of the post section 34 defining the bore 78 and the anchor tube 38.

This friction fit is augmented by a lag bolt 80. The lag bolt 80 extends through a threaded anchor hole 82 formed in the post section 34 and an unthreaded anchor hole 84 formed in the anchor tube 38. Simply by extending through the holes 82 and 84, the lag bolt 80 will help prevent relative movement between the post section 34 and the anchor tube 38.

Additionally, the lag bolt 80 is sized and dimensioned such that its pointed end 86 engages an inner surface 88 of the anchor tube 38 before a head portion 90 of the lag bolt 80 engages the post section 34. When the pointed end 86 of the lag bolt 80 engages the inner surface 88, a force is applied through the shaft of the lag bolt 80 and threaded hole 82 to the post section 34 which forces an inner surface portion 92 of the post section 34 against the anchor tube 38, thus increasing the friction therebetween. The anchor bore 78 and lag bolt 80 thus form a lag bolt attachment system 93 for connecting post portions 26 to anchor tubes 38.

Figures 5A, 5B, 5C:
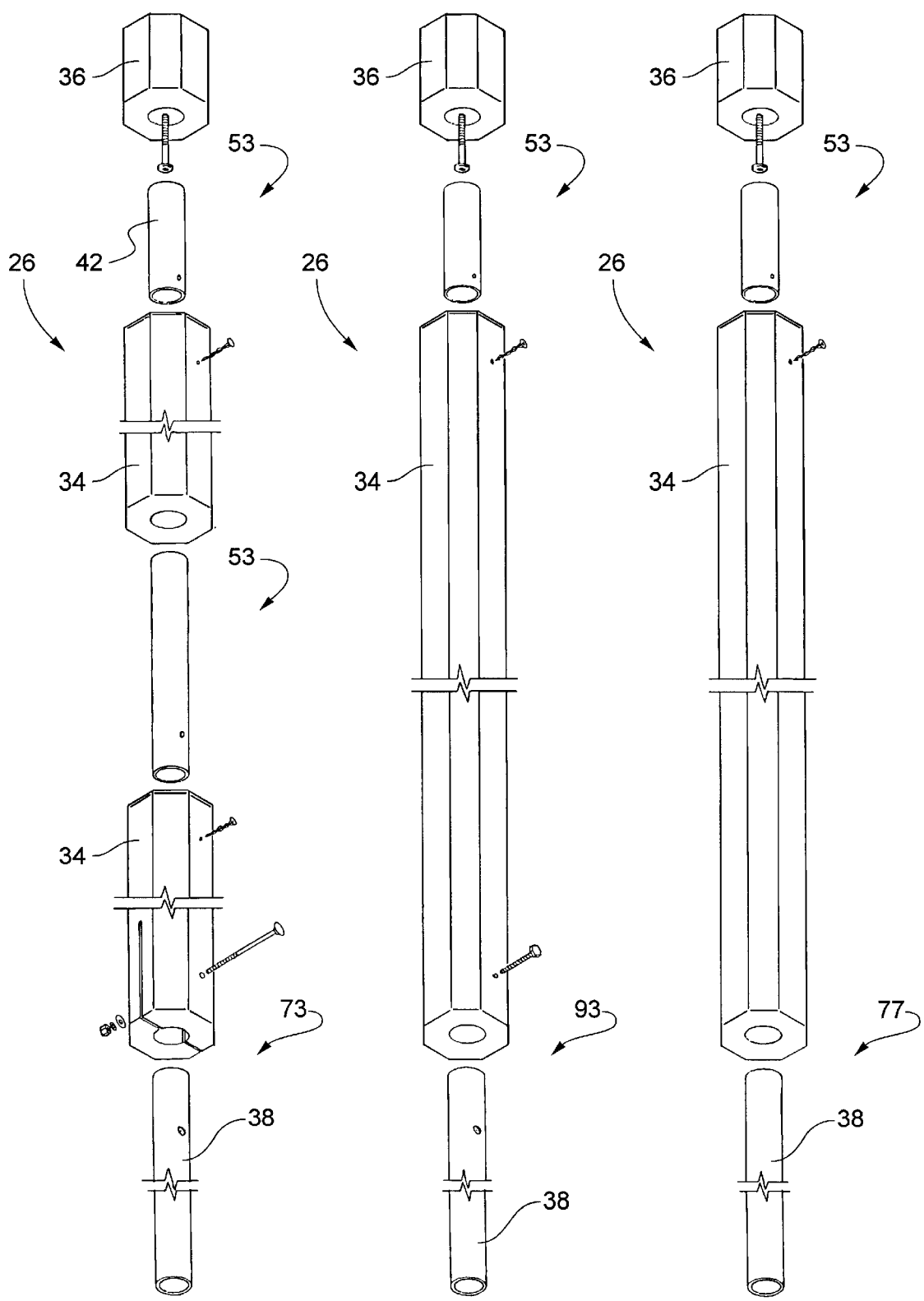
FIGS. 5A—5C depict exploded views of the support systems depicted in FIGS. 2–4.

Referring now to FIGS. 5A–5C, depicted therein are exploded assembly drawings depicting three exemplary post sections 26 and the details of attaching the various components thereof. For example, in FIG. 5A, the post portion 26 comprises first and second post sections 34, a post cap 36, and an anchor tube 38. The cap 36 is attached to the upper of the two post sections 34 by a cap attachment system 53, the first and second post sections 34 are attached by a similar cap attachment system 53, with the connecting tube 42 simply being elongated, and a clamping attachment system 73 for attaching the lower post section 34 to the anchor tube 38.

In FIG. 5B, the post portion 26 comprises a single post section 34, a post cap 36, and an anchor tube 38. The post section 34 is attached to the post cap 36 using a cap attachment system 53 and the post section 34 is attached to the anchor tube 38 using a lag bolt attachment system 93.

In FIG. 5C, the post portion 26 comprises a post section 34, a post cap 36, and an anchor tube 38. The post cap 36 is attached to an upper end of the post section 34 by a cap attachment system 53, and the post section 34 is attached to the anchor tube 38 by a friction fit attachment system 77.

Referring now for a moment back to FIG. 7, FIG. 7C illustrates the system of attaching a post cap 36 on to the elongated anchor tube 38d. In particular, a bore 94 is formed in the cap portion 36 in a manner similar to that of the bore 48 described above. The cap 36 is displaced such that the anchor tube 38d enters the bore 94 and forms a friction fit that prevents relative movement between the cap 36 and anchor tube 38d. FIG. 7B indicates that the cap 36 is assembled on to the anchor tube 38d after the cap bolt 40 is placed into the cap 36 as described above.

Referring for a moment back to FIG. 1C, the branch portion 28 thereof can be seen to comprise first through fourth branch assemblies 110a–110d.

The branch assemblies 110 depicted in FIG. 1C are designed to provide a platform for supporting or hanging an accessory 24. While certain of the accessories 24 may be attached directly to the post section 26, it is often desirable for functional and aesthetic reasons to space these accessories radially outwardly from the post portion 26. In such situations, one or more of these branch assemblies 110 are provided.

Figure 8A:
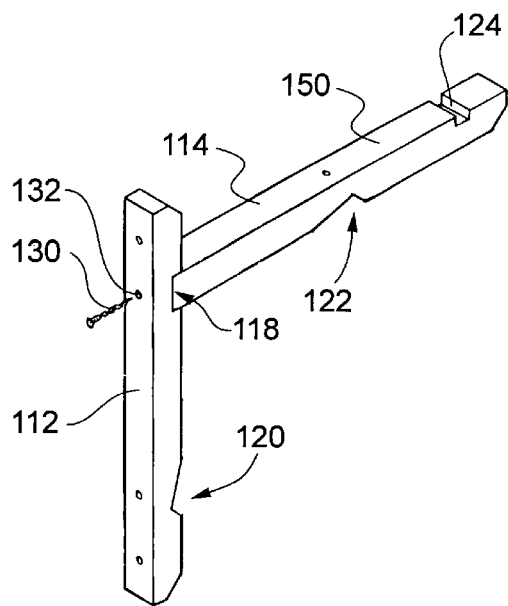
FIGS. 8A–8C depict a branch assembly portion of the support system depicted in FIG. 1, as well as the method of assembling and installing the branch assembly.
Figure 8B:
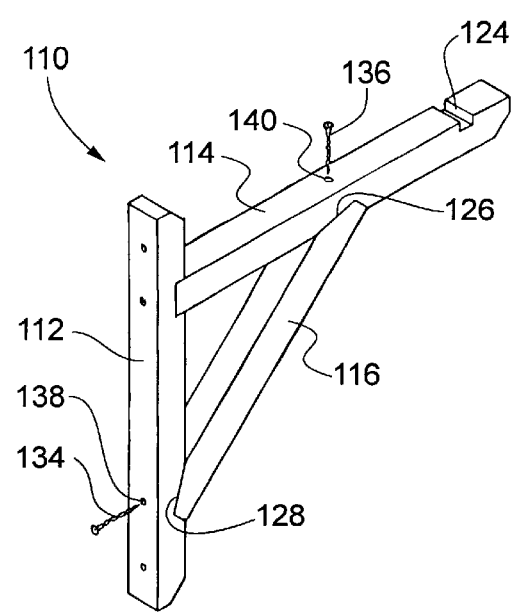
Figure 8C:
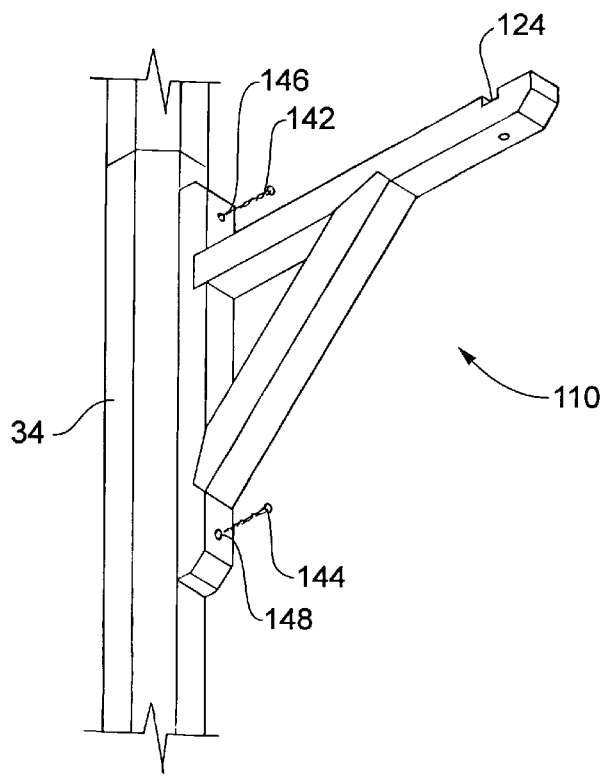

Referring now to FIGS. 8A–8C, depicted therein are the details of construction and assembly of the branch assemblies 110. Referring initially to FIG. 8B, it can be seen that the branch assembly comprises a mounting member 112, a support member 114 and a brace member 116. The mounting member 112 has first and second notches 118 and 120 formed therein. The first notch is rectangular in cross section and is sized and dimensioned to receive a proximal end of the support member 114. The second notch 120 is triangular in cross section and is designed to receive a lower end of the brace 116.

The support member 114 has a brace notch 122 and an accessory groove 124 formed therein. The bracing notch 122 is formed on the underside of the support member 114 approximately mid-way along its length. The accessory groove 124 is formed on an upper surface of the support member 114 adjacent to a distal end thereof. The brace 116 has beveled surfaces 126 and 128 formed on each end thereof.

The branch assembly 110 is constructed as follows. Initially, the proximal end of the support member 114 is inserted into the first notch 118. A fastener 130 is driven through a first fastener hole 132 into the proximal end of the support member 114. At this point, the support member 114 extends at a right angle to the mounting member 112 with the second notch on the mounting member 112 facing the bracing notch 122 formed on the support member 114. The accessory groove 124 should be facing upwardly.

The bracing member 116 is then placed such that its notched end surfaces 126 engage the mounting member 112 and support member 114, with the triangular cross section of the brace member ends matching the triangular cross sections of the notches 120 and 122. Fasteners 134 and 136 are next driven through fastener holes 138 and 140 into the ends of the brace member 116.

The branch assembly 110 is mounted onto one of the post sections 34 using fasteners 142 and 144 driven through predrilled holes 146 and 148 into the post section 34.

The post sections and post caps may have any of a number cross-sectional configurations; the exemplary sections 34 and caps 36 are octagonal in cross-sectional area. Each surface of the sections 34 and caps 36 is sized and dimensioned to have the same transverse dimension as the support member 112. Thus, the installer may easily attach the support member 112 to any one of the eight sides, and the resulting attachment will be aesthetically pleasing. The use of an octagonal cross-section also facilitates the attachment of four branch assemblies to a given post section where the branch assemblies are to be spaced at 90 degree intervals, as shown in FIGS. 9A–C.

The manner in which accessories 24 are attached to the branch assemblies 110 will now be described with reference to FIGS. 10A–M. As shown in these figures, the accessory groove is formed on an upper surface 150 of the support member 112. Additionally, an accessory bore 152 is formed in the support member 112 such that it extends through the center of the accessory groove 124 and is substantially vertical when the system 20 is upright. The directions in which the accessory bore 124 and accessory hole 152 are formed are orthogonal to each other and to a longitudinal axis of the support member 112.

Referring specifically to FIG. 10A, it can be seen that an accessory 24 can simply be hung from the branch assemblies 110 by laying a strap or straps 154 attached to the accessory 24 into the accessory groove 124.

As shown in FIG. 10B, two accessories 24 are attached to one support member 112 by laying one or more straps 154 into the accessory groove 124 and also inserting a strap 156 through the accessory bore 152. As perhaps best shown in FIGS. 10J and 10K, the strap 156 will be prevented from passing completely through the bore 152 by a cross-peg 158 inserted through a loop 159 formed by the strap 156. The cross-peg 158 will be received within the accessory groove 124.

Figure 10D:
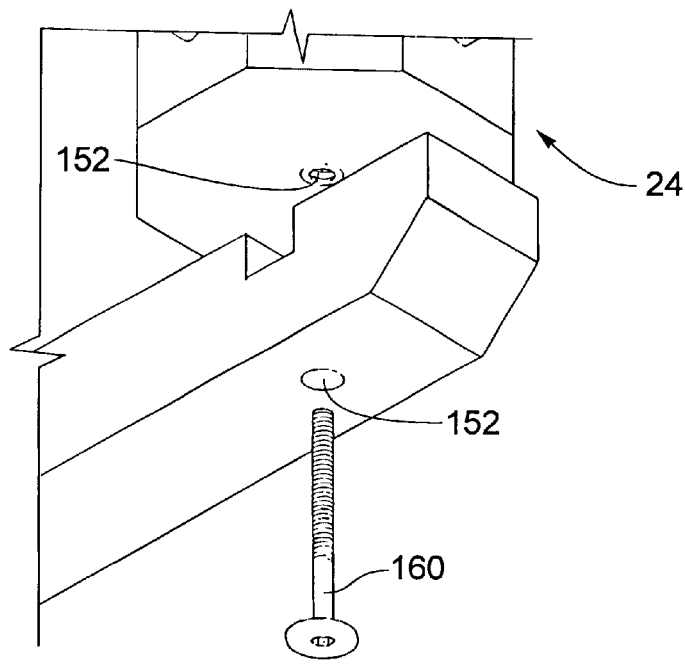
Figure 10E:
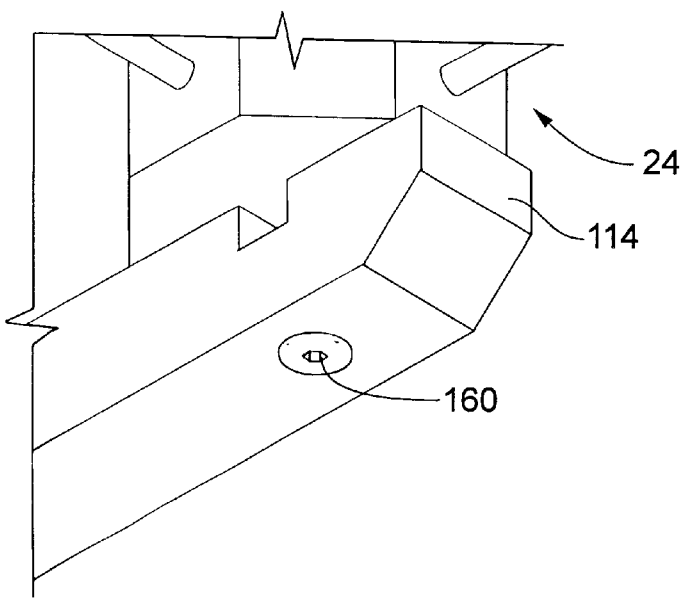
Figure 10F:
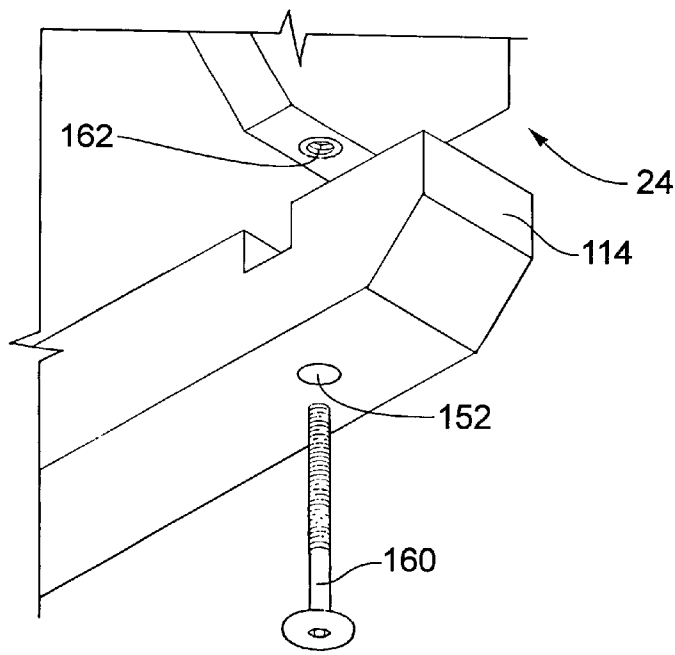
Figure 10G:
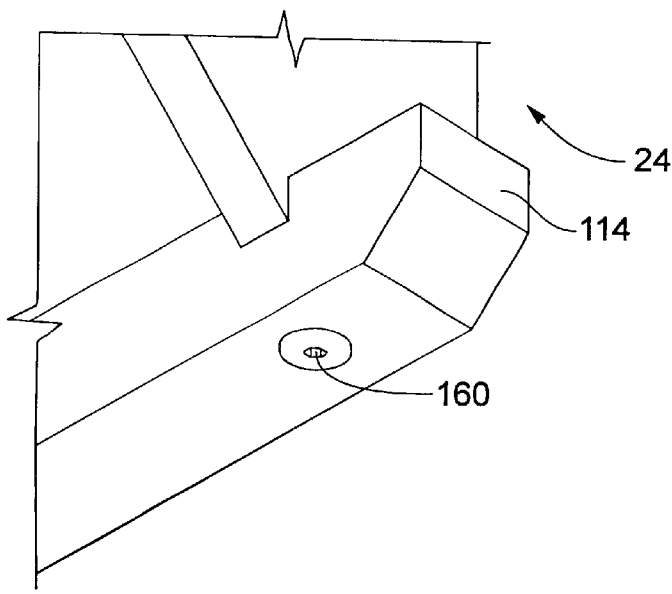

FIG. 10C shows that, in addition to straps 154 lying in the accessory groove 124, an accessory 24 may be attached to the upper surface 150 of the support member 112 by passing a bolt 160 up through the accessory bore 152 and into the accessory 24. The process of attaching several types of accessories 24 to the upper surface 150 using the bolt 160 is depicted in FIGS. 10D–G, 10L, and 10M. FIGS. 10D and 10F illustrate that a threaded insert 162 may be attached to the accessory 24 to form a more secure connection to the bolt 160.

Figure 10H:
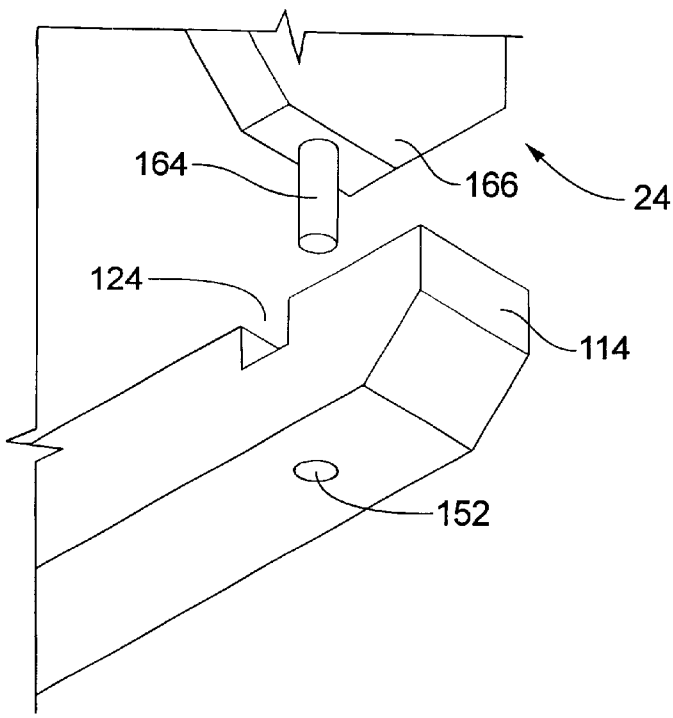
Figure 10I:
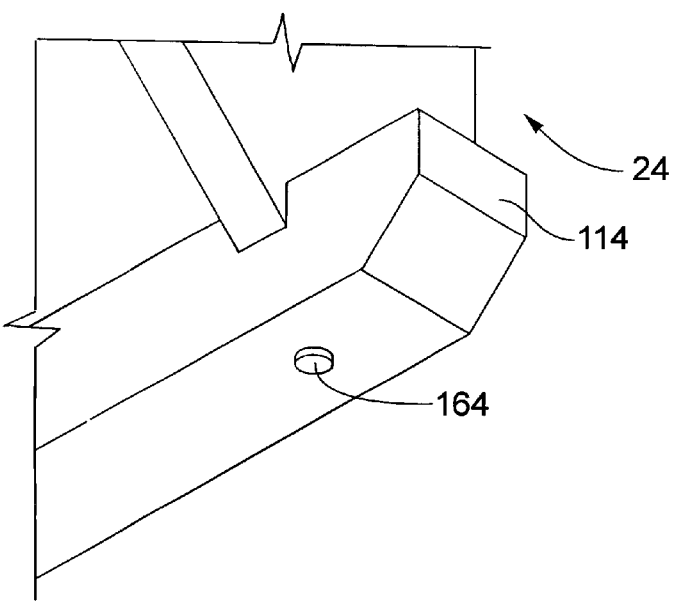
Figure 10J:
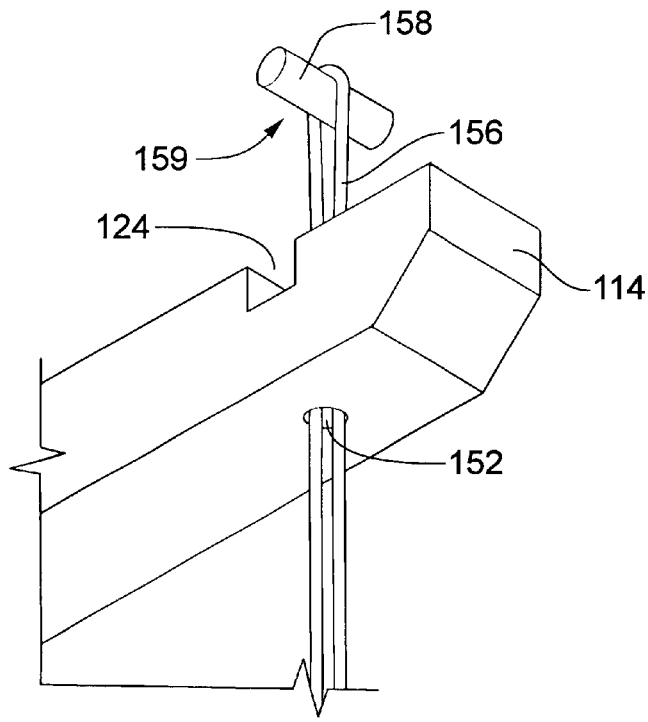
Figure 10K:
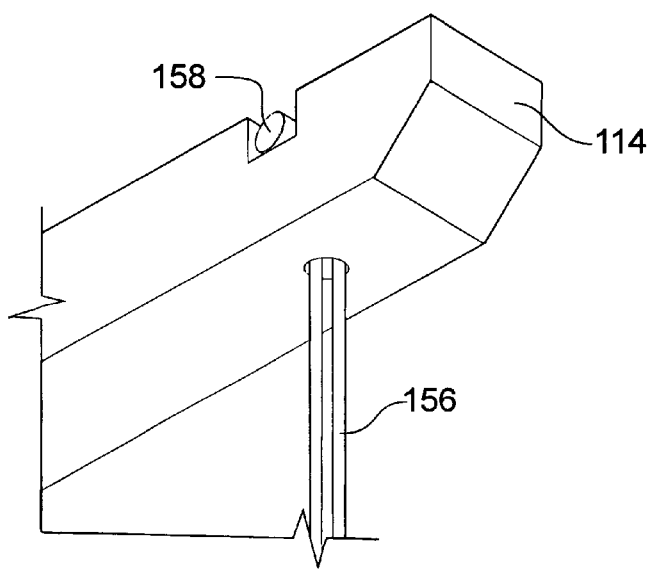
Figure 10L:
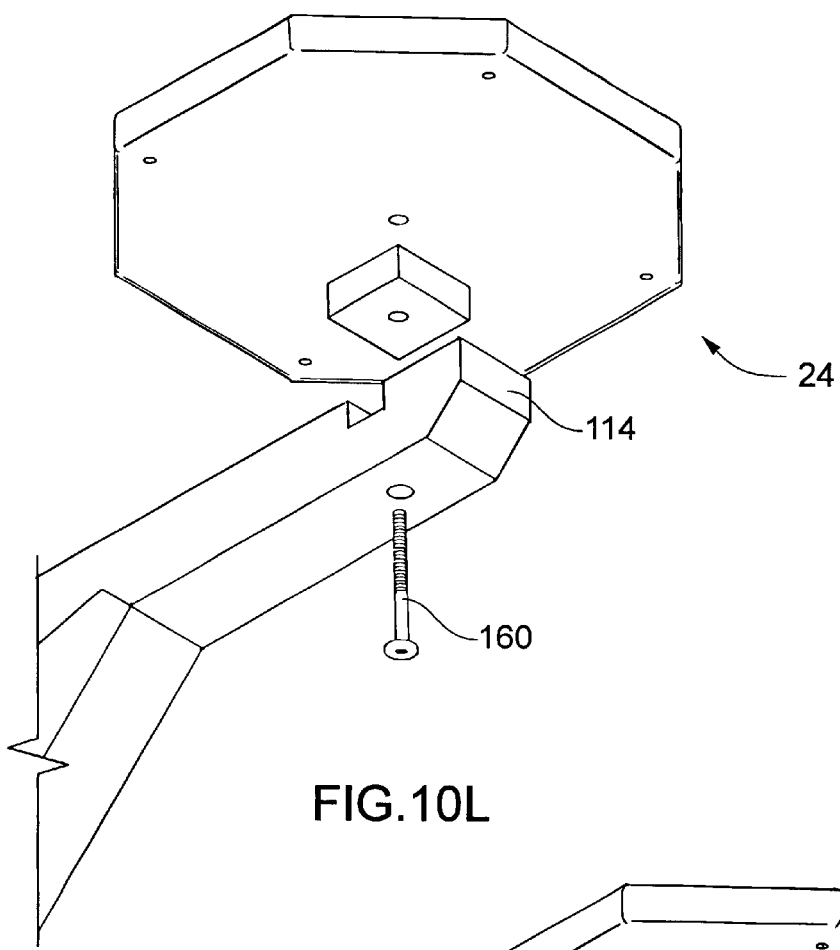
Figure 10M:
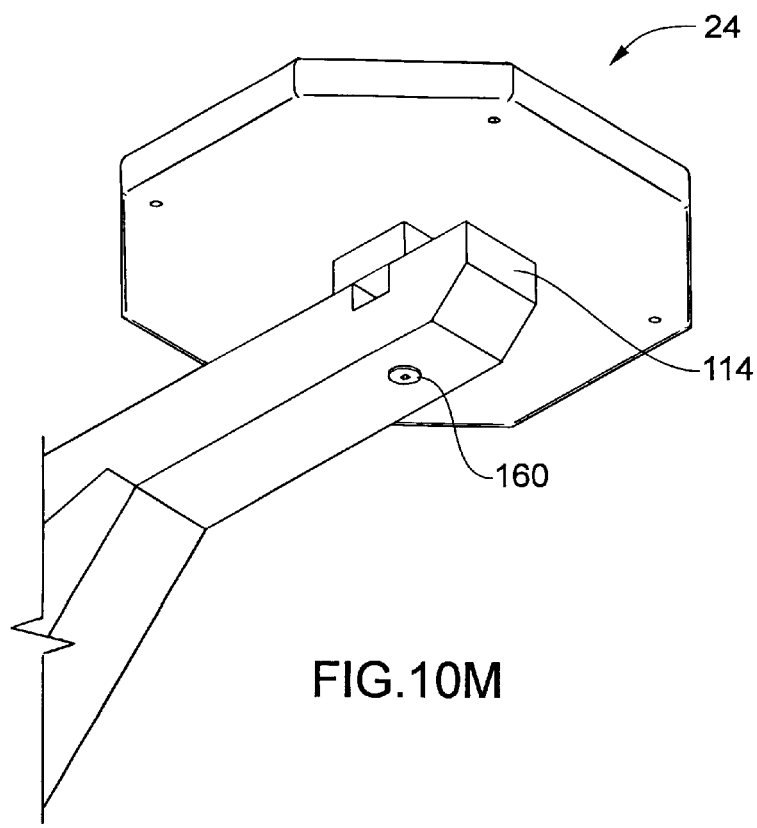

FIG. 10H illustrates that a peg 164 may be attached to an underside of the accessory 24 and inserted into the accessory hole 152. This system works best when the lowermost end of the accessory 24 is formed by a flat member 166 that will be received within the accessory groove 124 to prevent the accessory 24 from rotating about the axis of the peg 164.

Referring for a moment back to FIGS. 1A, 1B, 1F, 1I, and 1J, depicted therein at 170 is a planter assembly forming a part of the system 20. The planter assembly 170 has characteristics of an accessory 24 but can be included as part of the support system 22.

Figure 11A:
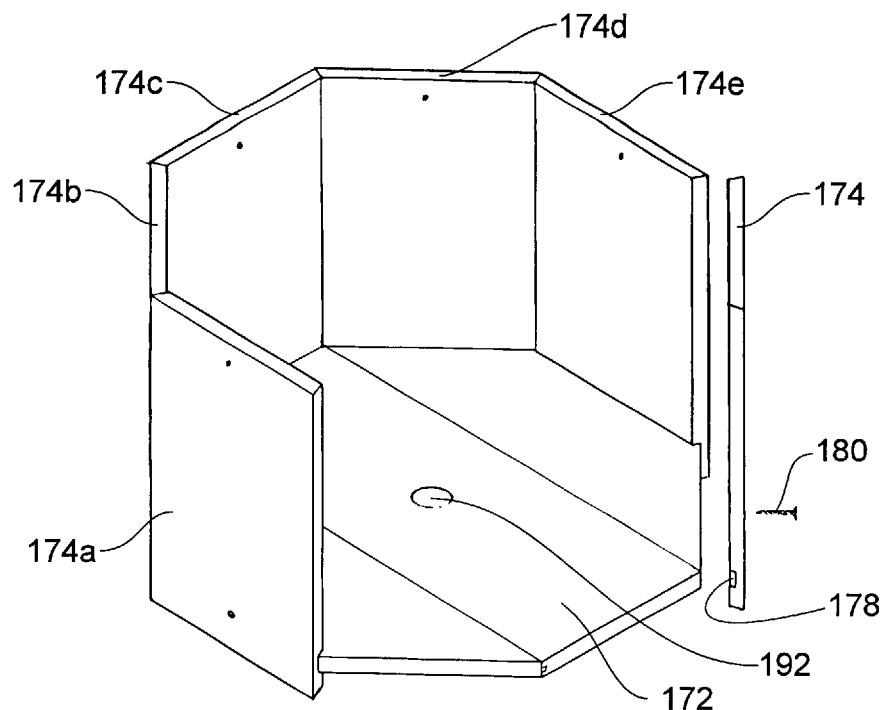
FIGS. 11A–11D depict a planter portion of a support assembly, as well as the method of fabricating the same.
Figure 11B:
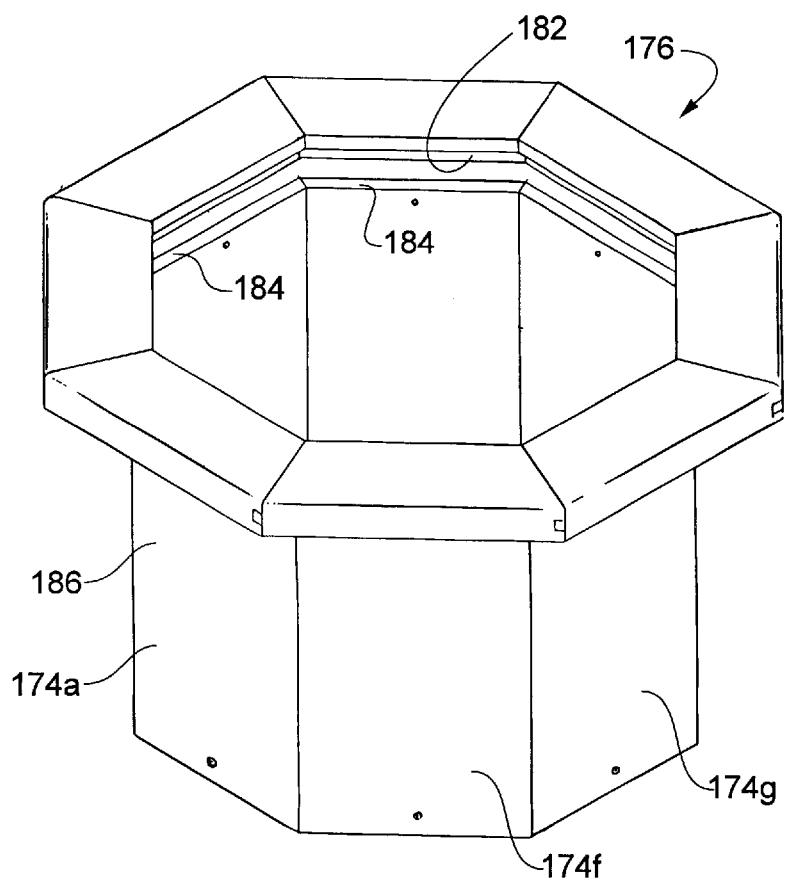
Figure 11C:
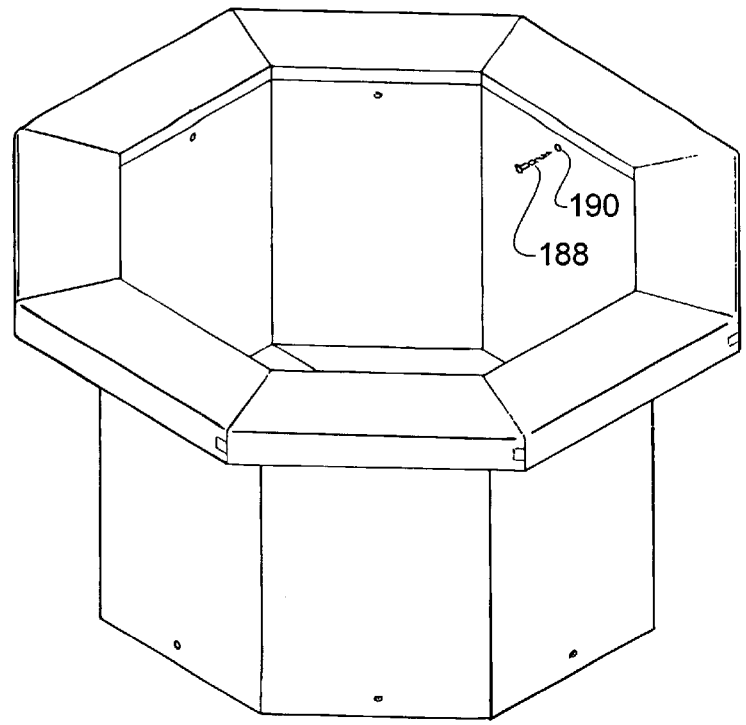
Figure 11D:
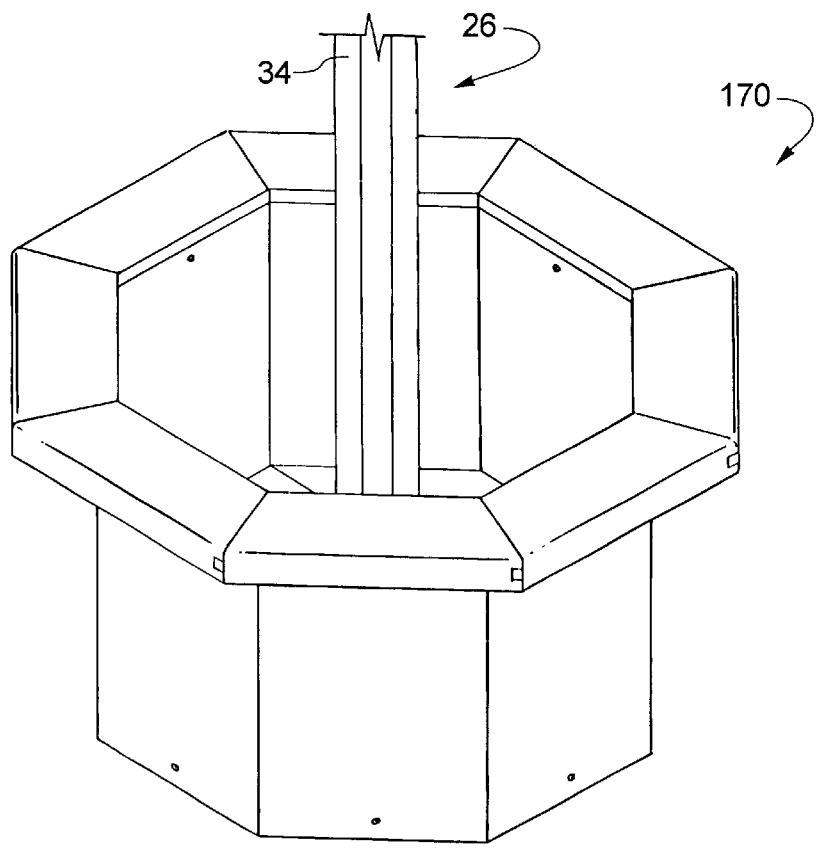

As shown perhaps best in FIG. 11D, the planter assembly 170 is generally octagonal in shape to reflect the cross section of the post sections 34 and post caps 36. FIGS. 11A–11D show that the planter assembly 170 comprises a bottom wall 172 and eight side wall members 174a–170f, and a rim assembly 176. The bottom wall assembly 172 and rim assembly 176 are preassembled; but these assemblies 172 and 176 are flat, as well as the members 174, so the entire assembly 170 can be shipped in a flat storage container.

To assemble the planter assembly 170, the base assembly 172 is inserted into grooves 178 formed along a lower edge of the side members 174. Fasteners 180 are then driven through the side walls 174 into the bottom wall assembly 172. When all eight side wall members 174 are attached to the bottom wall assembly 172, the rim assembly 176 is placed over the top of the upper edge of the side wall members 174. A lower, inner, peripheral groove 182 is formed on the rim assembly 176. This groove 182 allows the rim assembly to lay over the upper edges 184 of the side wall members 174 and extend a short way down the outer surfaces 186 of these wall members 174. FIG. 11C depicts the rim member sitting on top of the side wall member 174. Fasteners 188 are driven into predrilled holes 190 in the side wall members 174 and into the portion of the rim assembly 176 that extends down the side walls 186. As shown in FIG. 11D, the resulting assembly is a very sturdy assembly that is easy to assemble and has a well-finished look.

The assembly 170 can be integrated into the overall system 20 in several ways. The first of these ways is depicted in FIG. 11D. As shown in FIG. 11A, a hole 192 is formed in the bottom assembly 172. The anchor tube 38 of the post portion 126 shown in FIG. 11D is passed through the hole 192 and into the ground. It may also be advisable to use a longer anchor tube than necessary in order to space the post section 34 of the post portion 26 above the dirt within the planter assembly 170.

Figures 1D, 1E, 1F:
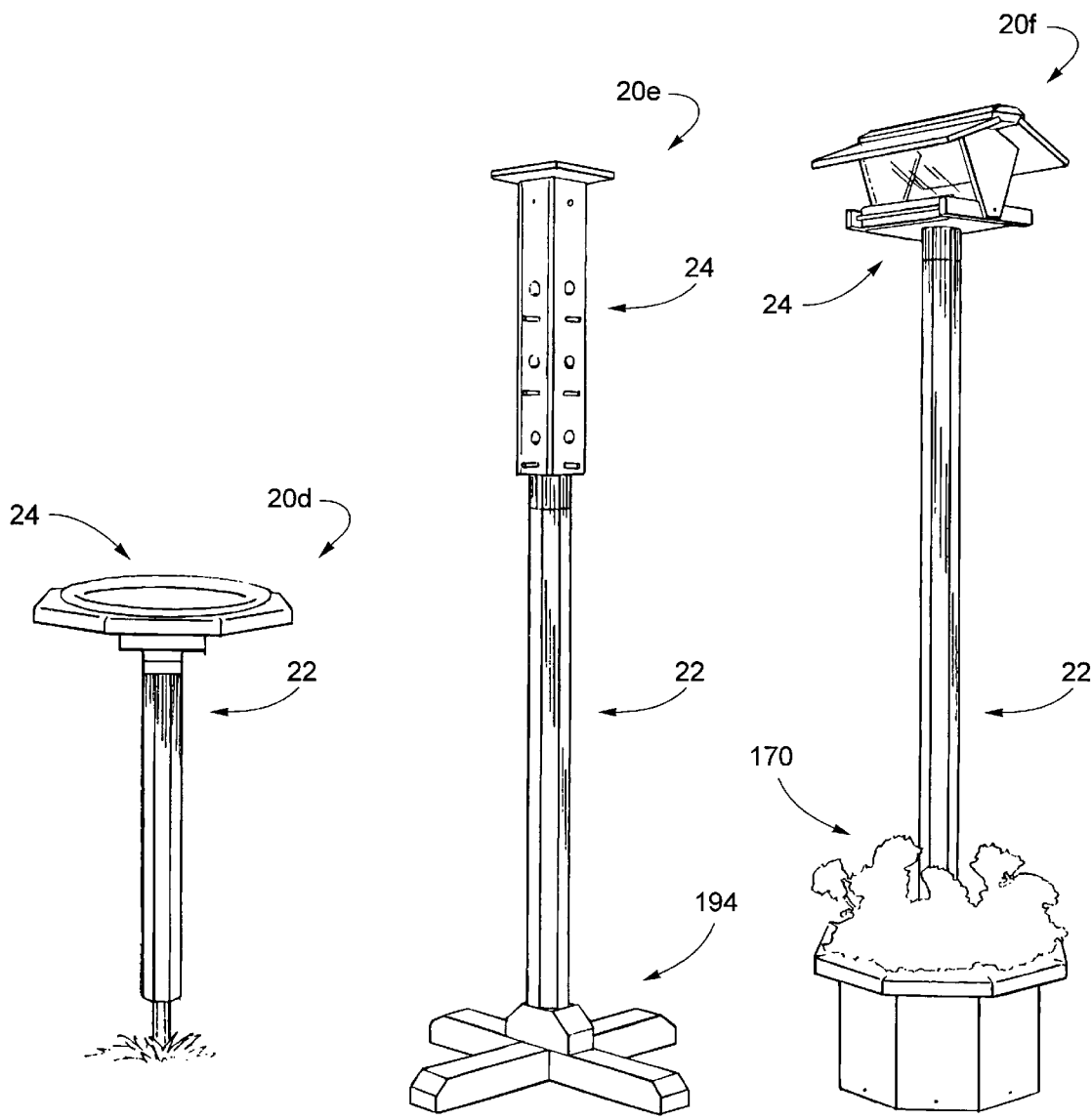
Figures 1G, 1H, 1I:
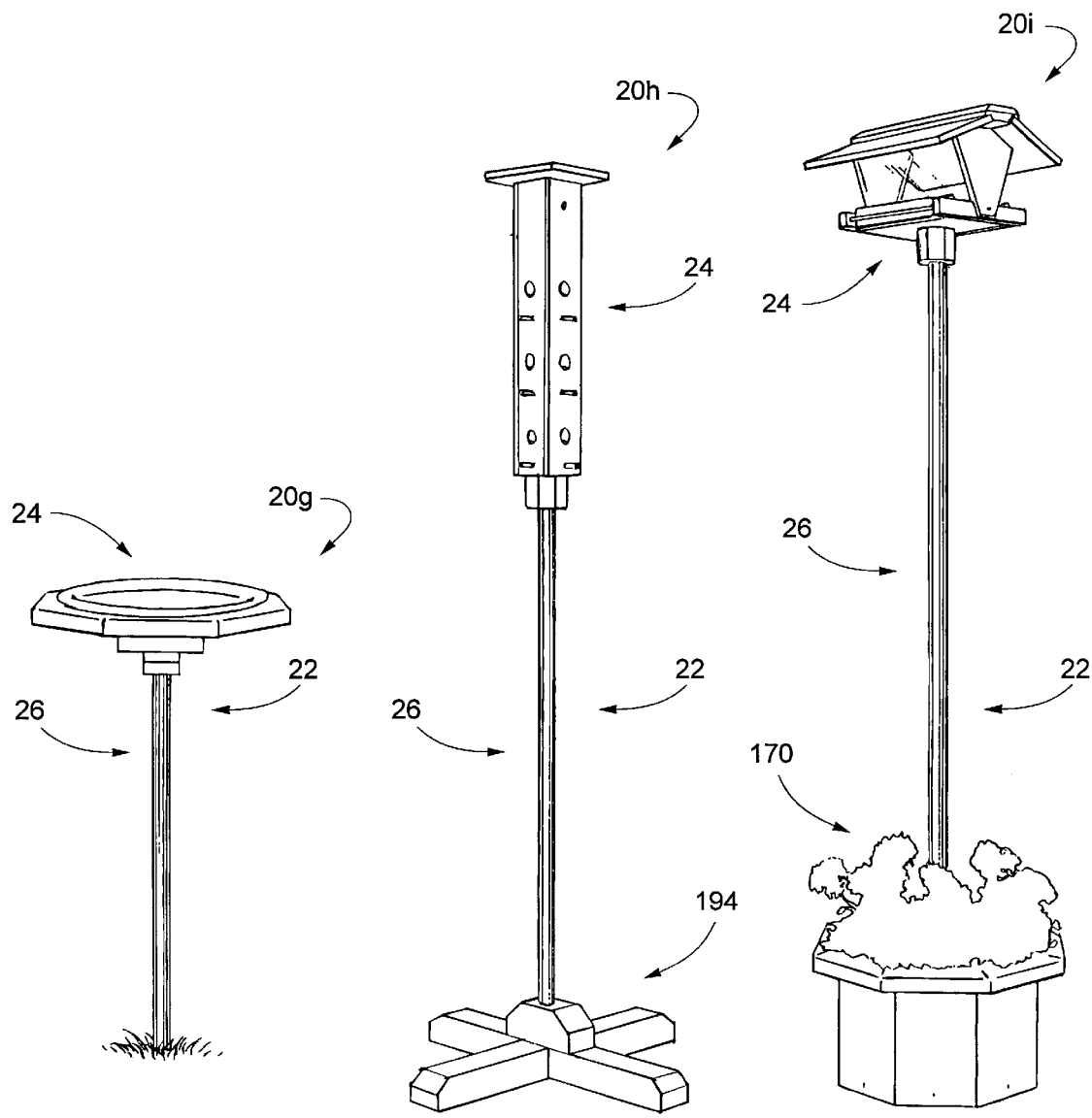

Referring for a moment back to FIGS. 1E and 1H, depicted therein are stand assemblies 194 that may be used instead of driving the anchor tube 38 into the ground.

Figure 12A:
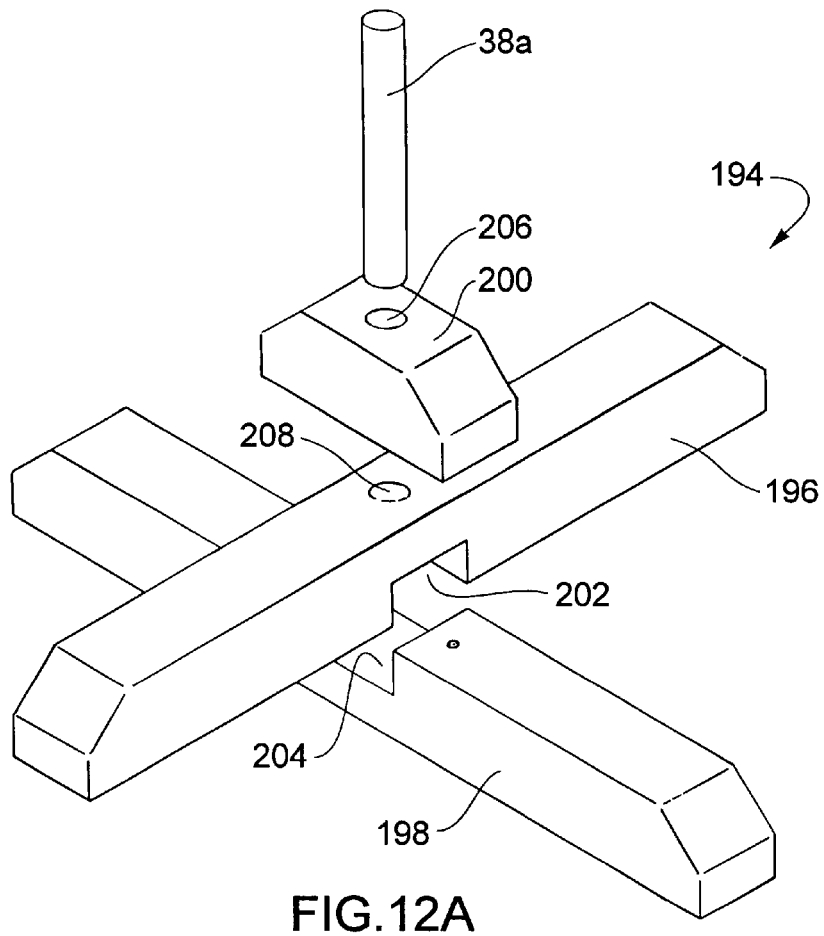
FIGS. 12A–12D depict a stand assembly portion of the support system depicted in FIG. 1, as well as the method of fabricating the same.

As shown in FIG. 12A, the stand assemblies 194 comprise first and second cross members 196 and 198 and a brace block 200. The cross members 196 and 198 have dadoed grooves 202 and 204 formed therein that allow these members 196 and 198 to be placed cross-wise to each other with their upper surfaces coplanar and lower surfaces coplanar.

Figure 12B:
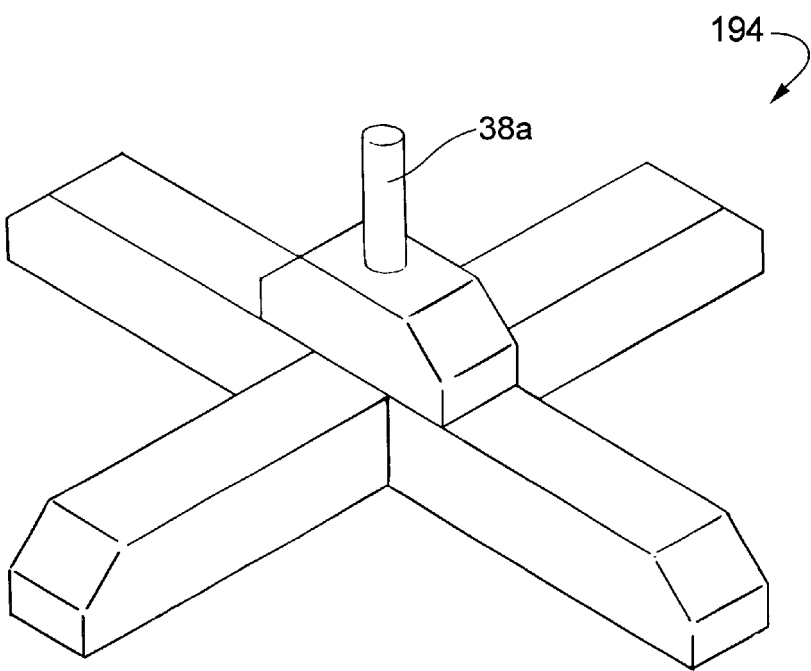
Figure 12C:
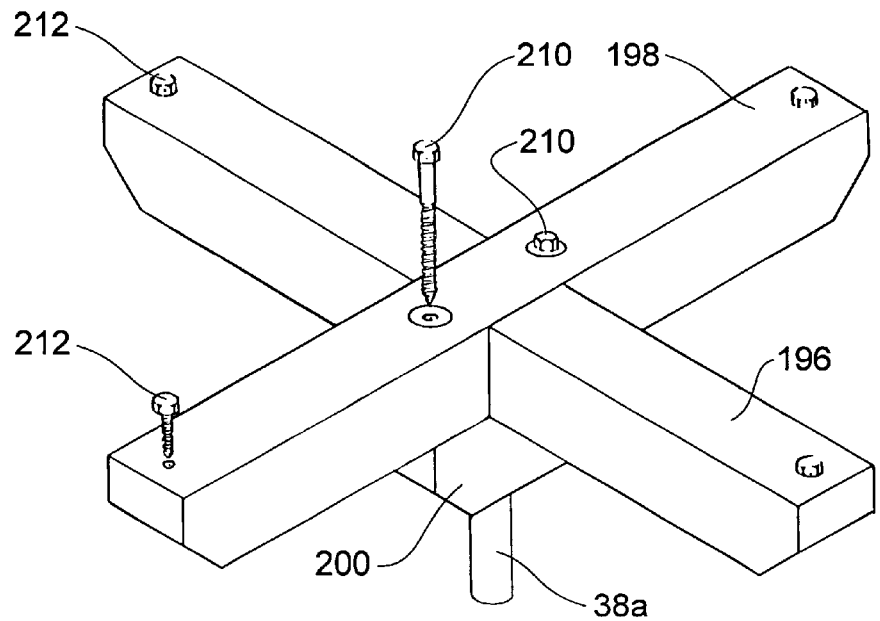
Figure 12D:
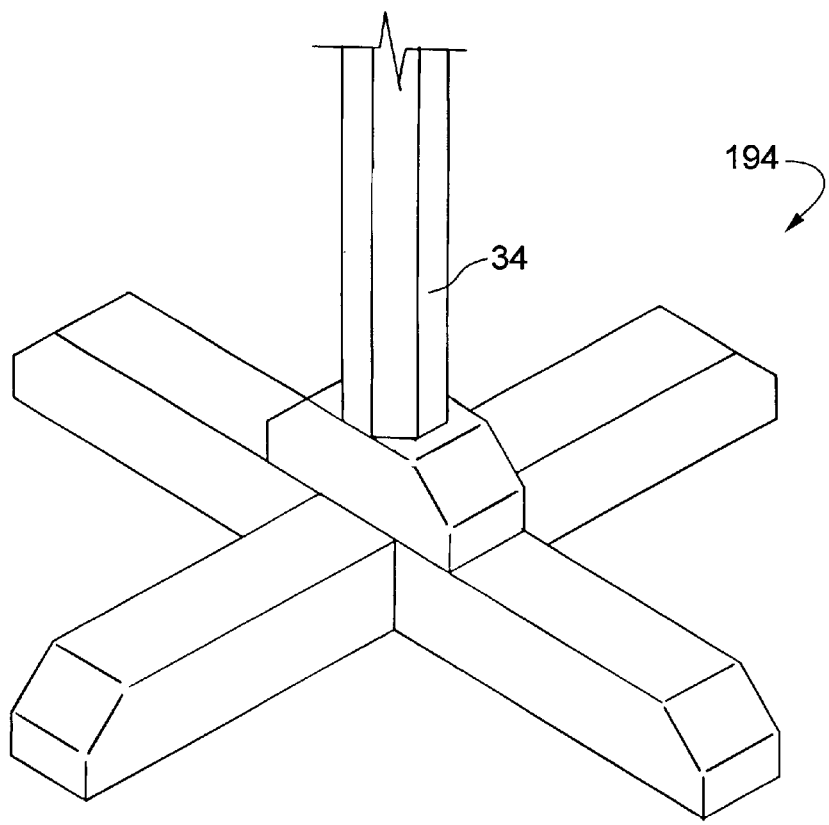
Figure 14A:
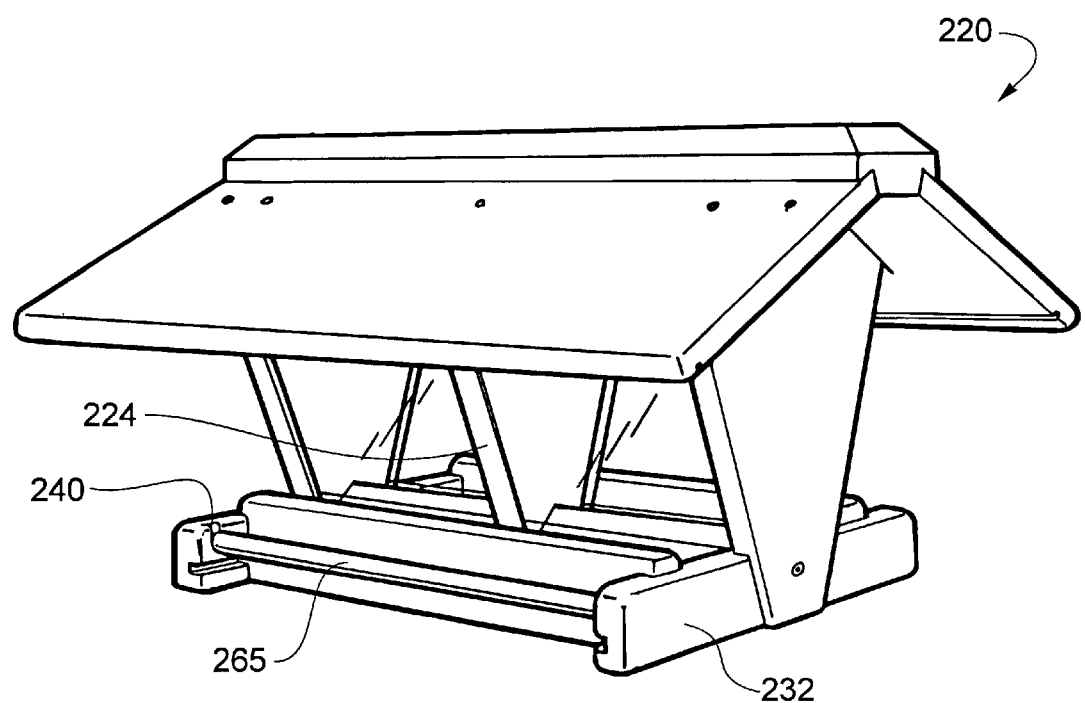
FIGS. 14A–14R depict a double hopper feeder constructed in accordance with the present invention, with FIG. 14A being a perspective view, FIG. 14B being a top plan view, FIG. 14C being an end elevational view, the opposite end elevational view being identical, FIG. 14D being a front elevational view, the rear elevational view being identical, and FIG. 14E being a bottom plan view thereof.
Figure 14B:
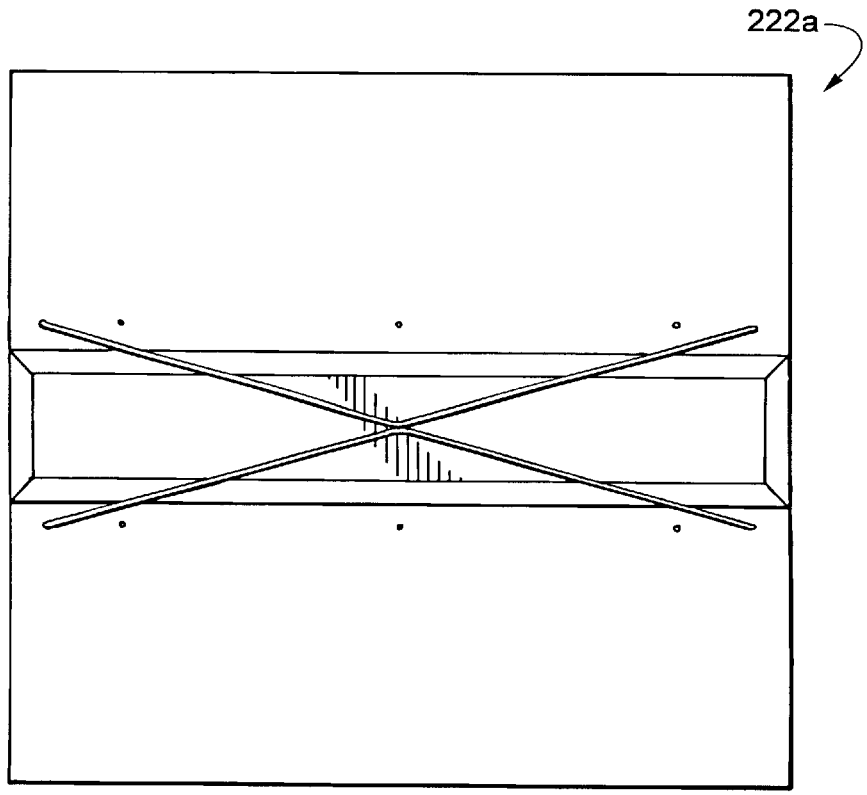
Figure 14E:
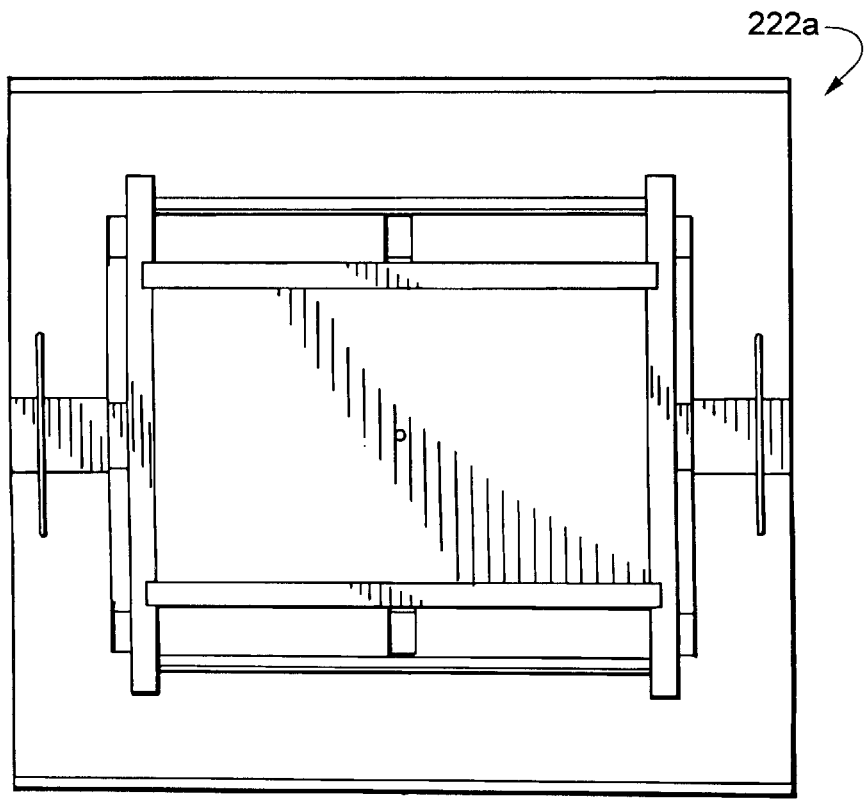
Figure 14D:
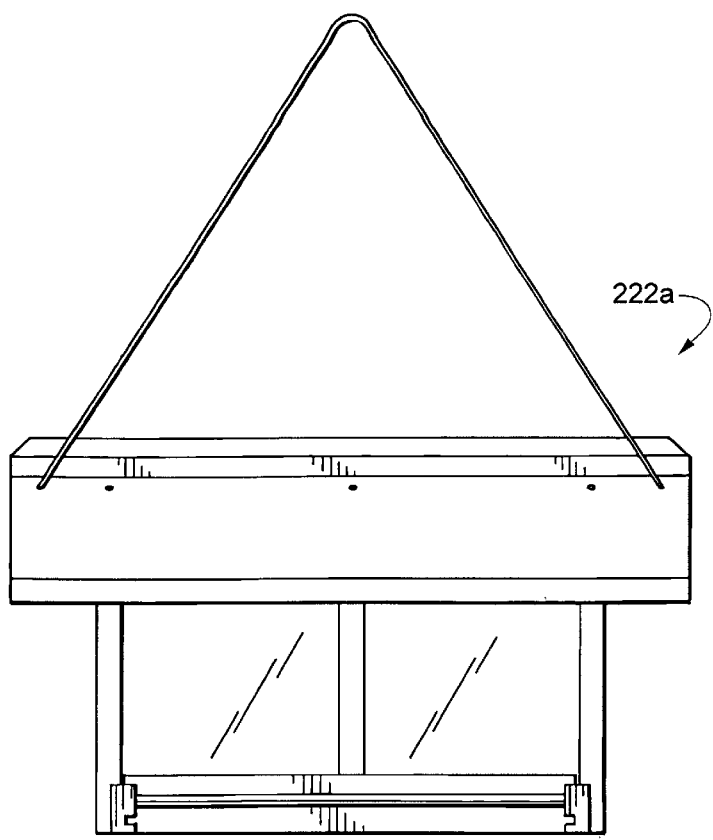
Figure 14C:
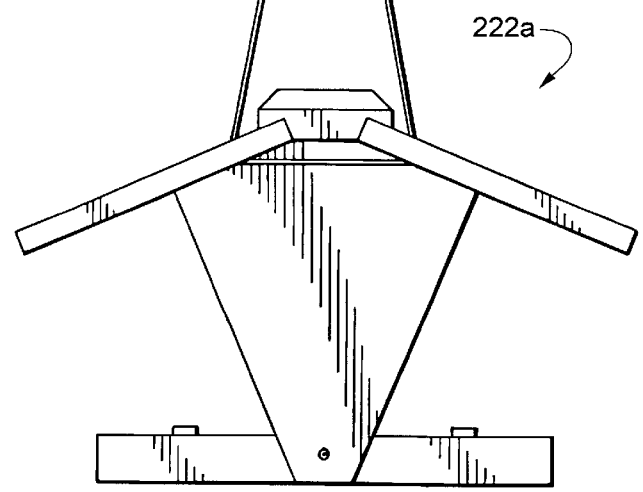

The support block 200 extends across the upper cross member 196 and overlaps the upper surface of the lower member 198, as shown in FIG. 12B. A short anchor tube 38a is inserted into holes 206 and 208 formed in the support block 200 and upper cross member 198, respectively.

The assembly so formed is then inverted and fastening lag bolts 210 inserted through predrilled holes in the bottom cross member and into predrilled holes formed in the support block 200. The support block thus holds the upper cross member 196 against the lower cross member 198.

Leveling lag bolts 212 are provided to allow the system 20 to be arranged in a stable upright configuration.

The assembly 194 is then reinverted to its upright position and a post section 34 is placed over the anchor tube 38a.

The stand assembly 194 can be placed on location or attached to the lower surface of a planter assembly such as that described above.

ACCESSORIES

Referring for a moment back to FIG. 1A, it can be seen that a number of accessories 24 are attached to the support assembly 22. The following discussion will describe in further detail the fabrication and assembly of these accessories 24.

Referring initially to FIGS. 13–14, depicted therein are a single hopper feeder 220 and a double hopper feeder 222 constructed in accordance with, and embodying, the principles of the present invention.

These hopper feeders 220 and 222 are in most respects the same, except that the feeder 222 has a center plate 224 that divides its hopper into two sections. The double hopper feeder 222 will be described below only to the extent that it differs from the single hopper feeder 220.

Additionally, both of these feeders 220 and 222 may be constructed using a flat wooden bottom wall or a specially designed plastic bottom wall. FIGS. 13B–13D and 14B–14D depict the use of a flat wooden bottom wall, while FIGS. 13E–13G and 14E–14G depict the use of the plastic bottom wall. Feeders using a wooden bottom wall are identified by reference characters having suffix "a" and those using a plastic bottom wall are identified by reference characters having a suffix "b".

Figure 13A:
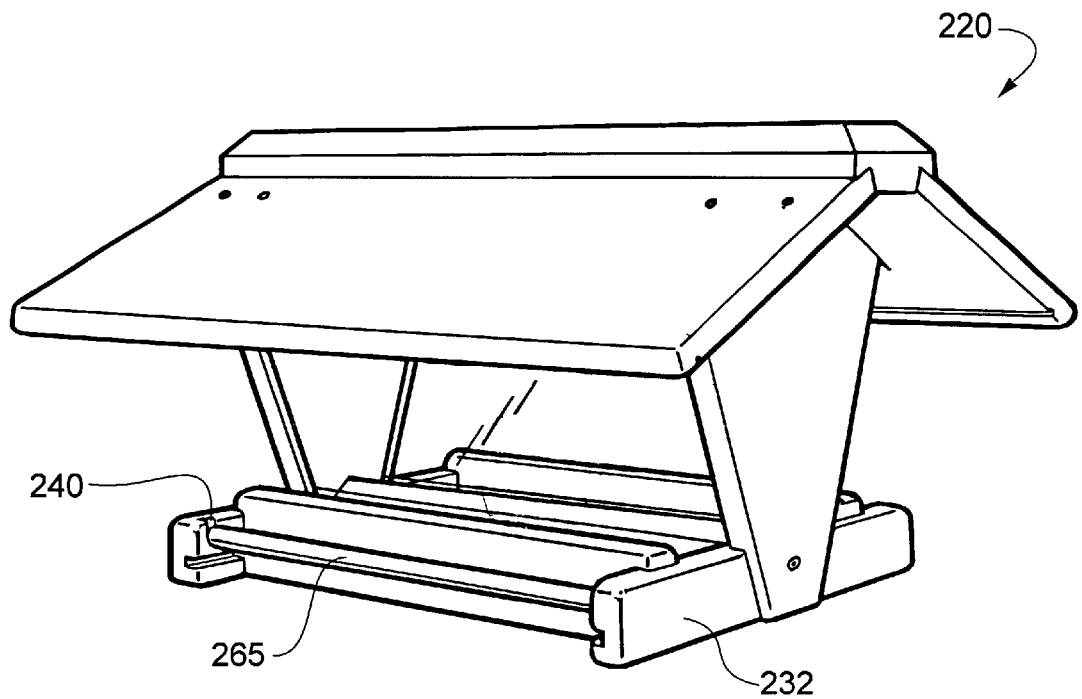
FIGS. 13A–13U depict two embodiments of a single hopper feeder of the present invention, with FIG. 13A being a perspective view, FIG. 13B being a top plan view, FIG. 13C being a side elevational view, the opposite side being identical.
Figure 13B:
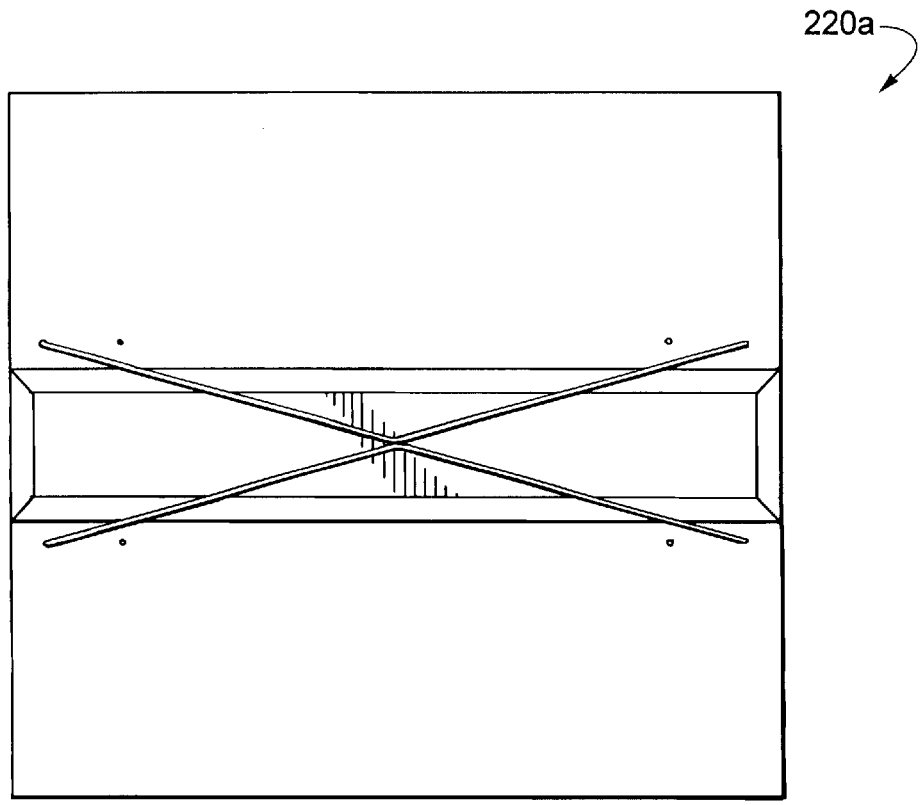
FIG. 13D is a front elevational view thereof, the rear elevational view being identical.
FIG. 13E is a bottom plan view thereof.
Figure 13E:
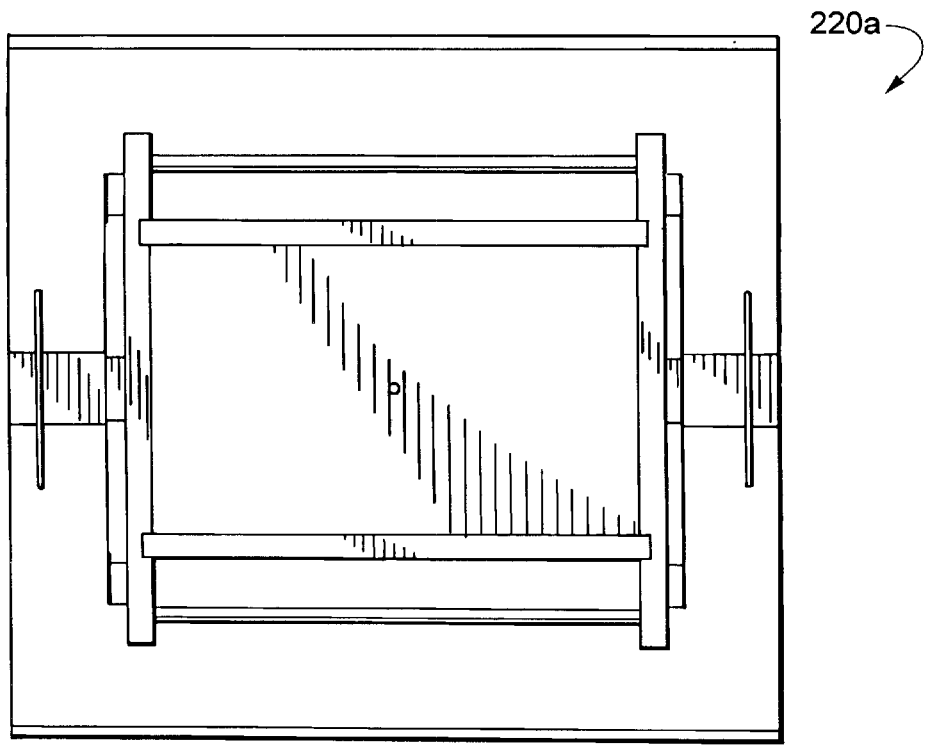
Figure 13D:
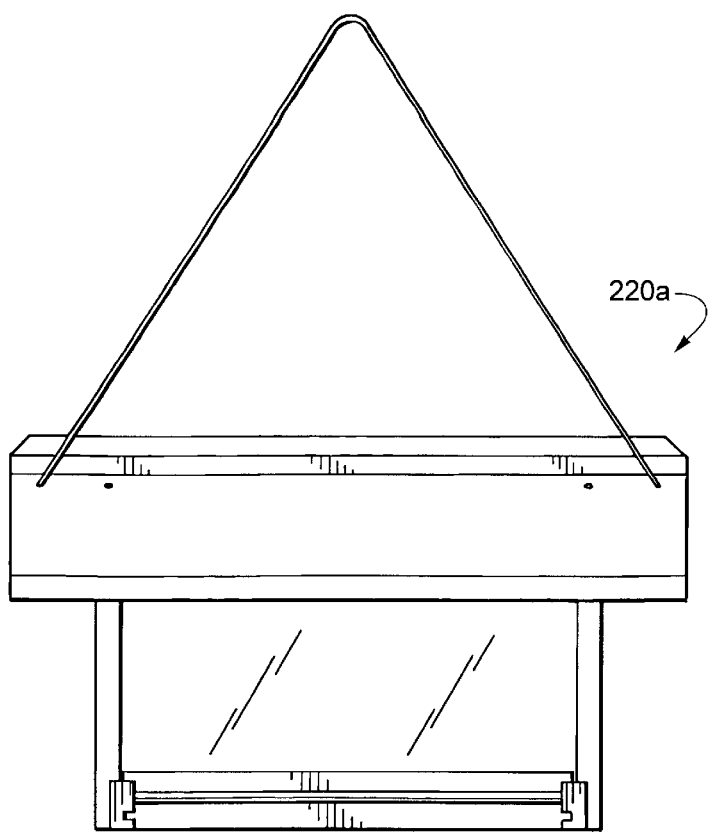
Figure 13C:
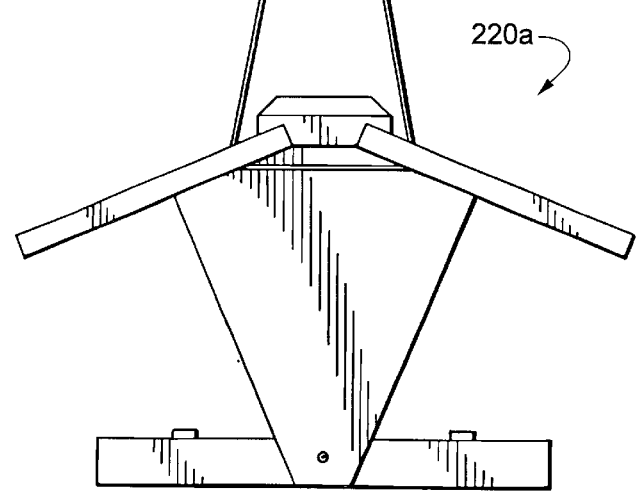
Figure 13F:
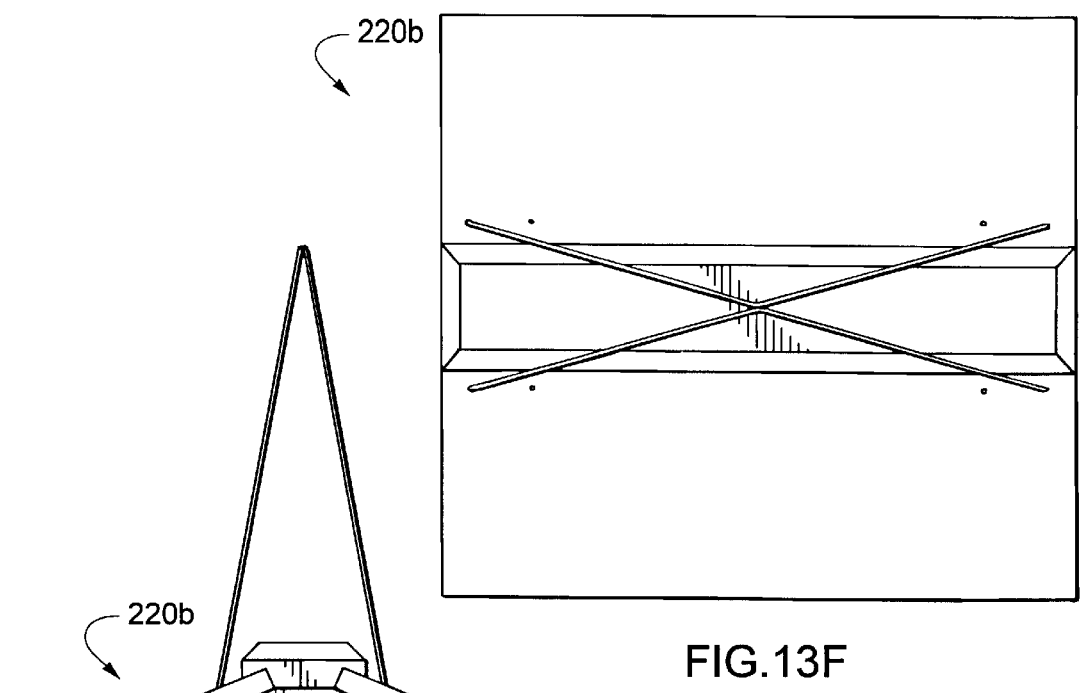
Figure 13G:
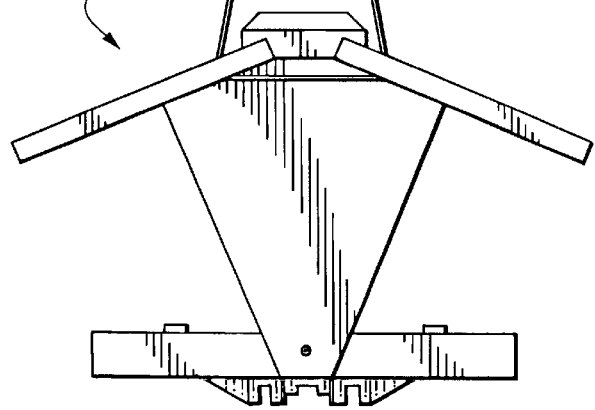
Figure 13H:
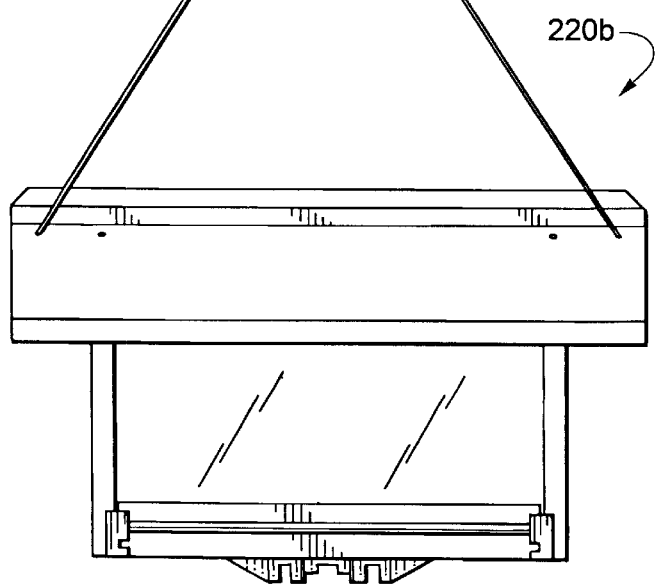
Figure 14F:
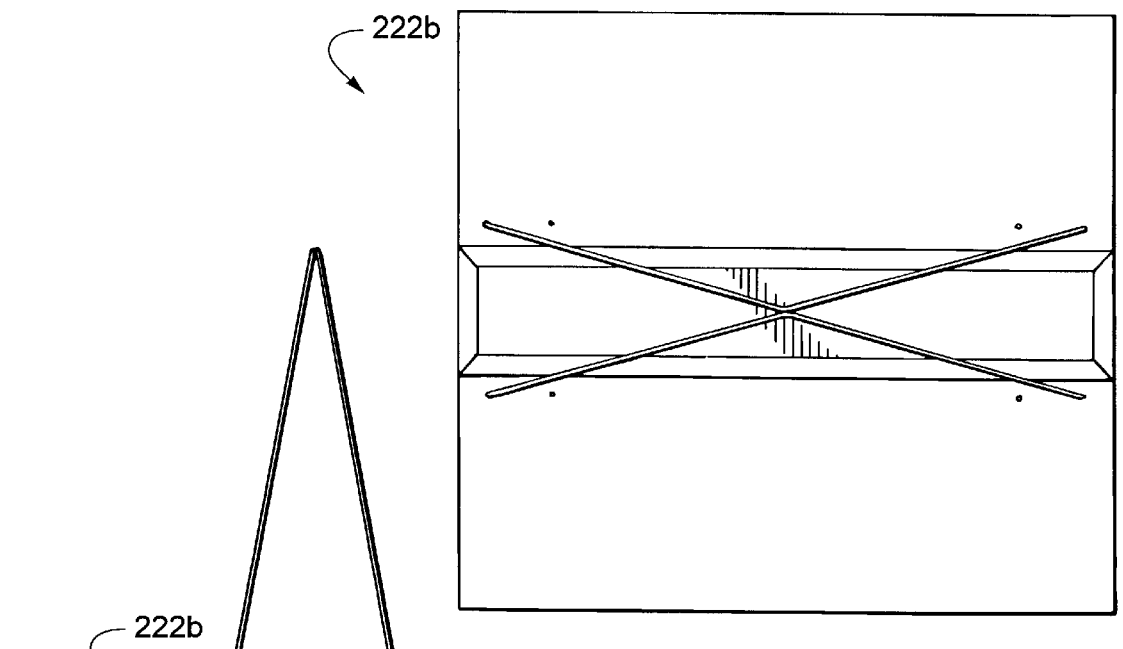
Figure 14G:
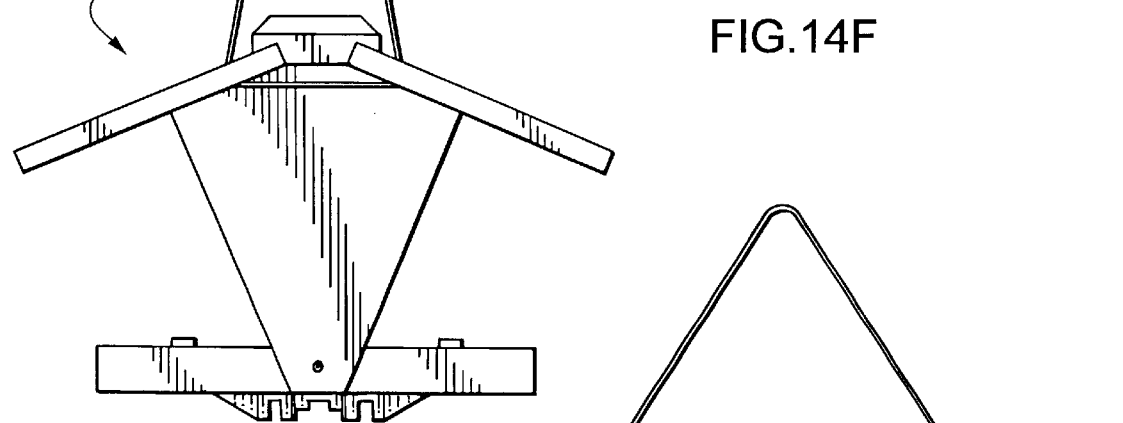
Figure 14H:
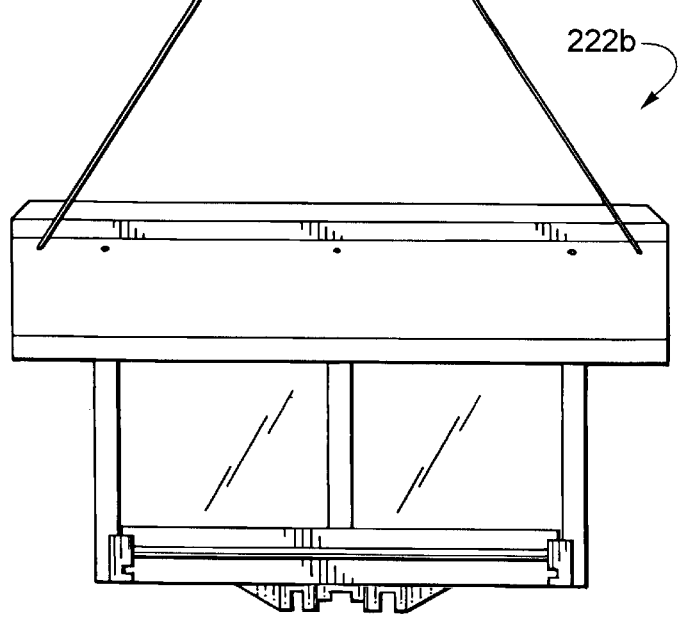
Figure 13I:
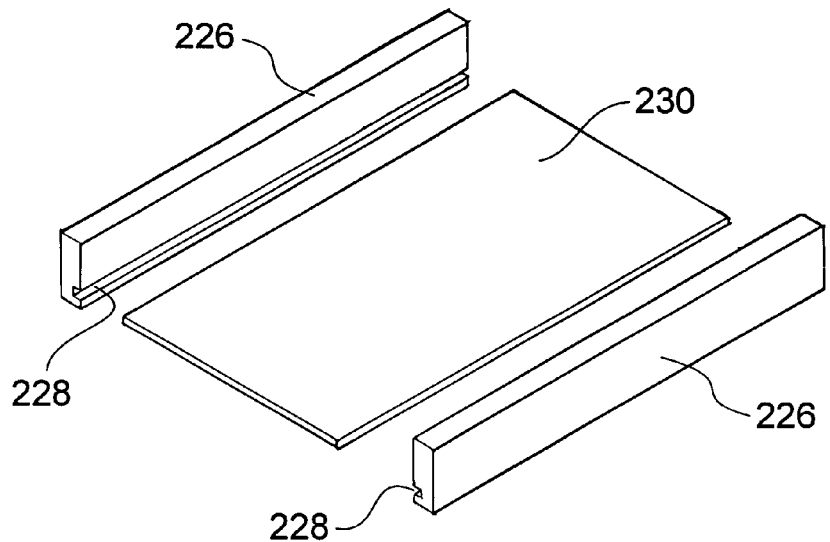
Figure 13J:
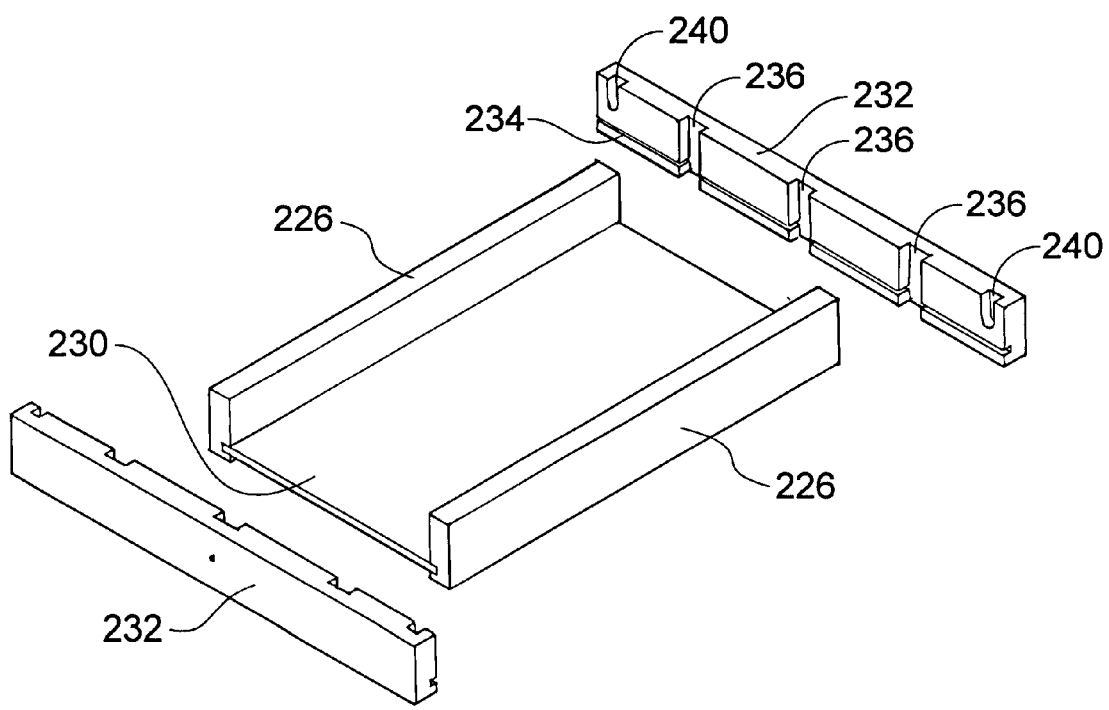

Referring now to FIGS. 13H–13N, depicted therein is the construction of a single hopper feeder 220a. Initially, as shown in FIG. 13H, two short side walls 226 having grooves 228 formed therein are assembled on to a flat bottom wall 230, with opposing edges of the wall 230 being received in the grooves 228. Two end walls 232 as shown in FIG. 13I are also provided. These end walls are formed with a single horizontal groove 234 extending the length thereof, three transverse grooves 236 extending from top to bottom orthogonal to the lower groove 234, and two half grooves 240.

The end walls 232 are placed such that the bottom wall 230 is received in the lower grooves 234 and the side walls 226 are received in the outermost of the transverse grooves 236. A center wall 240 is then downwardly inserted into the center transverse grooves 236b until the bottom surface of the center wall 240 engages the upper surface of the bottom wall 230.

Figure 13K:
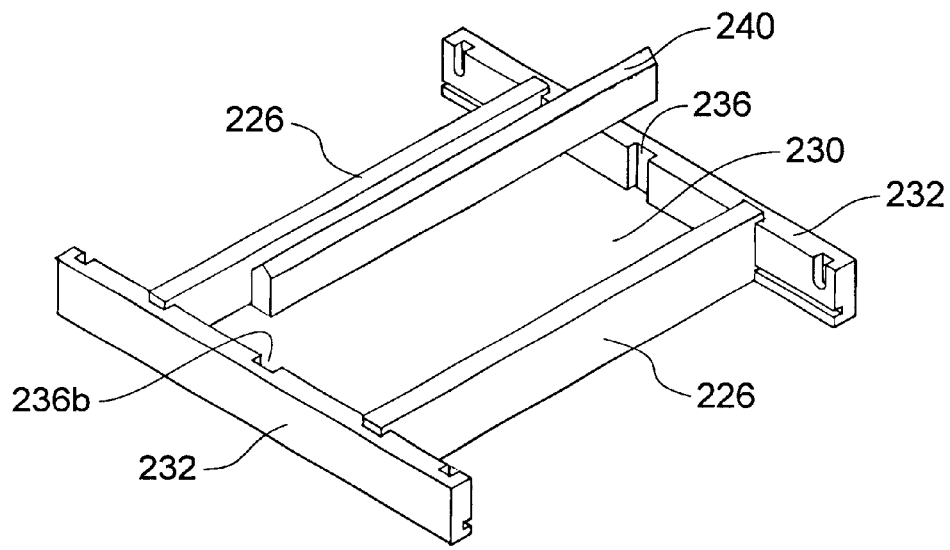

End housing walls 242 are next provided as shown in FIG. 13K. These end walls 242 each have a dado cut 244 and canted side grooves 246. The dado cuts engage the base end walls 232 such that predrilled holes 248 extending through the dado portions 244 are aligned with the center wall 240.

Figure 13L:
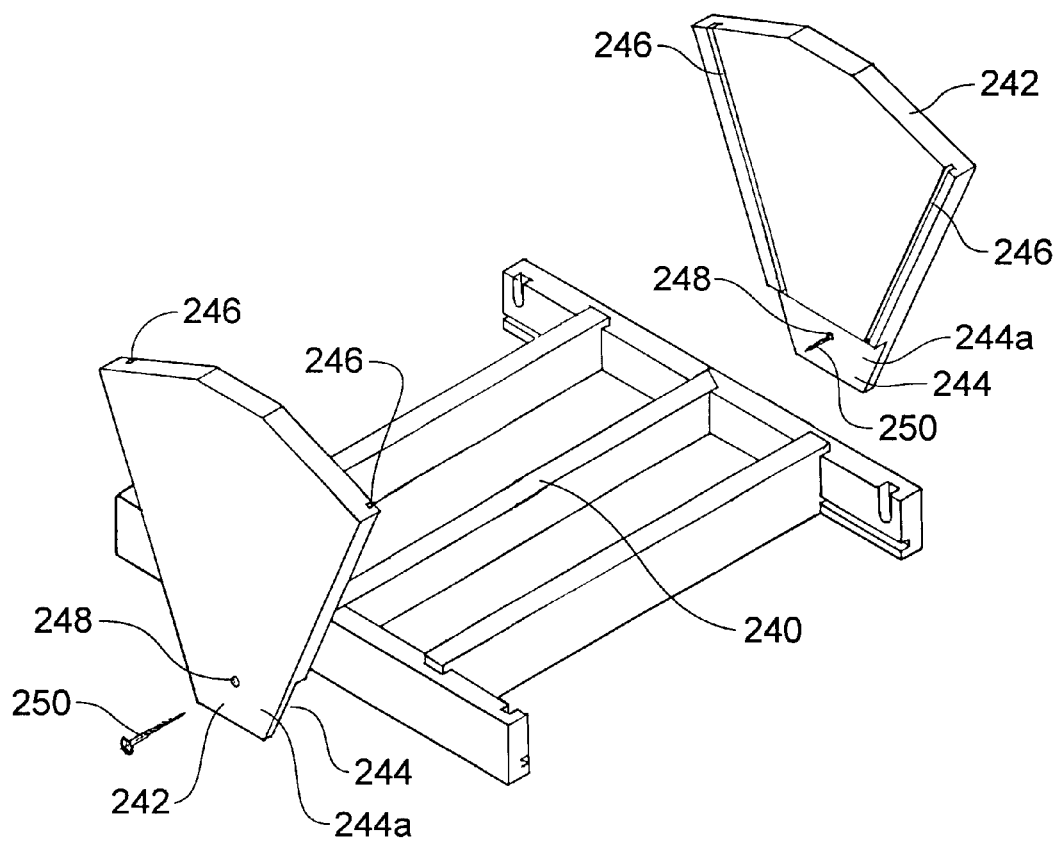

Fasteners 250 are then inserted through the dado portions 244a, the end walls 232, and into the center wall 240. This entire subassembly is held together by two fasteners. The grooves interlock such that the center wall 240 is engaged by the fasteners 250 to hold the entire assembly together. At this point, transparent sheets 252 are placed into the canted side grooves 246 as shown in FIG. 13L.

Figure 13M:
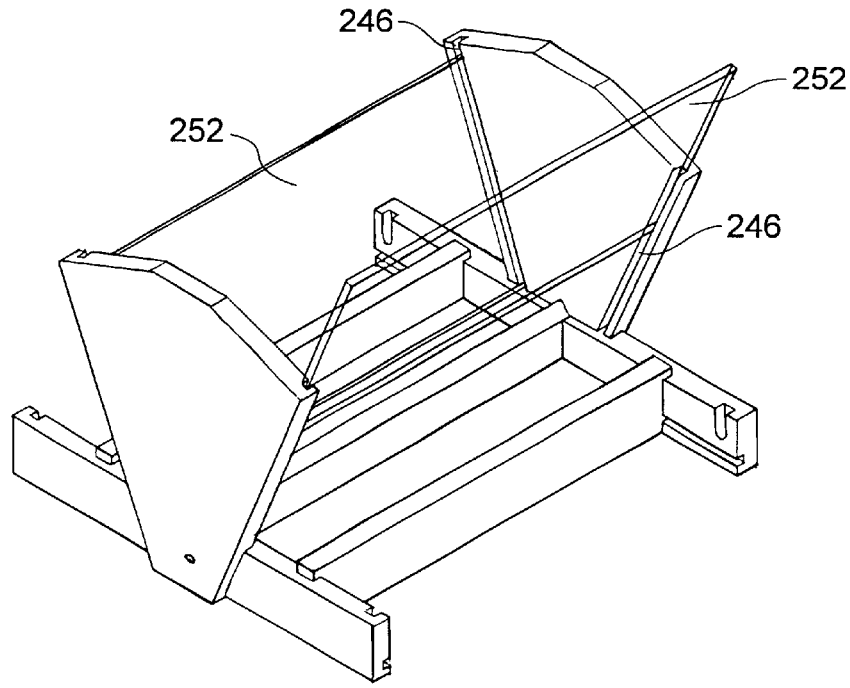
Figure 13N:
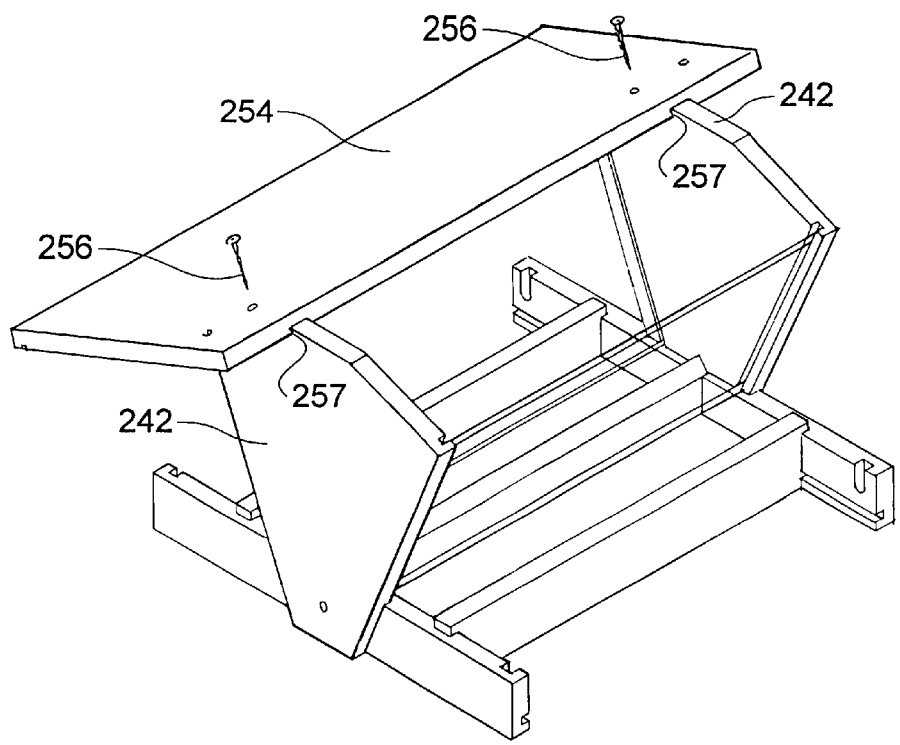

Referring now to FIG. 13M, a first side roof member 254 is attached to the housing end walls 242 by fasteners 256. Grooves 257 are formed on each end of the roof member 254; these grooves 257 receive the upper edges of the housing end walls 242 to provide strength to the finished assembly and allow accurate alignment during the assembly process.

A roof cap 258 is then provided as shown in FIG. 13M. This roof cap has lower side edge grooves 260 which have a triangular cross-sectional area, formed along its side edges. These grooves are configured to receive the side roof members 254. Even though the roof cap 258 is removable to allow feed to be placed into the feeder 220a, it is used during assembly to align the location of the second side roof member 254 that is attached to the housing end members 242. During use, the roof cap 258 may be removed to introduce feed within the hopper chamber defined by the transparent walls 252 and hopper walls 242.

FIGS. 14H–14M depict the construction of a dual hopper feeder 222a. In this case, a center notch 262 is formed in the center wall 240.

Additionally, a center hopper wall 264 is provided. This center hopper wall 264 has the same basic shape as the end hopper walls 242 but has a notch 266 at its lower end instead of a dado portion and has four canted side grooves 246 to support the transparent walls. In this case, four transparent walls are provided: two extending between one end hopper wall and the center hopper wall, and the other two extending between the opposite end hopper wall and the center wall.

An additional fastener 256 is provided for each side roof member to the center wall 264. In all other respects the construction of the dual hopper feeder 222 is the same as the single hopper feeder 220.

Both the single and double hopper feeders 220 and 222 described above have removable perches 265 (FIGS. 13A and 13B). These exemplary perches 265 are simply wooden dowels the ends of which are received within the vertical half grooves 240 formed in the end walls 232.

The perches 265 may be removed to prevent larger birds from dominating the feed tray.

Figure 13O:
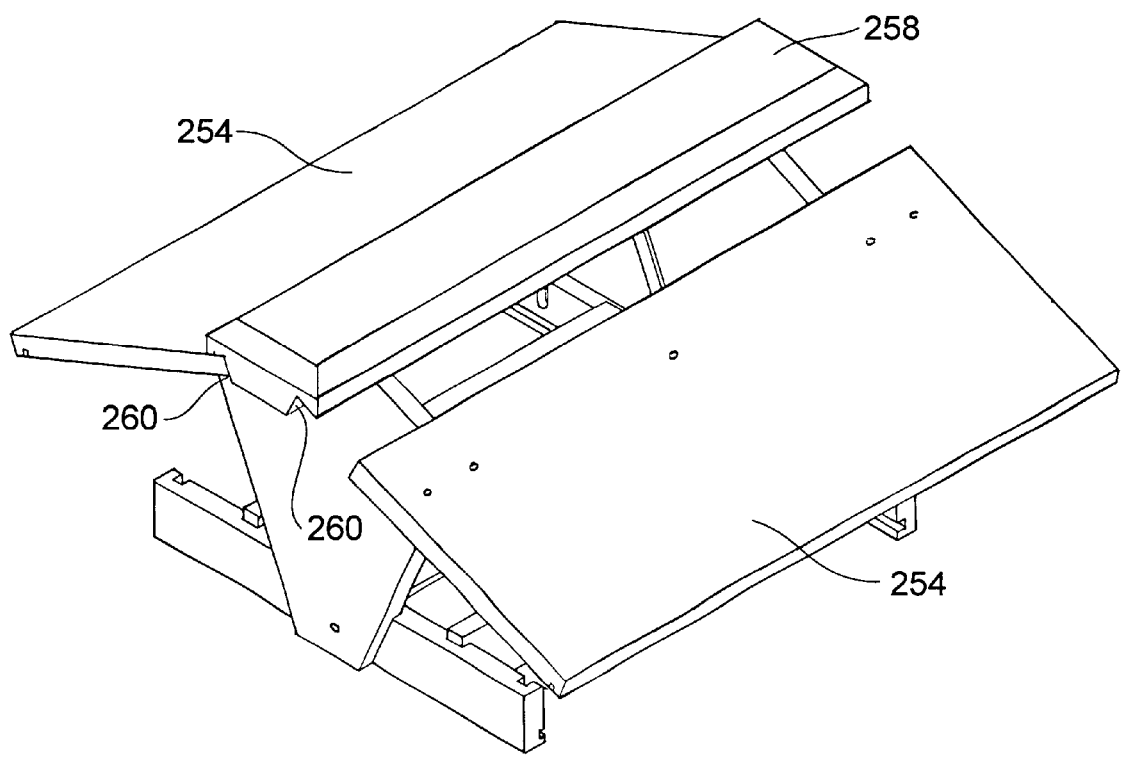
Figure 14I:
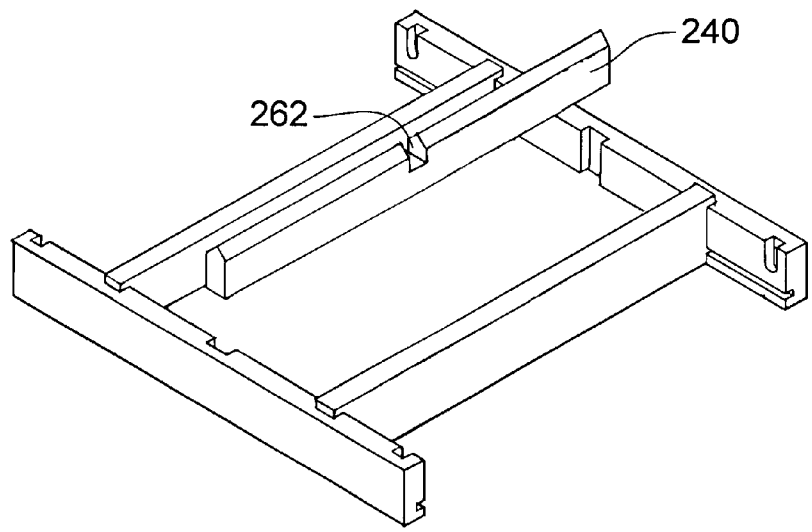
Figure 14J:
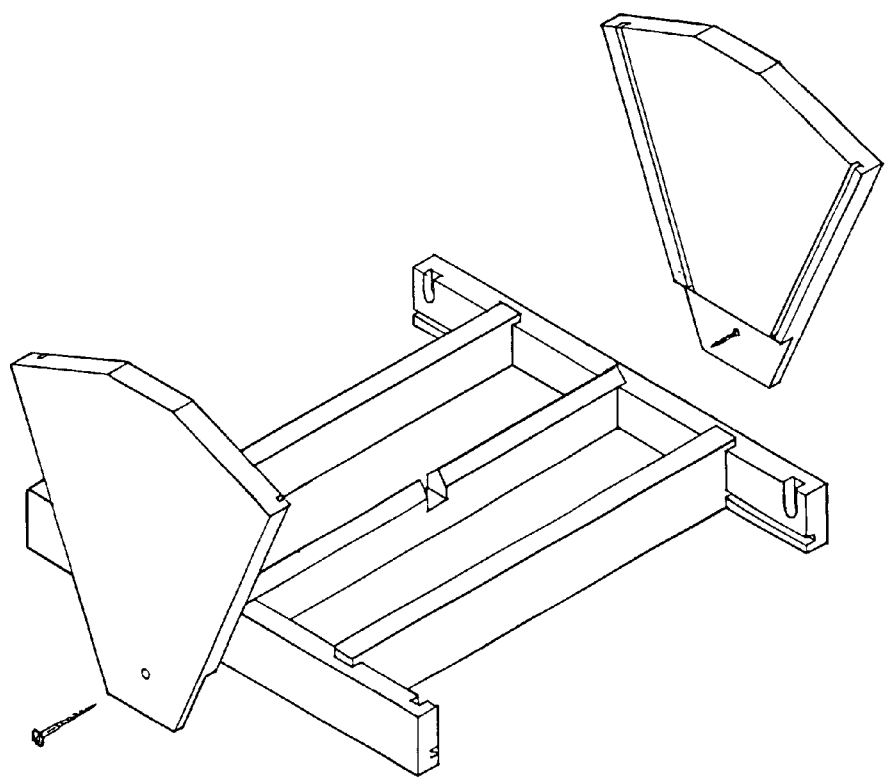
Figure 14K:
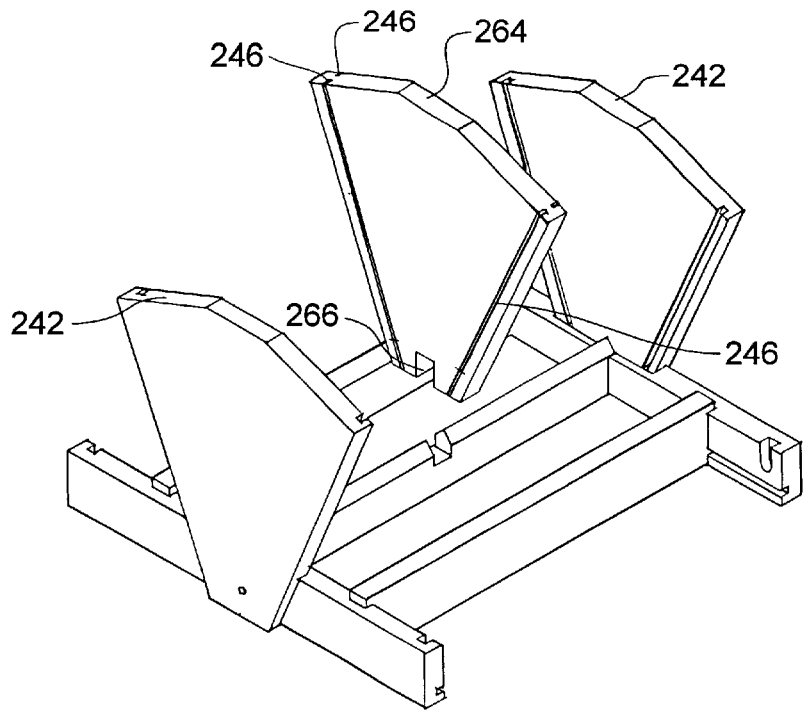
Figure 14L:
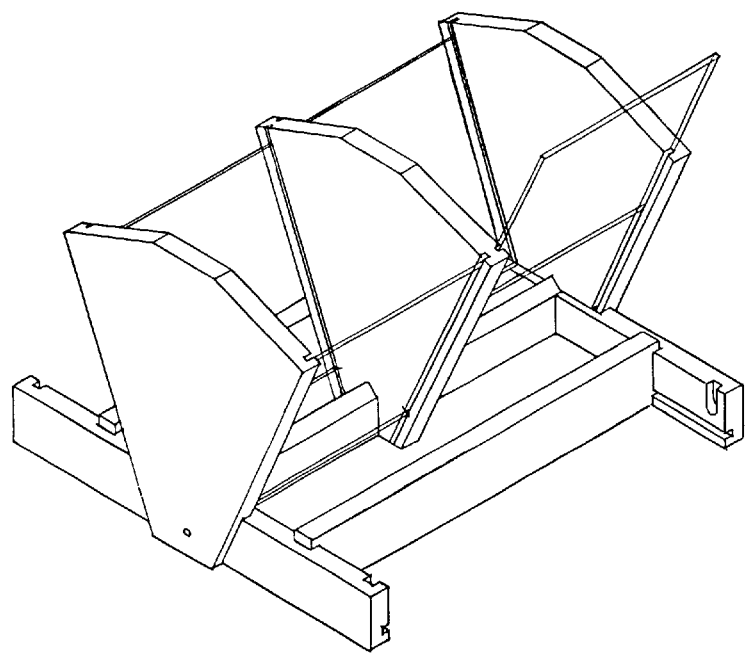
Figure 14M:
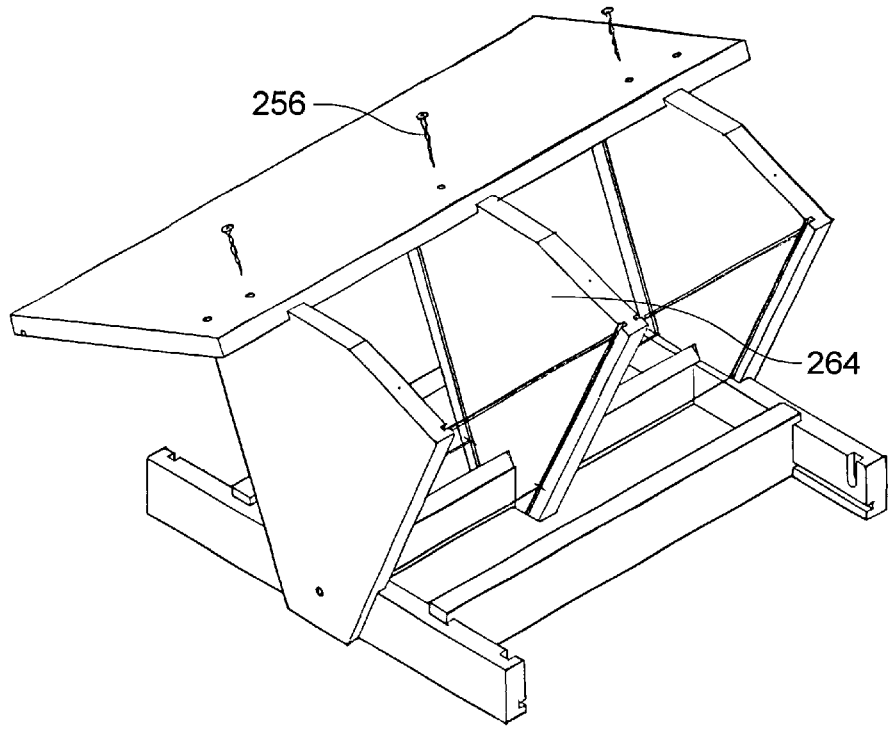
Figure 14N:
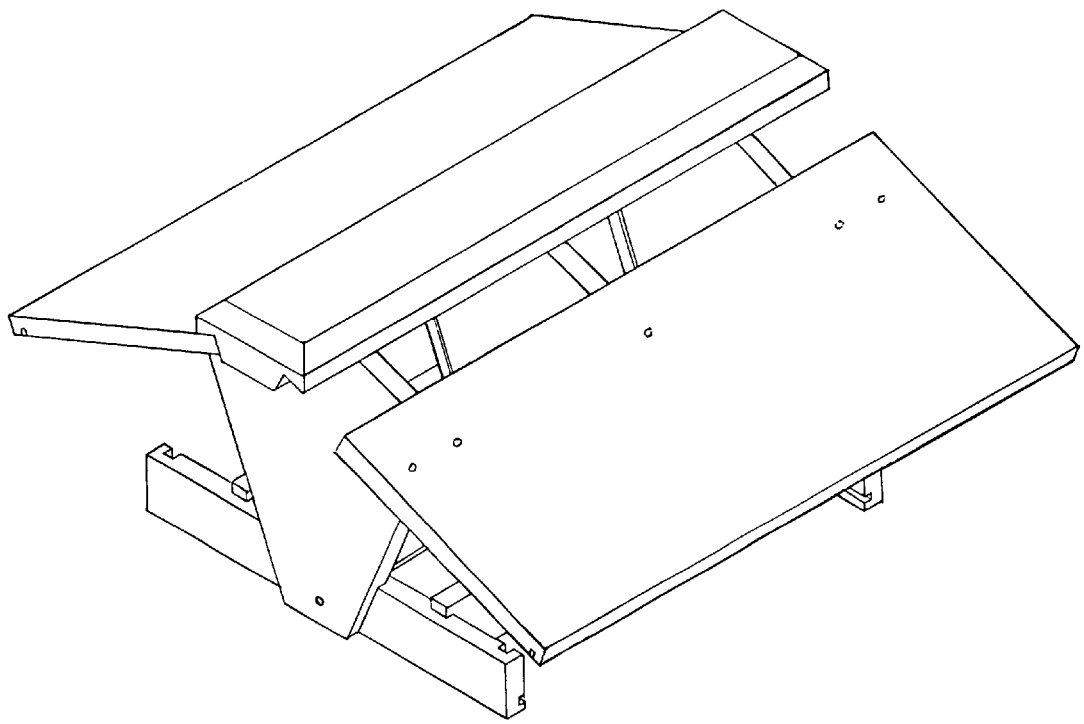
Figure 14O:
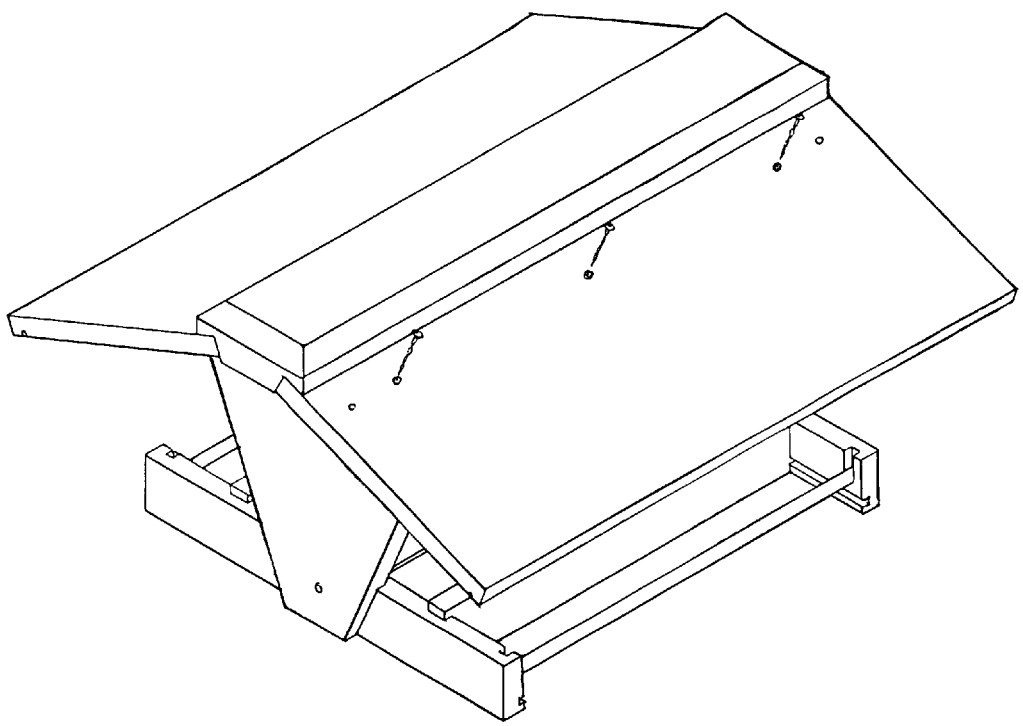
Figure 14P:
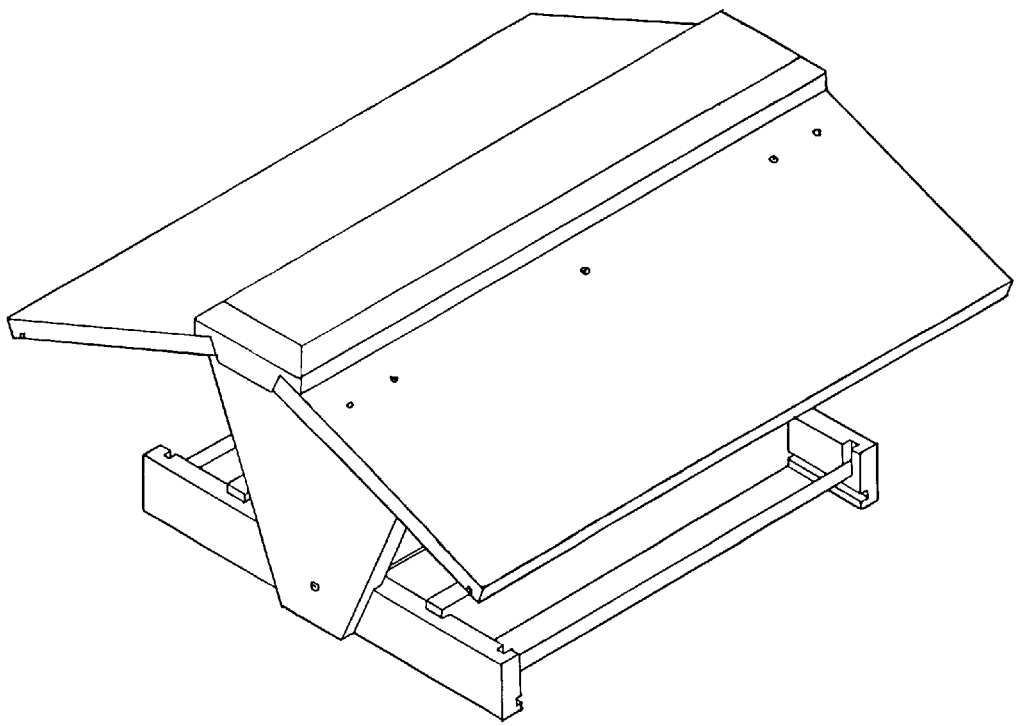
Figure 13P:
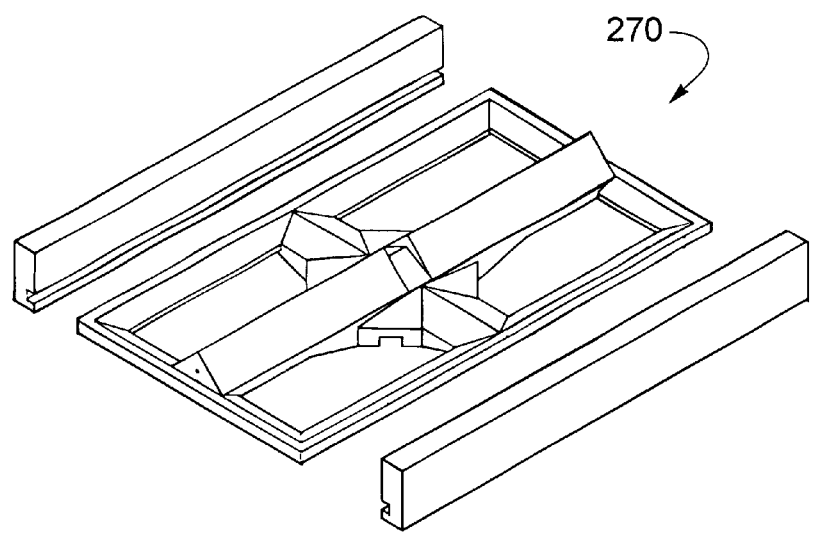
Figure 13Q:
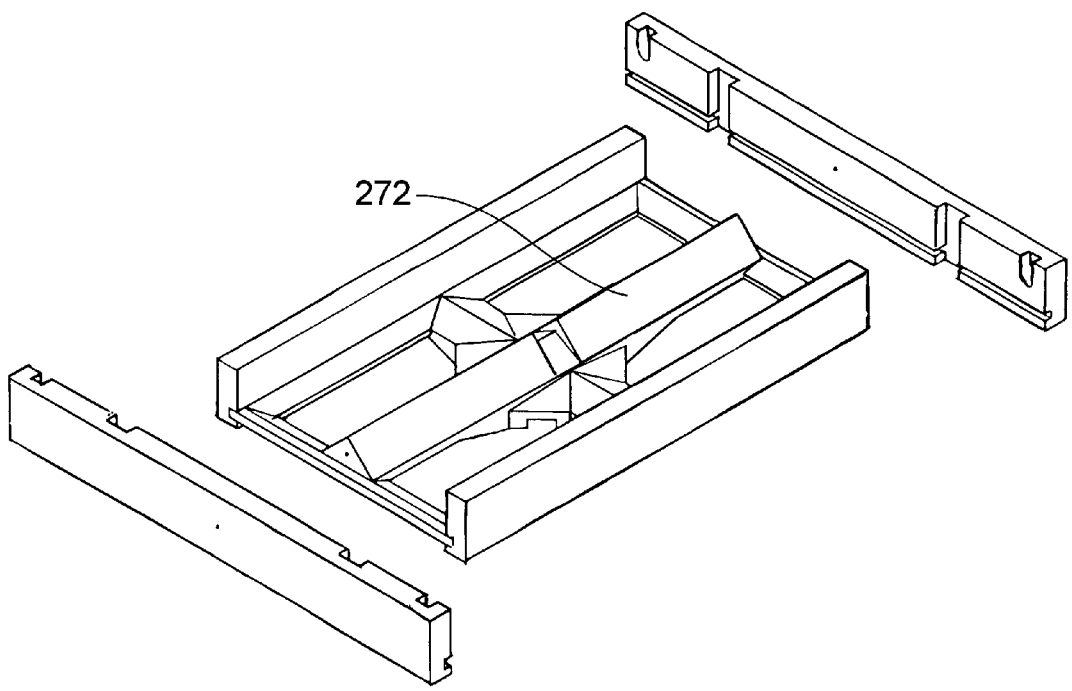
Figure 13R:
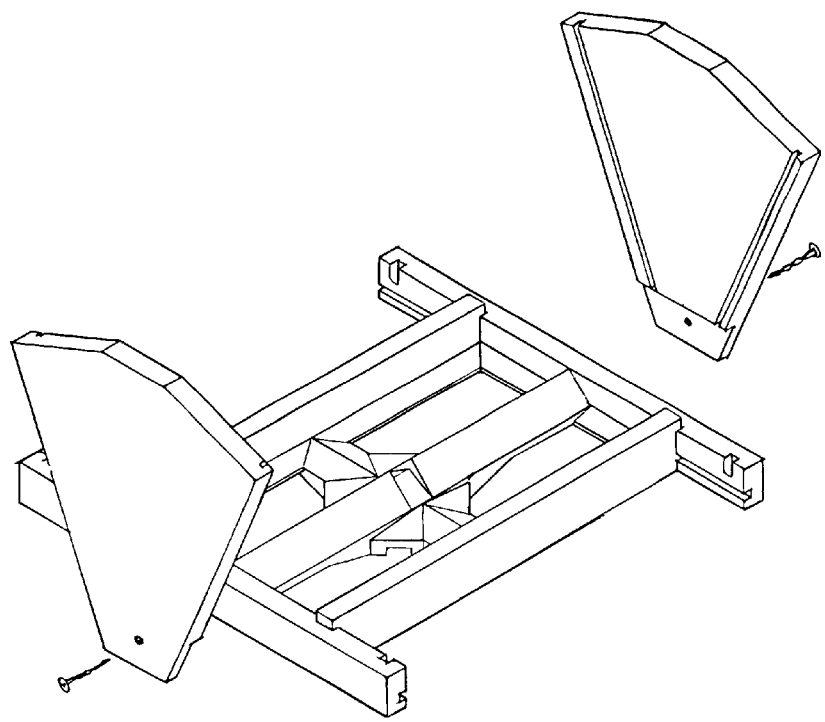
Figure 13S:
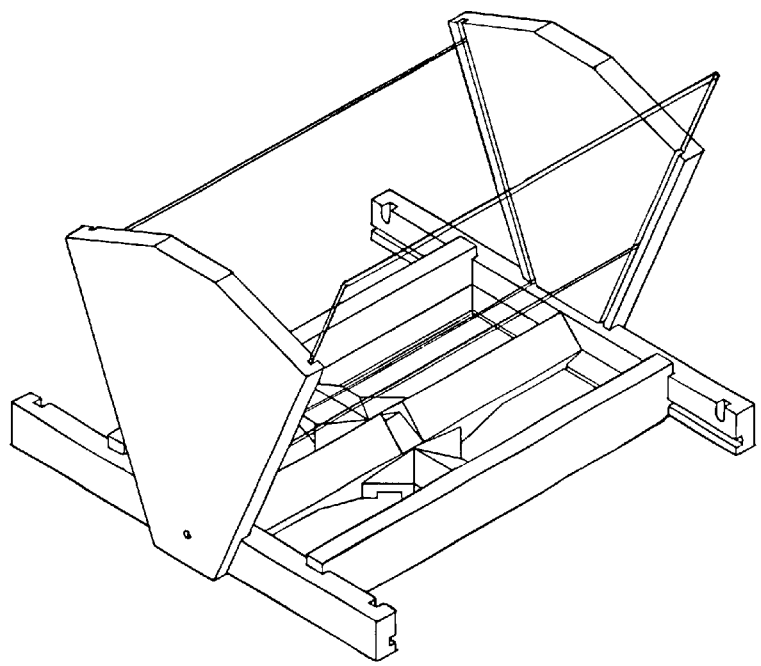
Figure 13T:
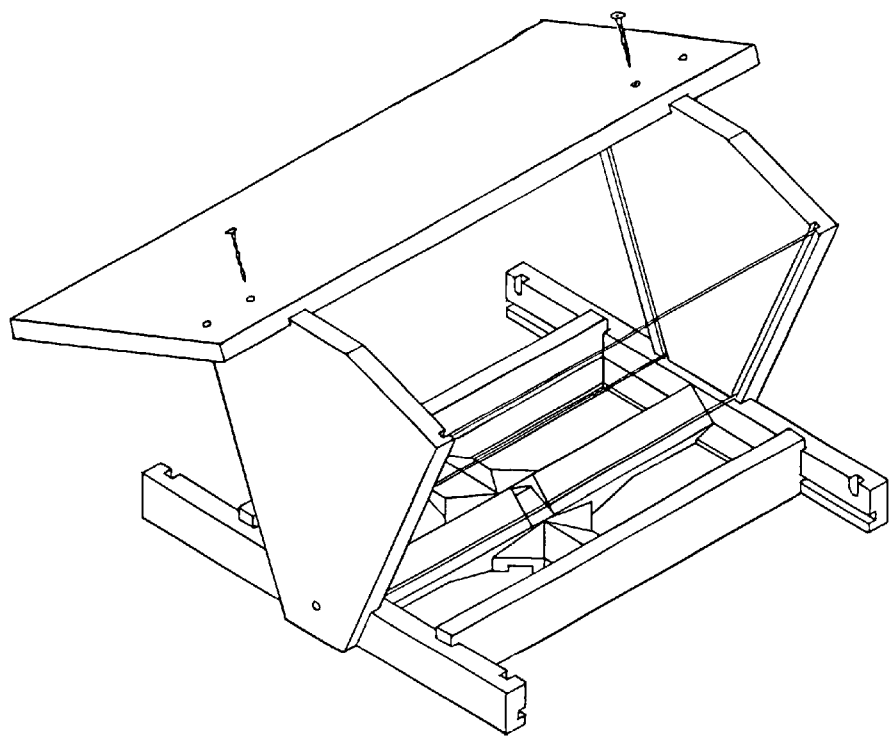
Figure 13U:
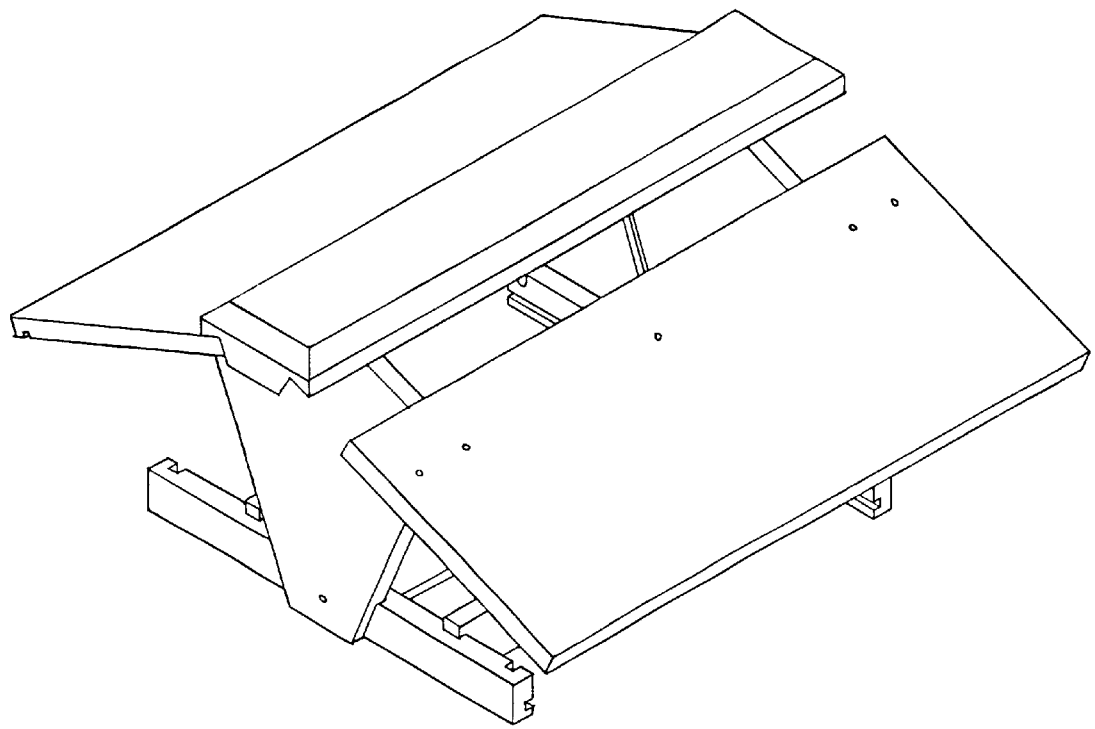
Figure 14Q:
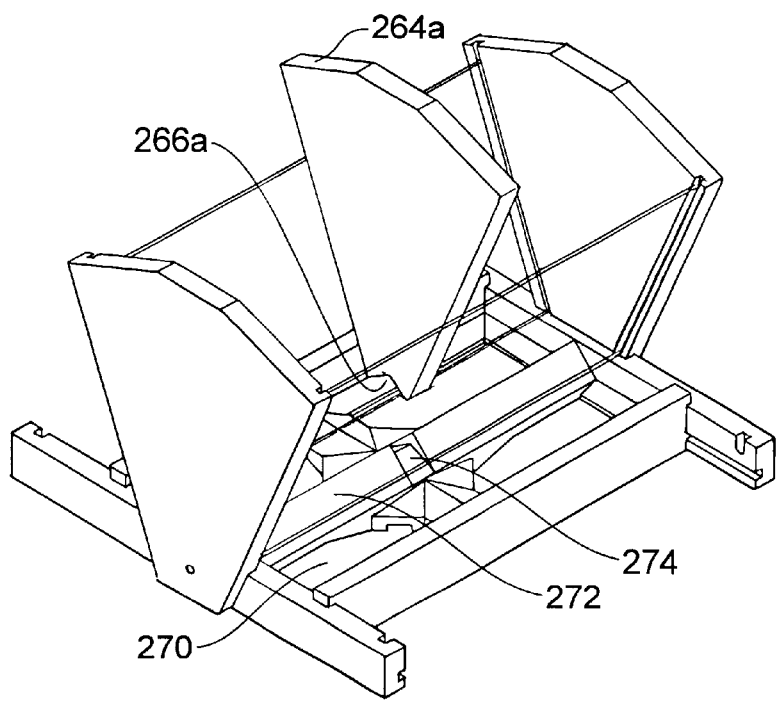
Figure 14R:
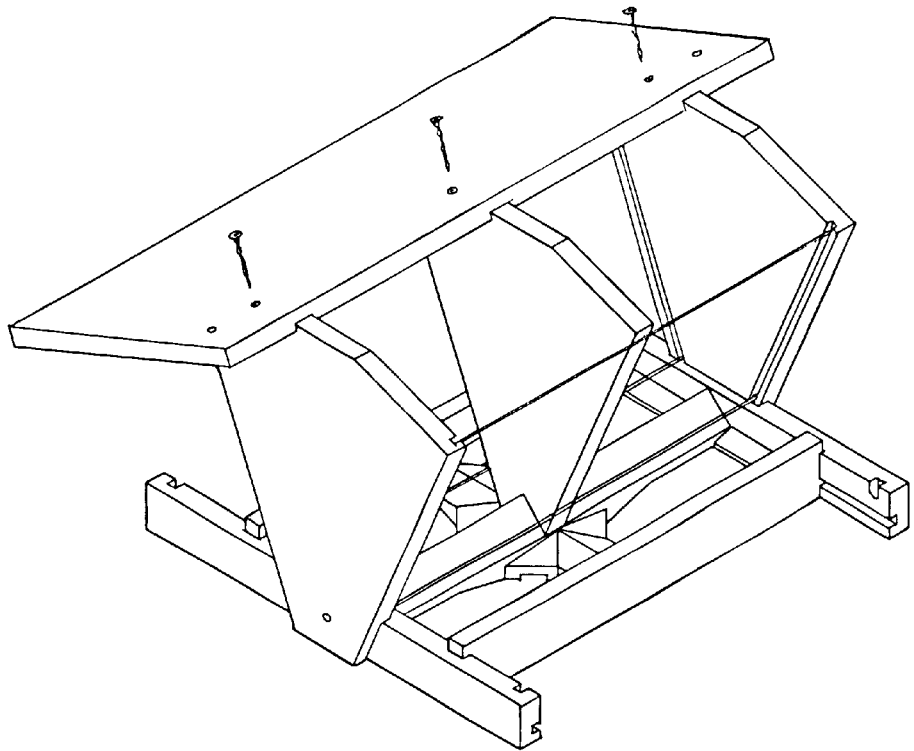

Referring now to FIGS. 13O–13T and 14P–14Q, the fabrication of the single and dual hopper feeders 20b and 22b is depicted. This process is very similar to that of the feeders 20a and 22a, but instead of the flat bottom wall 230, the feeders 220b and 222b employ a plastic bottom wall 270, as shown in FIG. 13O. The only difference in assembly of the feeders 220a, 222a, and the feeders 220b, 222b is that a separate center wall piece is not required and the end wall pieces 232 do not have a center transverse notch.

The plastic base wall 270 will be described in further detail below, but at this point it should be noted that this base wall 270 has an upwardly extending central portion 272 that serves a function similar to the center wall 240 described above. In other respects, the construction of the single feeder hopper 220b is substantially identical to that of 220a.

The construction of the double hopper 222b is also similar to that of the hopper 222a. The primary difference between these two methods is the shape of the notch 266 formed in the center wall 264. This notch 266a of the center wall 264a is triangular to match a triangular surface notch 274 formed in the central portion 272 of the plastic base wall 270. Also, instead of having four canted side grooves that require the use of four transparent side panels, the center wall 264 is slightly smaller and fits inside two transparent side walls as used in the single hopper configuration. In all other respects, the assembly of the dual hopper feeder 222b is the same as that of the feeder 222a.

Figure 15A:
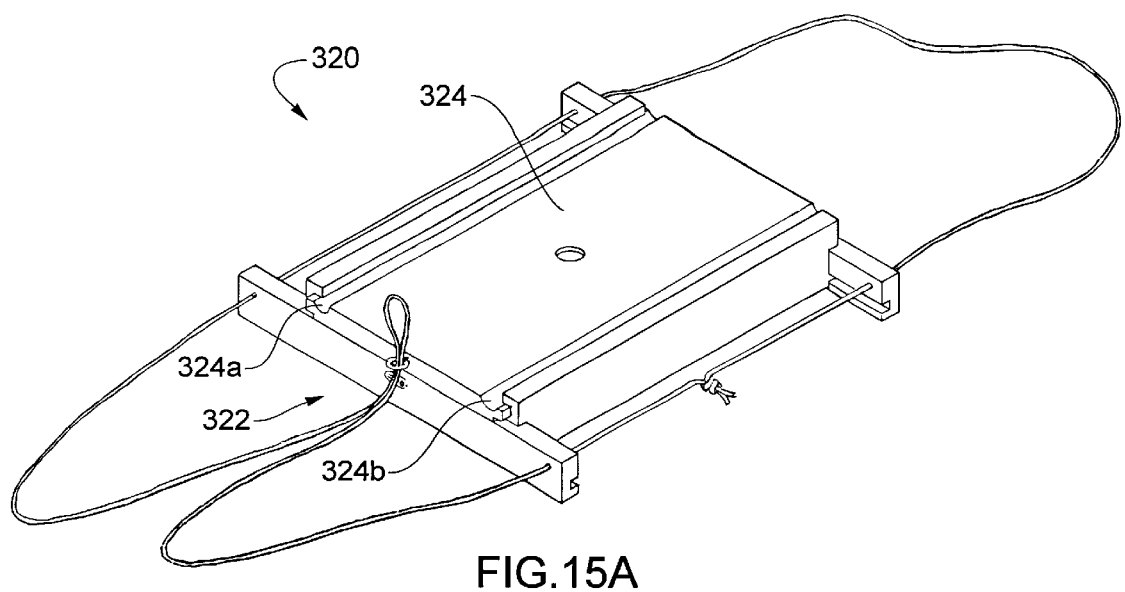
FIGS. 15A–15N depict a portable covered bird feeder, with FIGS. 15A–15B being perspective views thereof, FIG. 15C being a top plan view thereof, FIG. 15D being an end elevational view thereof, the opposite end being the same except for the arrangement of the straps, FIG. 15E being a front elevational view, the rear elevational view being a mirror image thereof, FIG. 15F being a top plan view of a second embodiment thereof, FIG. 15G being an end elevational view, the opposite end being identical except for the arrangement of the straps, FIG. 15H being a front elevational view, the rear elevational being a mirror image thereof, and FIG. 15I being a bottom plan view.
Figure 15B:
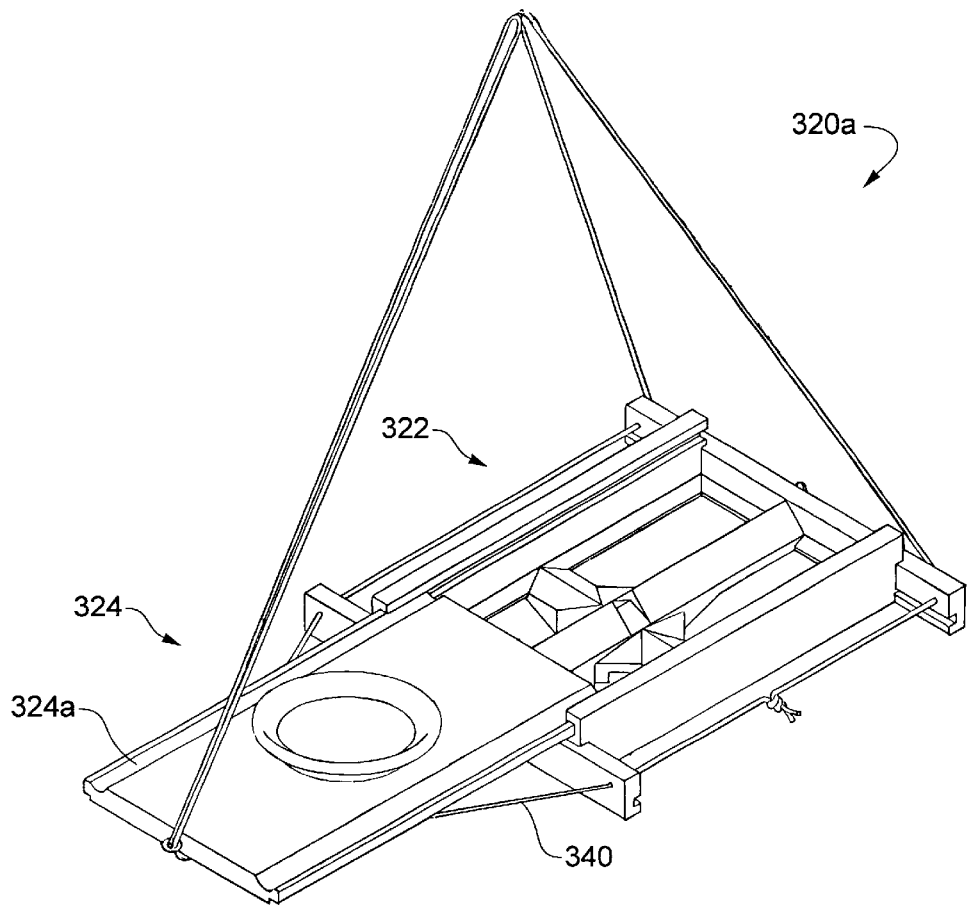
Figure 15C:
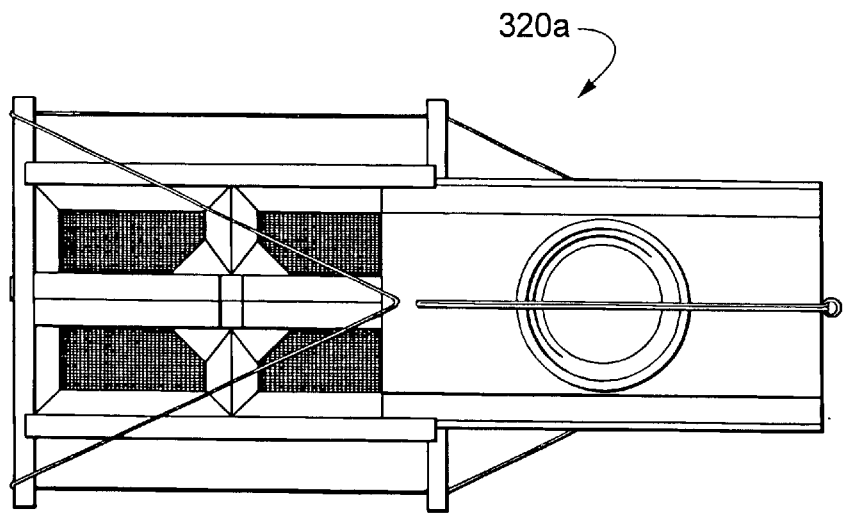
Figure 15D:
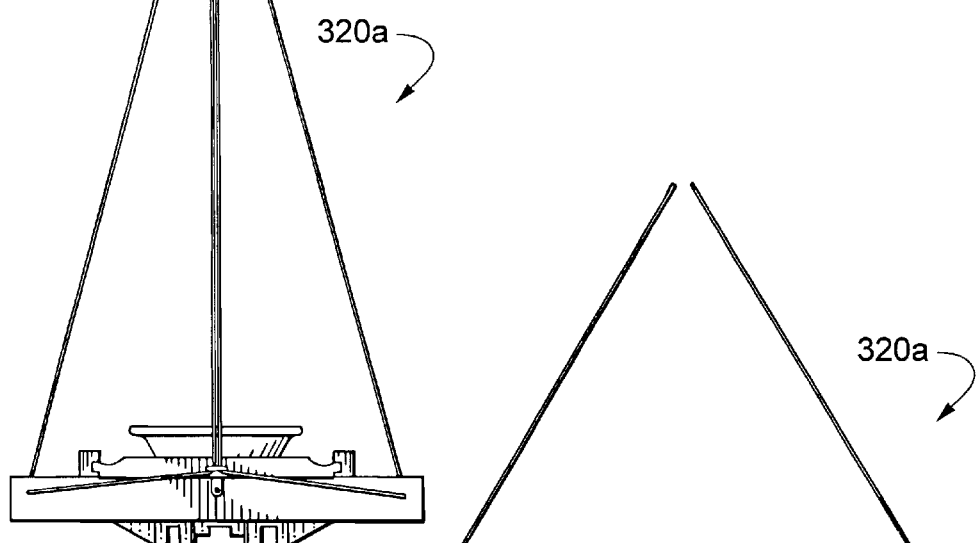
Figure 15E:
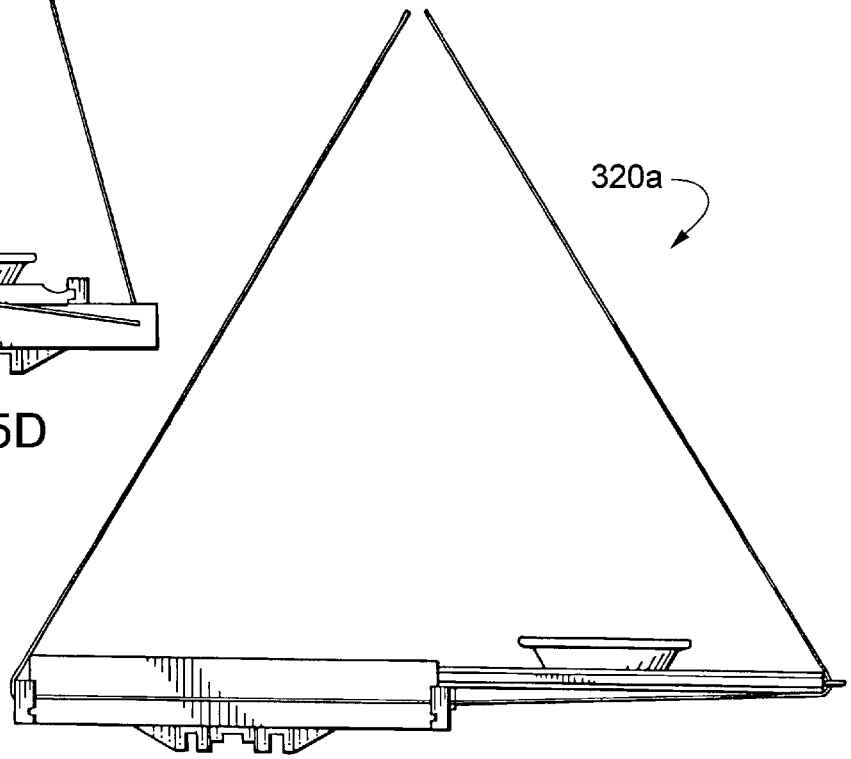
Figure 15J:
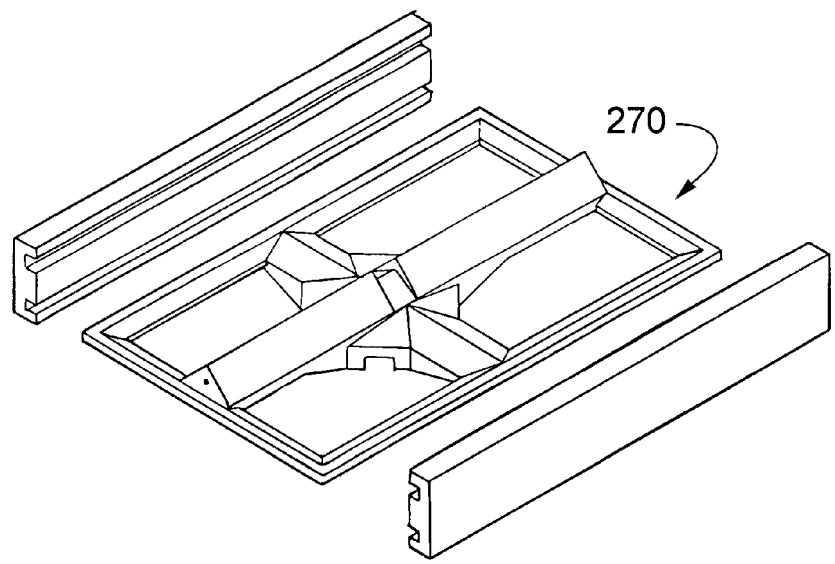
Figure 15K:
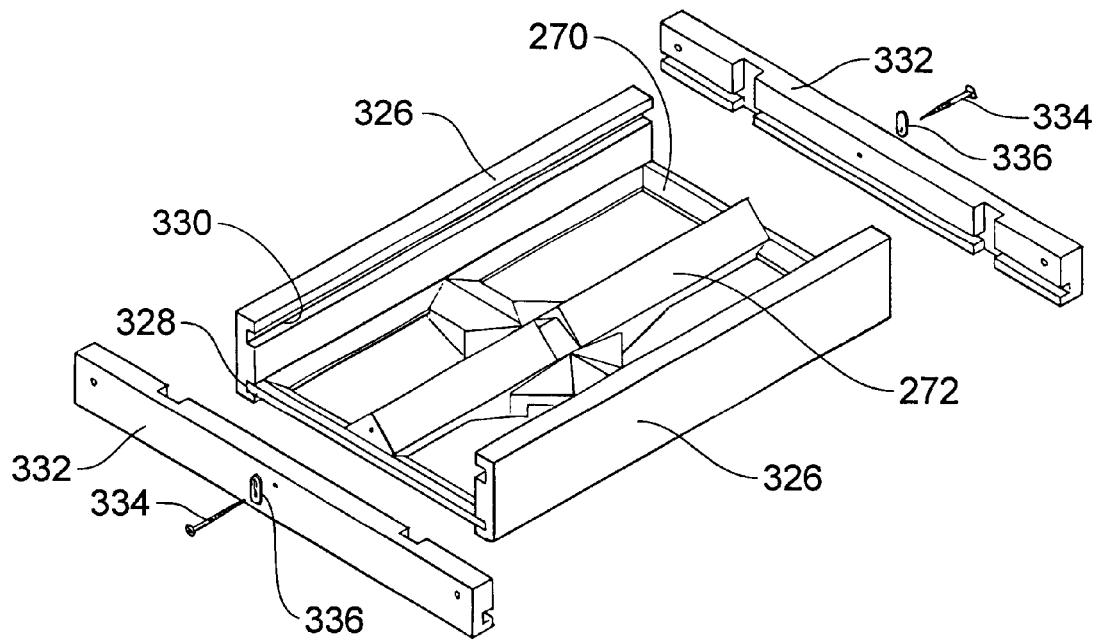
Figure 15L:
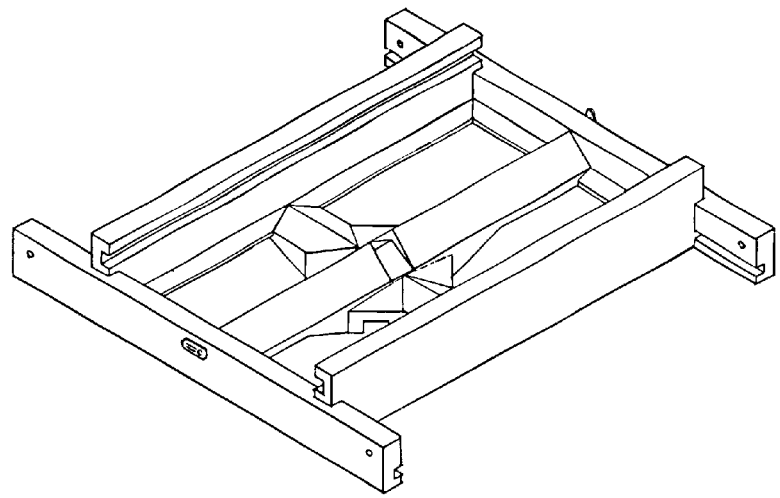
Figure 15M:
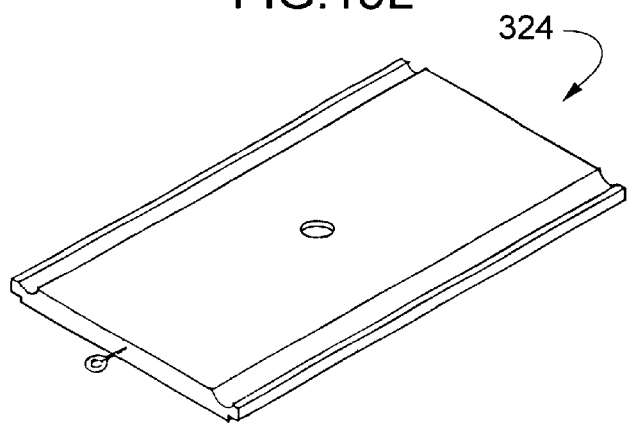
Figure 15N:
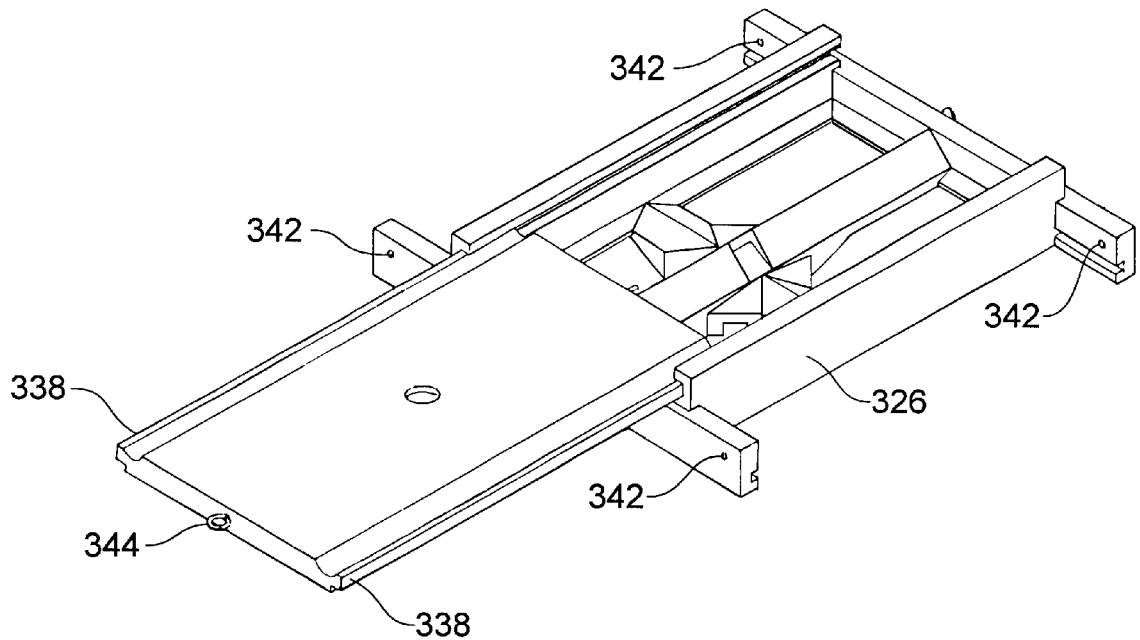

Referring now to FIGS. 15A–15N, depicted therein is a portable covered bird feeder 320 constructed in accordance with, and embodying, the principles of the present invention. This feeder 320 comprises a base portion 322 and a lid portion 324. As shown by a comparison of FIGS. 15A–15B, the lid portion 324 may be slid relative to the base portion 322 between opened and closed positions. In the open position feeding is allowed, while in the closed position birds are not able to reach feed within the feeder 320. This feeder 320 can be manufactured using the plastic bottom wall 270 described above (FIGS. 15B–15E) or with a screen as shown in FIGS. 15F–15I.

Of note are the gutter grooves 324a and 324b formed along the edges of the lid portion 324. These gutter grooves 324a,b divert water away from the seam between the lid portion 324 and the base portion 322 when the lid portion 324 is in the closed position; this helps to keep food within the base portion 322 dry.

Referring now to FIGS. 15J–15N, the process of assembling the feeder 320 having the plastic bottom wall 270 is depicted. This process is generally similar to that of forming the base portion of the single and double hopper feeders described above, and will be described herein only to the extent that it differs. Initially, the side walls 326 of the feeder 320 have two parallel grooves formed therein. The first is a lower groove 328 designed to receive a side edge of the bottom wall 270. The second is an upper groove 330 designed to receive the cover 324. This upper groove 330 extends just above and is substantially parallel to the upper edge of end walls 332 of the assembly 320. Additionally, before fasteners 334 are inserted through the end walls 332 and into the center portion 272 of the plastic bottom wall 270, latch members 336 are arranged such that the fasteners 334 hold these latch members 336 against the outer surfaces of the end walls 332. With the latches 336 in the appropriate position, the cover 324 may be displaced such that its side edges 338 are received within the upper grooves 330 in the side walls 326. These edges 338 may be milled as appropriate to provide appropriate thickness to the cover 324 yet still fit within the grooves 330.

Finally, as shown in FIGS. 15B, a strap 340 may be inserted through predrilled holes 342 in the side walls 326 and a loop 344 attached to the cover 324. This strap 340 allows the feeder 320 to be suspended from a location such as the branch assemblies described above.

Figure 16A:
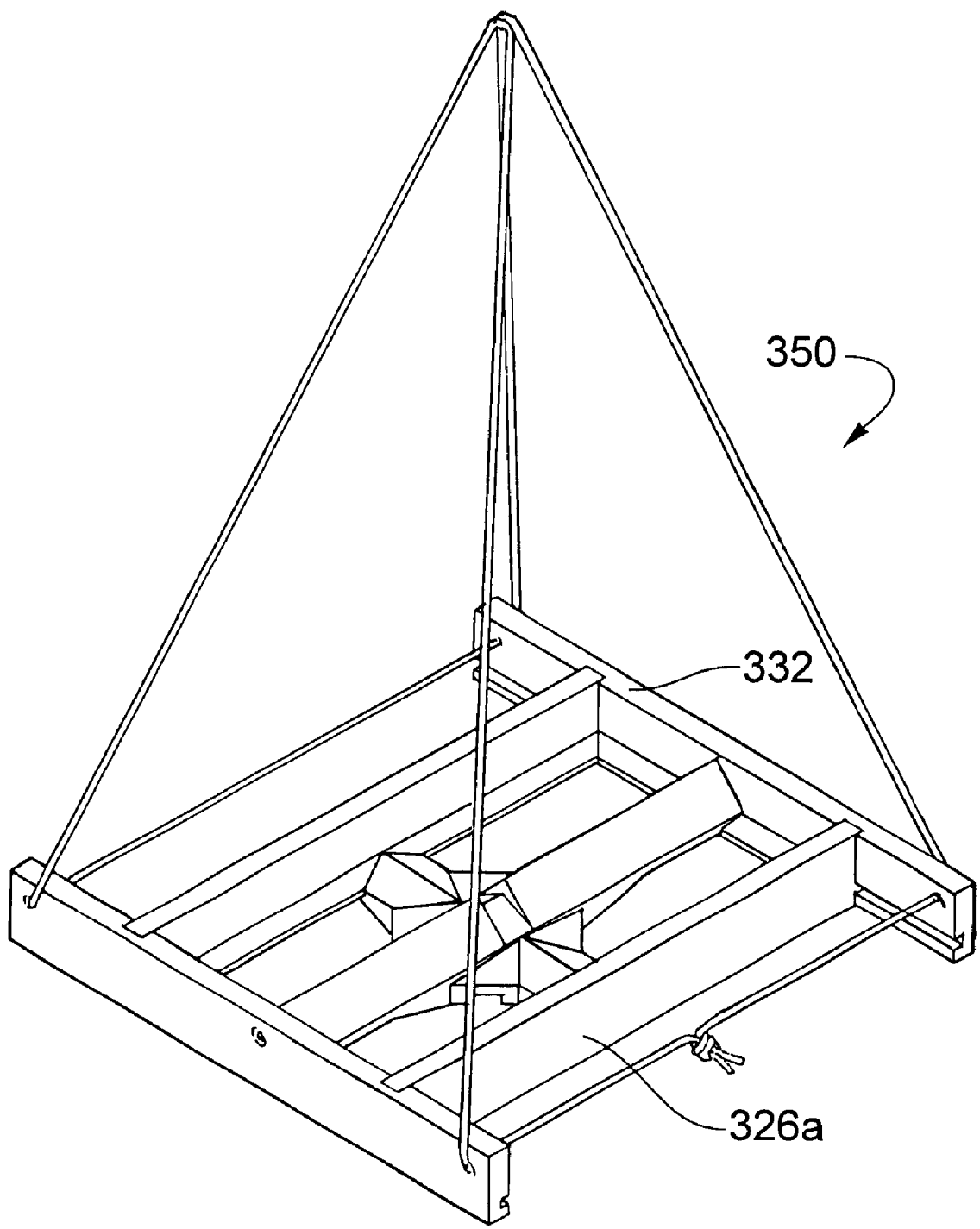
FIGS. 16A–16D depict an uncovered feeder constructed in accordance with, and embodying, the principles of the present invention.
Figure 16B:
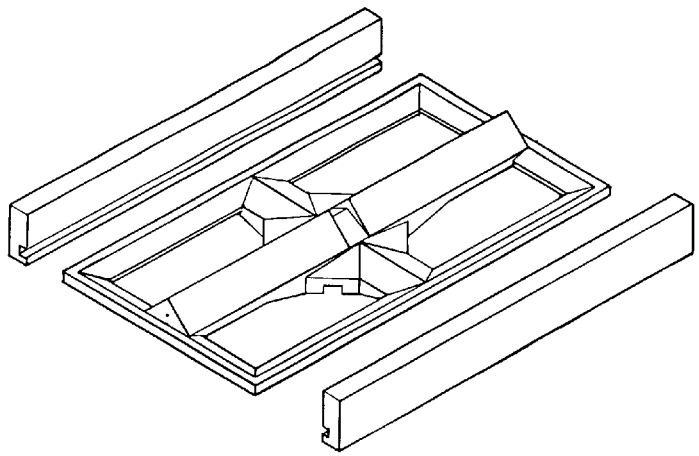
Figure 16C:
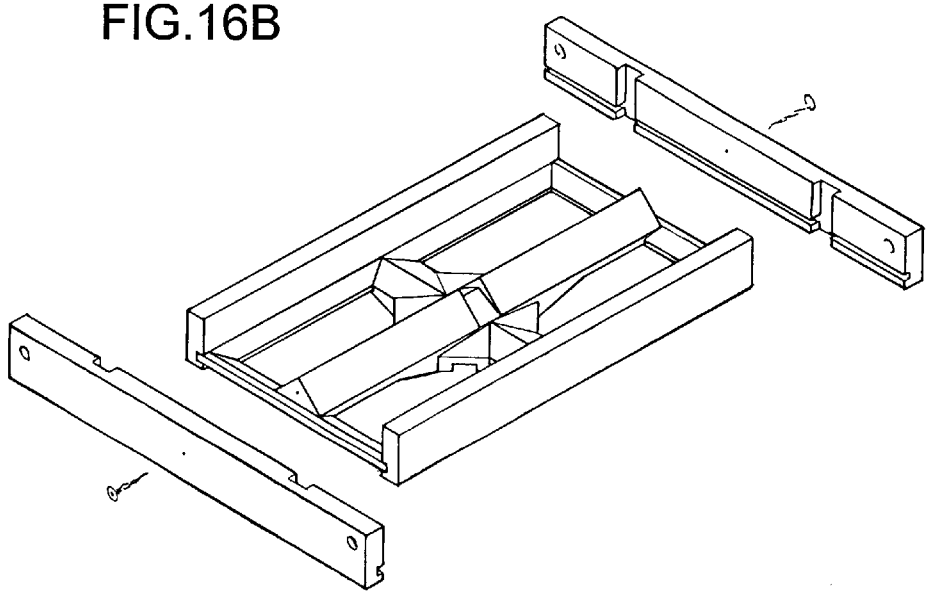
Figure 16D:
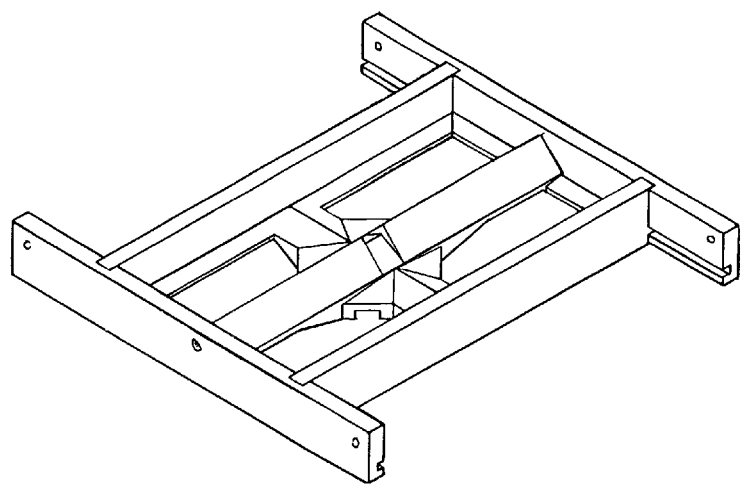

Referring now to FIGS. 16A–16B, depicted therein is an uncovered feeder similar in most respects to the covered feeder 320 described above. The only difference between these two feeders is that the side walls 326 do not have an upper groove, are cut flush to the upper surface of the end walls 332, and the cover 324 is not provided.

Figure 17A:
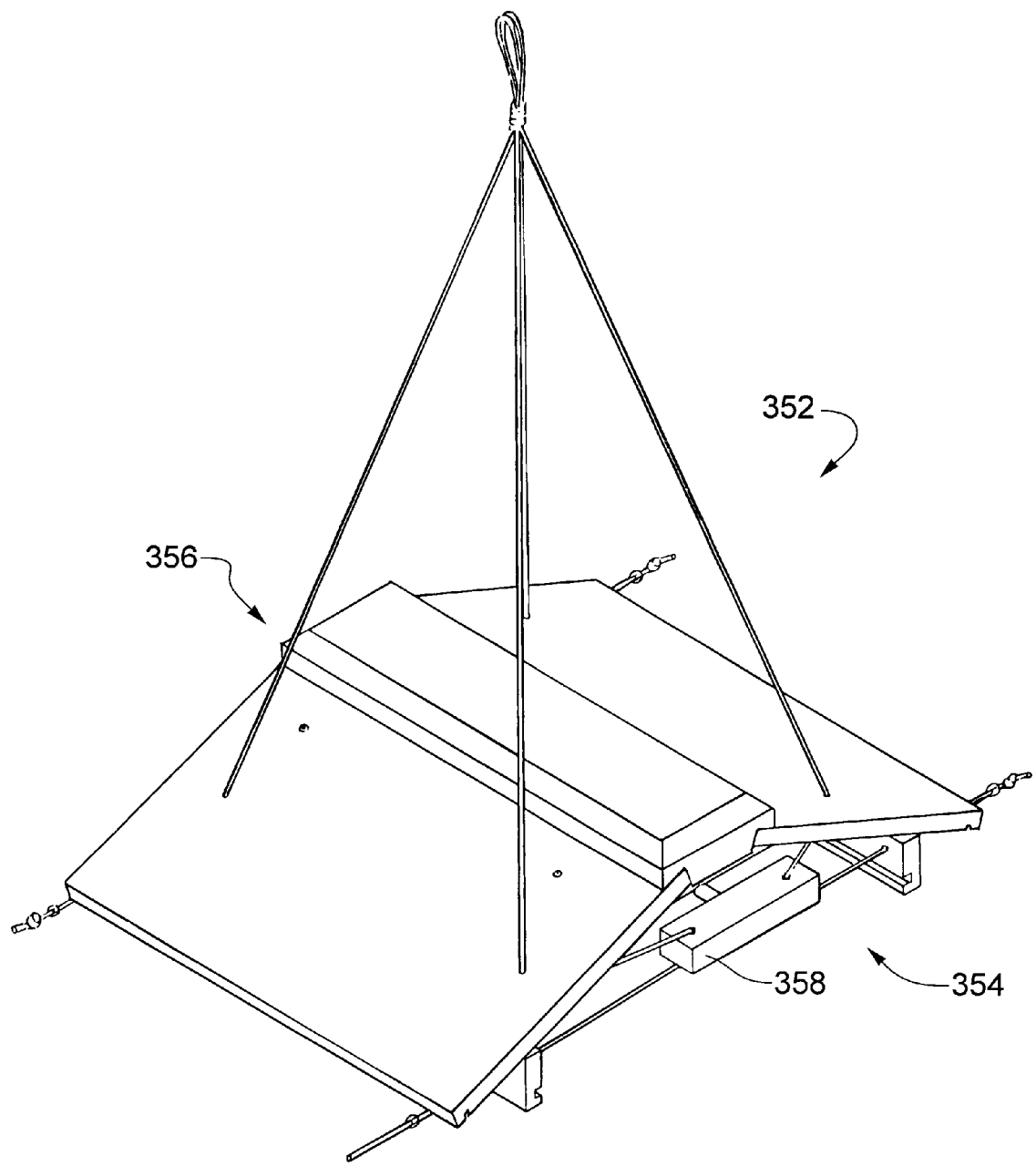
FIG. 17A–17I depict a covered feeder of the present invention, with FIGS. 17A,B being perspective views thereof, FIG. 17C being a top plan view thereof, FIG. 17D being an end elevational view thereof, the opposite end being identical, FIG. 17E being a front elevational view thereof, the rear elevational view being identical, and FIG. 17F being a bottom plan view thereof.
Figure 17B:
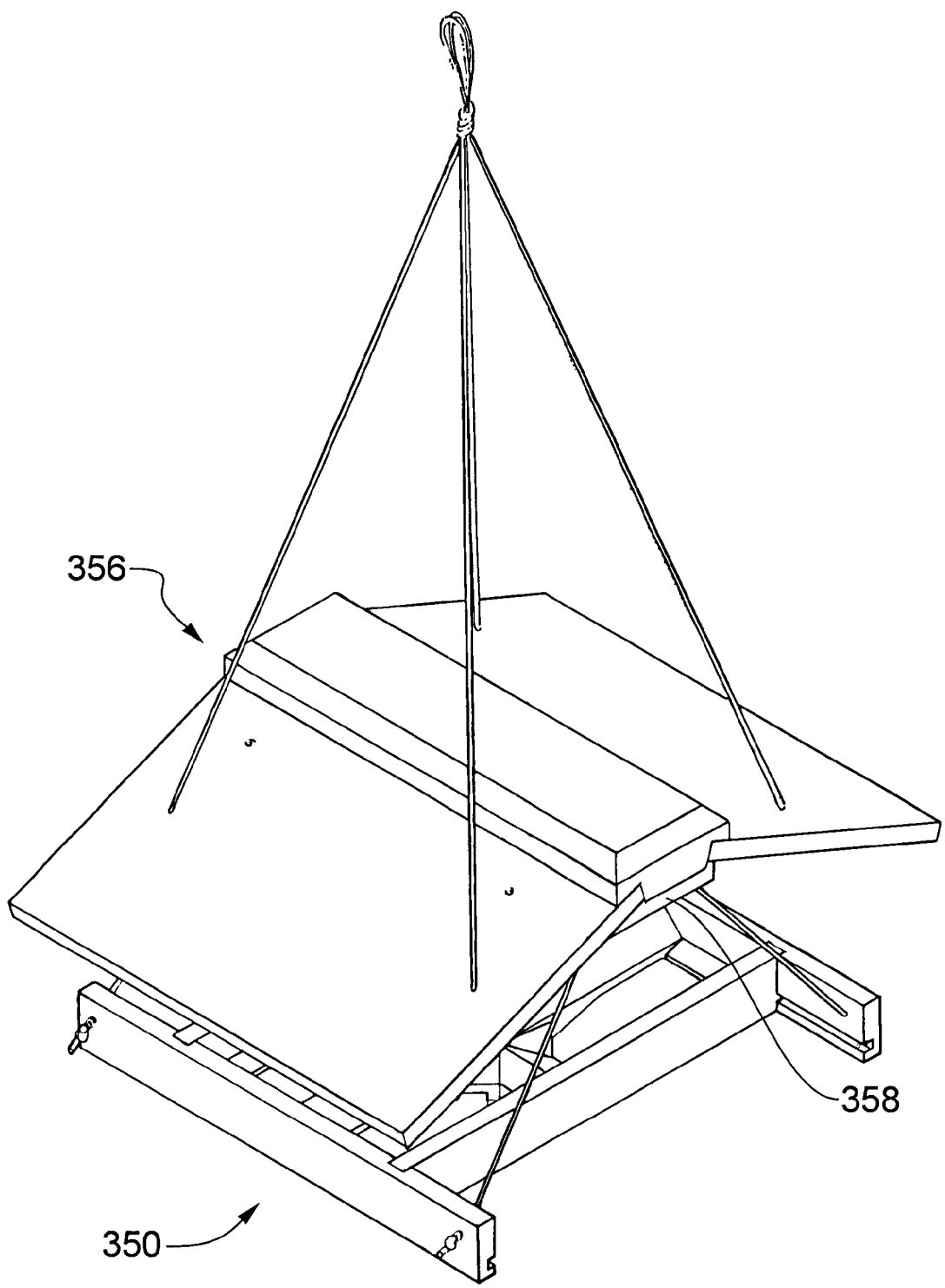
Figure 17C:
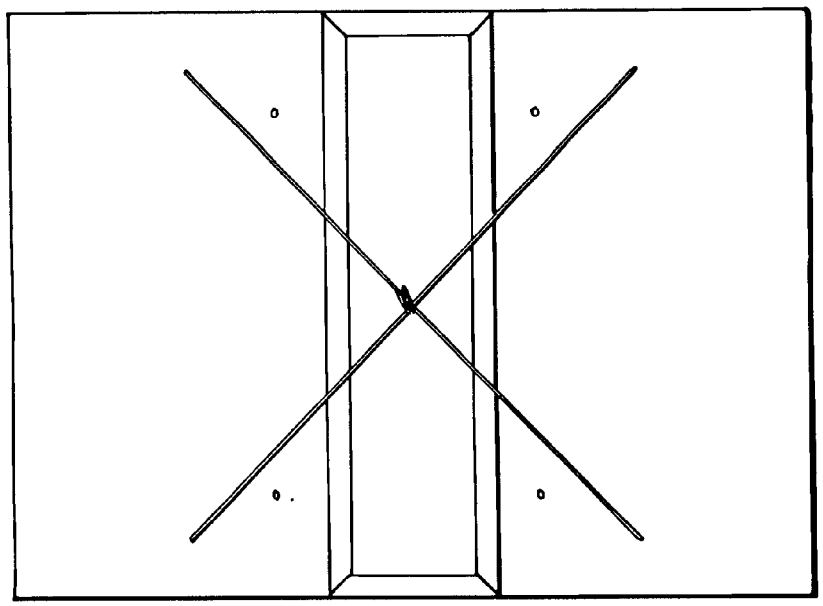

FIG. 17A depicts a modification to the uncovered feeder depicted in FIG. 16. As shown in FIG. 17A–17B, the feeder 350 shown in FIG. 16A has been modified to include a roof portion 354. The roof portion 354 comprises a roof assembly 356 and end blocks 358.

The strap 340 described above is passed through holes in the roof assembly 356 and end blocks 358 such that a distance between the roof assembly 356 and the uncovered feeder 350 may be varied to effectively prevent birds from feeding when the roof is in a closed position (FIG. 17A) and allows birds to feed with the roof is in an open position (FIG. 17B). The roof assembly 356 may also be placed in an intermediate position to allow only smaller birds to feed to prevent larger birds from dominating the feeder.

The roof assembly 356 may be dropped into the closed position by simply lifting the feeder base 350 slightly. This reduces tension on the end blocks 358, which in turn causes the roof assembly 356 to drop into the closed position. The roof assembly 356 is raised simply by grasping the roof assembly 356 and lifting it into its desired position. Releasing the roof assembly 356 when it is in its desired position places tension on the end blocks 358, which locks the roof assembly 356 into the desired position.

Figure 17F:
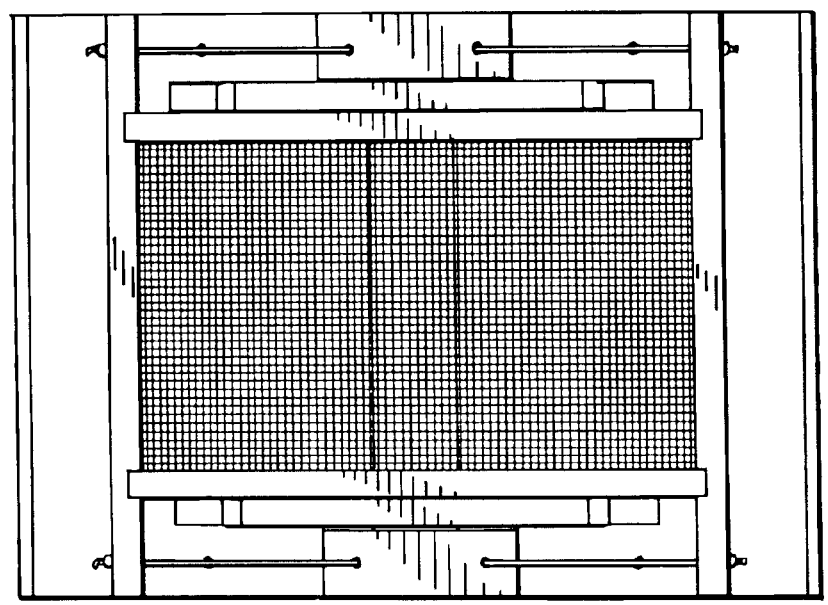
Figure 17E:
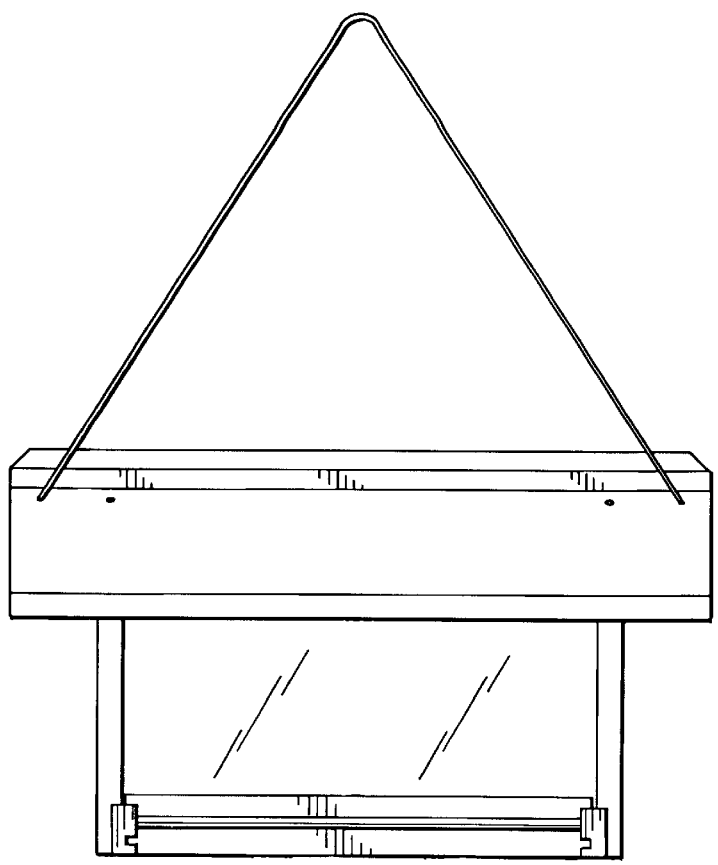
Figure 17D:
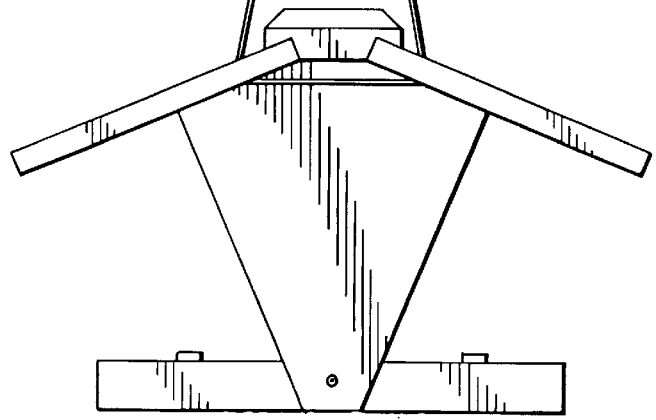
Figure 17G:
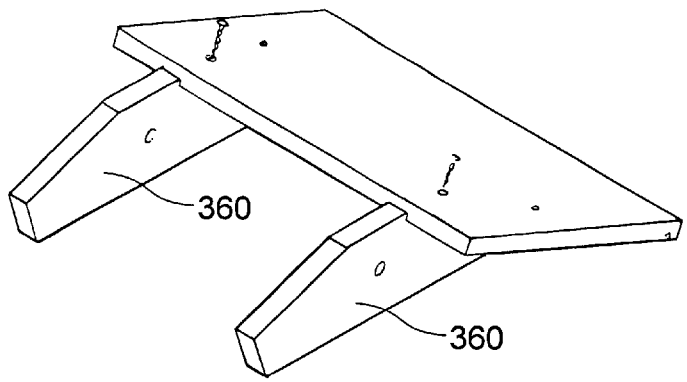
Figure 17H:
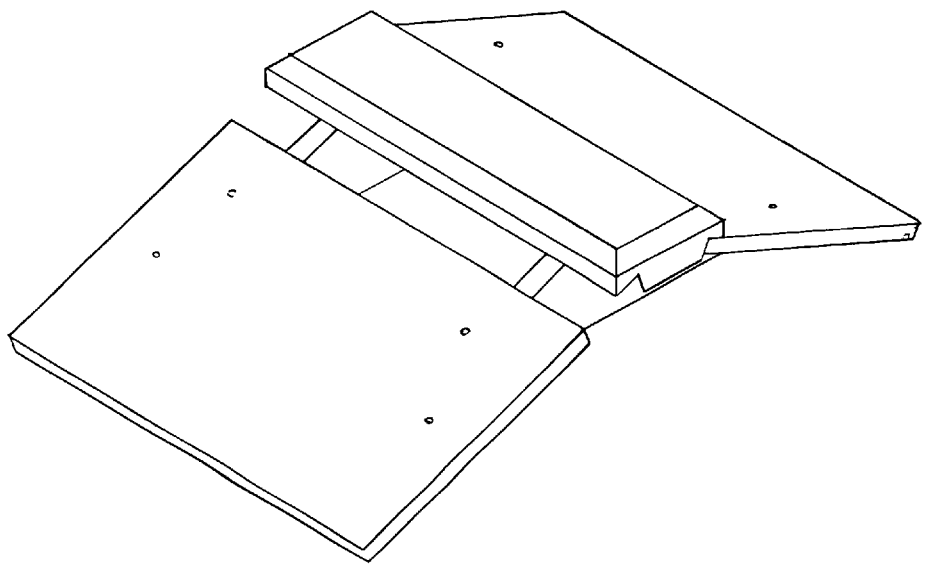
Figure 17I:
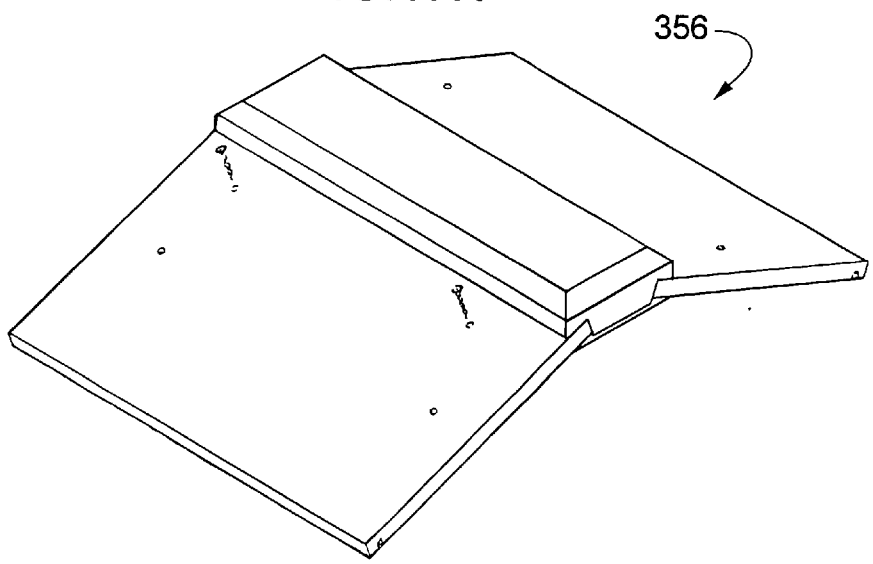

The construction of the roof assembly is shown in FIG. 17F–17H. the roof assembly 356 is similar to that employed by the single and double hopper feeders 320 and 322 described above, and will be described herein only to the extent that they differ from the earlier described roof assemblies.

In particular, rather than attaching side roof members to hopper end walls, the side roof members are attached to short alignment walls 360.

Figure 18A:
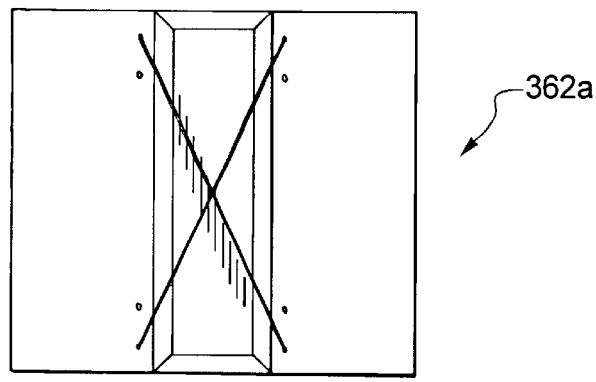
FIGS. 18A–18O depict two variations of a bird enclosure constructed in accordance with the present invention, with FIGS. 18A–18D being a top plan, side elevational, front elevational, and bottom elevational views of the first enclosure and FIGS. 18E–18H being top plan, side elevational, front elevational, and bottom plan views of the second enclosure.
Figures 18B, 18C:
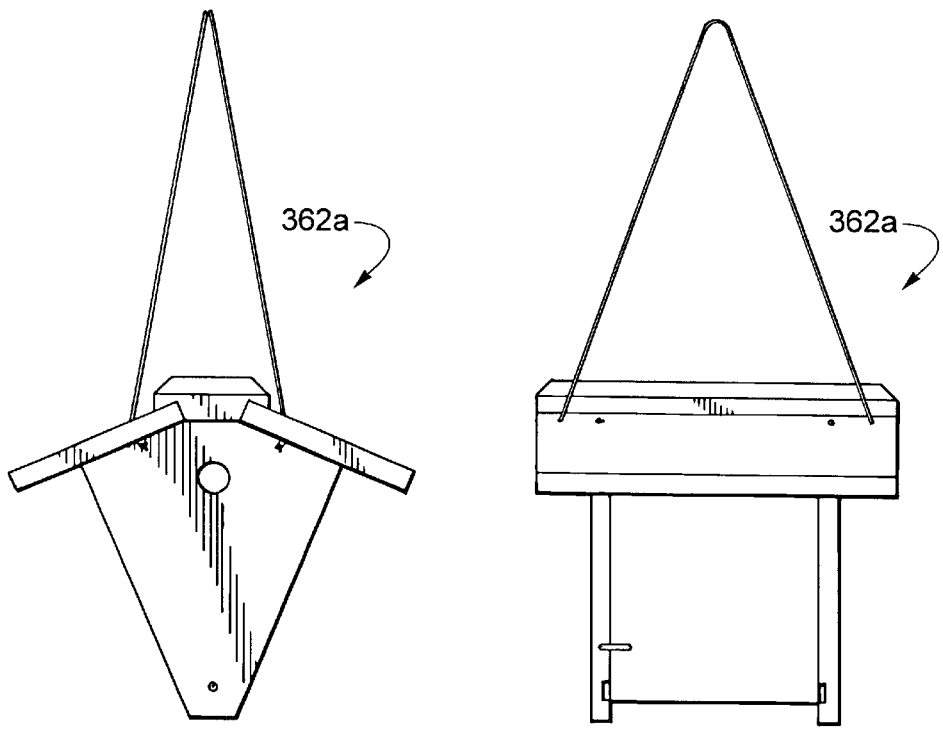
Figure 18D:
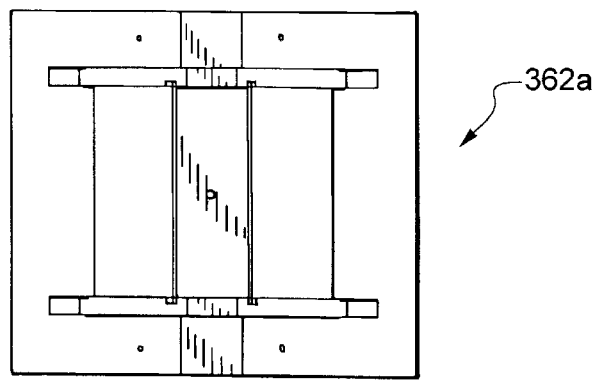
Figure 18E:
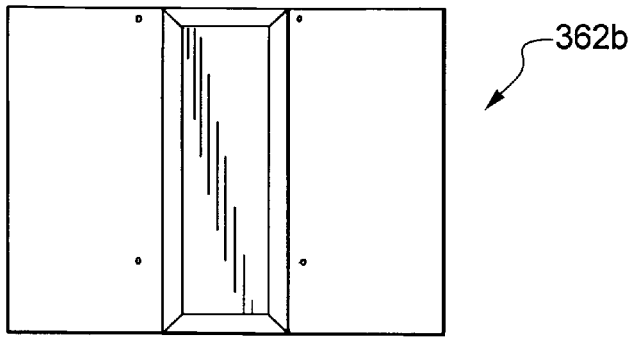
Figure 18F:
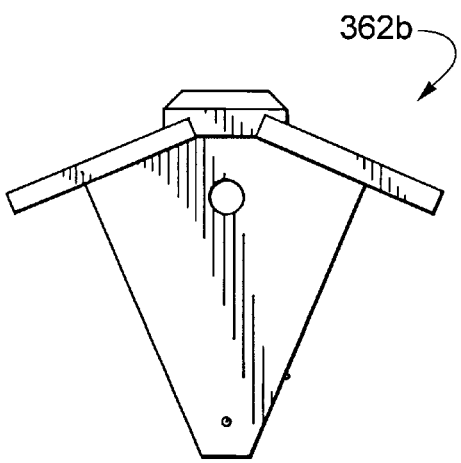
Figure 18G:
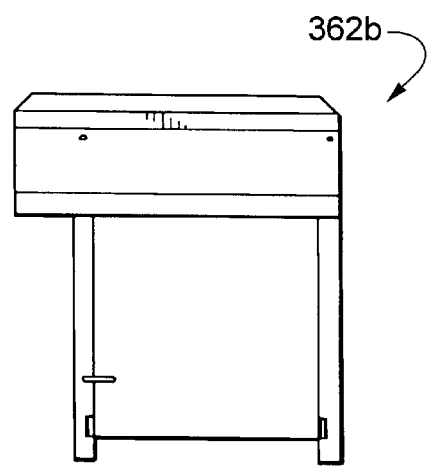
Figure 18H:
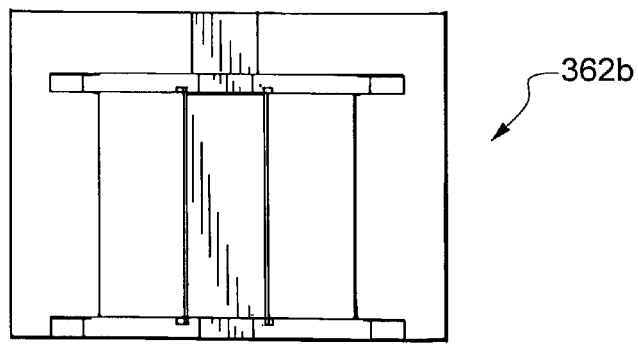
Figure 18I:
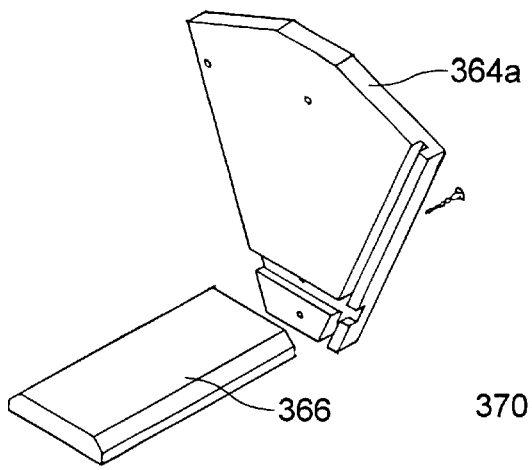
Figure 18J:
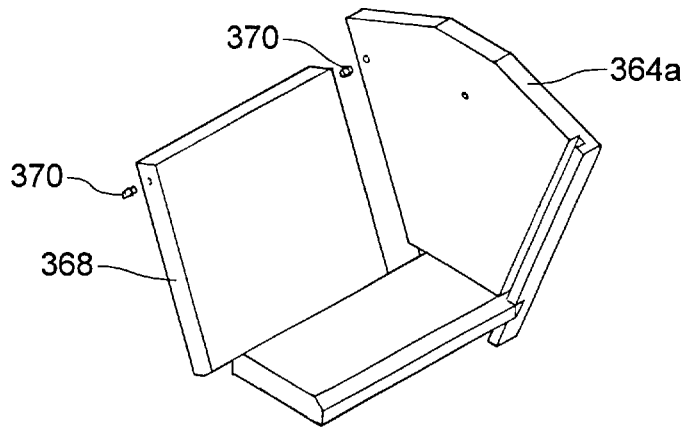
Figure 18K:
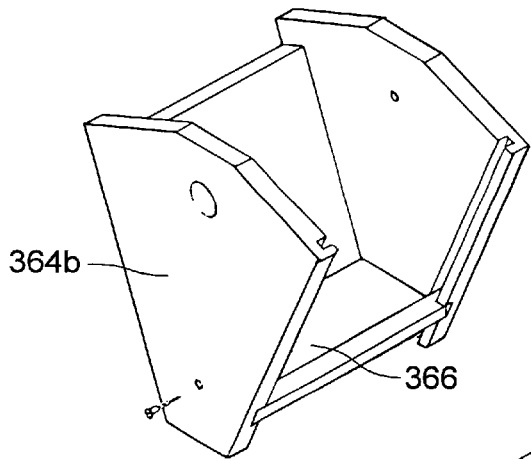
Figure 18L:
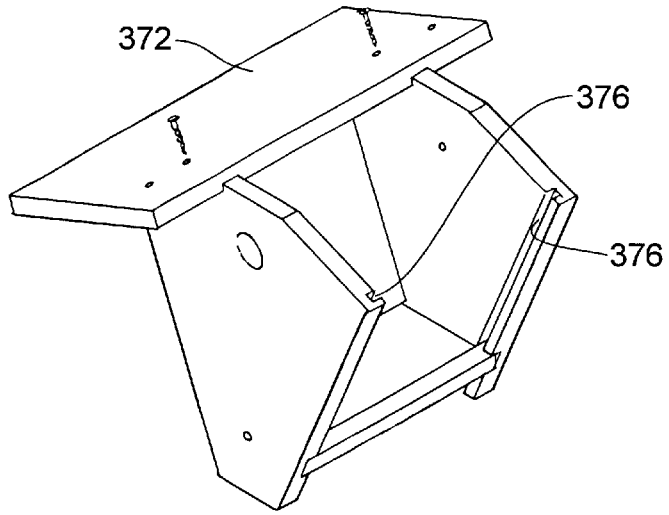
Figure 18M:
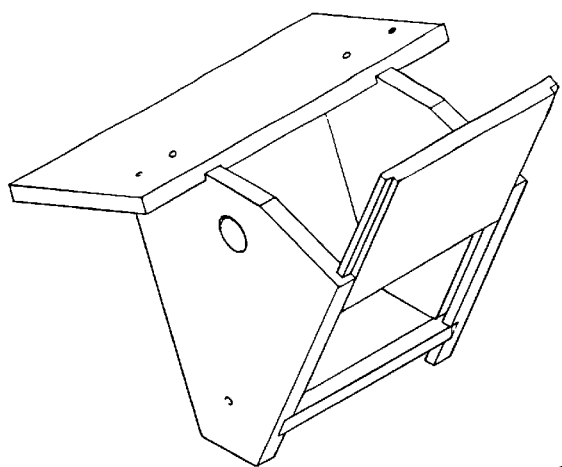
Figure 18N:
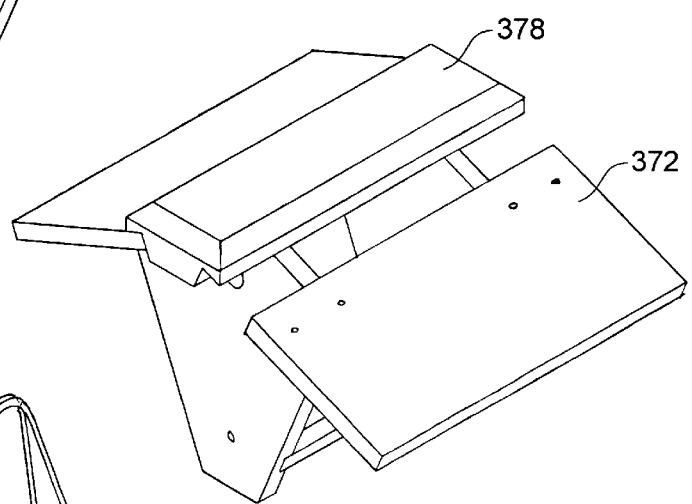
Figure 18O:
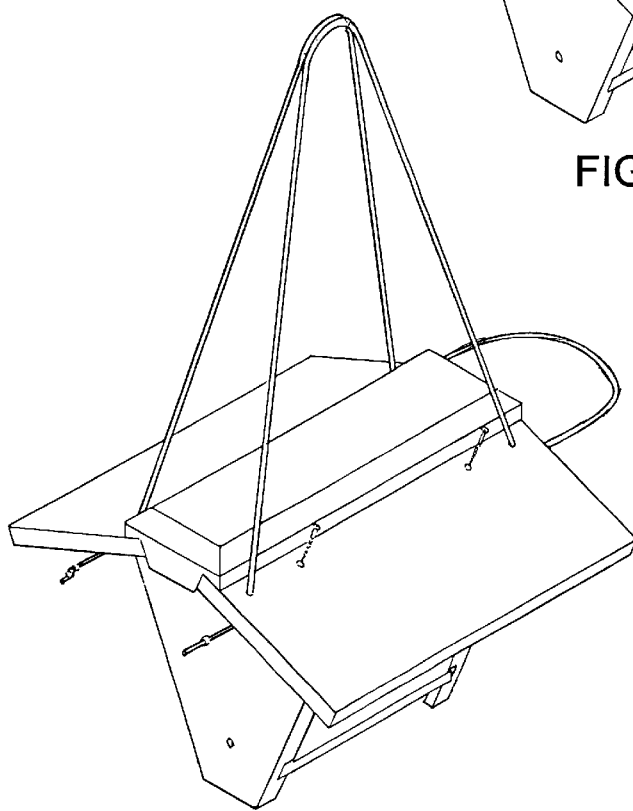

Referring now to FIGS. 18A–18O, depicted therein are two variations on a bird enclosure constructed in accordance with, and embodying the principles of the present invention. A first variation 362a of a bird enclosure is depicted in FIGS. 18A–18D, while the second variation 362b is depicted in FIGS. 18E–18H. The only difference between these two variations is that the roof assembly of the second variation shown in FIGS. 18E–18H is slightly shorter, allowing this assembly to be mounted against a vertical flat surface rather than hung from or mounted on the top of a post portion 26. Again, these roof sections have grooves on the undersides thereof to receive the upper edges of the end walls. This strengthens the resulting assembly and simplifies the assembly process.

The process of assembling these is depicted in FIGS. 18I–18O. As shown in FIGS.18I–18K, housing end walls 364 are attached to a housing bottom wall 366 by fasteners extending through these walls 364a, 364b and into the bottom wall 366. Additionally, a door 368 is attached at its upper end by hinge members 370 to the end walls 364a, 364b while these walls are being attached to the bottom wall 366. A first roof side portion 370 is then attached to the end walls 364a, 364b above the door 368. A back end wall 374 is then inserted into grooves 376 formed in the end walls 364a, 364b. The other roof side member 372 is then attached using a roof cap 378 as a guide.

Referring now to FIGS. 19A–J, depicted therein is a tail prop suet cake feeder constructed in accordance with, and embodying, the principles of the present invention. This tail prop suet cake feeder 380 is similar in many respects to the enclosure 362 described above. The primary differences between these two accessories is that the feeder 380 does not include a door or fixed side wall, has a tail rest 382 extending downwardly therefrom, and has a mesh pocket 384 downwardly extending from its roof assembly into which feed may be placed.

Figure 19J:
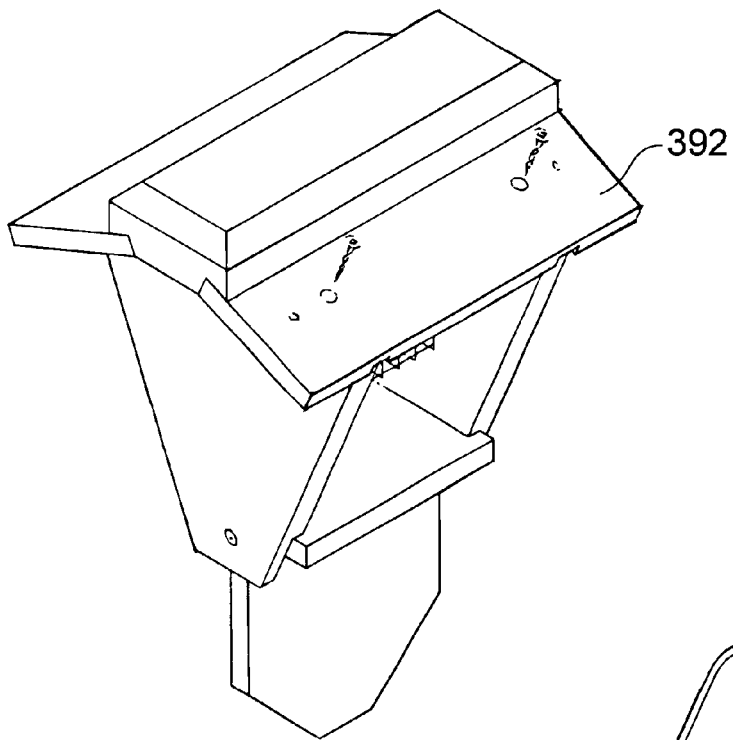
FIGS. 19A–19J depict a tail prop suet cake feeder of the present invention, with FIG. 19A being a perspective view, FIG. 19B being a top plan view, FIG. 19C being an end elevational view, the opposite end elevational view being identical, FIG. 19D being a front elevational view, the rear elevational view being identical, and FIG. 19E being a bottom plan view thereof
Figure 19A:
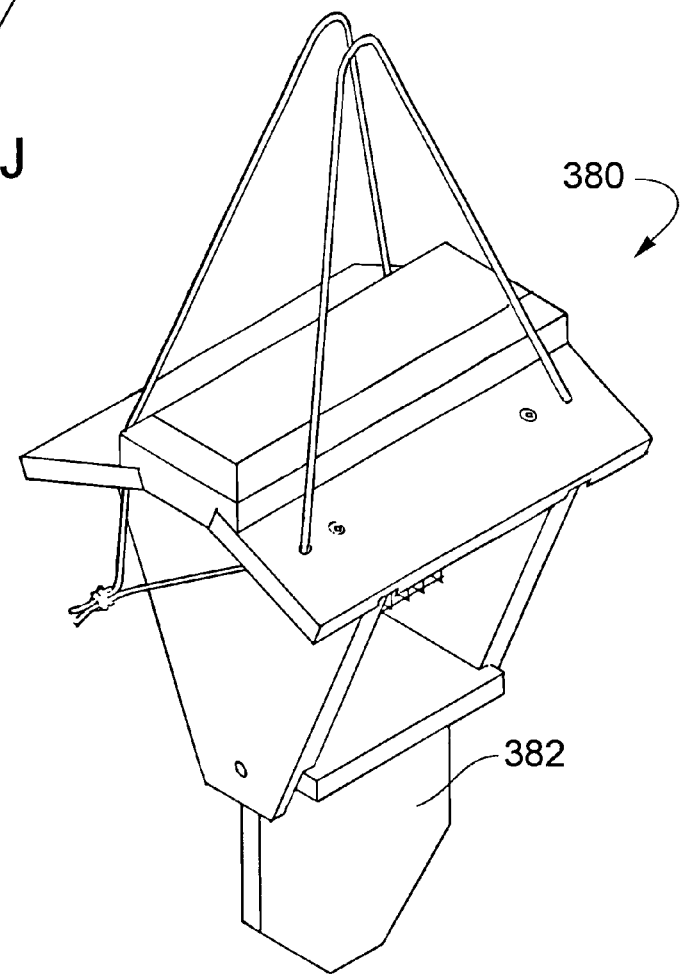
Figure 19B:
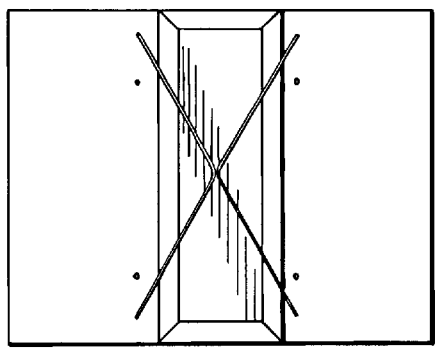
Figure 19E:
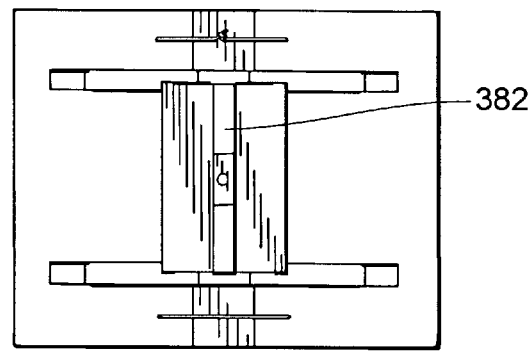
Figure 19C:
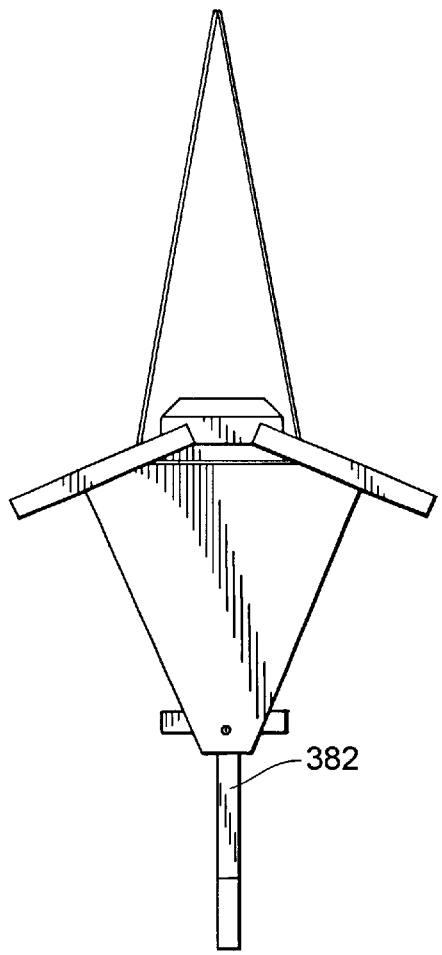
Figure 19D:
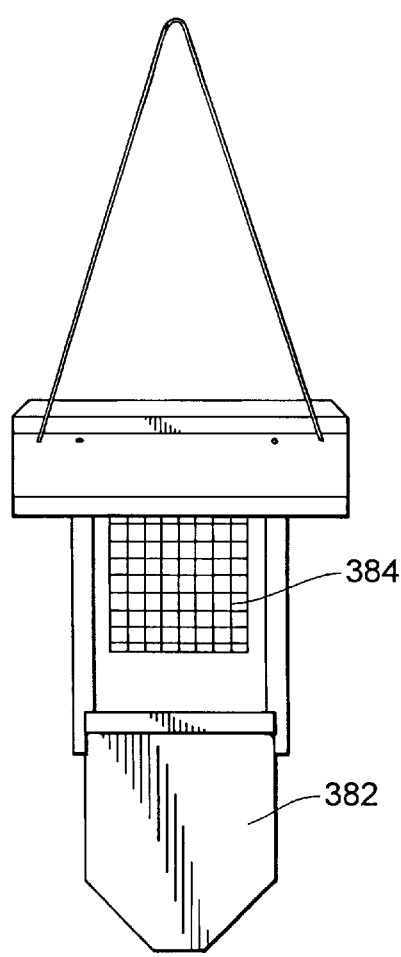
Figure 19F:
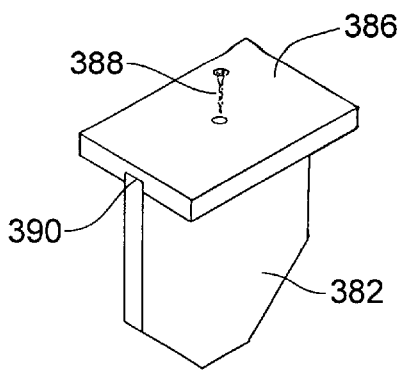
Figure 19G:
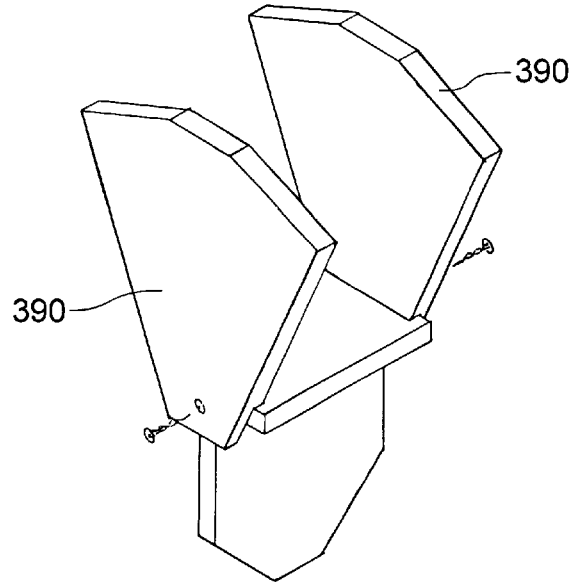
Figure 19H:
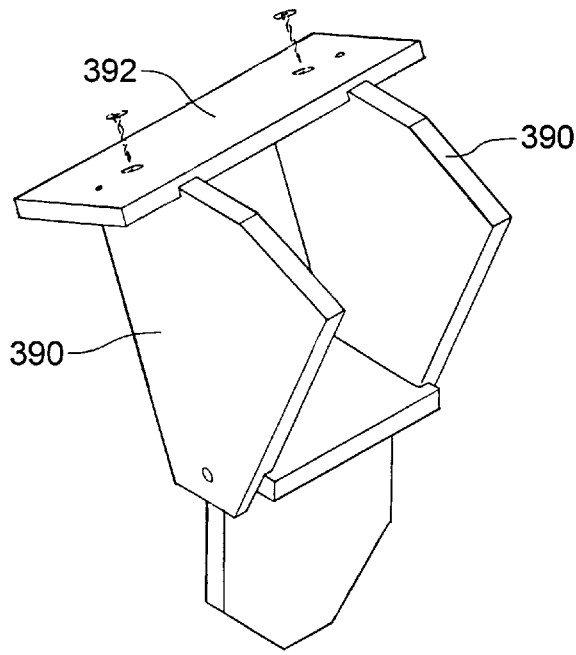
Figure 19I:
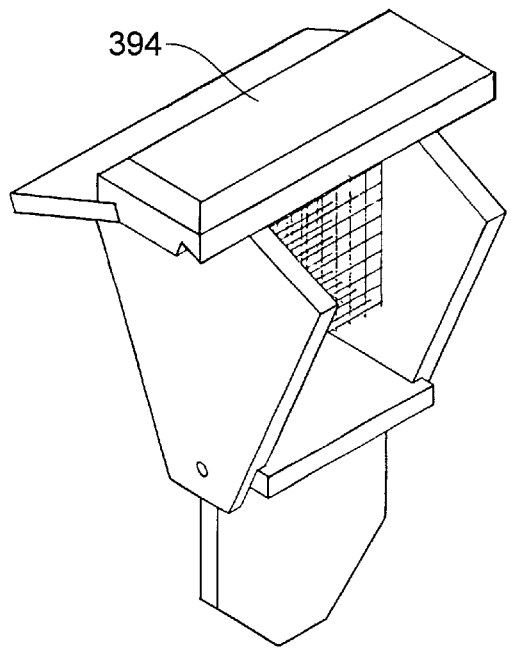

More specifically, as shown in FIG. 19F, the tail prop member 382 is attached to a bottom wall 386. This attachment is by a fastener 388, and the tail perch 382 is received in a groove 390 formed on the underside of the bottom wall 386. Side walls 390 and roof side member 392 and 394 are then attached (FIG. 19J).

The mesh 384 is attached to the underside of the roof cap 394 such that it forms a pocket under the roof cap 394 between the end walls 390, with the openings in the pocket 384 facing these end walls 390. Suet or other bird feed may be placed into the mesh pocket 384 to allow birds to feed while perched on the feeder 380. The mesh grid dimensions control the amount of feed that can be removed at any one time. Large birds and animals such as squirrels or the like thus cannot carry off the entire suet cake.

Figure 20A:
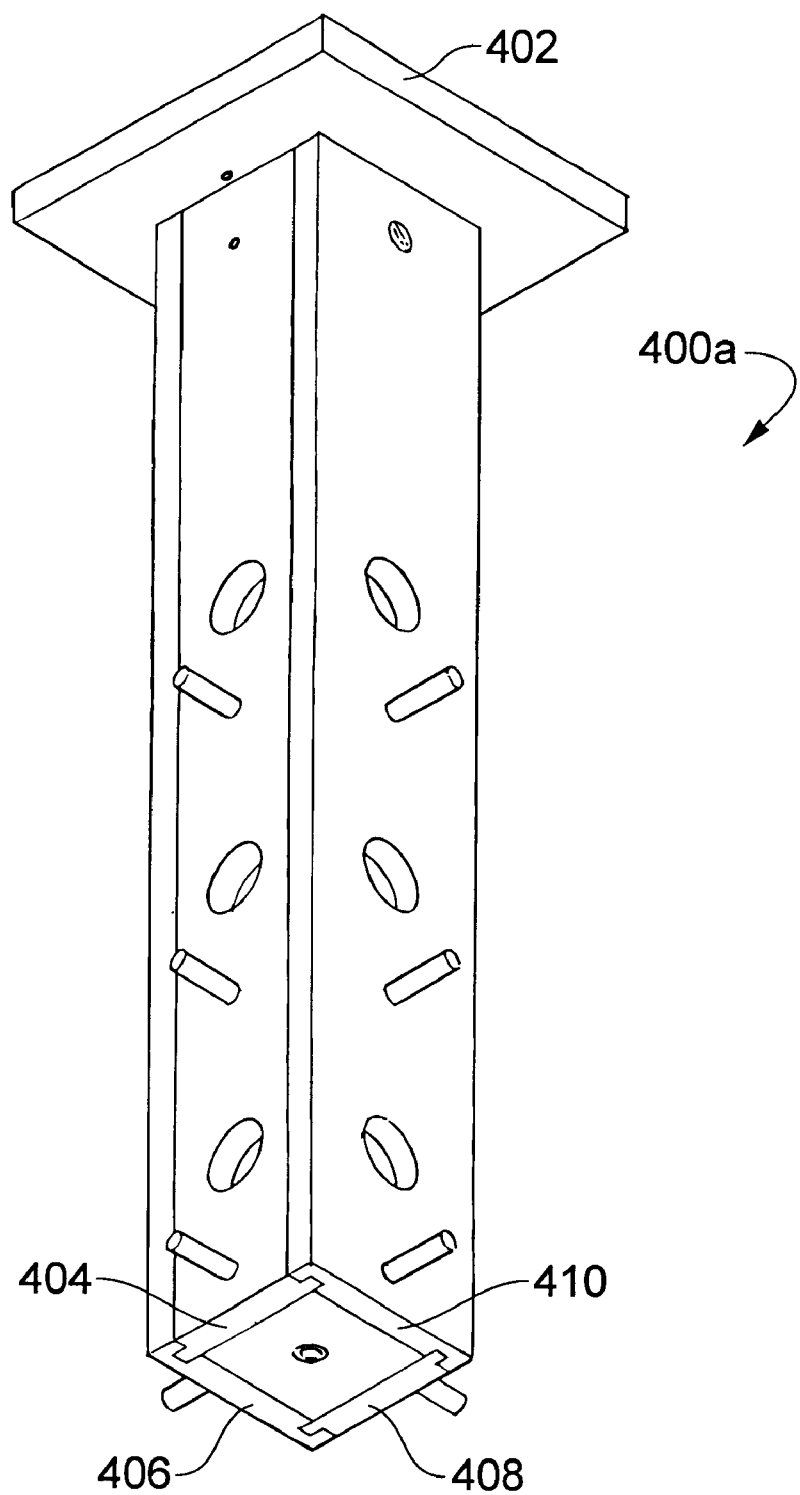
FIGS. 20A–20M depict two silo-type feeders, with each feeder having a different number of openings formed therein, with FIG. 20A being a bottom perspective view thereof, FIG. 20B being a top plan view thereof, FIG. 20C being a front elevation view thereof, the rear elevational view being identical, FIG. 20D being a side elevational view thereof, the opposite side view being identical, and FIG. 20E being a bottom plan view hereof, with FIGS. 20F–20J being corresponding views for the two-opening feeder.
Figure 20E:
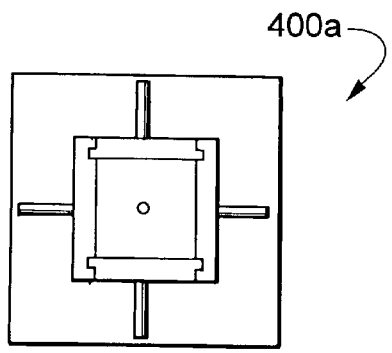
Figure 20B:
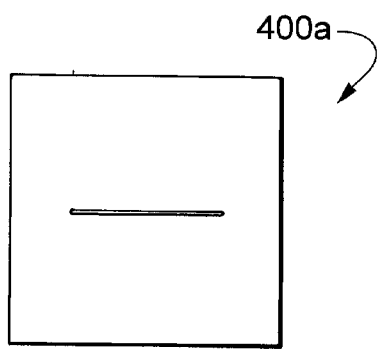
Figure 20C:
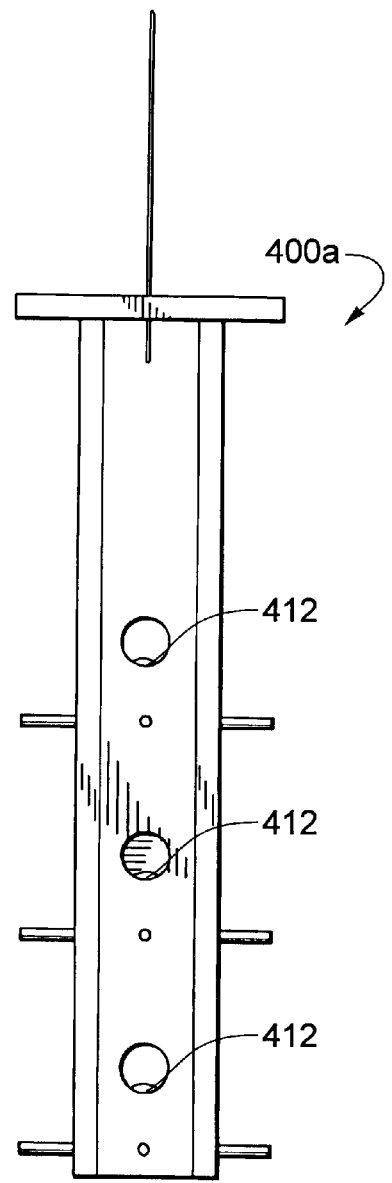
Figure 20D:
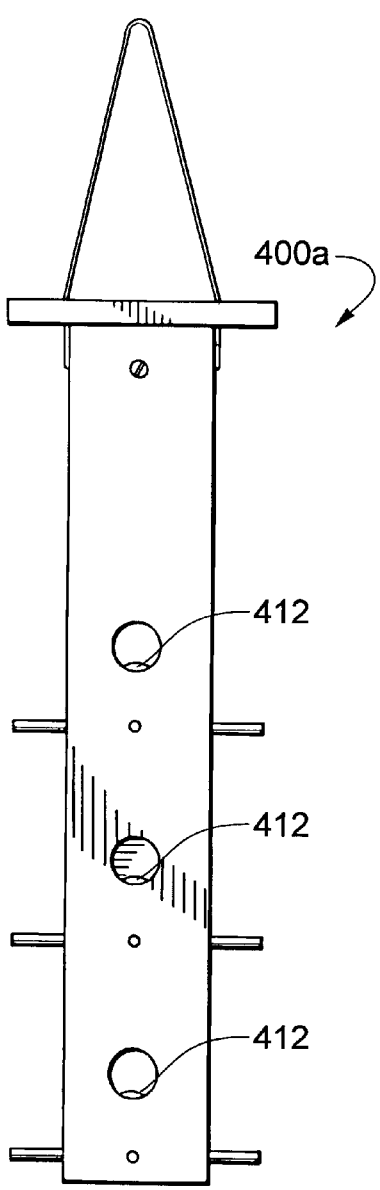
Figure 20I:
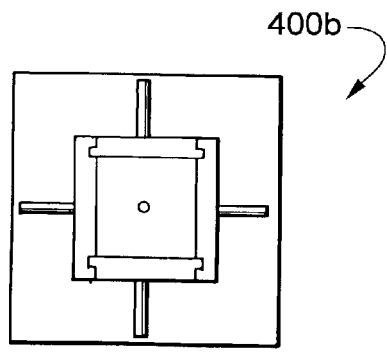
Figure 20F:
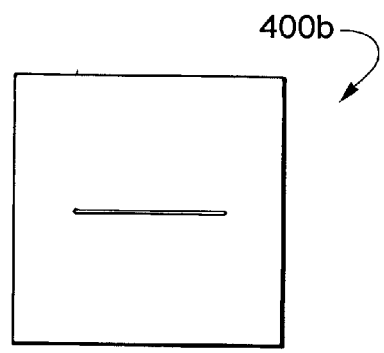
Figures 20G, 20H:
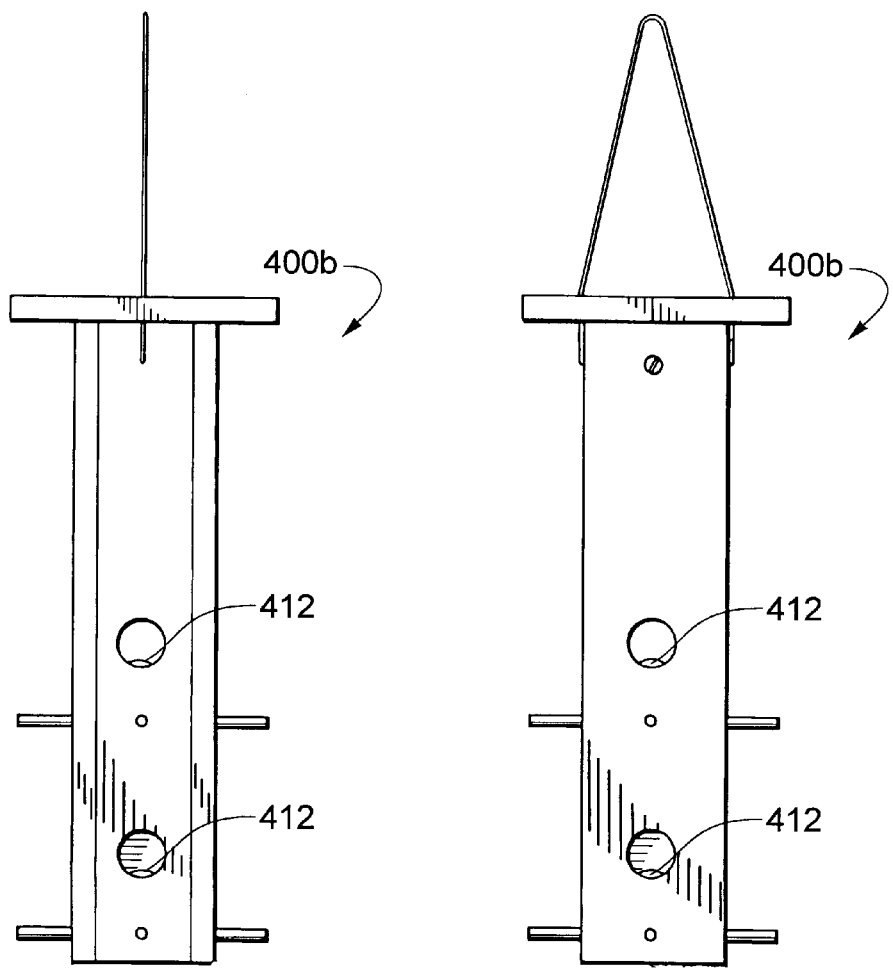

Referring now to FIG. 20A, depicted therein is a silo feeder 400 constructed in accordance with, and embodying, the principles of the present invention. This feeder 400 comprises a roof member 402 and first, second, third, and fourth side walls 404–410. As perhaps best shown in FIGS. 20C–20D offset holes are spaced along the side walls 404–410 to form a plurality of narrow feed openings 412.

FIGS. 20A–20E show a silo-type feeder 400 having three feed openings on each side wall, while FIGS. 20F–20I show a silo feeder having two feed openings 412. These feeders are in all other respects identical.

Figure 20J:
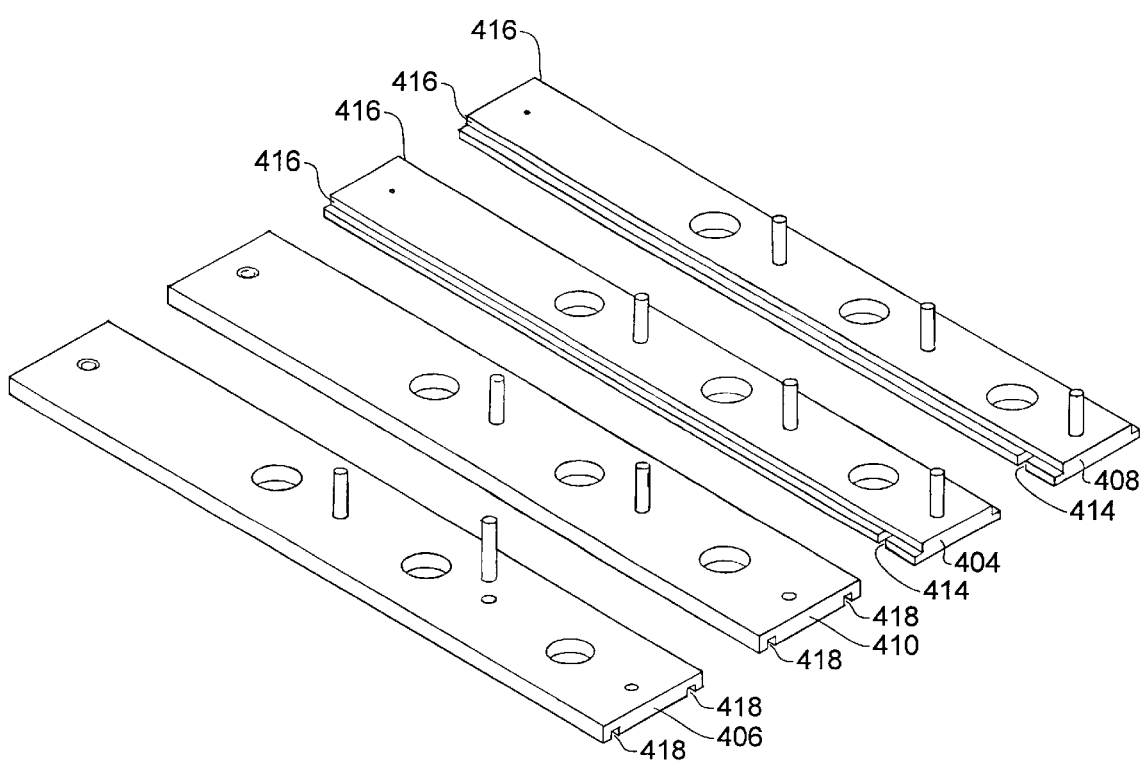
Figure 20K:
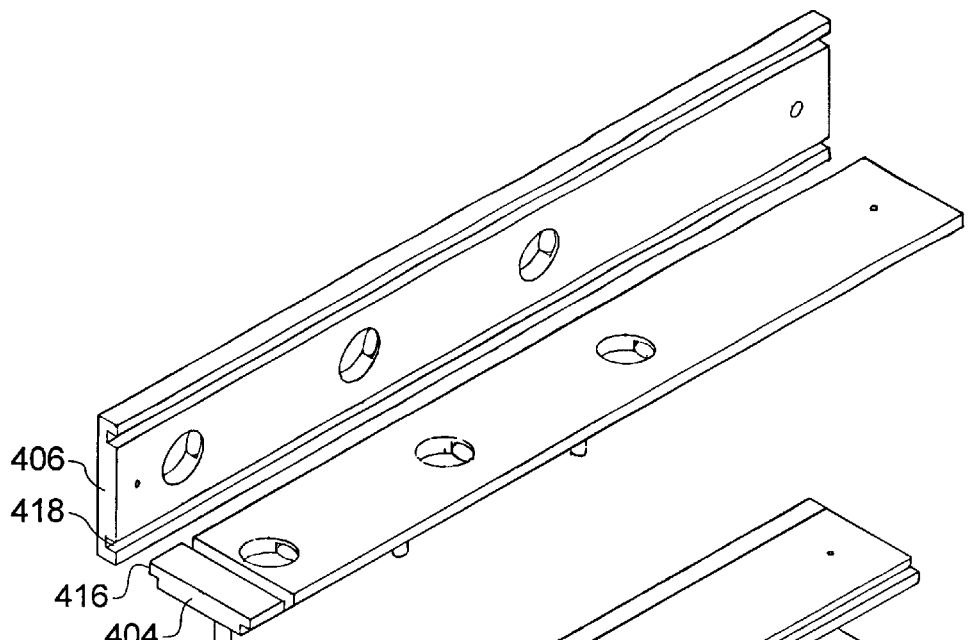
Figure 20L:
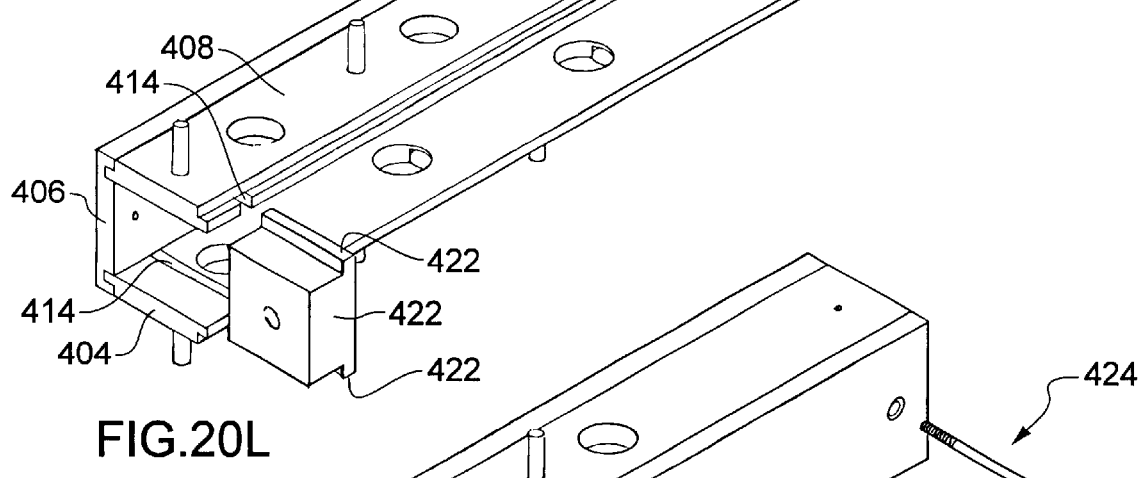
Figure 20M:
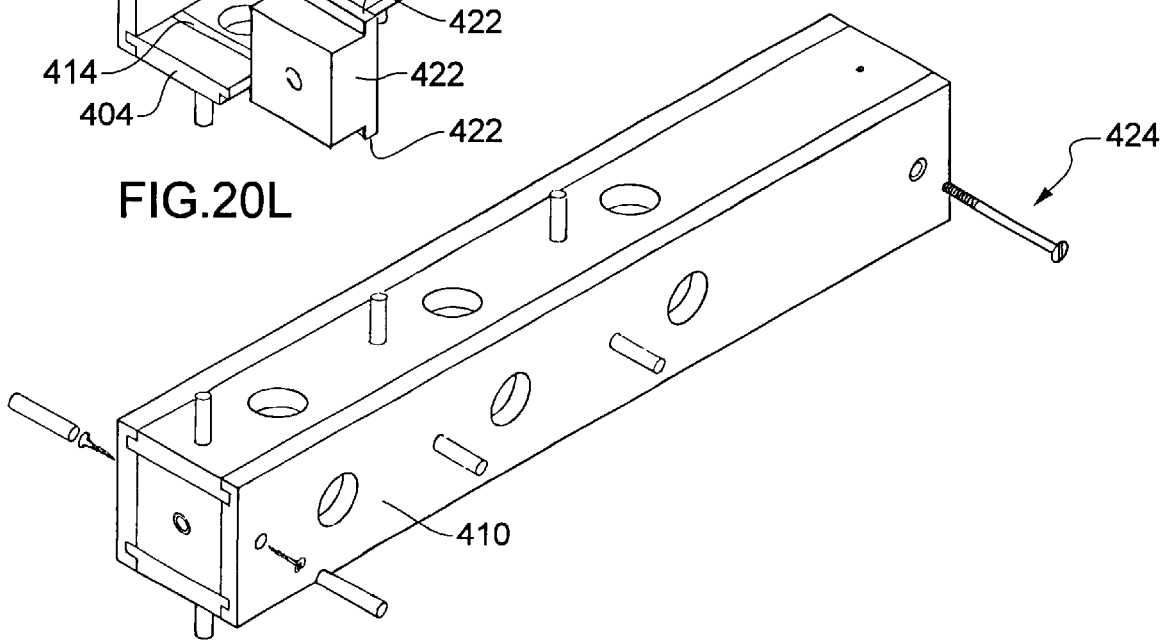

Referring now to FIGS. 20J–20M, the process of assembling the feeders 400 will be described. Initially, FIG. 20J illustrates that the side walls are formed from four members 404–410. The members 404 and 408 are identical, having an inner transgroove 414 formed adjacent to a bottom thereof and edge grooves 416 formed along vertical side edges thereof. The wall members 406 and 410 have lengthwise grooves 418 formed adjacent to the edges thereof adapted to receive the groove side edges 416 of the members 404 and 408.

During assembly, edges 416 of the side walls 404 and 408 are inserted into the grooves 418 of the side walls 406 and 410. Before the side wall 410 is assembled on to the remaining side walls 406–408, a base block 420 is assembled on to the three side walls 404–408.

The base block 420 has projections 422 sized and dimensioned to be received within the transverse grooves 414 formed in the wall members 404 and 408. Fasteners are then inserted through the side walls 406 and 410 into the bottom block 420. These fasteners, in conjunction with the tongue-in-groove style connections described above, lock the bottom ends of the side walls together. Additionally, a bolt assembly 424 is inserted through holes in the side walls 406 and 410 to fasten the upper ends of these wall members together. The roof member 402 is then placed over the upper ends of the wall members, but may be removed to pour feed into the chamber defined by the wall members 404–410.

Figure 21F:
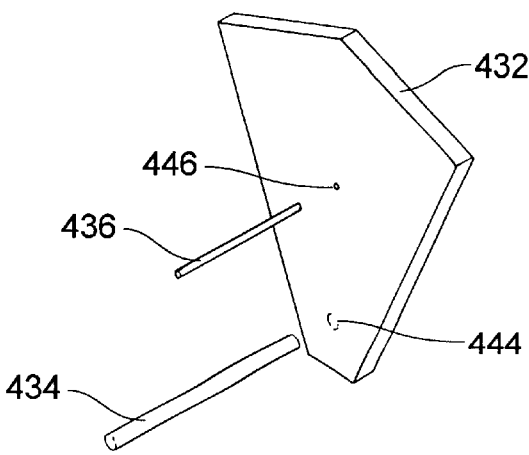
FIGS. 21A–21H depict a fruit feeder of the present invention, with FIG. 21A being a perspective view thereof, FIG. 21B being a top plan view thereof, FIG. 21C being a front elevational view, the rear elevational view being identical, FIG. 21D being a side elevational view, the opposite side being identical, and FIG. 21E being a bottom plan view thereof.
Figure 21G:
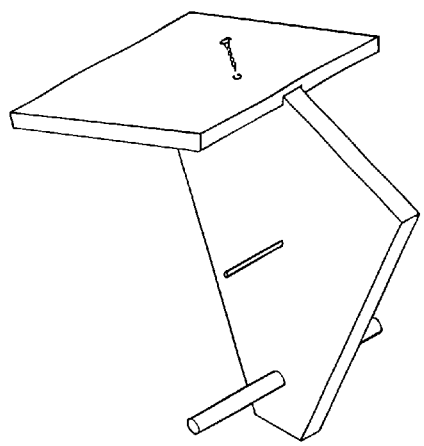
Figure 21H:
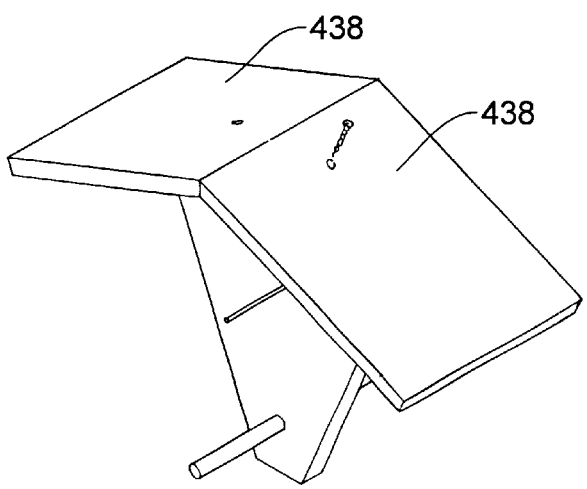
Figure 21A:
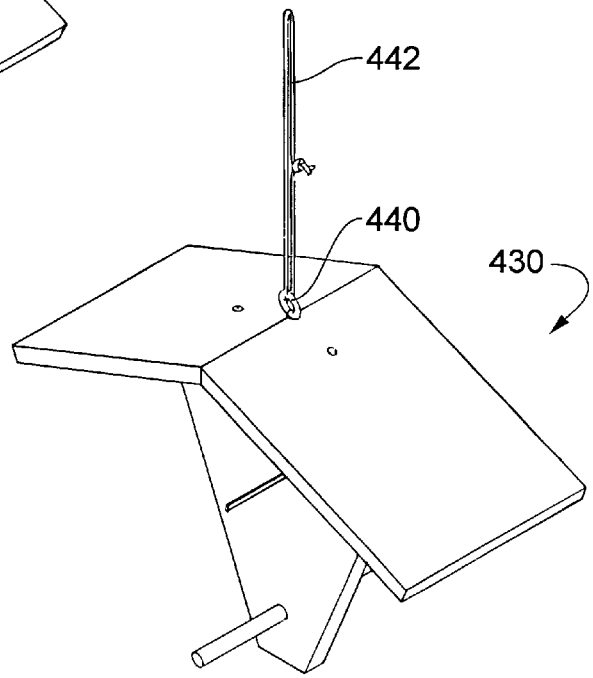
Figure 21B:
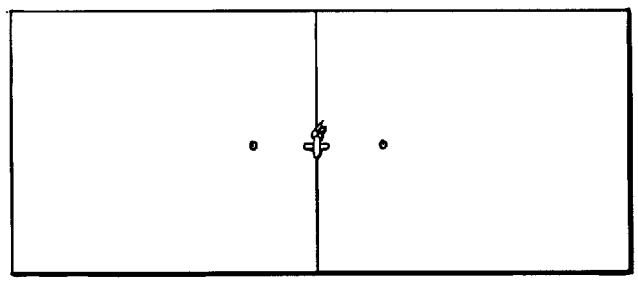
Figure 21C:
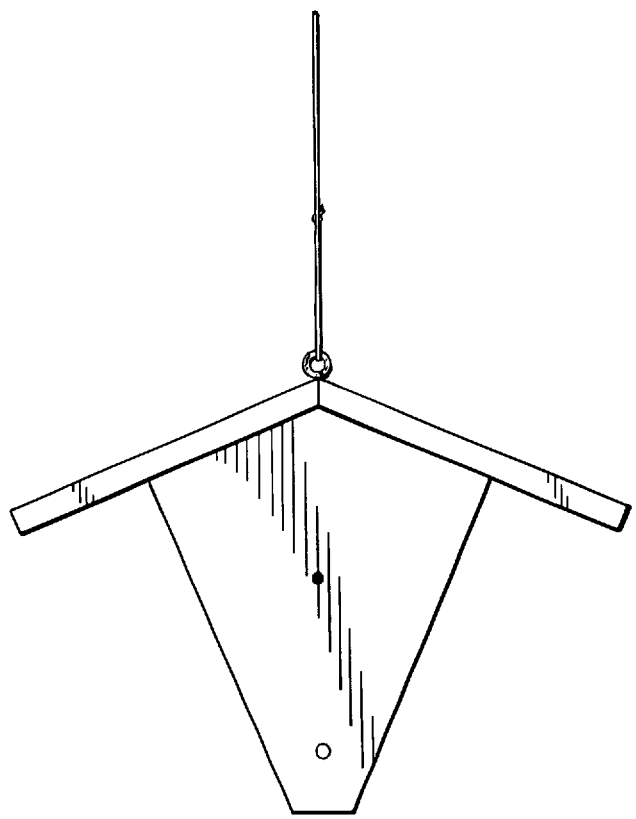
Figure 21D:
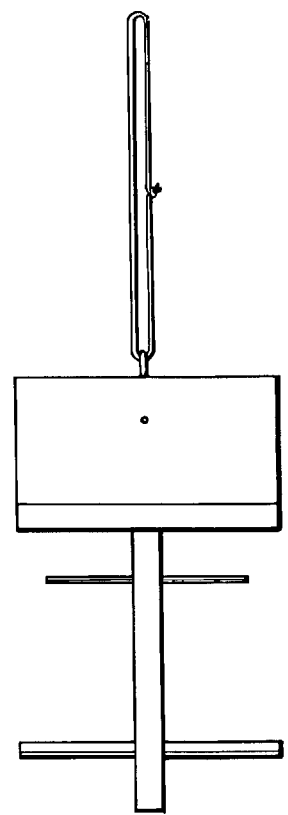
Figure 21E:
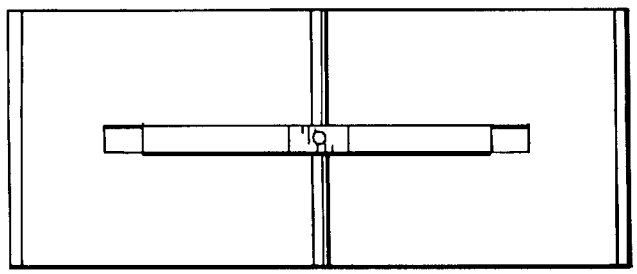

Referring now to FIGS. 21A–21 E, depicted therein is a fruit feeder 430 constructed in accordance with, and embodying, the principles of the present invention. The fruit feeder 430 comprises a center wall 432, a perch member 434, a fruit skewer 436, first and second roof members 438, an eye hook 440, and a strap 442. The perch member 434 is inserted into a predrilled hole 444 in the center wall 432 such that the perch member 434 extends on either side of the wall 432. The fruit skewer 436 is similarly inserted through a hole 446. The roof members 438 are next attached to upper canted edges of the center wall 432, and the eye hook 440 screwed into the roof members 438. The strap 440 is then looped through the eye hook 440.

Referring now to FIGS. 22A–22I, depicted therein is a bat enclosure 450 constructed in accordance with, and embodying, the principles of the present invention. As perhaps best shown in FIGS. 22H and 22I, the bat enclosure 450 comprises a housing 452 having side walls 454 and 456 and end walls 458 and 460. The enclosure further comprises a screen assembly 462 having a rectangular sheet of screen material 464 and a bottom block 466. Finally, the bat enclosure 450 includes a lid 468. The process of assembling the enclosure 452 is similar to the process of assembling the silo-type feeder 400 described above.

In particular, longitudinal grooves 470 are formed in the side wall members 454 and 456. These grooves 470 are sized and dimensioned to receive notched side edges 472 of the end walls 458 and 460. Additionally, grooves 474 are formed along the length of the inner surface of the end walls 458 and 460. Fasteners extend through the side walls 454 and 456 and into the end walls 458 and 460 to hold the enclosure 452 together. A strap 476 is then extended through predrilled holes 478 in the side walls 454 and 456. At this point, the screen assembly 462 is placed into the chamber defined by the housing 452, with the vertical side edges of the screen 464 being received in the grooves 474. The grooves 474 are closed as shown at 476 in FIG. 22E to prevent the screen assembly 462 from going down beyond a certain point.

The block 466 gives weight to the screen assembly 462 to allow it to be drawn down the grooves 474. The block 466 also makes the screen assembly rigid along its width dimension so that it doesn't slip out of the grooves 474.

Figures 22A, 22H, 22I:
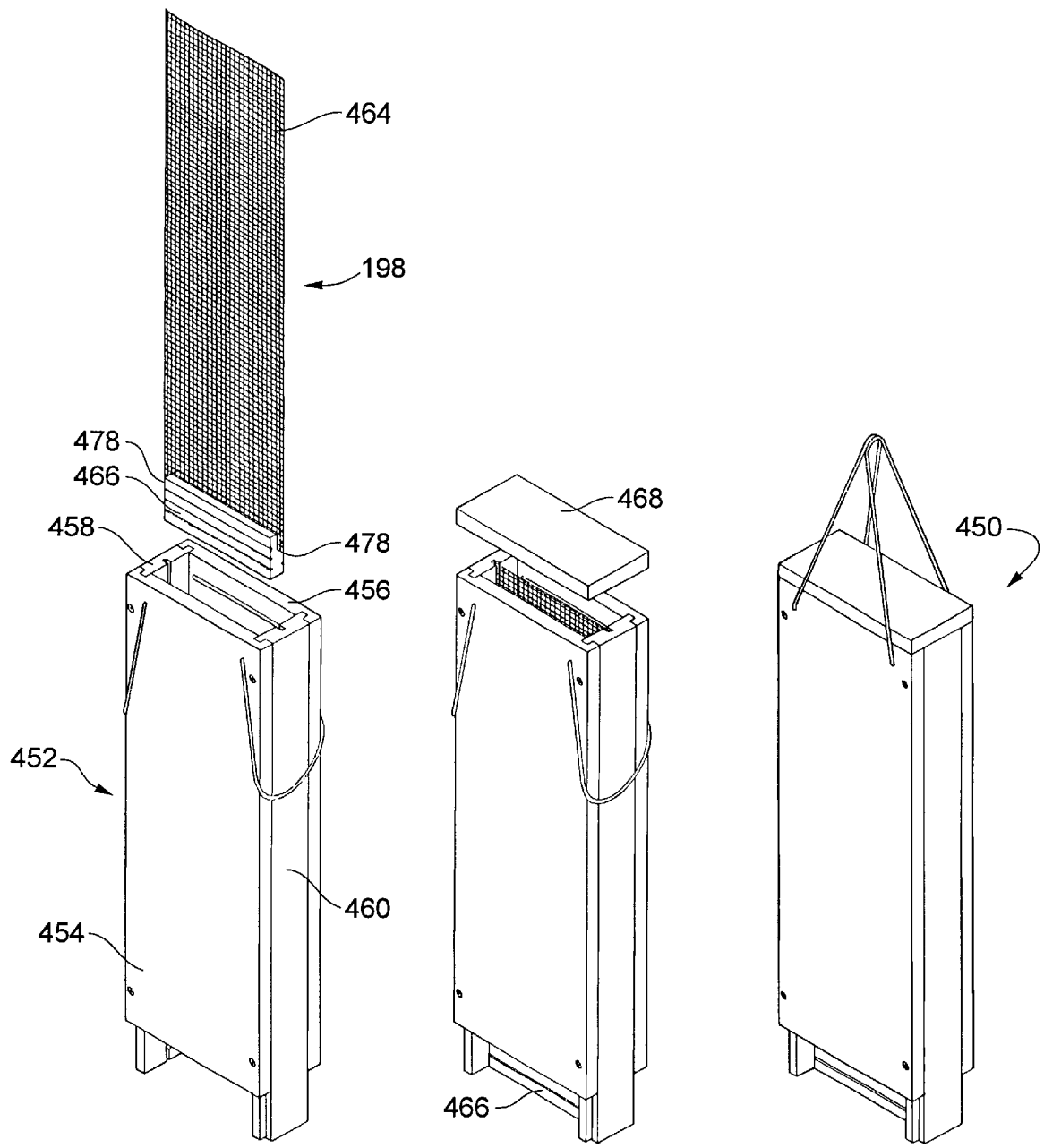
Figure 22E:
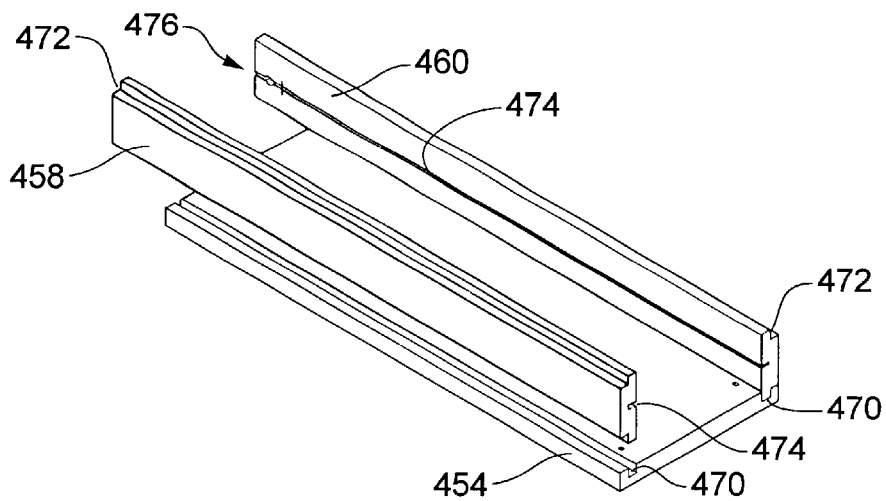
Figure 22F:
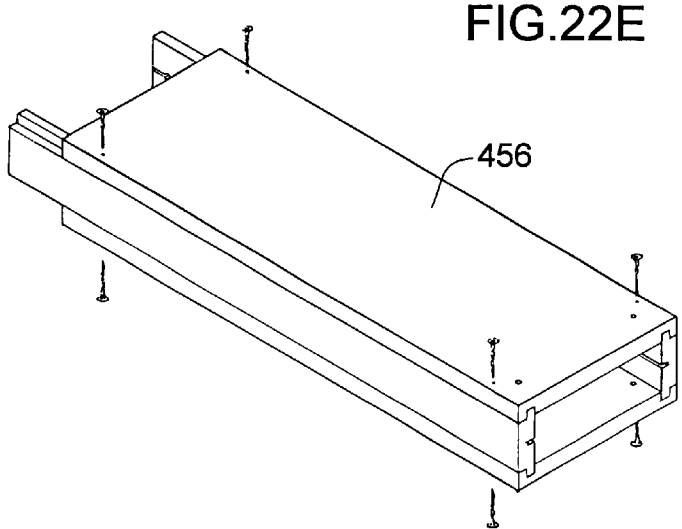
Figure 22G:
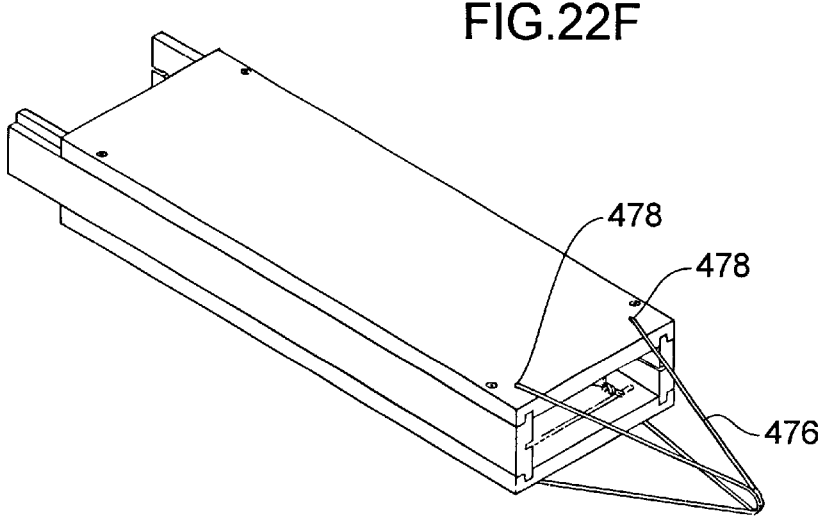

When bottom corners 478 of the screen 464 engage the stops 476, the screen is in the position shown in FIG. 22I, with the block 466 extending out of the chamber defined by the enclosure 452. The cap 468 is then placed over the opening through which the screen assembly 462 is inserted to cover the top of the enclosure 452. The bat enclosure 450 provides a location where bats can hang while sleeping during the day.

Figure 1J:
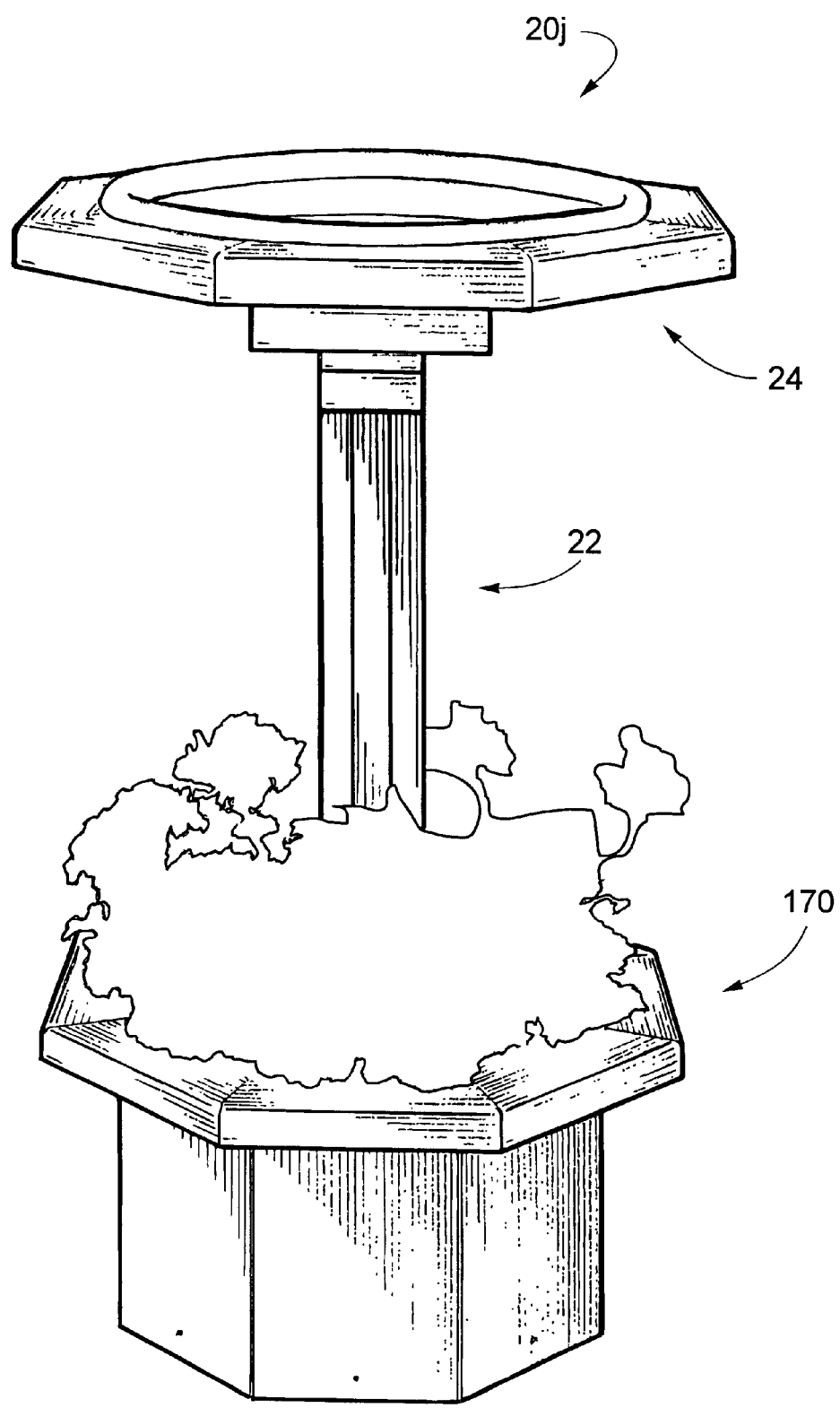
Figure 23A:
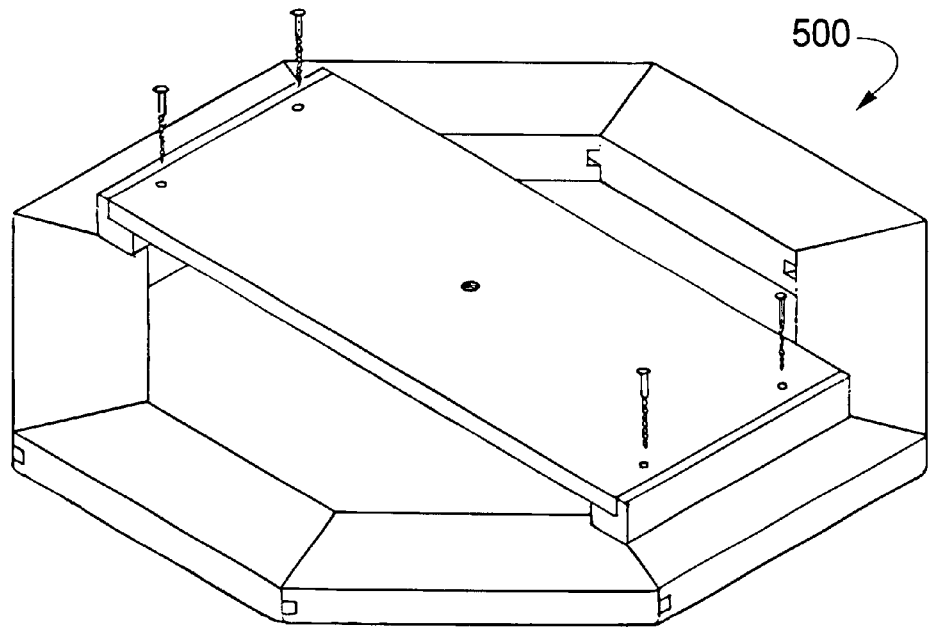
FIGS. 23A–23C depict a bird bath support of the present invention.
Figure 23B:
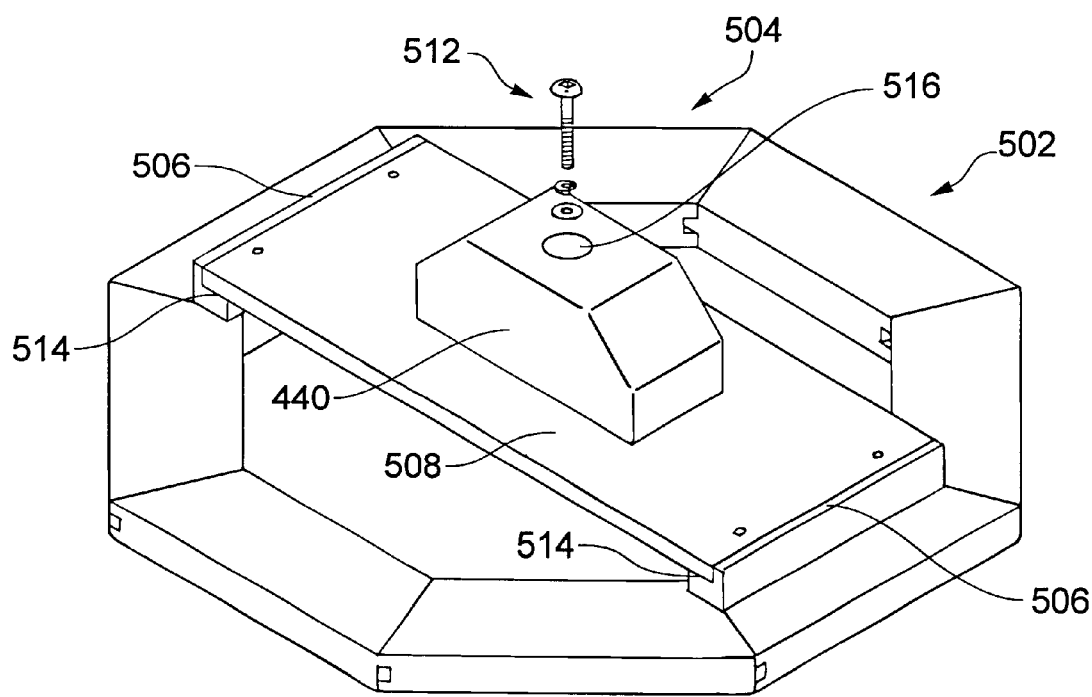
Figure 23C:
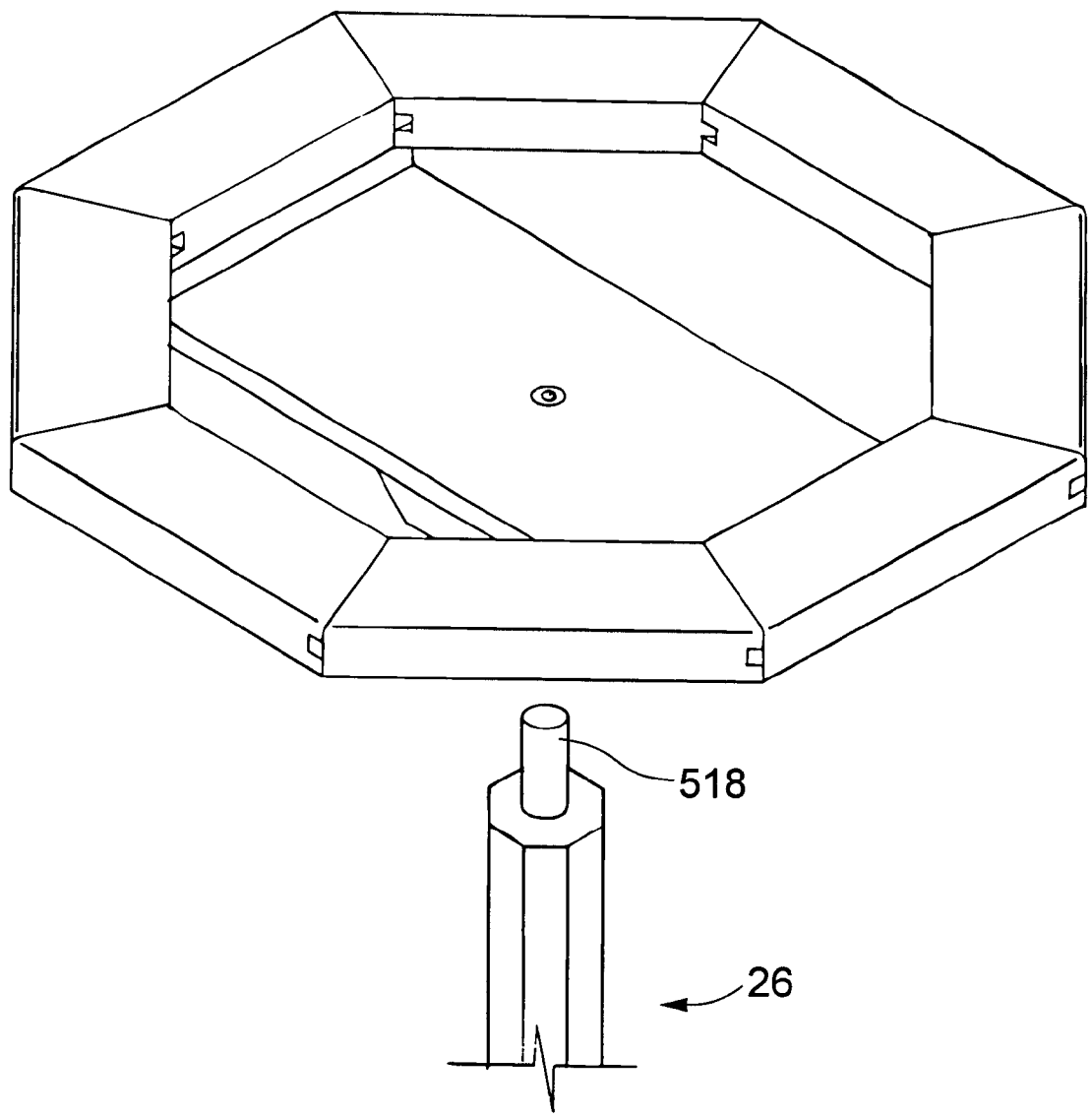
Figure 24A:
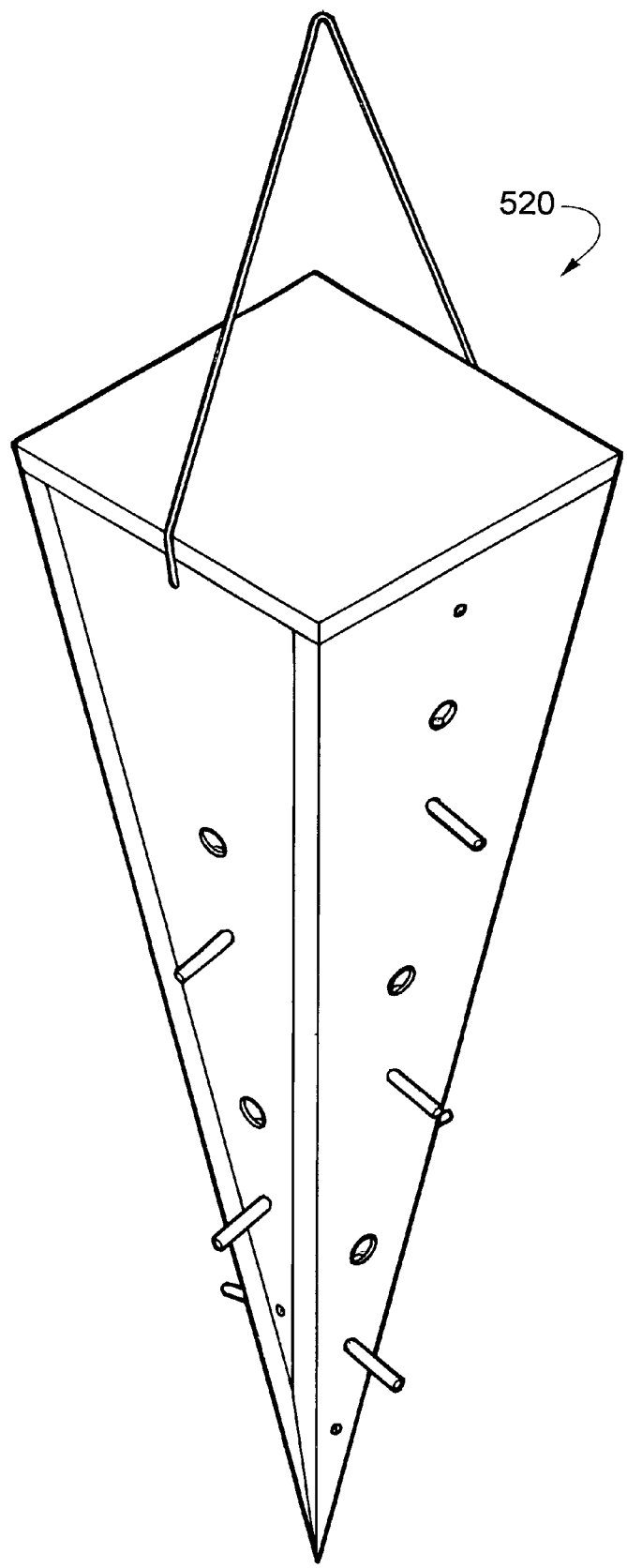
FIGS. 24A–24E depict yet another silo-type feeder of the present invention, with FIG. 24A being a top perspective view, FIG. 24B being a top plan view, FIG. 24C being a front elevational view, the rear elevational view being identical, FIG. 24D being a side elevational view, the opposite side being identical, and FIG. 24E being a bottom plan view.
Figures 24B, 24C, 24D, 24E:
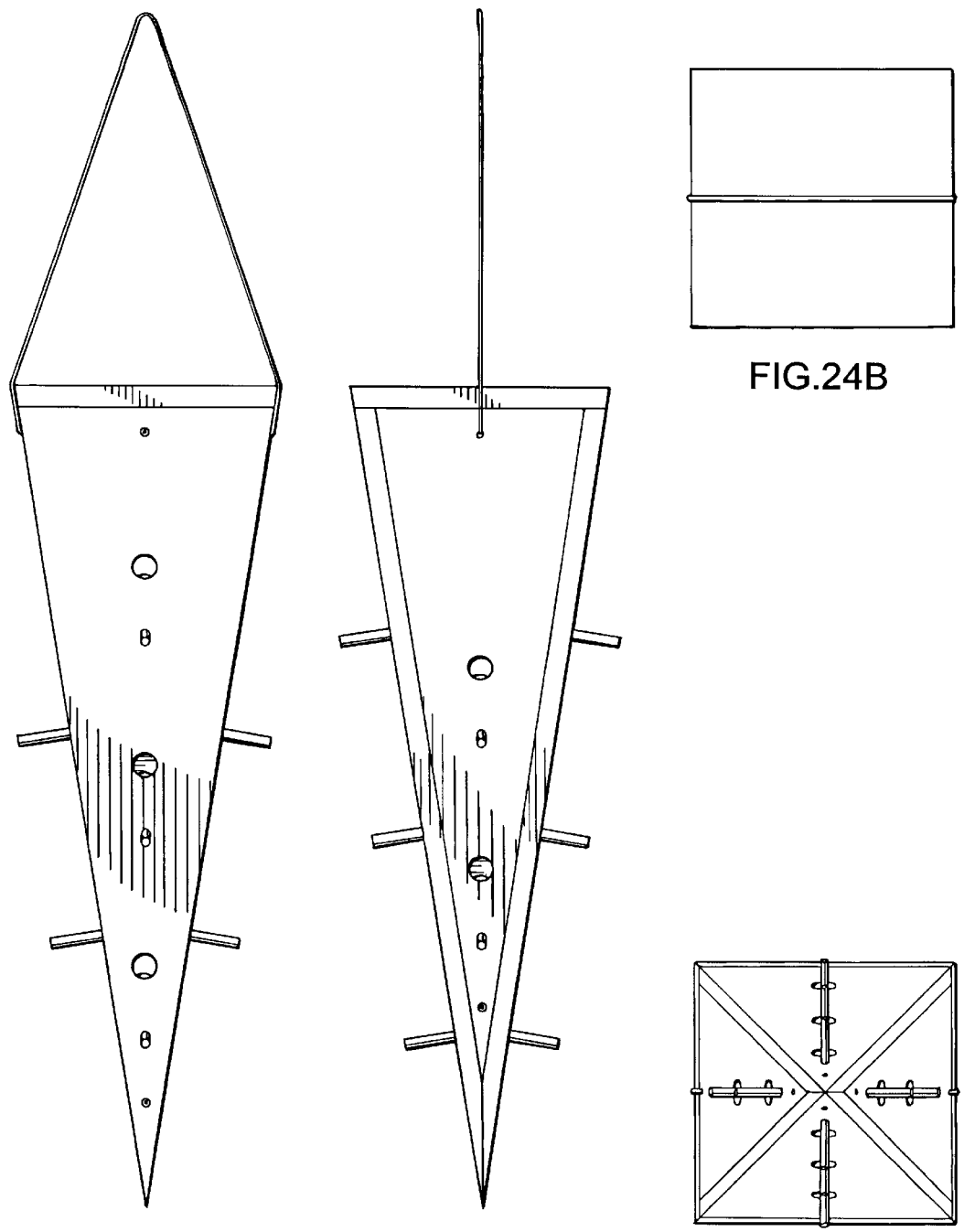
Figure 25A:
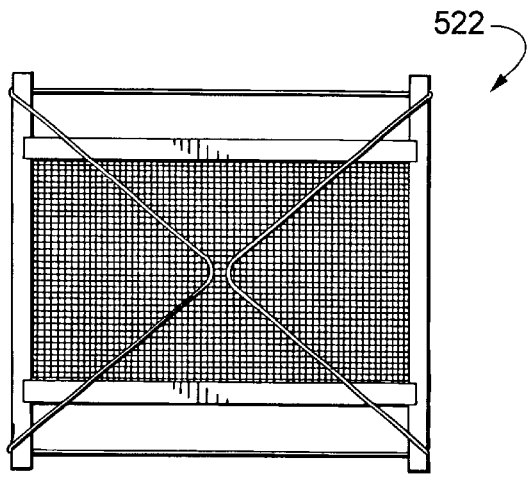
FIGS. 25A–25D depict a simplified hanging feeder of the present invention, with FIG. 25A being a top plan view, FIG. 25B being a front elevational view, FIG. 25C being a side elevational view, the opposite side being identical, and FIG. 25D being a bottom plan view thereof.
Figure 25D:
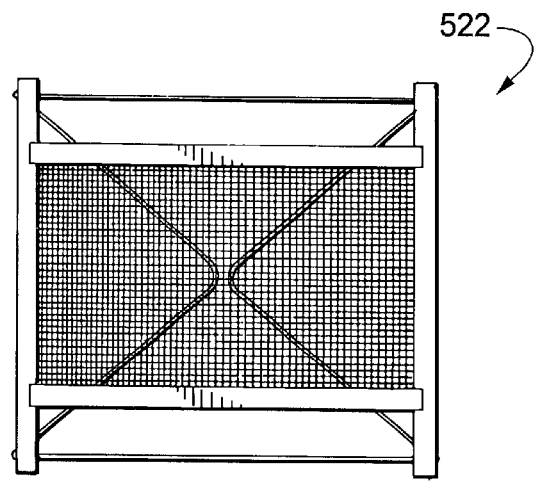
Figure 25B:
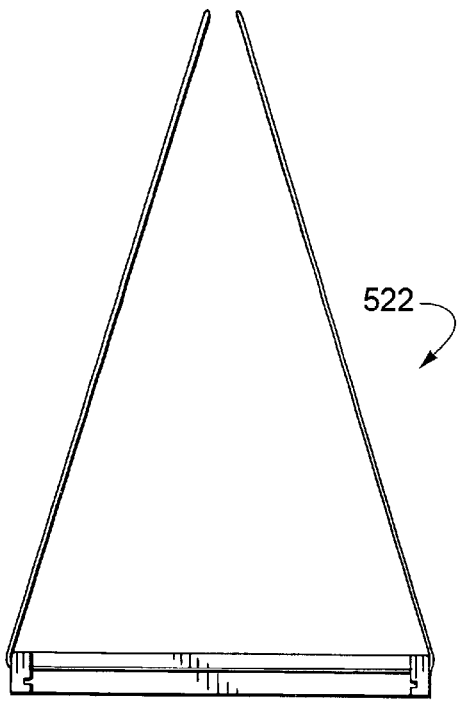
Figure 25C:
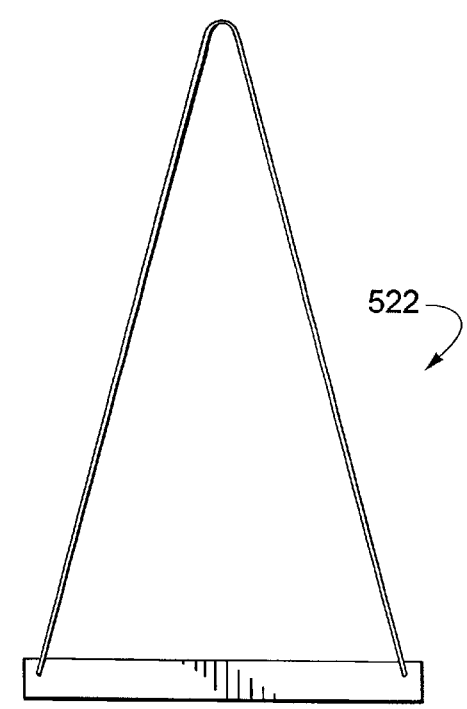

Referring now to FIGS. 23A–23C, depicted therein is the process of assembling a bird bath such as that shown in the systems 20d, 20g, and 20j in FIGS. 1D, 1G, and 1J. In particular, the bird bath assembly 500 shown in FIGS. 23A–23D comprises a rim portion 502 similar to that of the planter 176 described above. The assembly 500 further comprises a mounting assembly 504. The mounting assembly 504 comprises first and second bracket members 506, a cross plate 508, a mounting block 510, and a bolt assembly 512.

The brackets 506 are attached to opposite sides of the rim portion 502, with edge notches 514 facing each other. The center plate 508 is placed with its end edges into the edge notches 514 such that the plate member 508 spans an opening defined by the rim member 504. The block member 510 is then attached to the underside of the plate 508 using the bolt assembly 512. A fastening hole 516 is formed in the underside of the block 510 to receive a fastening tube 518 extending from an upper end of the post portion 26.

Referring now to FIG. 24A–24E, depicted therein is a third silo-type feeder 520 constructed in accordance with, and embodying, the principles of the present invention. This silo-type feeder 520 is similar in construction and operation to the silo-type feeders described and will not be described herein in further detail.

Referring now to FIGS. 25A–25D, depicted therein is a simplified hanging feeder 522 similar to the feeder 350 described above. The primary difference between the feeders 350 and 522 is that a screen is used in place of the plastic bottom wall.

Figure 26A:
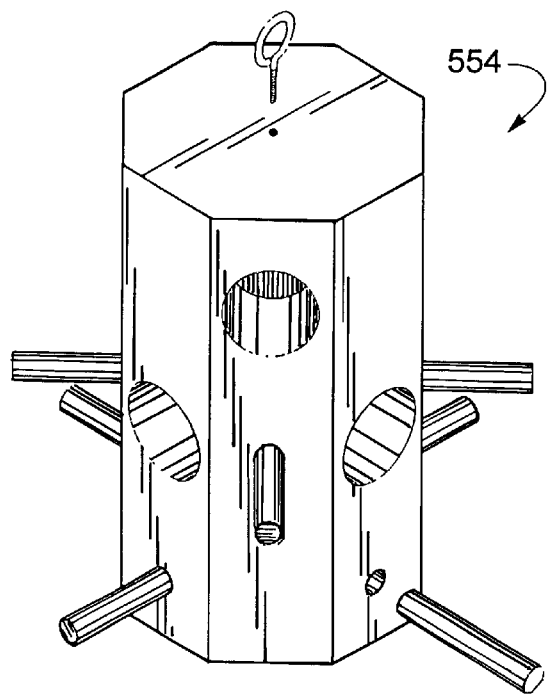
FIGS. 26A–26B depict a suet log feeder of the present invention.
Figure 26B:
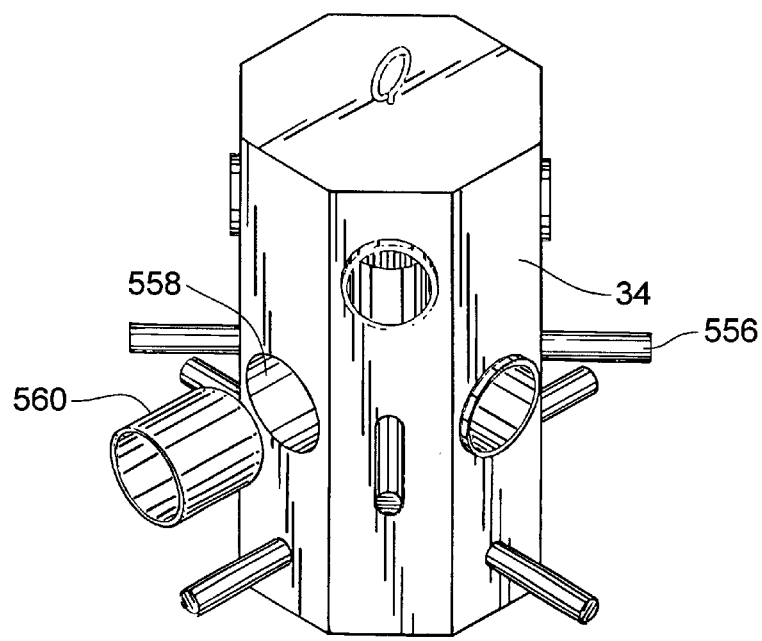

Referring now to FIGS. 26A–26B, depicted therein is a suet log feeder constructed in accordance with, and embodying, the principles of the present invention. This feeder 26a comprises short length of post section 34 having a series of holes drilled therein. Pegs 556 are inserted in some of these holes, and the remaining holes are left to be filled with suet. Each suet hole 558 is arranged above a peg 556.

Additionally, suet inserts 560 sized and dimensioned to engage the suet holes 558 may be employed. The suet inserts 560 form a friction fit with the holes 558 that allows the suet holders to be inserted into and withdrawn from these holes 558, but prevent inadvertent removal therefrom, such as by the action of a bird feeding. Other more positive fastening means, such as magnets, hook and loop, threads, or a retainer clip, may be provided to hold the suet inserts 560 within the holes 558 if necessary.

The suet holders 560 may be prepackaged with suet and sold to provide a disposable system for placing suet into the suet log feeder 554. Alternatively, these can be sold empty, filled by the user, washed, and refilled. These holders 560 allow easy cleaning of all surfaces in contact with suet, without having to try to clean the wood surfaces defining the suet holes 558.

Figures 28A, 28B:
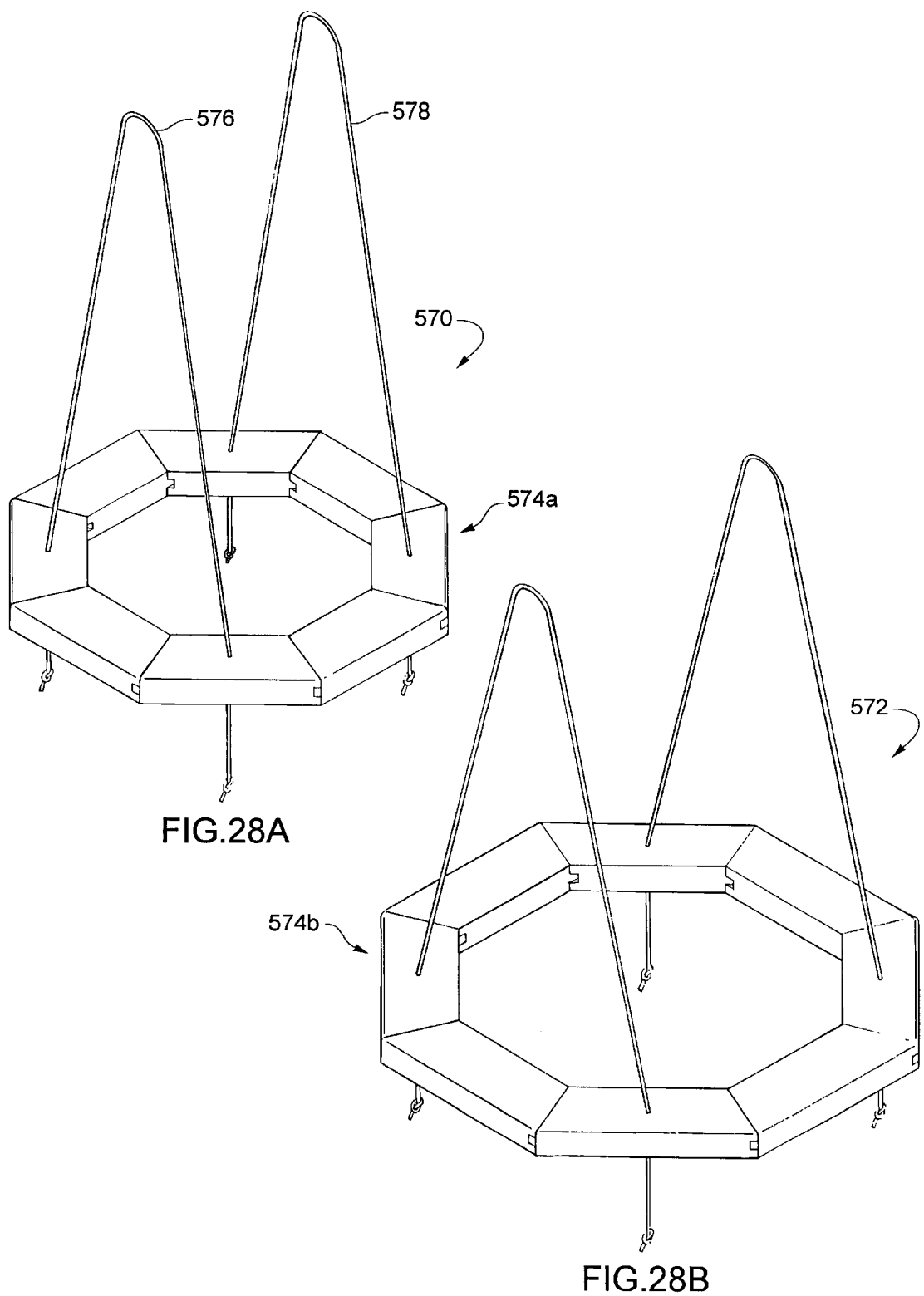
FIGS. 28A–28B depict hanging bird bath supports of the present invention.

Referring now to FIGS. 28A–28B, depicted therein are hanging bird bath supports 570 and 572. These supports comprise two different sizes of rims such as those shown on 502 above. First and second straps 574 and 576 are passed through holes spaced at 90 degree increments from each other in the rims 574a and 574b. A ceramic or other water impermeable container is placed in the rims 574a and 574b to form a bird bath.

Figure 28C:
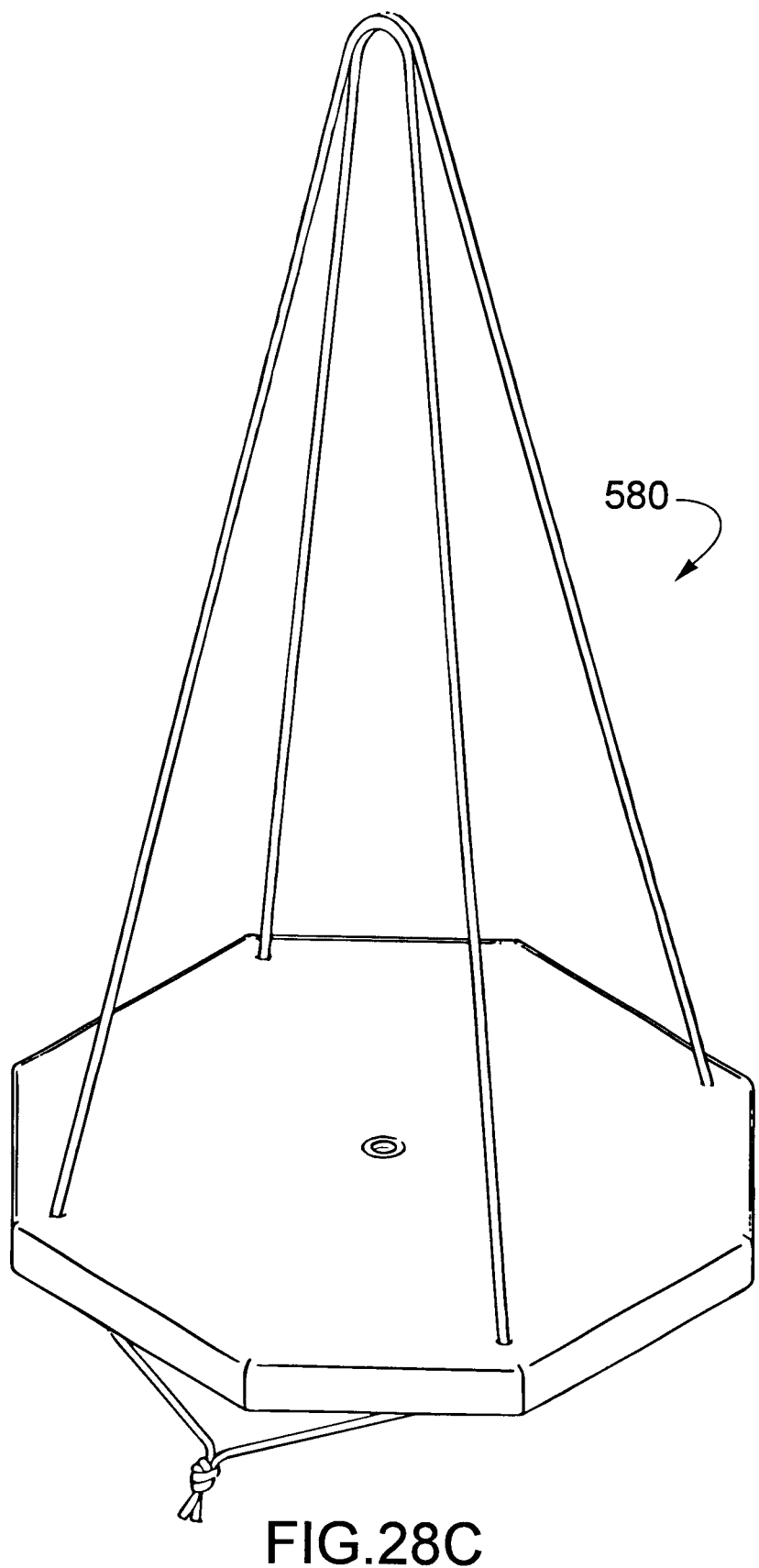

FIG. 28C depicts a similar support in which, instead of an annular rim, an octagonal base member is provided to support items such as ornamental objects, figurines, small planters, feeders, or a bird bath.

Referring now to FIGS. 29A–29F, depicted therein is a hull catching assembly 582 constructed in accordance with, and embodying, the principles of the present invention. The assembly 582 comprises four spacing members 580, 584. Each of these members has a groove 586 formed adjacent to a proximal end thereof. The proximal ends are all placed into a groove 586 of an adjacent member 584 to form a generally cruciform-shaped support assembly 588. Fasteners are passed through one of these members and into the proximal end of the other adjacent member to maintain these members 584 in the cruciform shape.

Figure 29A:
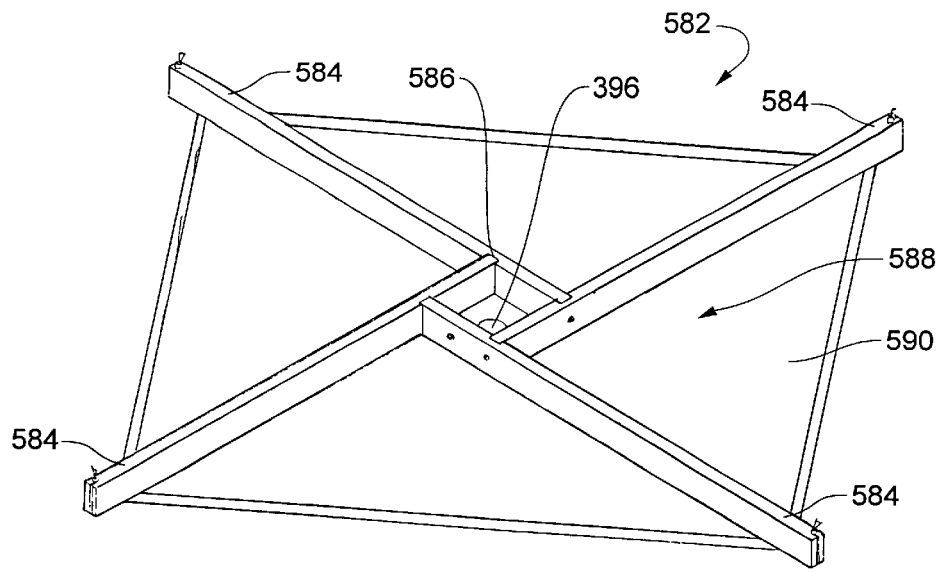
FIGS. 29A–29F depict a hull catching assembly of the present invention.
Figure 29B:
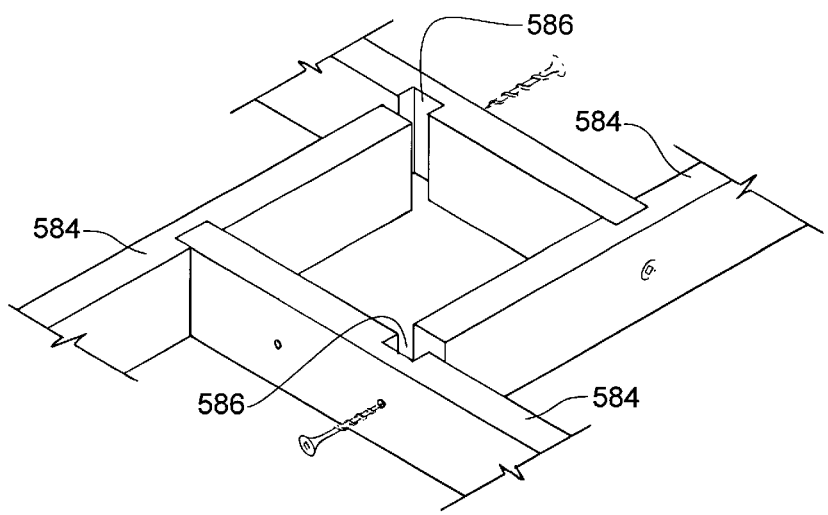
Figure 29C:
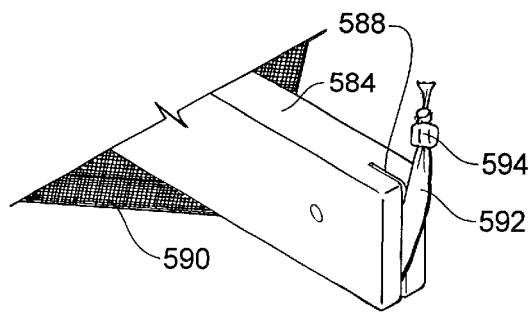

A square or rectangular screen assembly 587 is attached at its four corners to the distal ends of the members 584. In particular, as shown in FIG. 29C, a vertical slit 588 is formed at the distal ends of the members 584. Attached to each corner of a screen 590 are resilient pieces of material 592 with stops 594 formed thereon. The screen 590 is attached to the members 584 by extending the flexible material 592 into the slits 588 and allowing the stop member 594 to prevent the material 592 from being withdrawn from the slit 588. However, to detach the corner of the screen 590, the flexible material 592 is simply pulled such that the stop 594 is no longer in contact with the member 584, and then rotated downwardly so that the material 592 comes out of the slit 588. When each of the four corners of the screen 590 are attached to the cross structure 588, the entire hull catcher assembly may be placed under a bird feeder or the like to catch discarded hulls and other bird droppings.

Figure 29D:
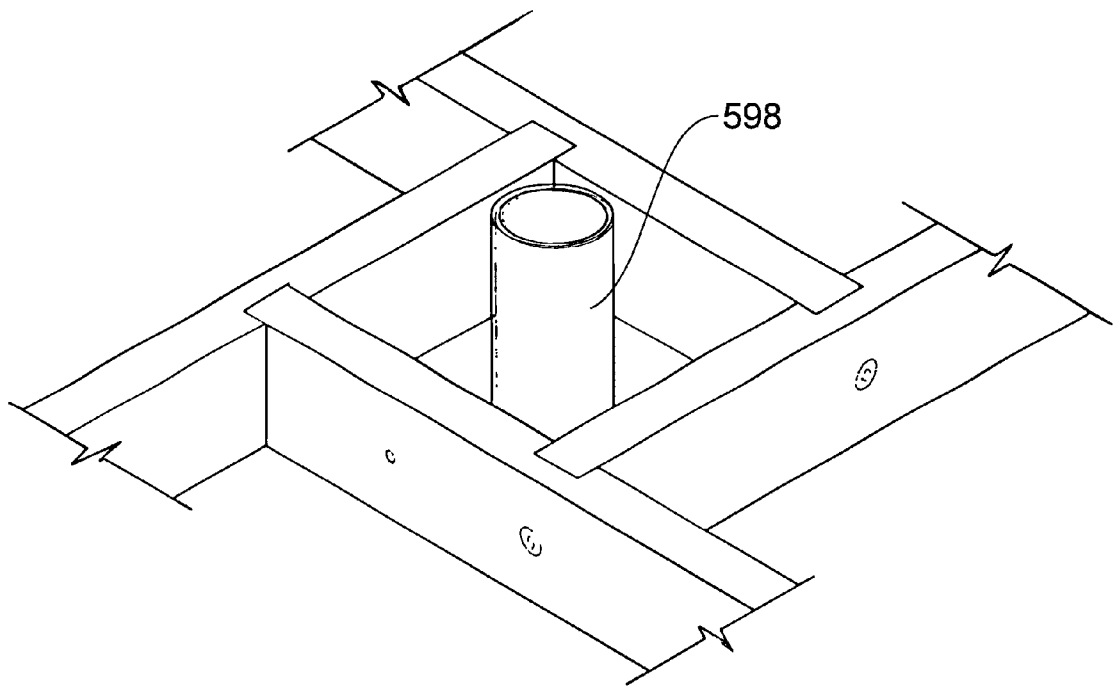
Figure 29E:
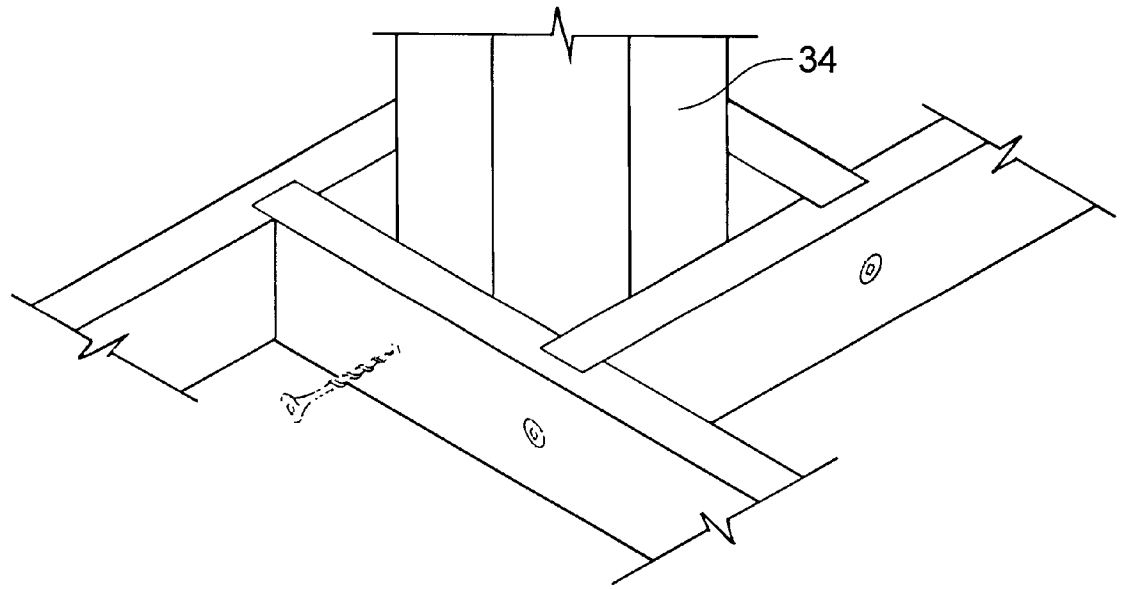
Figure 29F:
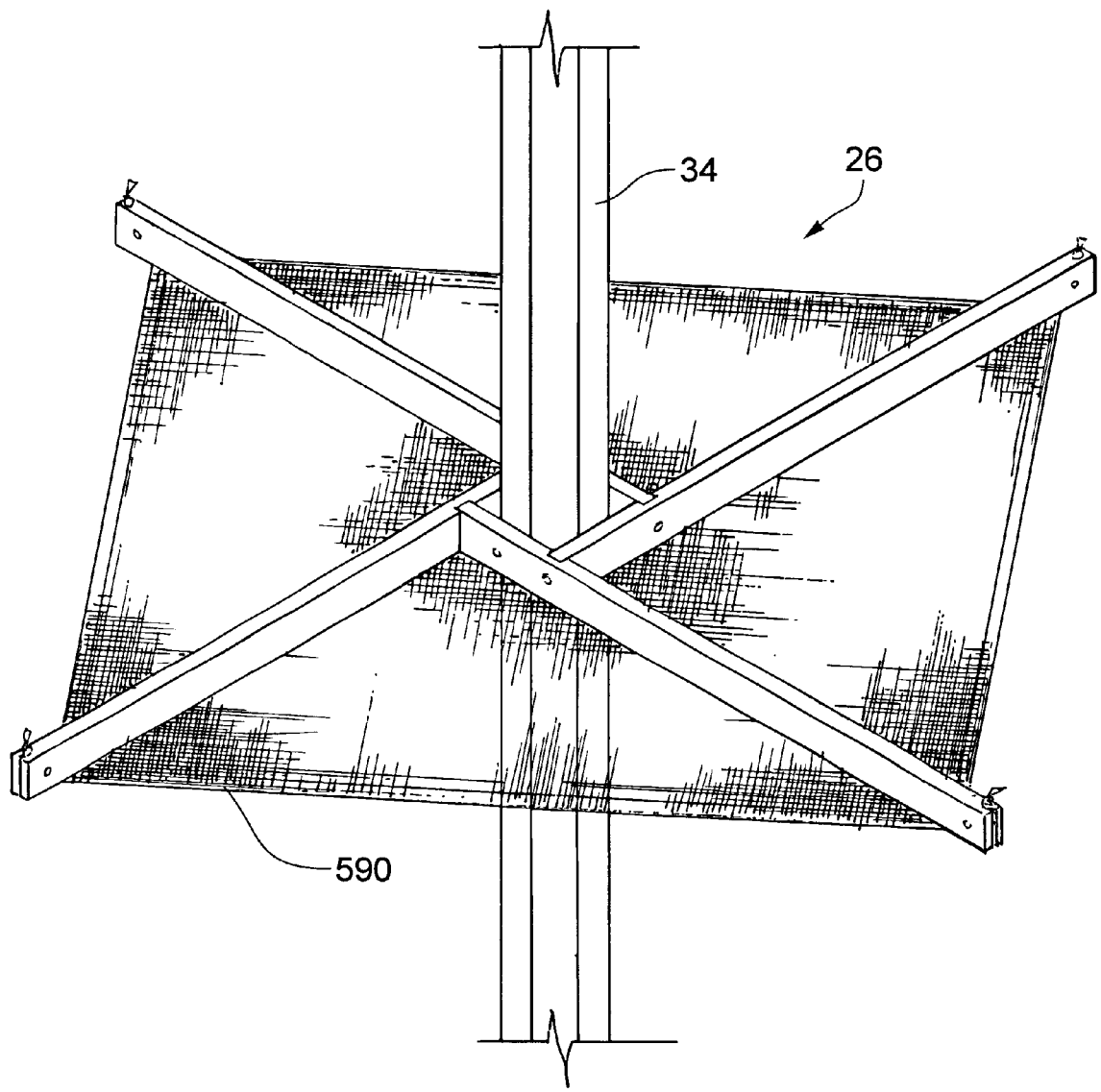

FIGS. 29D and 29E depict the process of installing the hull catcher 582 onto a post portion 26. In particular, as shown in FIG. 29A, a hole 596 is formed at the center of the screen 590. A connecting tube 598 of the post portion 26 is passed through the hole 596. Then, an upper section 534 of the post portion 26 is placed over the pin or tube 598. The support assembly 588 is then attached to the upper post section 534 by a fastener to obtain the assembly shown in FIG. 29F.

Figure 30A:
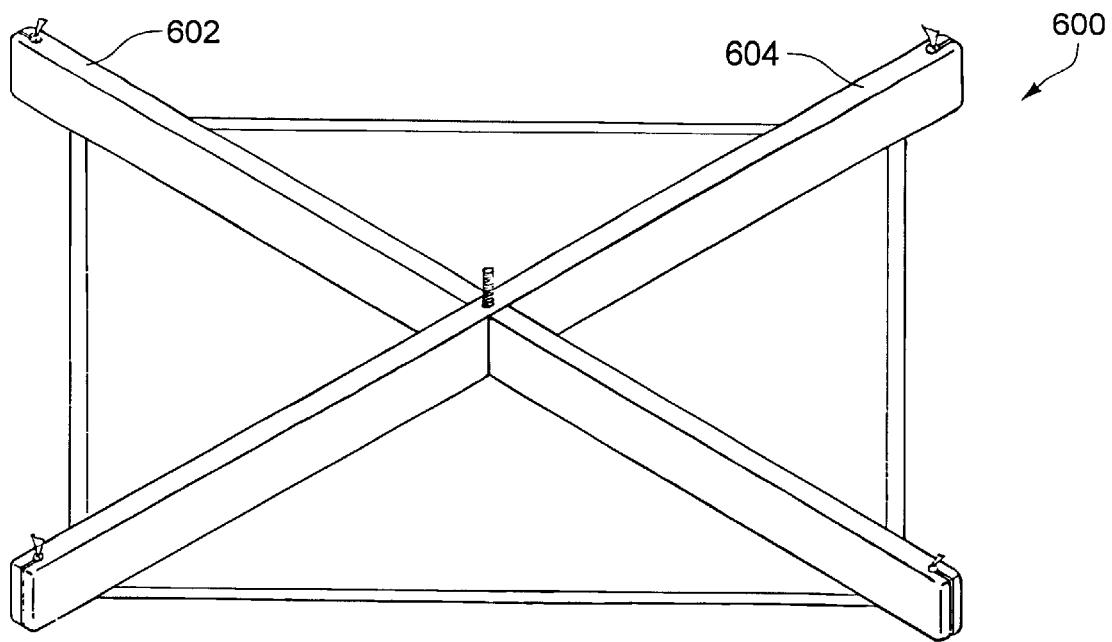
FIGS. 30A–30B depict a hanging hull catcher of the present invention.
Figure 30B:
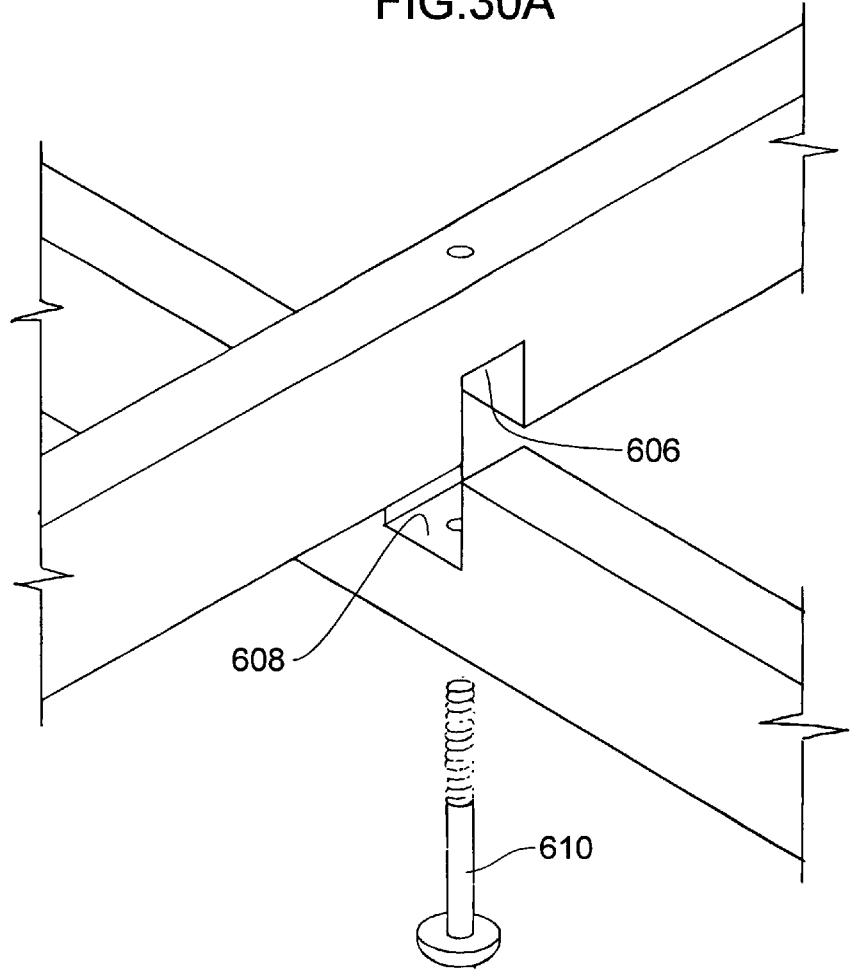
Figure 31A:
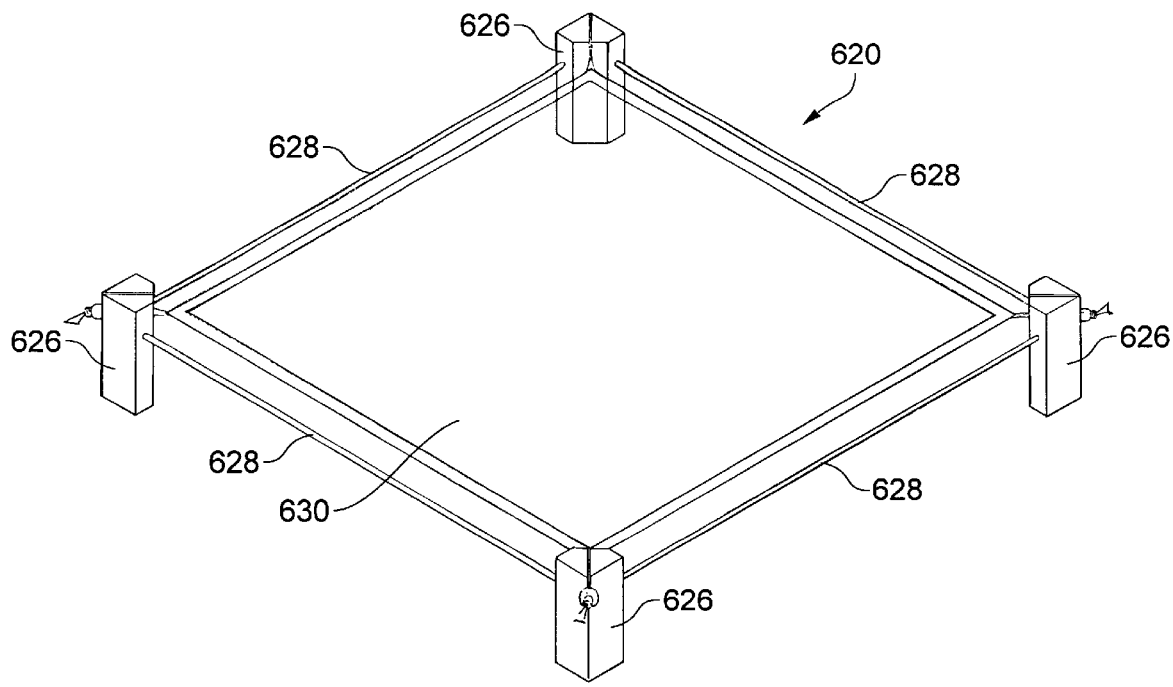
FIGS. 31A–31D depict two versions of ground screen assemblies of the present invention.
Figure 31B:
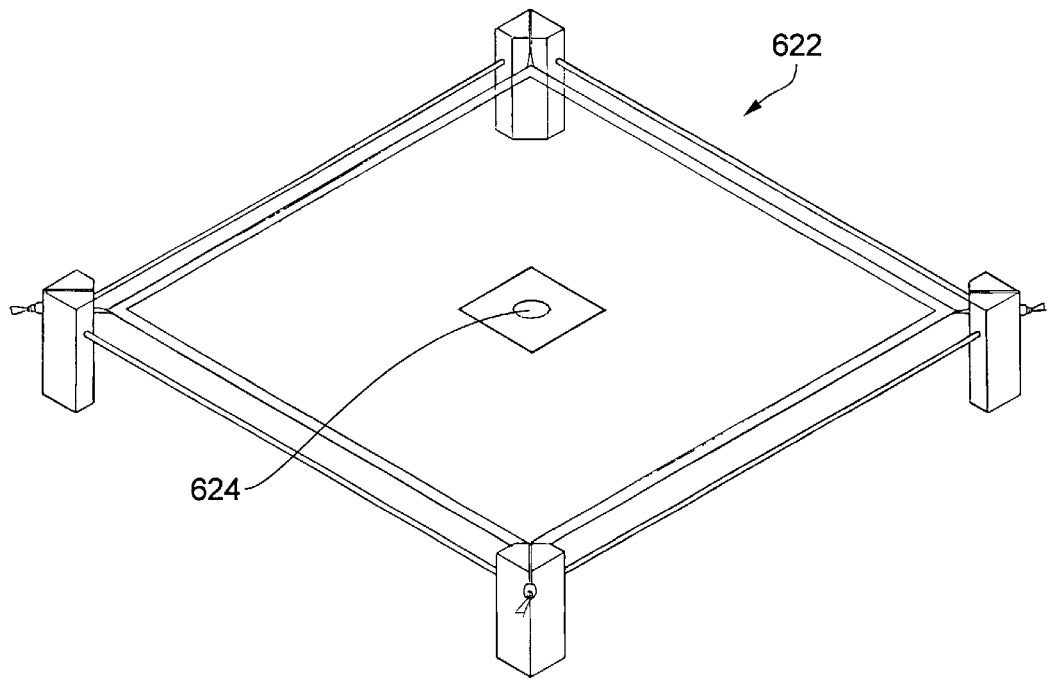
Figure 31C:
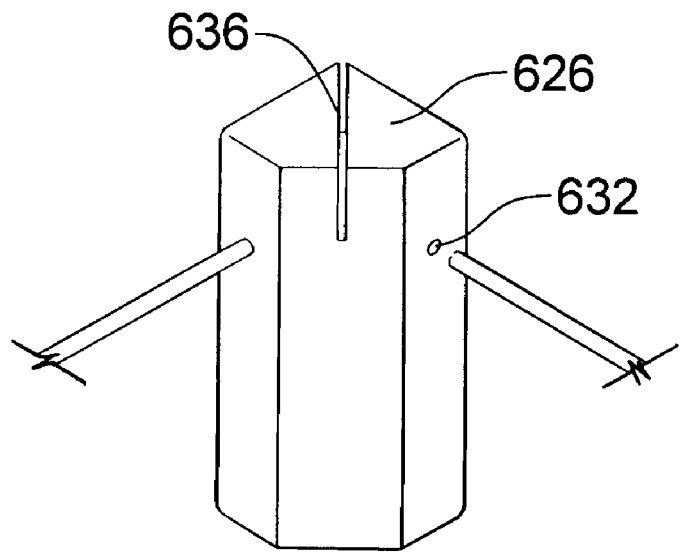
Figure 31D:
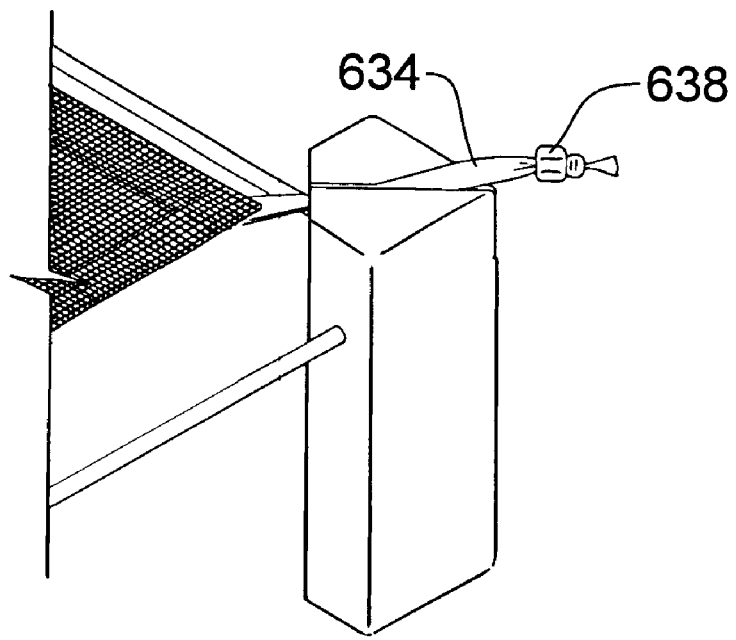

Referring now to FIGS. 30A–30B, depicted therein is a hanging hull catcher 600 constructed in accordance with, and embodying, the principles of the present invention. The hull catcher 600 is similar to the hull catcher 582 described above, but differs in that it is adapted to hang rather than be mounted on to a post section. In this respect, it is not necessary to employ four support members that define a central area through which the post may extend. Accordingly, the hull catcher 600 comprises first and second crossmembers 602 and 604 that are connected at their central points using a lap joint formed by first and second notches 606 and 608 and a bolt 610. The bolt 610 may either be tightened using a nut and washer or may be connected to the underside of an appropriately adapted accessory.

Referring now to FIGS. 31A–31D, depicted therein are first and second embodiments of ground screen and assemblies 620 and 622. The only difference between the assemblies 620 and 622 is that the assembly 620 is designed to be a stand-alone ground screen for providing feed to ground feeding birds, while the screen assembly 622 has a hole 624 in the center thereof to allow the assembly 622 to be used in a system 20. In particular, an anchor tube 38 may be inserted through the hole 624 such that the screen 622 is under the entire system 20.

Referring now back to FIG. 31, as shown therein the screen assembly 620 has four corner posts 626, four spacing bars 628, and a screen assembly 630. The spacing bars 628 are inserted into predrilled holes 632 in the post 626. To attach the screen 630 to the posts 626, a flexible material 634 is attached to each corner of the screen 630. This material is inserted into slits 636 formed on an upper surface of the posts 626. Stop members 638 are provided to prevent the material 634 from being withdrawn from the slits 636, but can be pulled away and manipulated around the slits to remove the material 634 from its corresponding slit 636.

BASIC COMPONENTS

Referring now to FIGS. 32–49, depicted therein are the basic components used to fabricate the parts used in the various systems 20 described above.

Figure 32A:
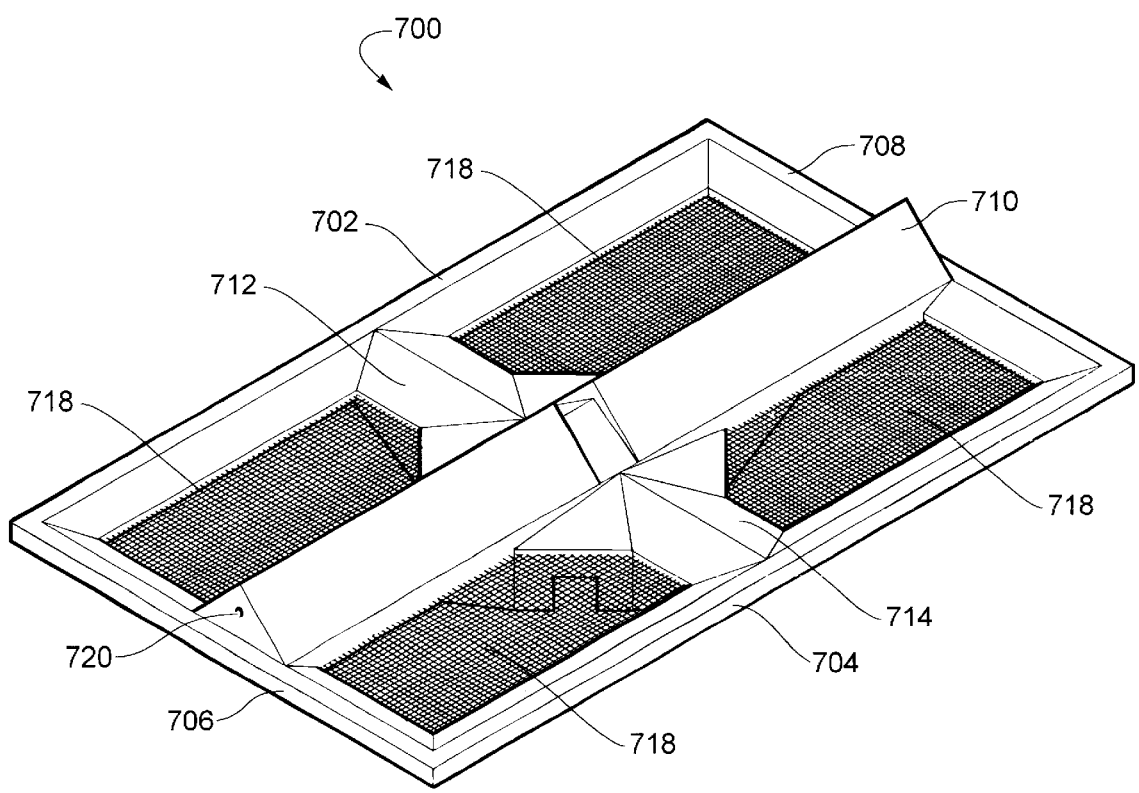
FIGS. 32A–32U depict a plastic base wall of the present invention, with FIG. 32B being a bottom plan view thereof, FIG. 32C being a top plan view thereof, FIG. 32E being an end elevational view thereof, the opposite end elevational view being identical, and FIG. 32J being a side elevational view, the opposite side elevational view being identical.
Figure 32B:
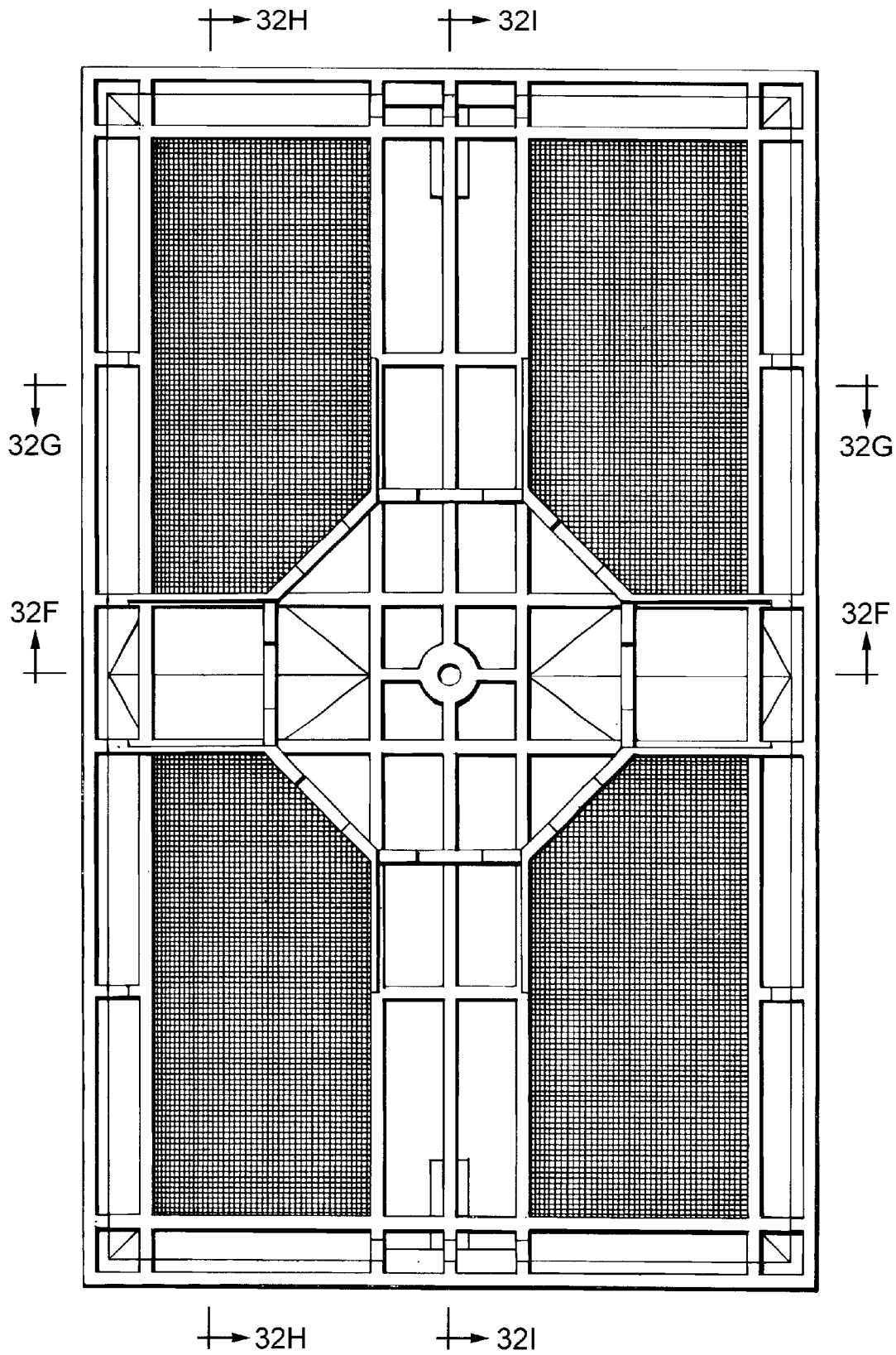
Figure 32C:
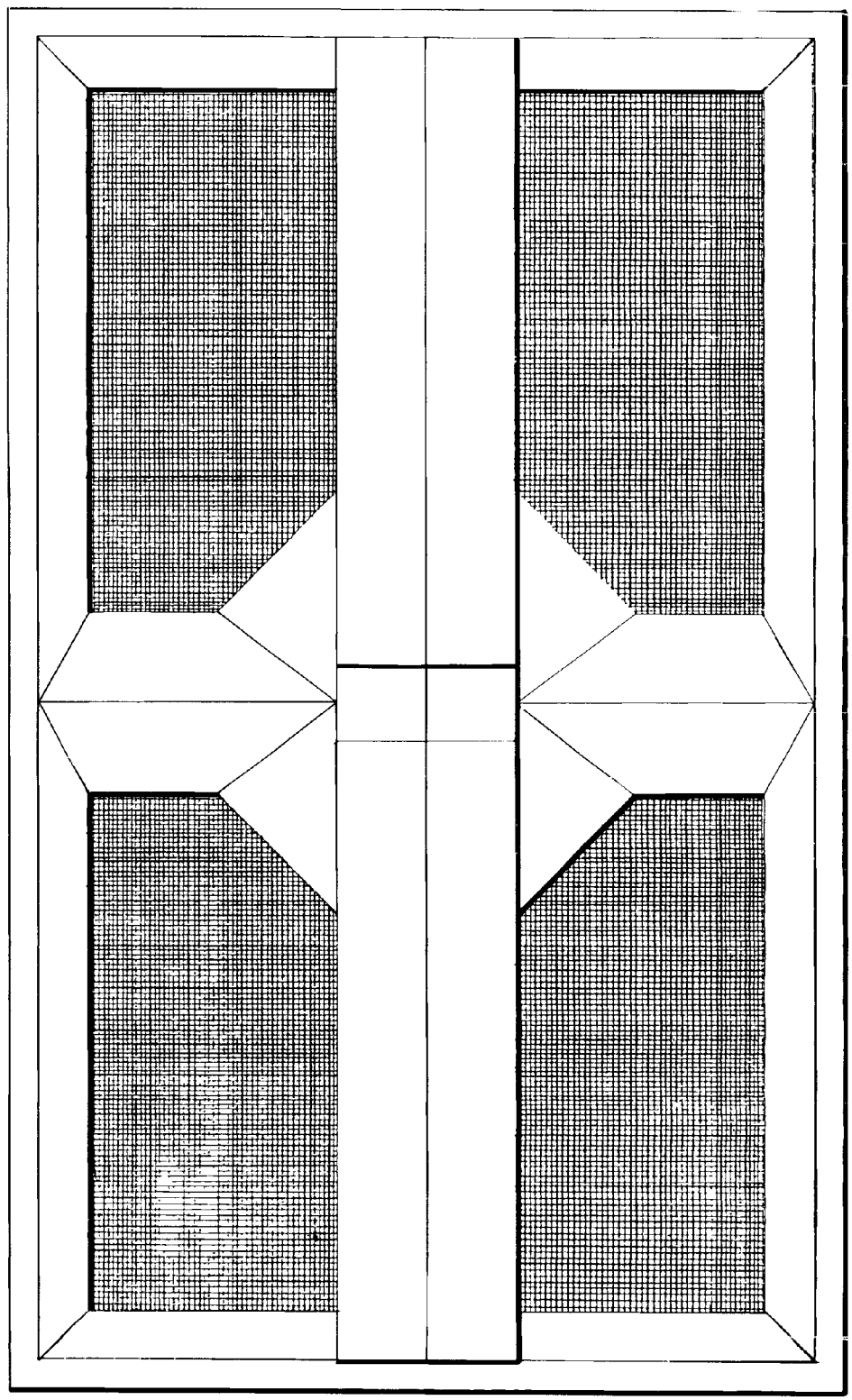
Figure 32E:
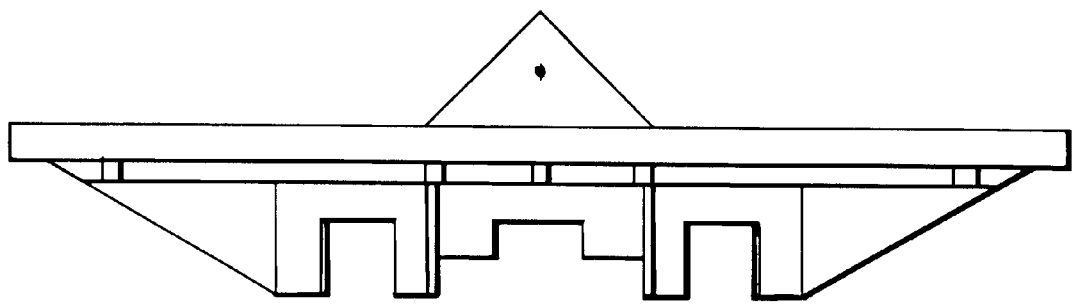
Figure 32F:
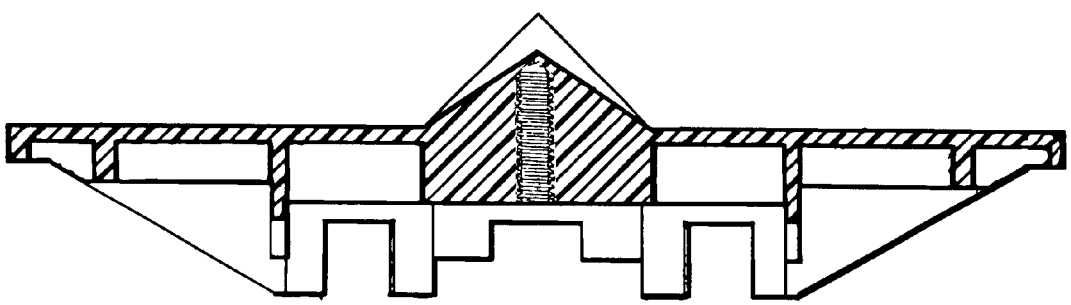
Figure 32G:
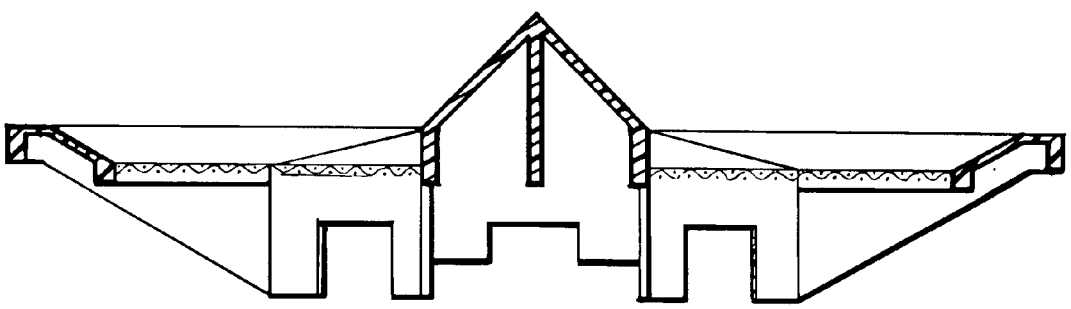
Figure 32H:
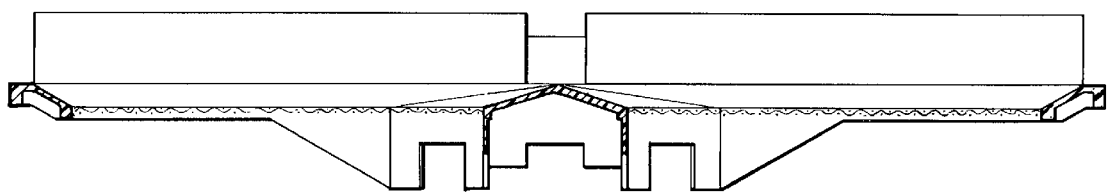
Figure 32I:
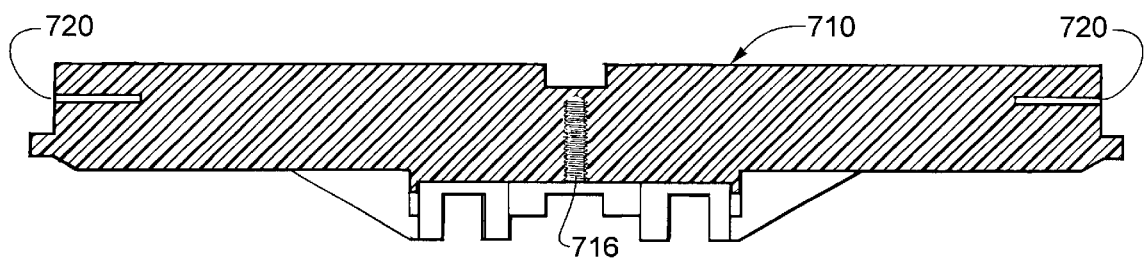
Figure 32J:
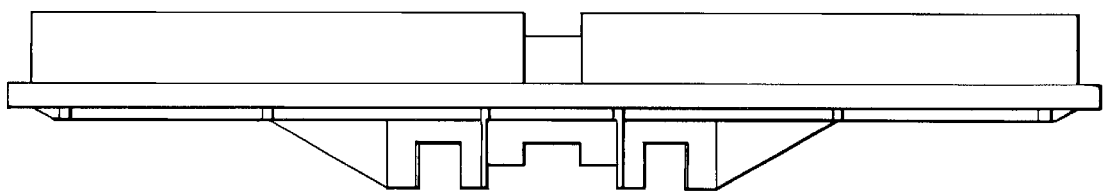
Figure 32K:
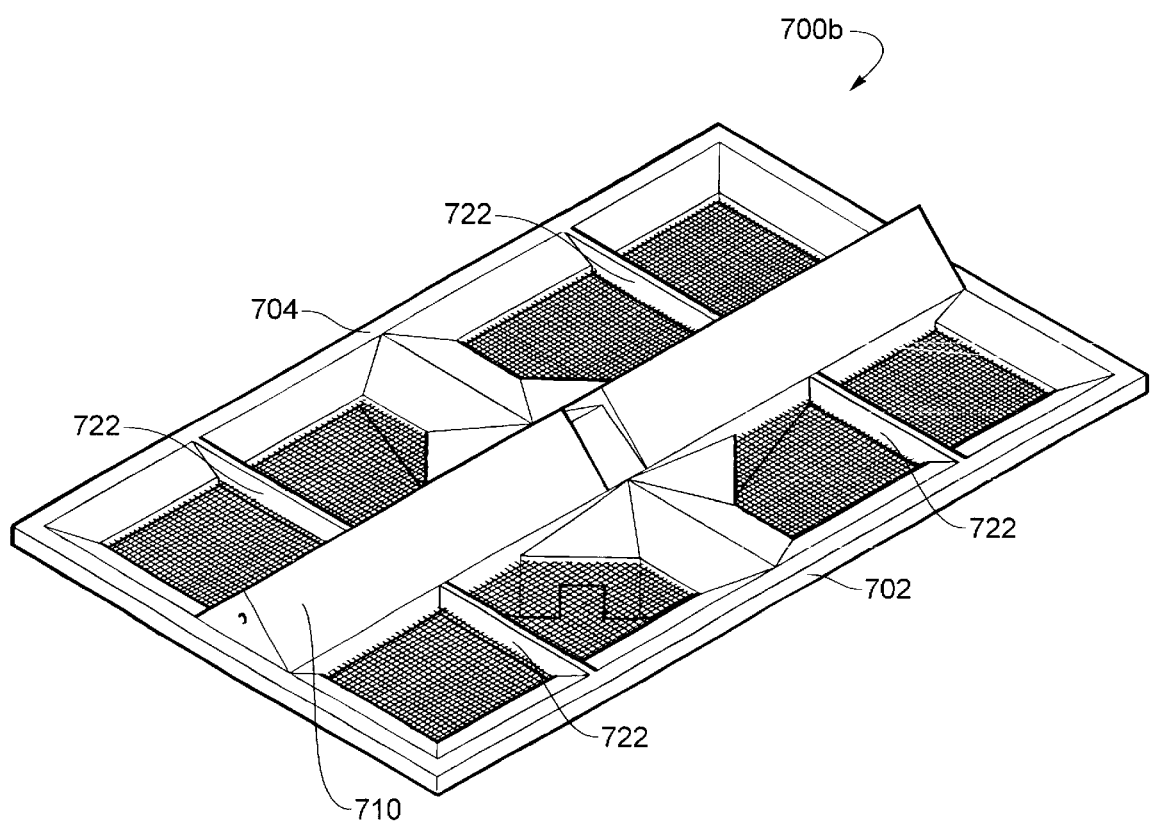
Figure 32L:
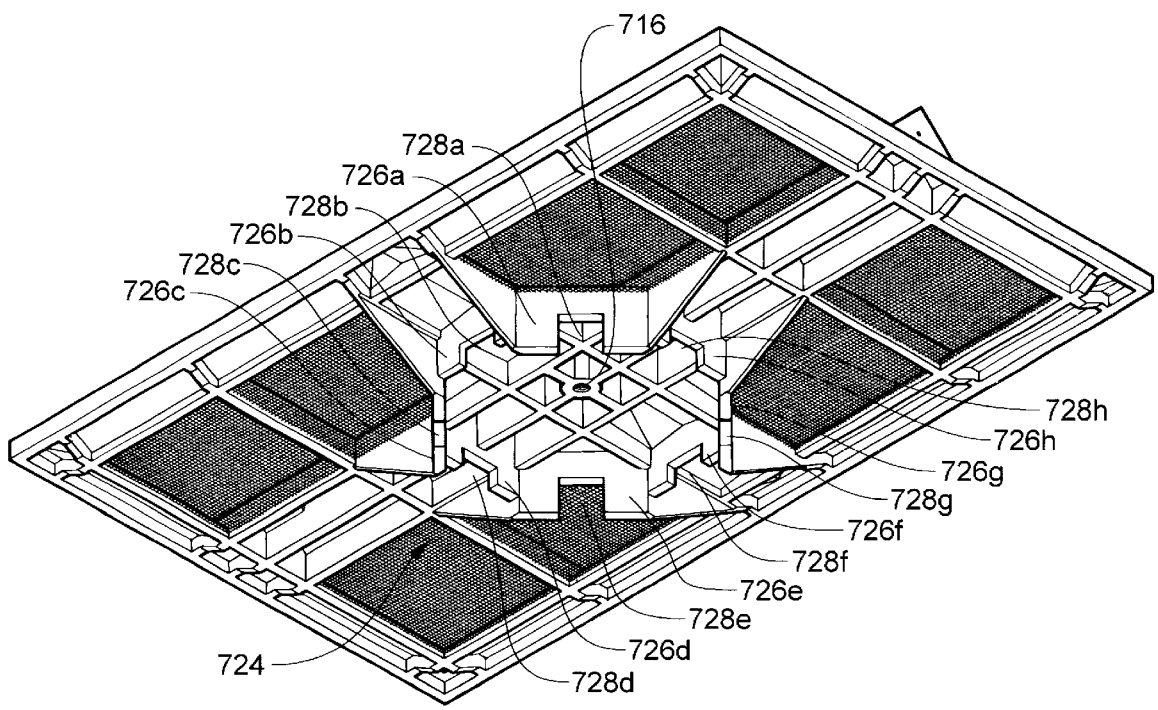
Figure 32M:
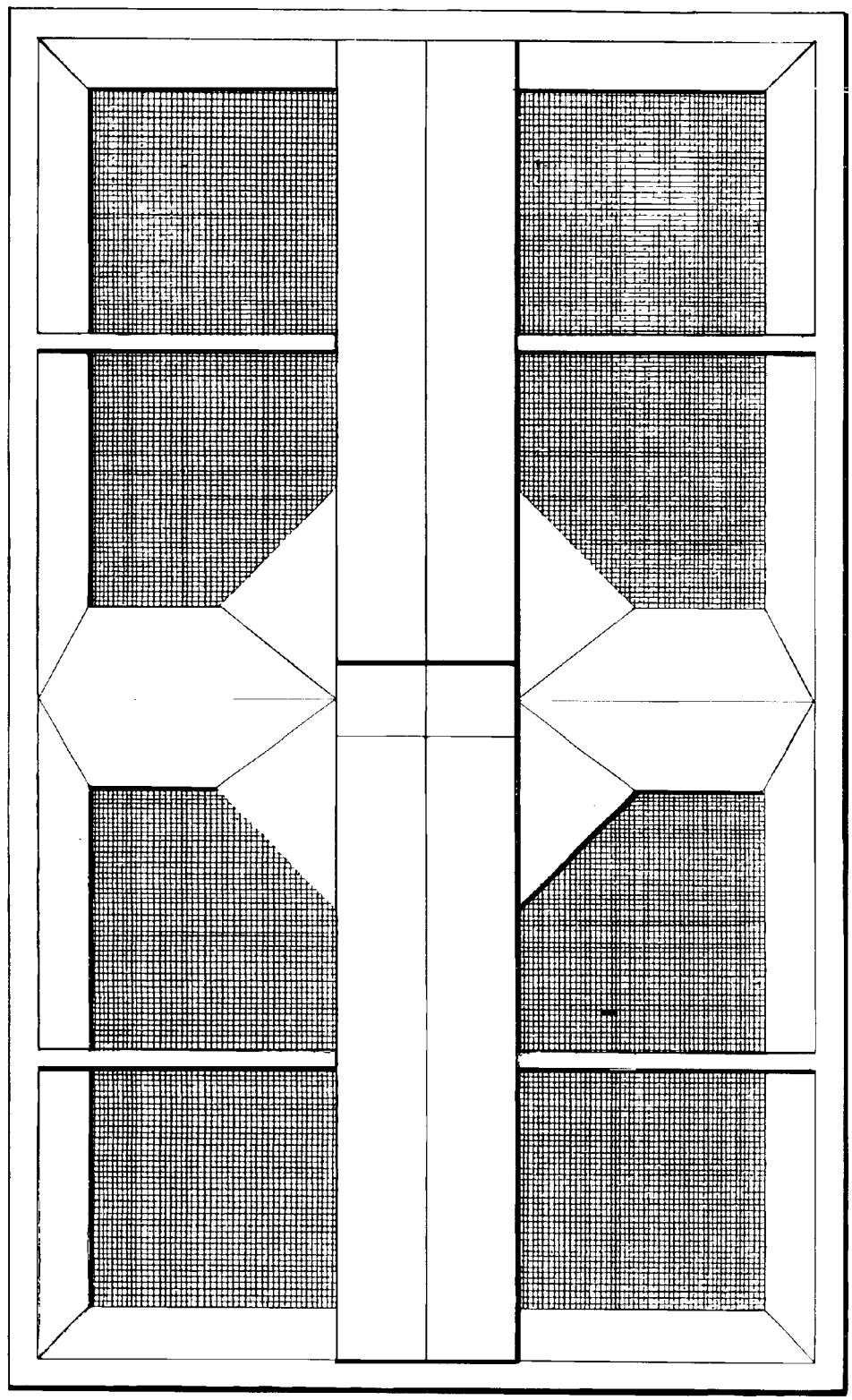
Figure 32N:
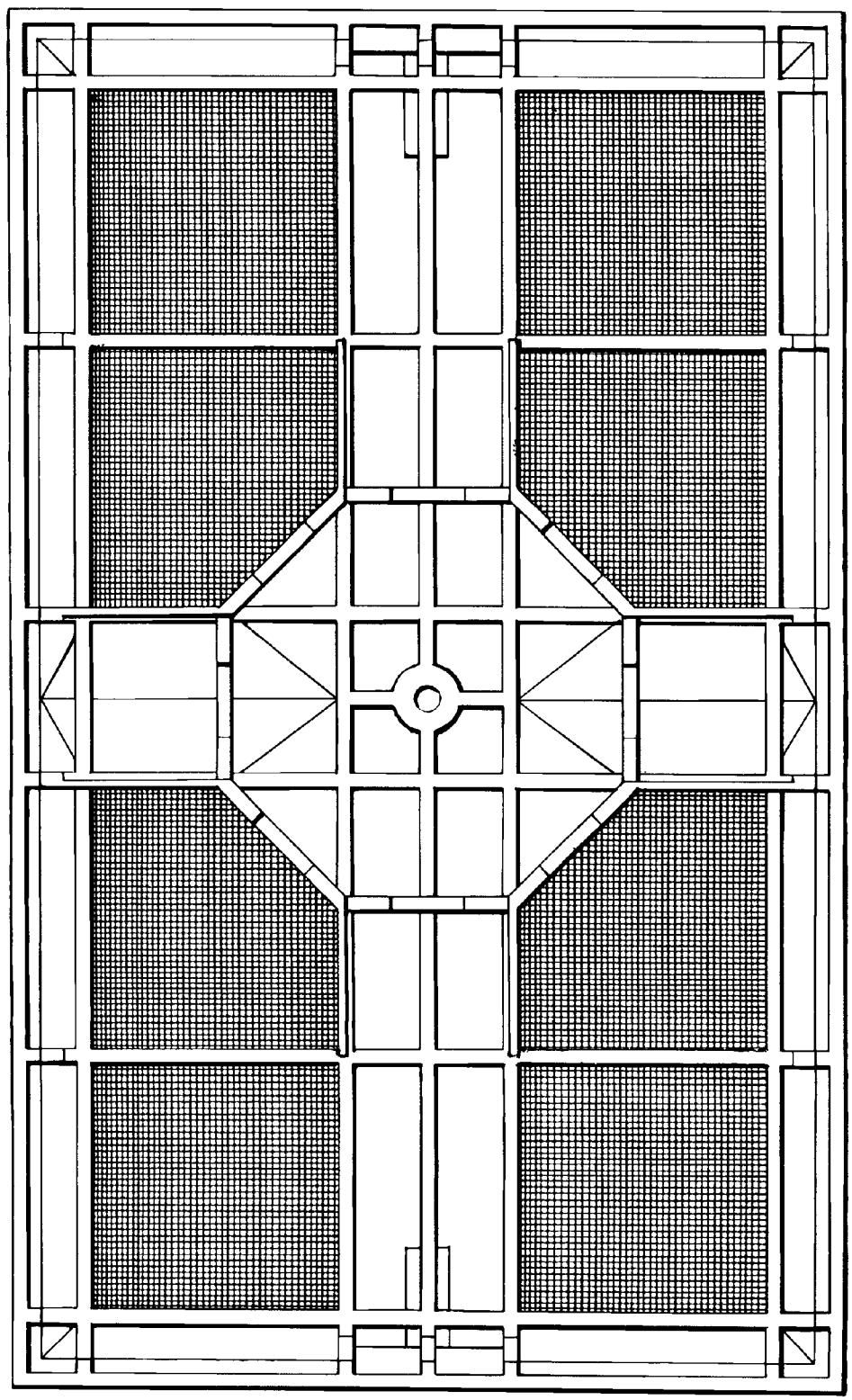
Figure 32S:
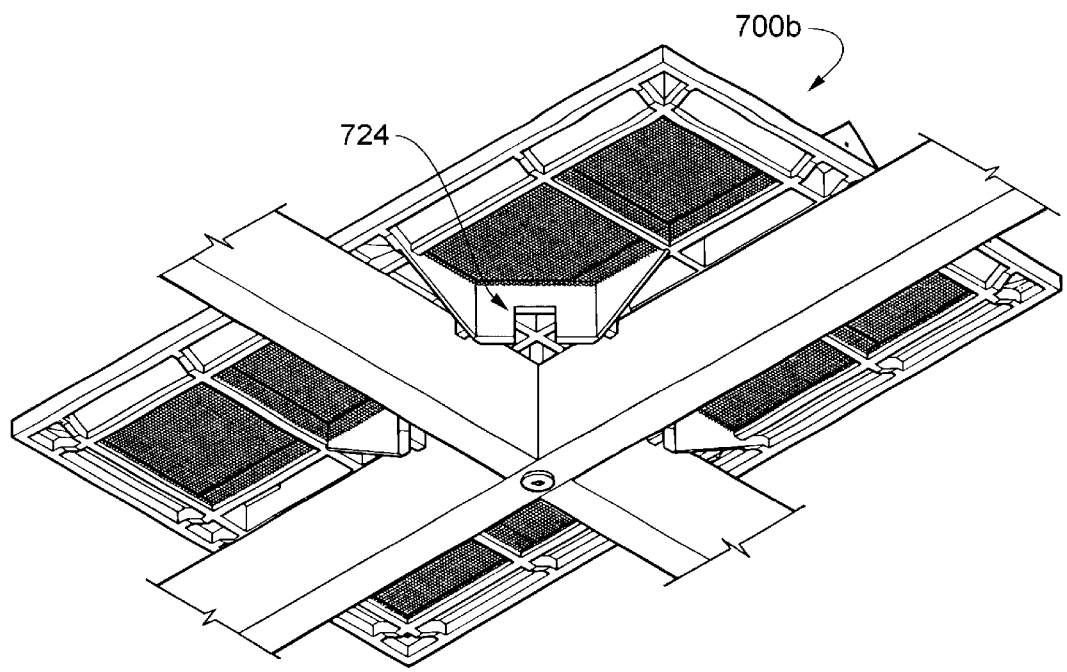
Figure 32T:
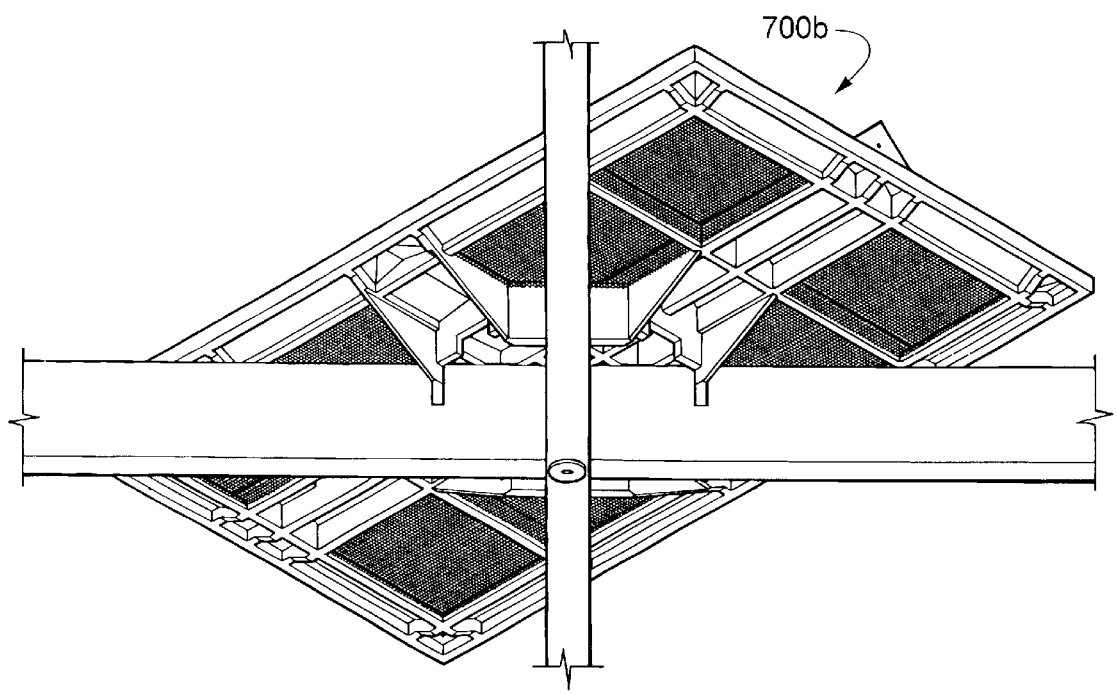
Figure 32Q:
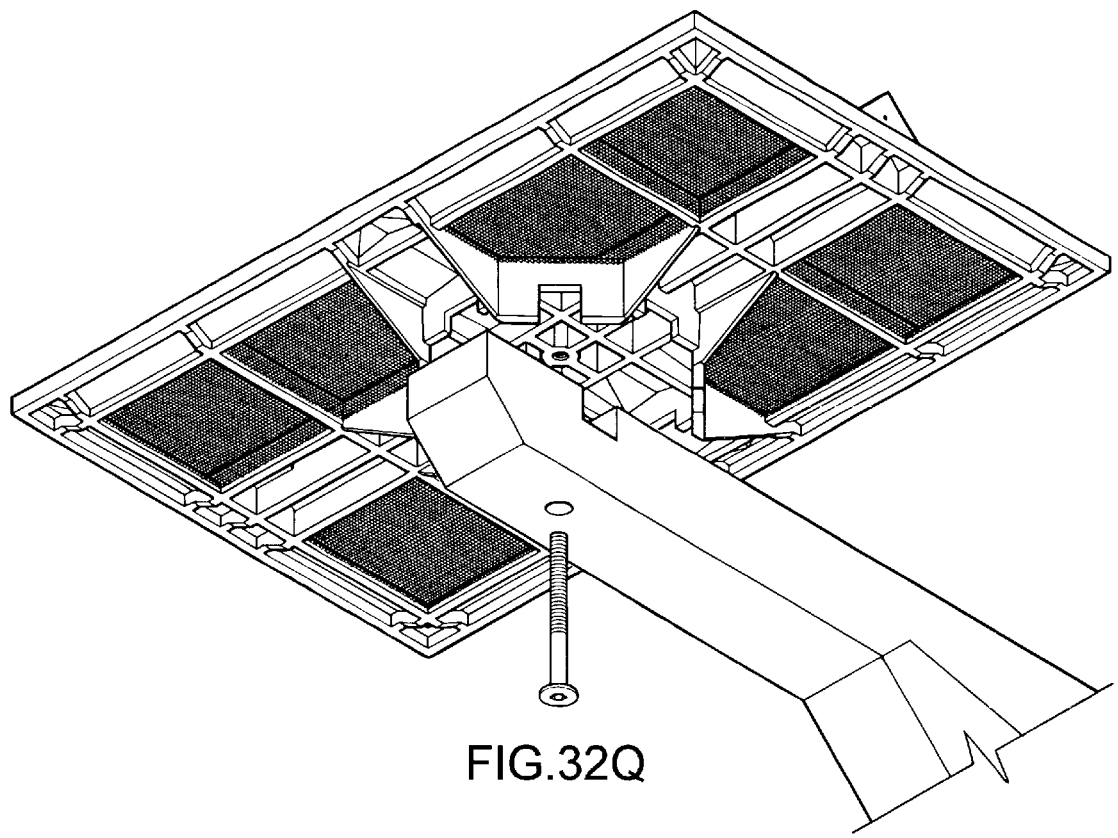

Referring initially to FIGS. 32A–32Q, depicted therein is a plastic base wall 700 constructed in accordance with, and embodying, the principles of the present invention. The base wall 700 corresponds to the base wall 270 described above.

The base wall 700 is preferably made out of a single piece of injection-molded plastic. The base wall 700 comprises a front edge 702, rear edge 704, left side edge 706, and right side edge 708. Extending from the left side edge 706 to the right side edge 708 is a center portion 710. Extending from the front edge 702 to the center portion 710 is a first bracing portion 712, while extending from the back edge 704 to the center portion 710 is a second bracing portion 714. These portions 702–714 provide primary structural rigidity to the base wall 700. Referring now to FIG. 32B, it can be seen that underneath the central portion 710 and bracing portion 712 and 714 is a series of walls that provide additional structure to the base wall 700.

Additionally, FIG. 32B shows that a hole 716 is formed on the bottom of the base wall 700 at a central location. This hole 716 may be pre-threaded or left unthreaded. If the hole 716 is left unthreaded, a self-tapping screw will be required to fasten objects to the underside of the base wall 700 using the hole 716.

Referring for a moment back to FIG. 32A, it can be seen that the central portion 710 and bracing portion 712 and 714 are generally cruciform in shape, resulting in four areas in which screens 718 are formed. These screens 718 allow water to pass through the bottom wall 708, which prevents spoilage of feed thereon and allows the bottom wall 700 to be cleaned.

Referring now for a moment to FIG. 32I, depicted therein is a section view taken along the center portion 710. This section view illustrates the hole 716 and also shows two unthreaded holes 720 formed at opposite ends of the central portion 710. One of these holes 720 is also shown in FIG. 32A. FIG. 32I illustrates that self-tapping fasteners are used in connection with these holes 720; these fasteners within the holes 720 will not be able to move relative to each other because of the rigid central portion 710 extending directly between these holes 720.

Referring now for a moment to FIGS. 32K–32N, depicted therein is yet another embodiment of a base wall 700b constructed in accordance with, and embodying, the principles of the present invention. This base wall 700b is in most respects the same as the base wall 700 described above. The primary distinction between these base walls is that the base wall 700b has additional braces 722 extending between its front and back edges 702 and 704 under the central portion 710.

As generally discussed above, the base walls 700 and 700b include braces 712, 722 that, in addition to providing strength, divide the screen 718 up into smaller areas. These smaller areas, along with the short defining walls formed by the braces 712, 722, help trap the feed and make it more difficult for birds to sift through the seeds with their heads, a process that usually causes feed to be ejected from the feed tray. The exact dimensions of the smaller screen areas defined by the braces 712, 722 are determined to reduce this sifting process.

Figure 32R:
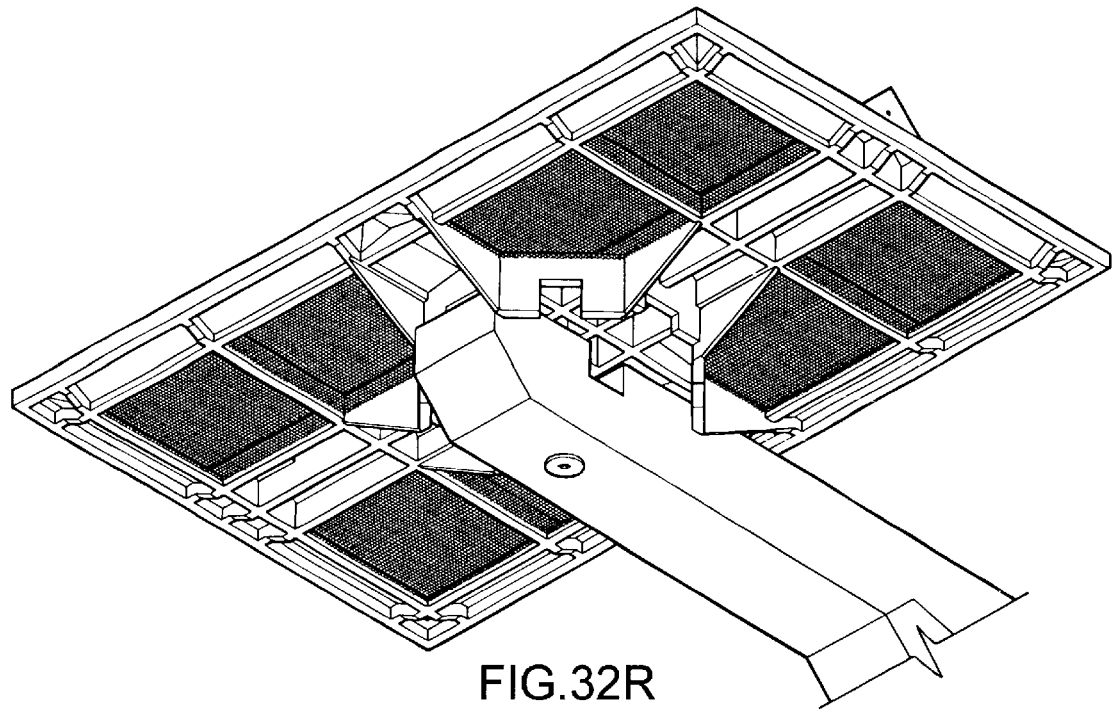
Figure 32O:
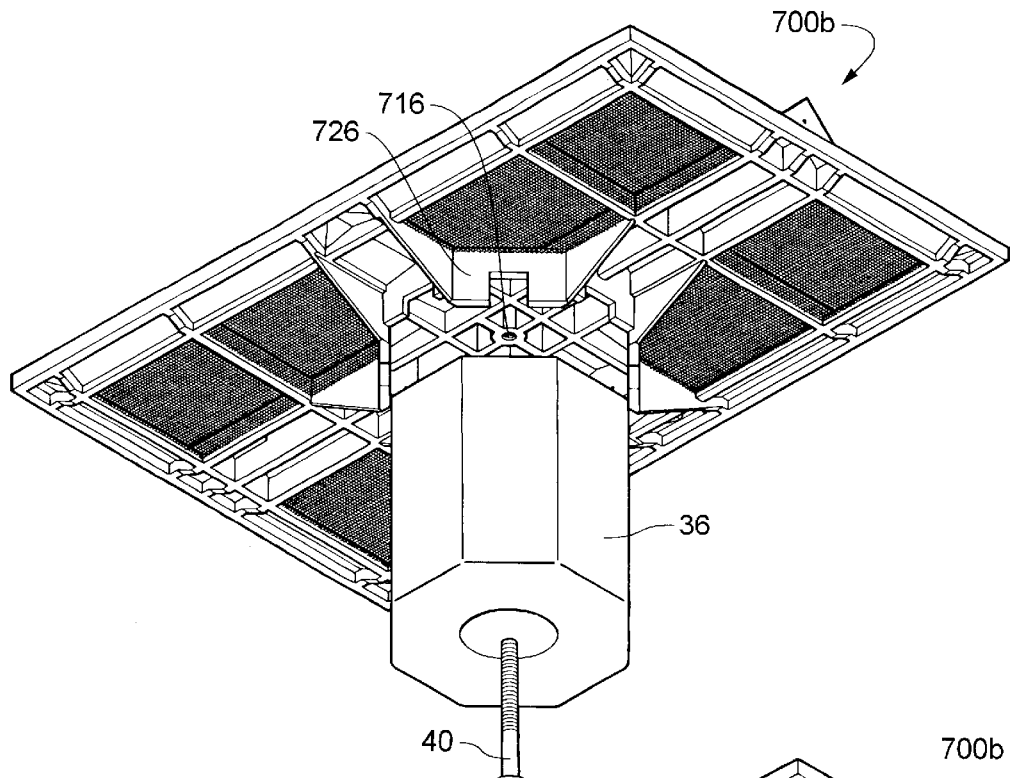
Figure 32P:
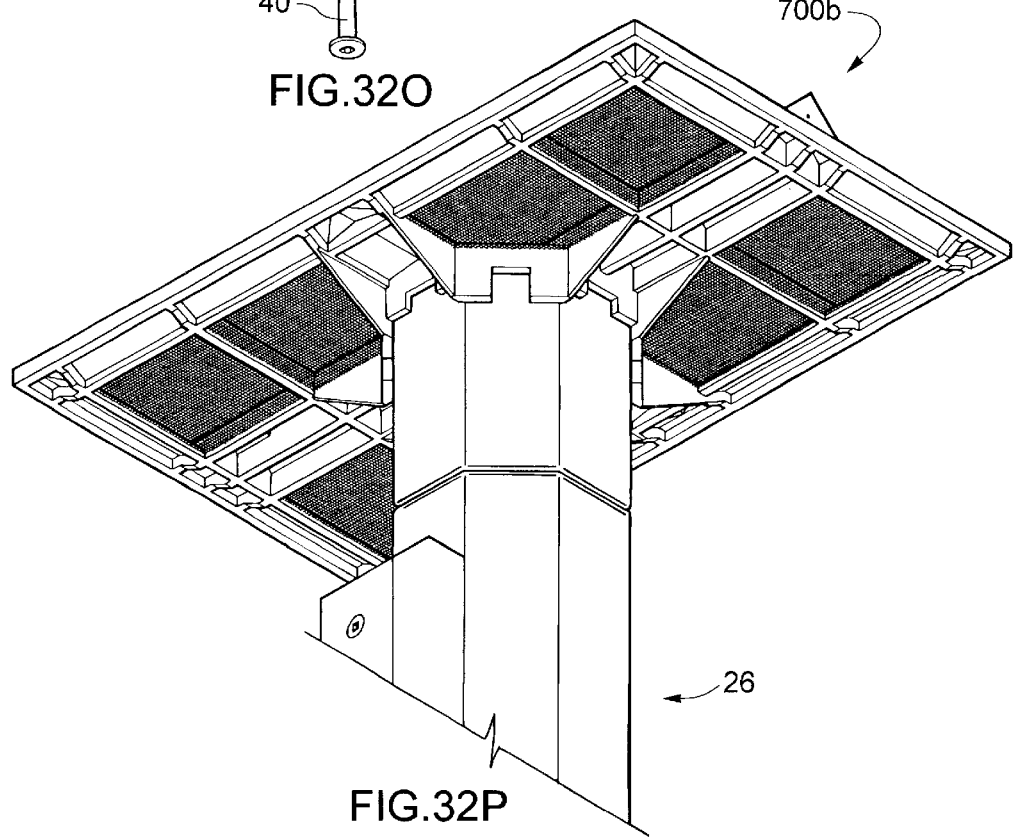
Figure 32U:
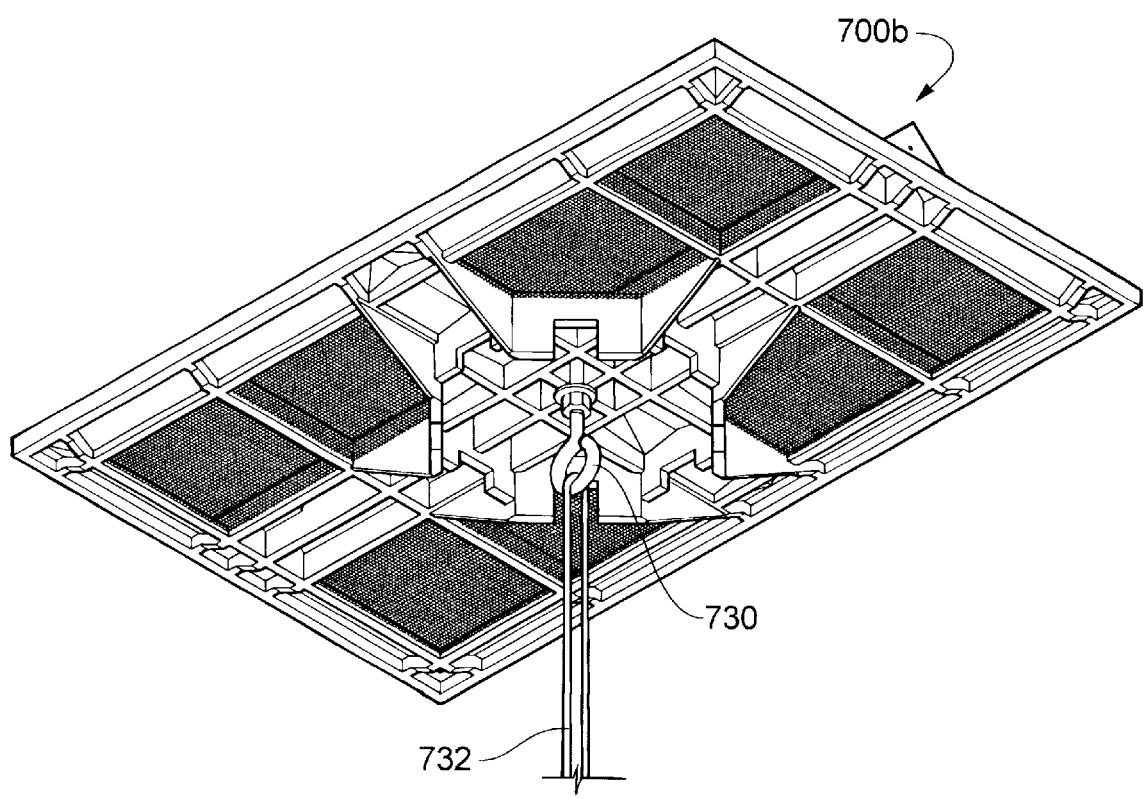
Figure 35B:
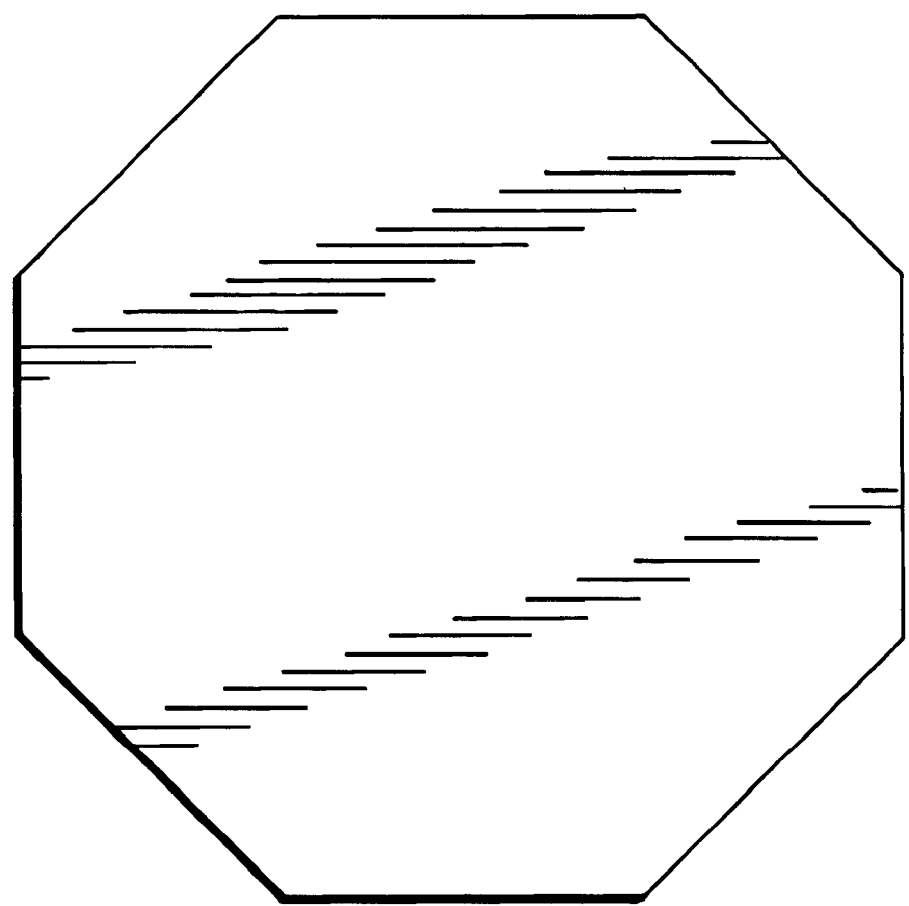
Figure 35A:
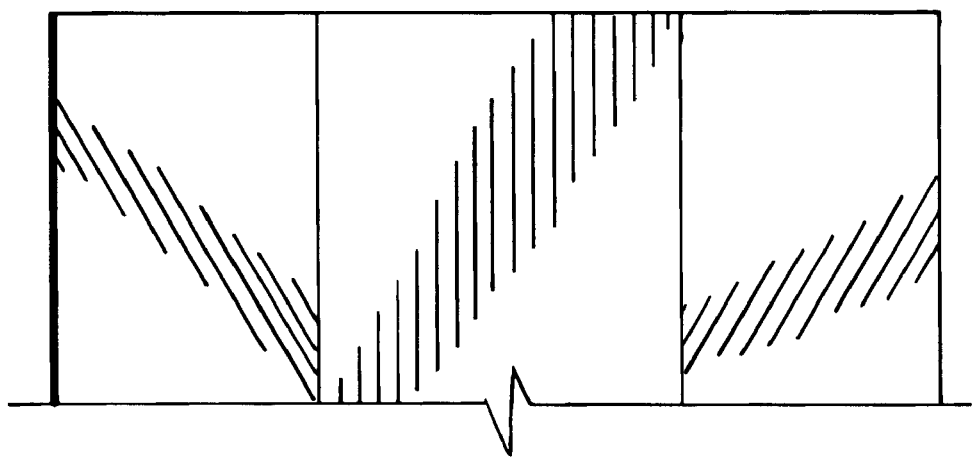

Referring now to FIGS. 32S–32U, various ways in which the base walls 700 and 700b may be used are depicted. Initially, as shown in FIG. 32S, the bottom of these base walls 700, 700b includes a mounting portion 724. This mounting portion 724 comprises, as shown perhaps best in FIG. 32L, eight side walls 726a–726h. The walls 726a, 726c, 726e, and 726g extend downward further than the walls 726b, 726d, 726f, and 726h. Notches 728a –728h are formed in each of the walls 726a–726h.

Referring now to FIGS. 32S–32R, it can be seen that any one of a number of structural members can be received within the notches 728. By inserting a bolt upwardly through one or more of these members, and into the threaded hole 716, the base member 700, 700b can be securely attached to a structure. In the case of FIGS. 32S and 32T, the structure attached to the base 700, 700b is a hull catcher such as that described above. In the case, of FIGS. 32Q and 32R, the structural member is a support member of a branch assembly.

In FIG. 32O and 32P, it can be seen that the eight walls 26 described above are arranged in an octagon having the same dimensions as the material from which the post caps 36 are made. Accordingly, a post cap can be inserted between these walls 726 in a snug fashion and the cap bolt 40 threaded into the threaded hole 716 to secure the base wall 700 to the post portion 26 in a secure manner.

Referring now to FIG. 32U, depicted therein is the use of an eye bolt 730 connected to the threaded opening 716 to suspend a strap 732 from the bottom of the base wall 700b.

Referring now to FIGS. 33–49, depicted therein are a number of molding profiles used to manufacture the components of the various post portions and accessories of the system 20 described above.

The drawings of these profiles are self-explanatory and can be matched to the various components above. The important aspect of these profiles is that, with a very limited number of these profiles, all of the different variations of the system 20 described above in FIG. 1 can be manufactured. This significantly reduces inventory and manufacturing costs for the producer.

Figure 50:
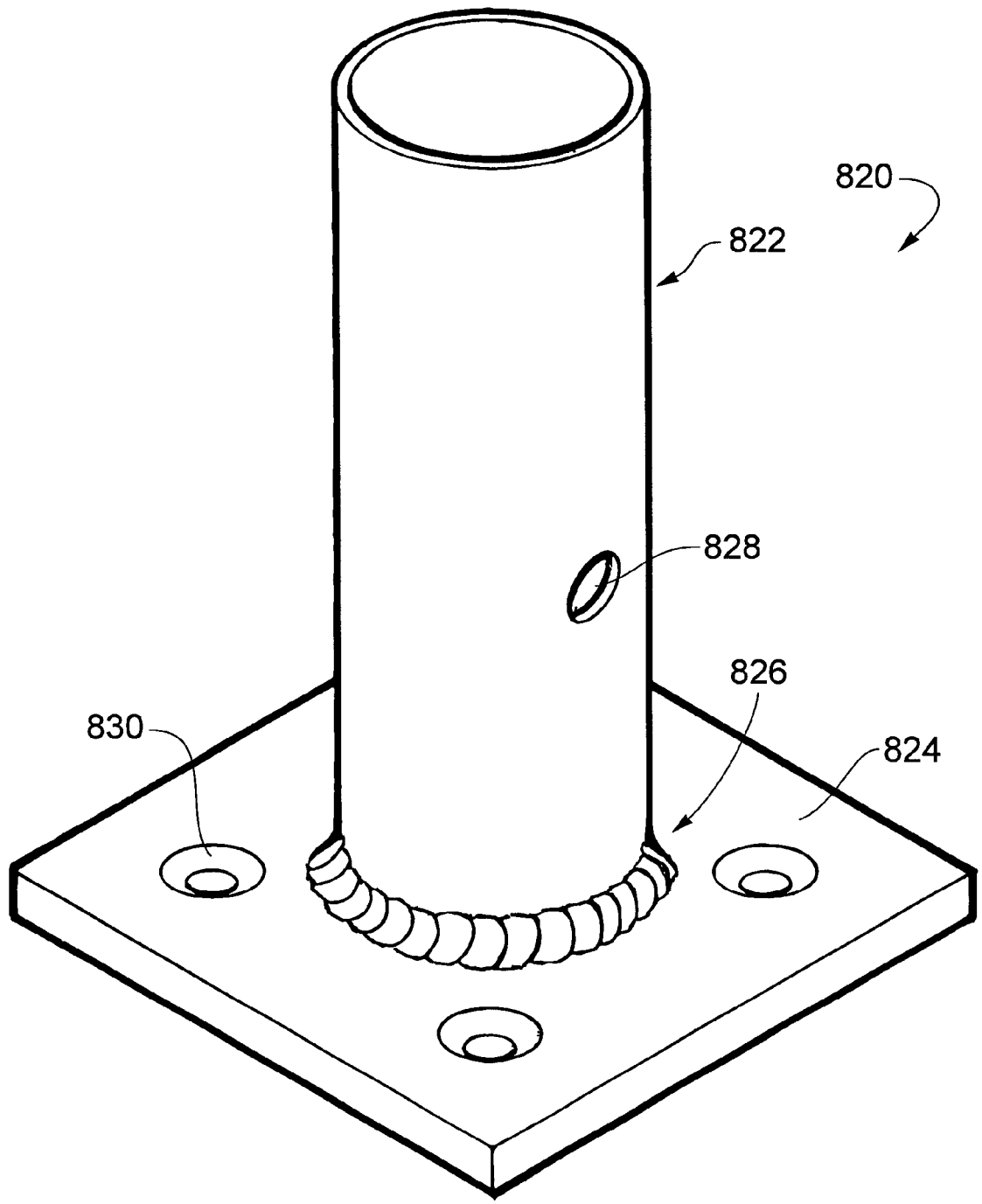

Referring now to FIG. 50, depicted therein at 820 is an anchor base that may be used in place of the anchor tube 38 described above. The anchor base 820 comprises a tube portion 822 and a flat mounting plate portion 824. The tube portion 822 is welded to the mounting plate portion 824 at a seam 826. An anchor hole 828 in the tube portion 822 performs the same function as the anchor hole 84 described above. The plate has four countersunk holes 830 formed therein.

During use, fasteners are driven through the holes 830 to secure the plate portion 824 to a mounting surface such as a deck or the like. A post section is then placed over the tube portion 822 in the same basic manner as shown in FIGS. 2A–F above to secure a support assembly to the mounting surface.

Figure 51:
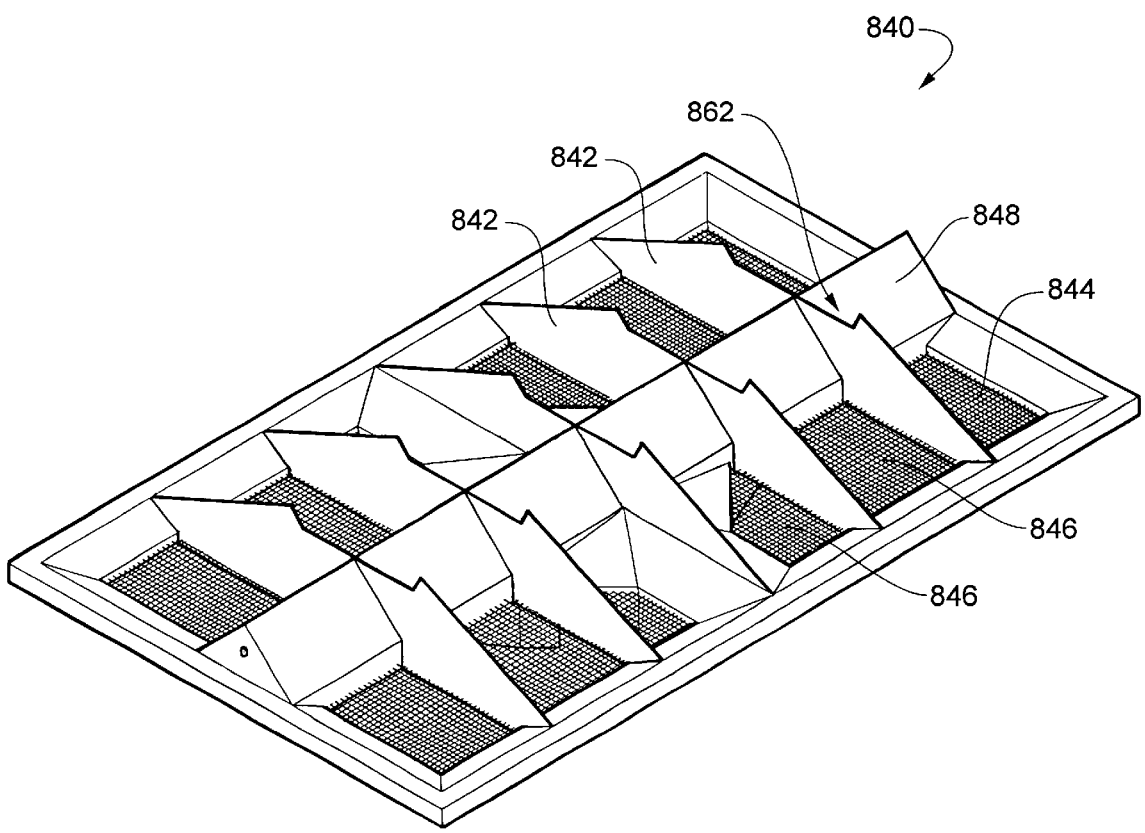
FIGS. 51 and 52 depict base walls that may be used to form a bottom wall of a feeder assembly.
Figure 52:
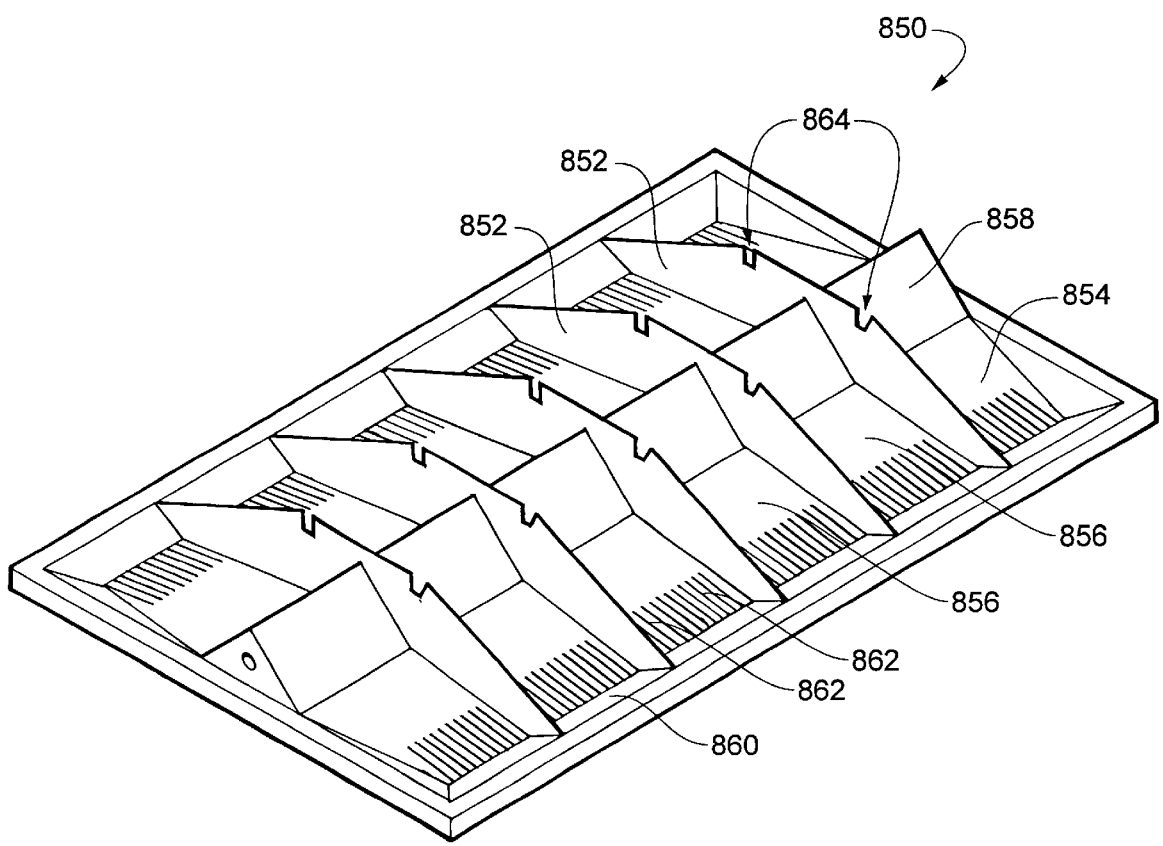

Referring now to FIGS. 51 and 52, depicted therein are two base walls such as the base wall 700 described above.

Shown in FIG. 51 is a base wall 840 comprising a series of dividing braces 842 that, in combination with a center portion 848, divide a feeding surface 844 of the wall 840 into twelve discrete bins 846. The center portion 848 has a slanted surfaces which force feed within the bins 846 towards the outside of the wall 840.

Shown in FIG. 52 is a base wall 850 comprising a series of dividing braces 852 that divide a feeding surface 854 into twelve discrete bins 856. These dividing braces 852 function in the same manner as the braces 842 described above.

The feeding surface 854 is not mesh as in the other embodiments and is not horizontal during normal use. Instead, the surface 854 slants downwardly to a lowermost portion 860 that is adjacent to the perimeter edge of the wall 850. The feeding surface 854 thus causes feed within each of the bins 856 to collect at this lowermost portion 860.

To allow water to drain from the bins 856, slots 862 are formed in the feeding surface 854 adjacent to the lowermost portion 860. Water flowing to the lowermost portion 860 will thus pass out of the bins 856.

While all of the base walls described herein may be made of injection molded plastic, the wall 850 is perhaps best suited for manufacture using the injection mold process.

The dividing braces of the base walls described above perform a number of different functions.

First, birds will sort through seeds as they feed. In doing so they scatter seeds to the side. These seeds often fall out of the feeder, resulting in wasted seed and a messy area surrounding the feeder. By dividing the feeding surface into discrete bins, the braces block seeds from being thrown out of the feeder.

Second, the braces further provide structural integrity to the base members of which they are a part. This reduces or eliminates the need for ribs or flanges underneath the base member.

Third, dividing braces can be notched as shown at 864 in FIG. 51 and 866 in FIG. 52. These notches 864 and 866 simplify the process of incorporating the base walls into a hopper style feeder. The notches receive the bottom edges of the side walls of a hopper style feeder as shown, for example, in FIGS. 14 and 15 described above. In this respect, the notches both identify where these side walls are located and hold the lower edge of the side wall to prevent the side wall from bulging during use.

Fourth, the dividing braces locate a center wall of a dual hopper style feeder. Shown in FIG. 14 is a hopper feeder that has a center wall that divides the hopper into two section. The center wall of the hopper can be milled with a slot designed to receive the upper edge of the dividing brace. This slot is simple to form and positively centers the center wall in the right location.

Figure 53A:
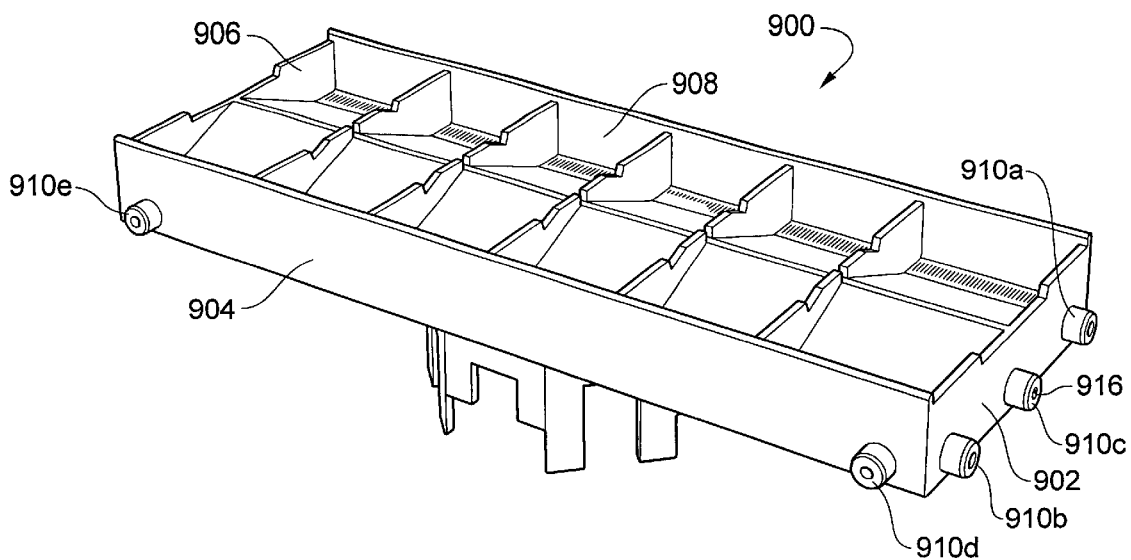
FIGS. 53A and 53B depict top perspective and bottom perspective views of a base member that may be used as an alternative to the base member described with reference to FIGS. 32A–U above.
Figure 53B:
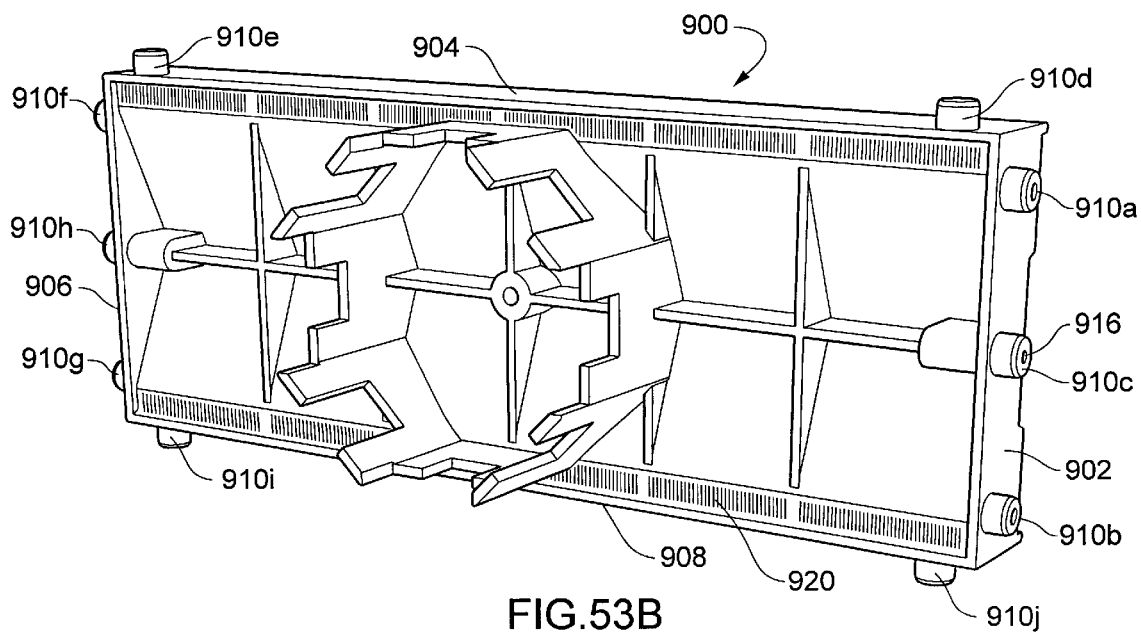

As an alternative to the base wall 700 described above, a base wall 900 as shown in FIGS. 53A and 53B may be used. The base wall 900 is constructed and used in a manner similar to that of the wall 700; the wall 900 will thus be described herein only to the extent that it differs from the wall 700.

The base wall 900 comprises first, second, third, and fourth vertical walls 902, 904, 906, and 908 and a plurality of alignment projections 910 extending from these walls 902–908.

In particular, the alignment projections 910 are cylindrical protrusions that horizontally extend outwardly from the outer surfaces of the walls 902–908. The exemplary base wall 900 comprises first side, second side, and middle alignment projections 910a, 910b, and 910c extending from the end wall 902, first end and second end alignment projections 910d and 910e extending from the side wall 904, first side, second side, and middle alignment projections 910f, 910g, and 910h extending from the end wall 906, and first end and second end alignment projections 910i and 910j extending from the side wall 908.

Figure 54:
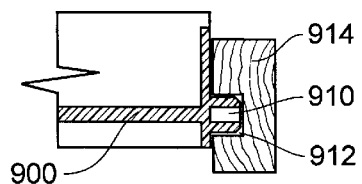
FIG. 54 is a section view depicting the engagement of an alignment projection on the base member with a socket in a wall member.

Referring to FIG. 54, the alignment projections 910 are sized and spaced from each other to accommodate sockets 912 formed in wooden members 914 that are intended to be attached to the base member 900. With the base member 700 described above, grooves were formed in the wooden members attached thereto; the grooves receive the edges of the base member 700 to connect the wooden members to the base member.

With the base member 900, on the other hand, the sockets 912 receive the alignment projections 910 to secure the wooden members 914 relative to the base member 900 as shown in FIG. 54. The alignment projection/socket system used by the base member 900 obviates the need to form grooves in the wooden members 914. The fabrication of the wooden members and the assembly of the wooden members onto the base member is thus significantly simplified when the base member 900 is used.

The middle alignment projections 910c and 910h differ slightly from the other alignment projections in that they each define a screw cavity 916. A conventional wood screw may be threaded into the cavities 916. The cavities 916 thus allow a fastener such as a wood screw to securely engage the base member 900. In practice, the wood screw will normally first extend through a hole in a wooden member, thereby allowing the wooden member to be securely attached to the base member 900.

The base member 900 differs from the base member 700 in that, instead of a screen material to allow moisture to drain from the upper surface, small holes 920 are formed at the lower most point of the upper surface. Any water on the upper surface of the base member 900 thus drains through these holes 920.

Like the base member 700 described above, the base member 900 may be used to form a number of enclosures of different shapes, configurations, and purposes. For example, any of the enclosures described above with reference to FIGS. 13–17 may simply be adapted to use the base member 900; the adaptation requires the replacement of horizontal grooves in the wooden members and edges on the base member with the aligning sockets and alignment projections discussed above.

Many of the enclosures that may be used with the base member 900 require the use of all of the alignment projections 910, but some enclosure designs do not require the use of all of the alignment projections 910.

Figure 55A:
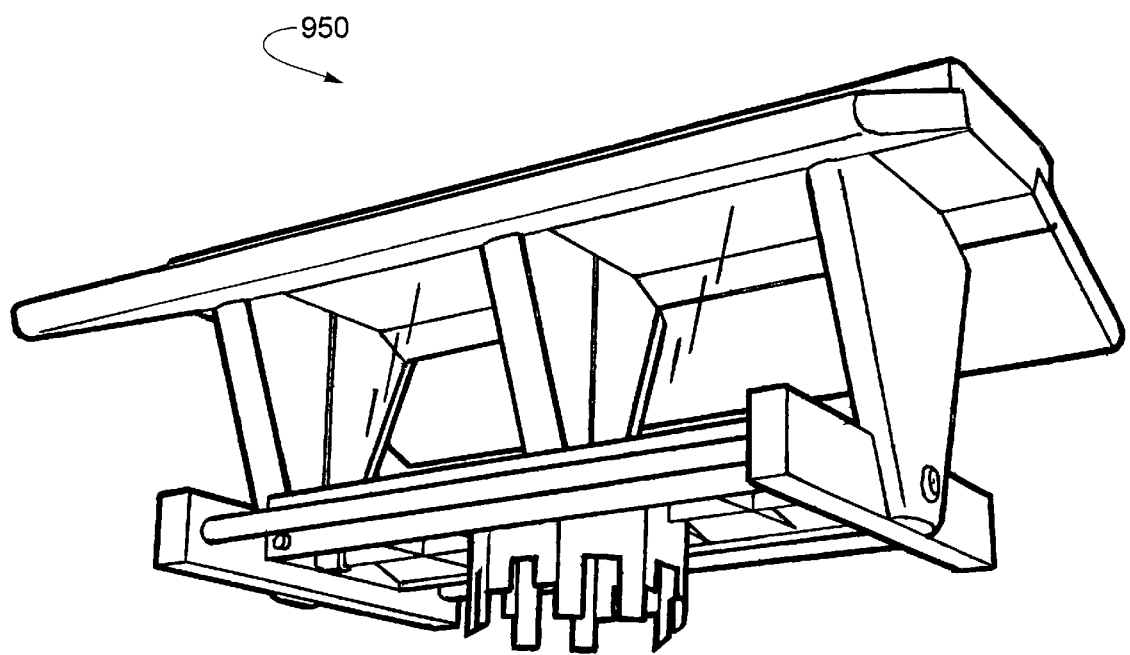
FIGS. 55A and 55B are top perspective and exploded views of an exemplary animal enclosure (feeder) using the base member of FIG. 53.
Figure 55B:
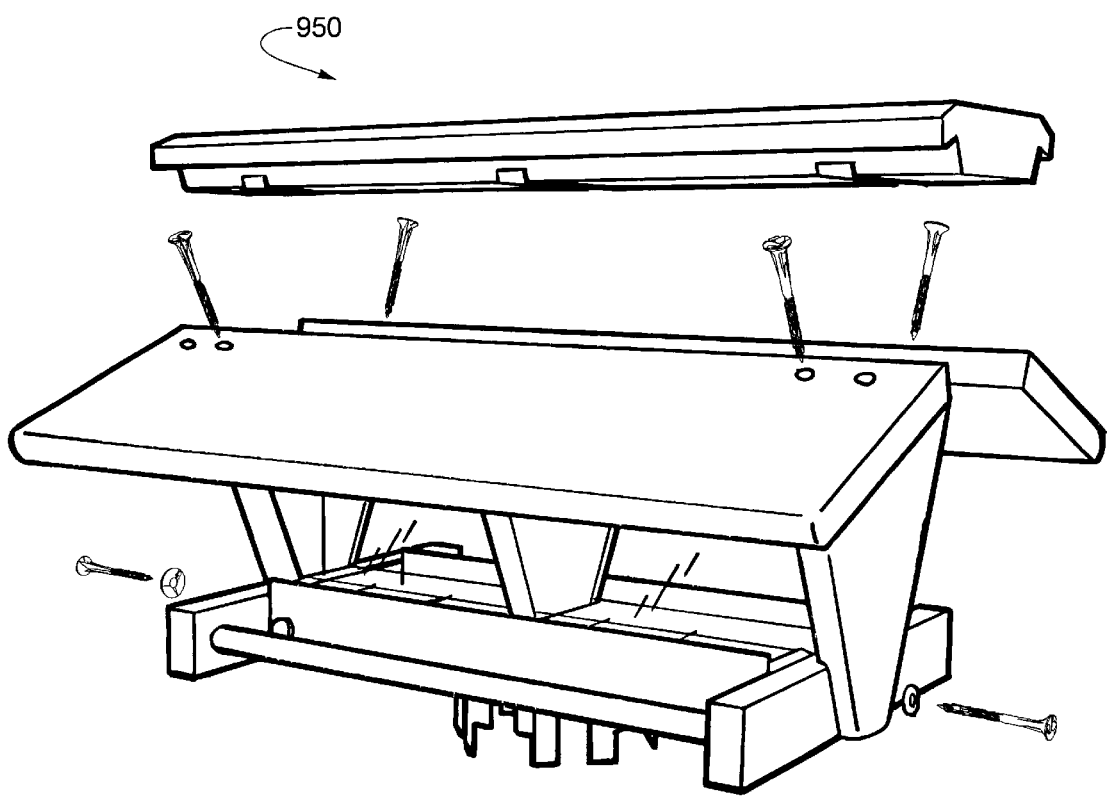

One exemplary enclosure using the base member 900 is depicted at 950 in FIGS. 55A and 55B. The enclosure 950 only uses the side and middle alignment projections 910a–c and 910f–h and does not require use of the end alignment projections 910d,e and 910i,j.

FIGS. 56A–H depict the process of assembling the enclosure 950.

Figure 56A:
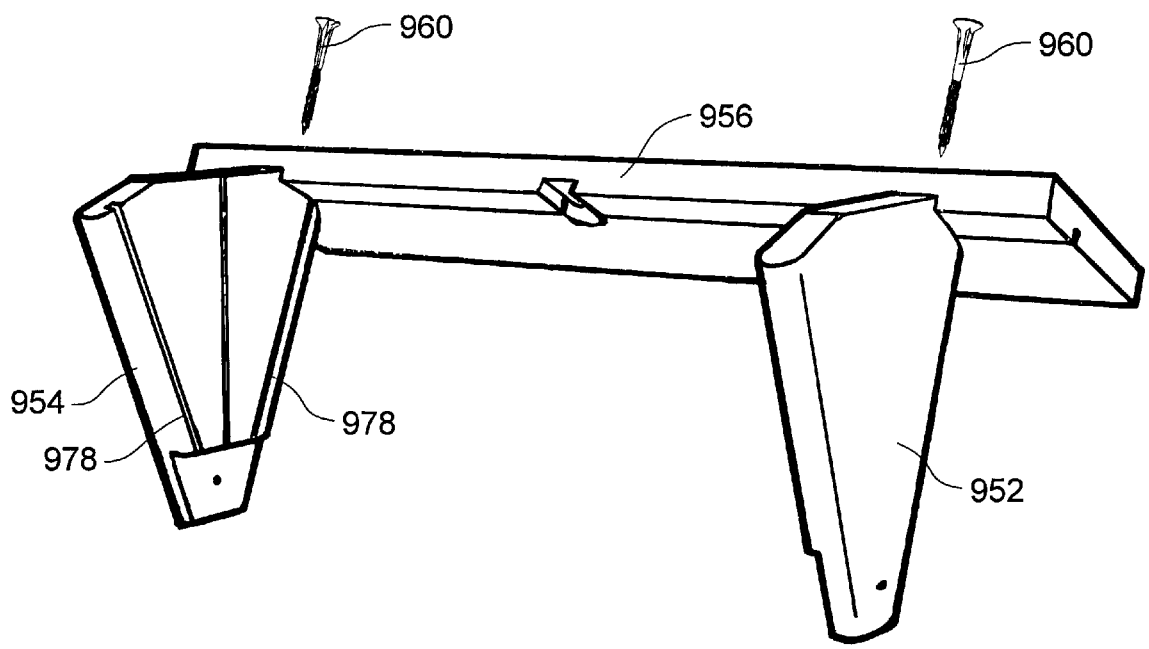
FIGS. 56A–H depict the assembly of the animal enclosure depicted in FIG. 55.
Figure 56B:
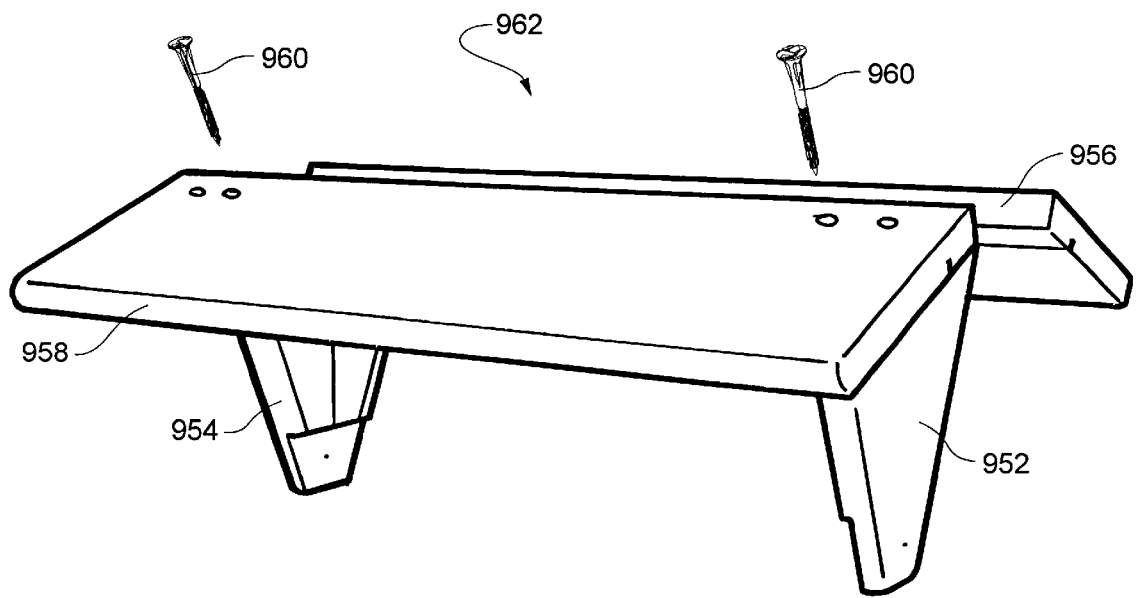
Figure 56C:
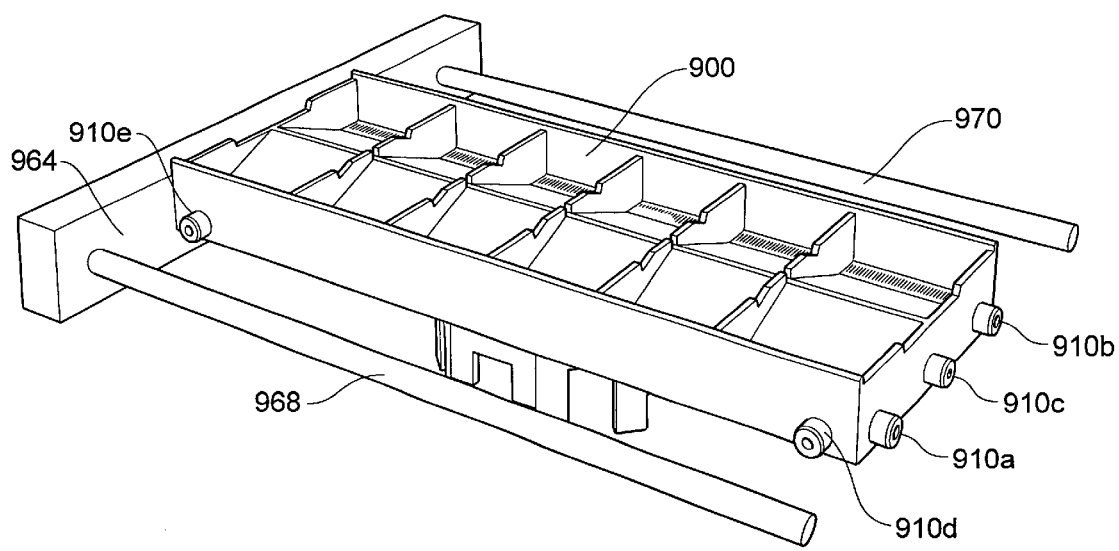
Figure 56D:
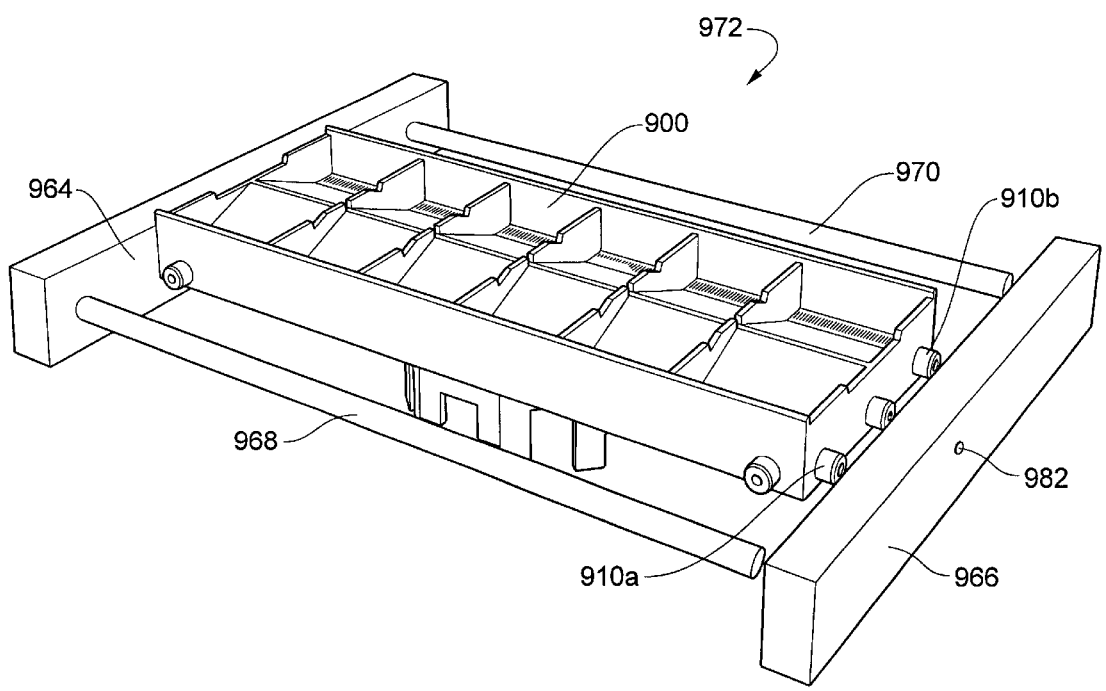
Figure 56E:
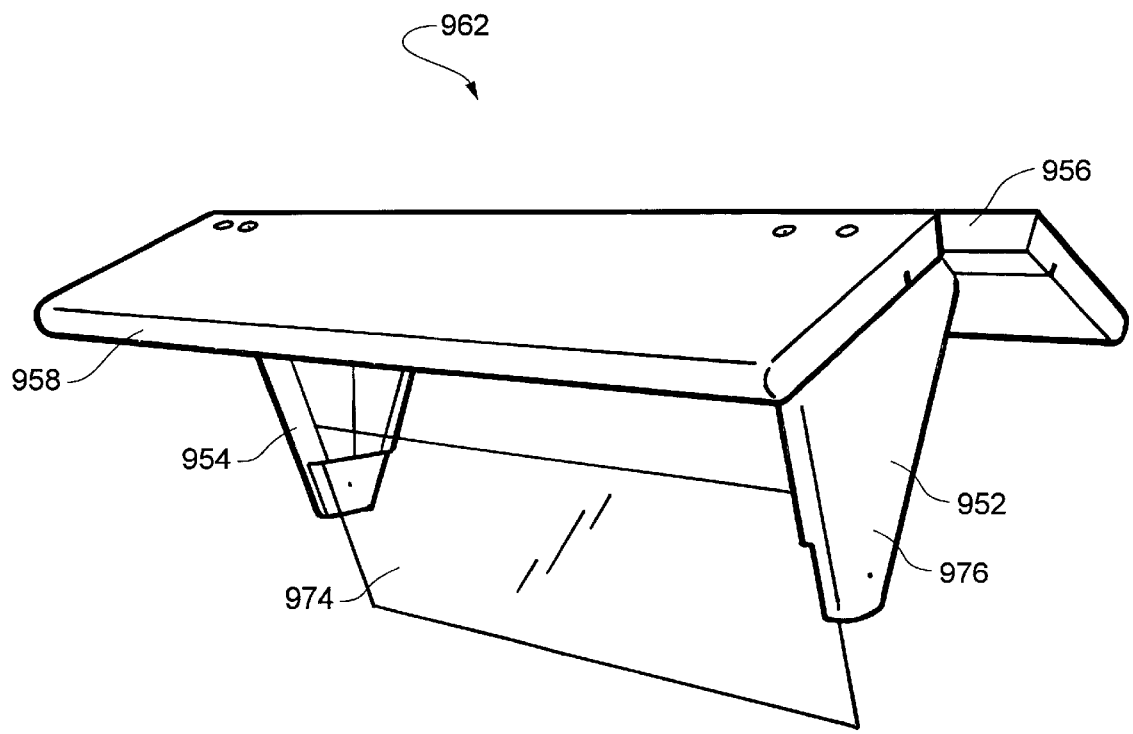

Initially, as shown in FIGS. 56A and 56B, outer end members 952 and 954 are attached to side roof members 956 and 958 using fasteners such as wood screws 960 to form a roof assembly 962. Inner end members 964 and 966 and perch rails 968 and 970 are then assembled onto the base member 900 to form a base assembly 972 as shown in FIGS. 56C and 56D. Sockets formed in the inner end members 964 and 966 receive the side and middle alignment projections 910a–c and 910 f–h. Transparent bin walls 974 and 976 are next inserted into slots 978 in the outer end members 952 and 954 as shown in FIG. 56E.

Figure 56F:
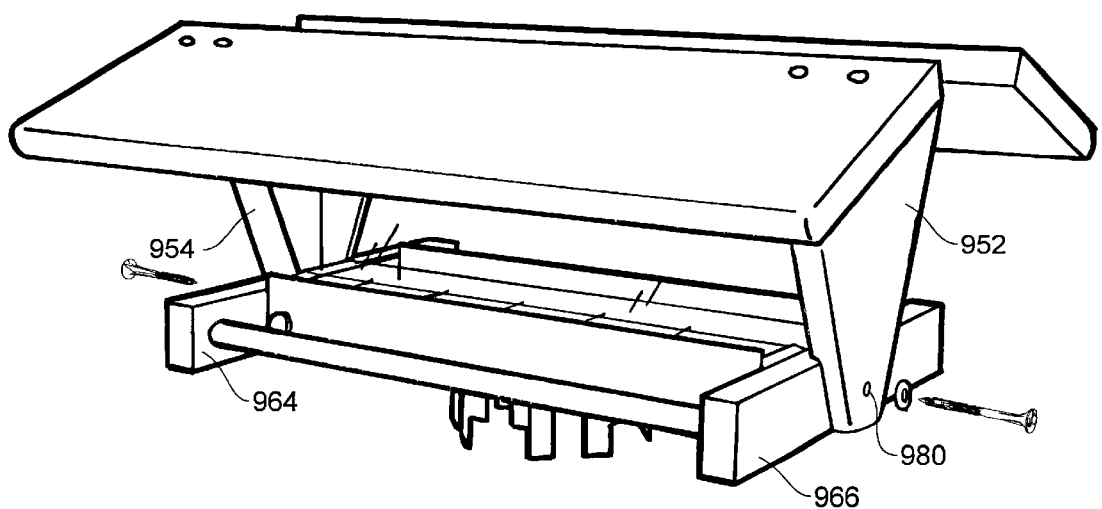
Figure 56G:
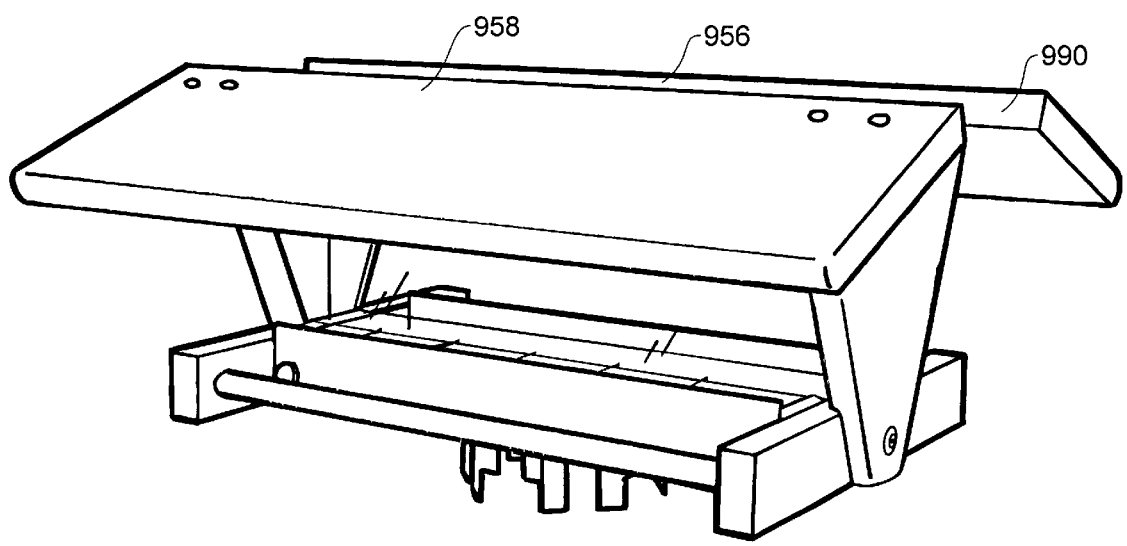
Figure 56H:
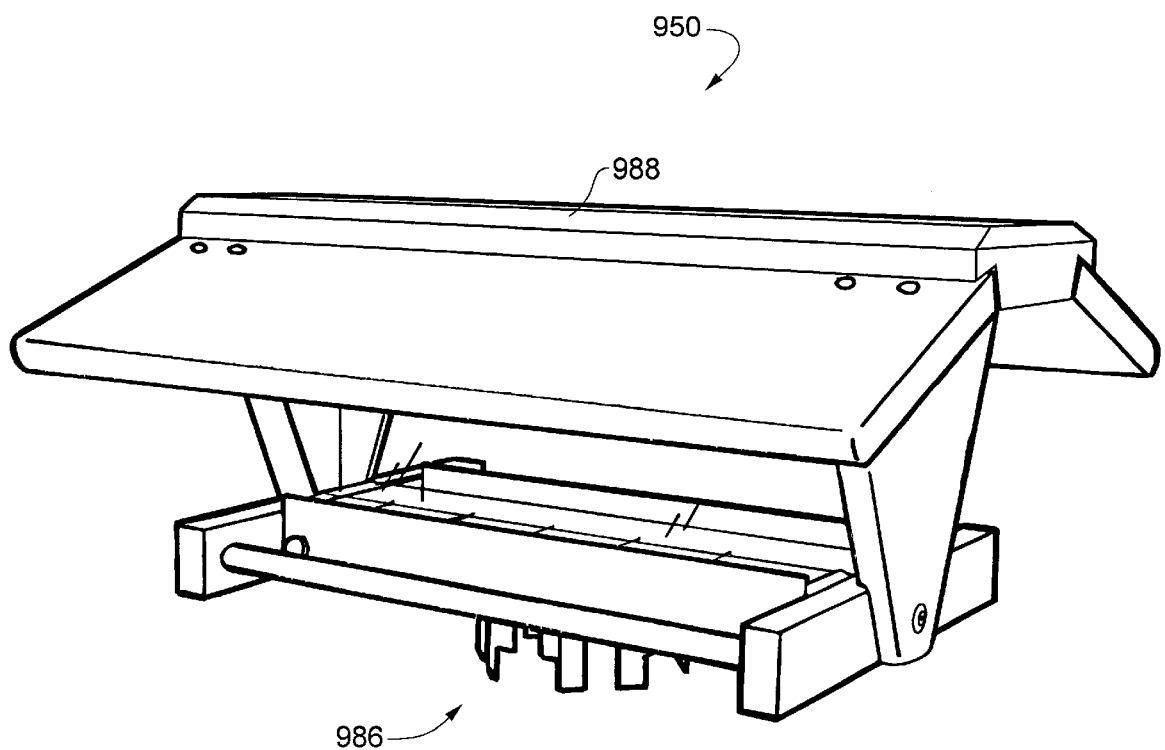

The roof assembly 962 is then placed onto the base assembly 972 such that the inner end members 964 and 966 are straddled by the outer end members 952 and 954. At this point, holes 980 formed in the outer end members 952 and 954 are aligned with holes 982 formed in the inner end members 964 and 966. The holes 980 and 982 are further aligned with the screw cavities 916 formed in the middle alignment projections 910c and 910h. Fasteners 984, which may be wood screws identical to the wood screws 960 described above, are then inserted or threaded through the holes 980 and 982 and into the screw cavities 916 to join the roof assembly 962 to the base assembly 972 to form an enclosure assembly 986 as shown in FIGS. 56F and 56G.

The enclosure 950 is then formed by placing a roof cover 988 onto the roof side members 956 and 958 to cover a gap 990 formed between the members 956 and 958.

In use, the roof cover 988 is removed and feed is placed between the bin walls 974 and 976 through the gap 990. The cover 988 is then replaced and the feed is allowed to gradually fall onto the upper surface of the base member 900. The enclosure 950 thus functions to store and dispense feed for birds, which stand on the feed rails 968 and 970 to eat the feed on the base member 900.

From the foregoing, it should be apparent that the present invention may be embodied in many forms without departing from the principles of the present invention.

I claim:

1. A base member adapted to form a part of an animal enclosure comprising at least one wall member and one roof member, the animal enclosure being adapted to be mounted onto a structural member, the base member comprising:

an upper surface that forms a floor of the animal enclosure assembly;

a structural portion adapted to form a structural part of the animal enclosure assembly;

an edge portion adapted to engage the at least one wall member; and a lower surface adapted to allow the animal enclosure assembly to be attached to the structural member.

2. A base member as recited in claim 1, in which the structural portion is integrally formed with the upper portion.

3. A base member as recited in claim 1, in which the structural portion defines first, second, third, and fourth side edges and comprises:

a center portion extending between the first and third side edges; and a plurality of bracing portions extending between the center portion and one of the second and fourth side edges.

4. A base member as recited in claim 1, in which the structural member is a post member, and the bottom surface comprises a base portion defining a chamber adapted to receive the upper end of the post member.

5. A base member as recited in claim 1, in which the structural member is a horizontal branch member having an outer end, and the bottom surface comprises a base portion defining a chamber adapted to receive the outer end of the branch member.

6. A base member as recited in claim 1, in which the structural member is selected from a group consisting of a vertical post member having an upper end and a horizontal branch member having an outer end, and the bottom surface comprises a base portion defining a chamber adapted to receive a selected one of the upper end of the vertical post member and the outer end of the branch member.

7. A base member as recited in claim 1, further comprising at least one horizontally extending alignment projection to engage a socket formed in the wall member of the animal enclosure.

8. A base member as recited in claim 1, in which the alignment projection is a cylindrical portion integrally formed with the base member.

9. A base member as recited in claim 1, in which the base member comprises at least one horizontally extending alignment projection, where a fastener cavity is formed in the alignment projection to allow a fastener to be securely attached to the base member.

10. A base member as recited in claim 1, in which the base member is formed of plastic.

11. A base member as recited in claim 1, in which the at least one roof member is attached to the at least one wall member to form the animal enclosure.

12. An animal enclosure as recited in claim 11, in which the structural portion of the base member is integrally formed with the upper portion.

13. An animal enclosure as recited in claim 11, in which the structural portion of the base member defines first, second, third, and fourth side edges and comprises:
- a center portion extending between the first and third side edges; and
- a plurality of bracing portions extending between the center portion and one of the second and fourth side edges.

14. An animal enclosure as recited in claim 13, in which a feed surface for holding animal feed is arranged between the center portion and the bracing portions.

15. An animal enclosure as recited in claim 14, in which the feed surface is perforated to prevent water from being trapped on the feed surface.

16. An animal enclosure as recited in claim 11, in which the structural member is a post member, and the bottom surface comprises a base portion defining a chamber adapted to receive the upper end of the post member.

17. An animal enclosure as recited in claim 11, in which the structural member is a horizontal branch member having an outer end, and the bottom surface comprises a base portion defining a chamber adapted to receive the outer end of the branch member.

18. An animal enclosure as recited in claim 11, in which the structural member is selected from a group consisting of a vertical post member having an upper end and a horizontal branch member having an outer end, and the bottom surface comprises a base portion defining a chamber adapted to receive a selected one of the upper end of the vertical post member and the outer end of the branch member.

19. An animal enclosure as recited in claim 11, in which the base member comprises a plurality of bracing members extending across the floor surface to divide the floor surface into a plurality of feeding bins.

20. An animal enclosure as recited in claim 11, in which the base member comprises at least one horizontally extending alignment projection, where at least one socket is formed in the at least one wall member such that the socket receives the alignment projection to properly align the wall member with the base member.

21. An animal enclosure as recited in claim 20, in which the alignment projection is a cylindrical portion integrally formed with the base member.

22. An animal enclosure as recited in claim 11, in which the base member comprises at least one horizontally extending alignment projection, where a fastener cavity is formed in the alignment projection to allow a fastener to be securely attached to the base member.

23. An animal enclosure as recited in claim 22, in which at least one socket is formed in the at least one wall member such that the socket receives the alignment projection to properly align the wall member with the base member and the fastener extends through the wall member and into the fastener cavity to secure the wall member onto the base member.

24. An animal enclosure as recited in claim 11, in which the base member is formed of plastic and the wall and roof members are formed of wood.

* * * * *